United States Patent
Wolting

(10) Patent No.: US 10,355,940 B2
(45) Date of Patent: Jul. 16, 2019

(54) COMPILER FOR AND METHOD OF SOFTWARE DEFINED NETWORKING, STORAGE AND COMPUTE PERFORMING OPERATIONS

(71) Applicant: Wolting Holding B.V., Huizen (NL)

(72) Inventor: Simon Wolting, Huizen (NL)

(73) Assignee: Wolting Holding B.V., Huizen (NL)

( * ) Notice: Subject to any disclaimer, the term of this patent is extended or adjusted under 35 U.S.C. 154(b) by 0 days.

(21) Appl. No.: 15/512,886

(22) PCT Filed: Sep. 21, 2015

(86) PCT No.: PCT/NL2015/050658
§ 371 (c)(1),
(2) Date: Mar. 21, 2017

(87) PCT Pub. No.: WO2016/048144
PCT Pub. Date: Mar. 31, 2016

(65) Prior Publication Data
US 2017/0302530 A1   Oct. 19, 2017

(30) Foreign Application Priority Data

Sep. 22, 2014   (EP) .................................. 14185824
Sep. 22, 2014   (EP) .................................. 14185825
(Continued)

(51) Int. Cl.
*H04L 12/24*   (2006.01)
*H04L 29/08*   (2006.01)

(52) U.S. Cl.
CPC .............. *H04L 41/12* (2013.01); *H04L 41/08* (2013.01); *H04L 41/0896* (2013.01); *H04L 41/145* (2013.01); *H04L 67/327* (2013.01)

(58) Field of Classification Search
CPC ..... H04L 41/12; H04L 41/08; H04L 41/0896; H04L 41/145; H04L 67/327
(Continued)

(56) References Cited

U.S. PATENT DOCUMENTS

2008/0219272 A1   9/2008   Novello et al.
2011/0022694 A1   1/2011   Dalal et al.
(Continued)

FOREIGN PATENT DOCUMENTS

WO   2012090996 A1   7/2012

OTHER PUBLICATIONS

Kireeti Kompella, "Research Problems in SDN", Proceedings of IETF 85—SDNRG, Atlanta, GA, USA, Nov. 6, 2012, URL: http://www.1-4-5.net/~dmm/sdnrg/IETF85/presentations/Kompella.SDN-irtf.pptx.pdf.

*Primary Examiner* — Nicholas R Taylor
*Assistant Examiner* — Chong G Kim
(74) *Attorney, Agent, or Firm* — N.V. Nederlandsch Octrooibureau; Tamara C. Stegmann; Catherine A. Shultz

(57) ABSTRACT

Method of and a compiler for controlling a network based on a logical network model. The network has physical nodes and logical nodes. The physical nodes are interconnected by physical links in accordance with a physical network layout. The logical network model has logical nodes indicated with a logical node name which refers to at least one physical node in the network. The method uses a depth-mapping relation defining how the logical nodes are mapped to the physical nodes. The method includes creating logical links between the logical nodes in dependence on the physical paths between the physical nodes and on the depth-mapping relation. The method uses edge-relationships between logical link, logical path, physical link, physical path and depth-mapping relations. Logical paths in the logical net-
(Continued)

work are transformed into a physical path comprising of physical links between the physical nodes through recursive calculation and forwarding instructions are created for the physical nodes, in dependence on the edge-relationships and point-of-attachment names between physical links and physical nodes. A user of a compiler may specify additional operations other than switching, multiplexing or de-multiplexing to be performed at a logical node on packet or signal. Said packet or signal may be identified with a logical identifier identifying at least one logical link or logical path, and said additional operation may be specified at a logical node, providing programmability of additional operations in said logical network model. Said additional operations will, if possible, be performed by physical or virtual resources represented by physical nodes.

29 Claims, 79 Drawing Sheets

(30) Foreign Application Priority Data

Sep. 23, 2014 (EP) .................................. 14186045
Dec. 4, 2014 (EP) .................................. 14196330

(58) Field of Classification Search
USPC .......................................................... 709/220
See application file for complete search history.

(56) References Cited

U.S. PATENT DOCUMENTS

2013/0044641 A1   2/2013   Koponen et al.
2013/0058215 A1   3/2013   Koponen et al.
2013/0163475 A1   6/2013   Beliveau et al.

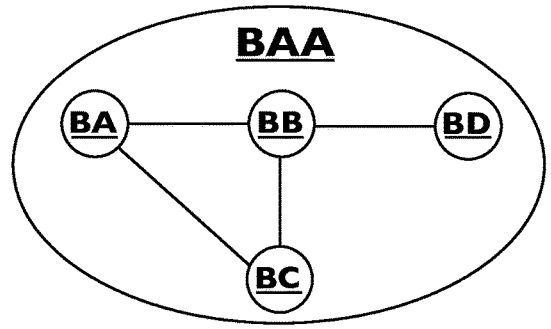
FIG. 2A
FIG. 2B
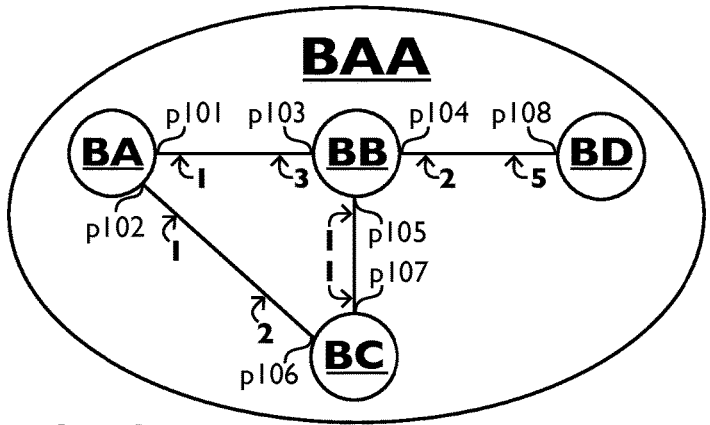
FIG. 2C
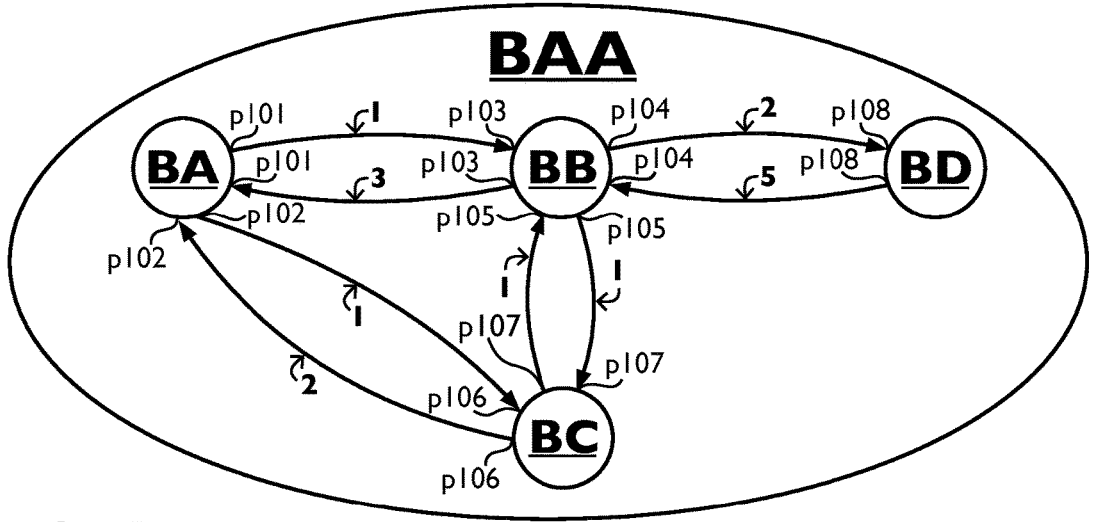
FIG. 2D

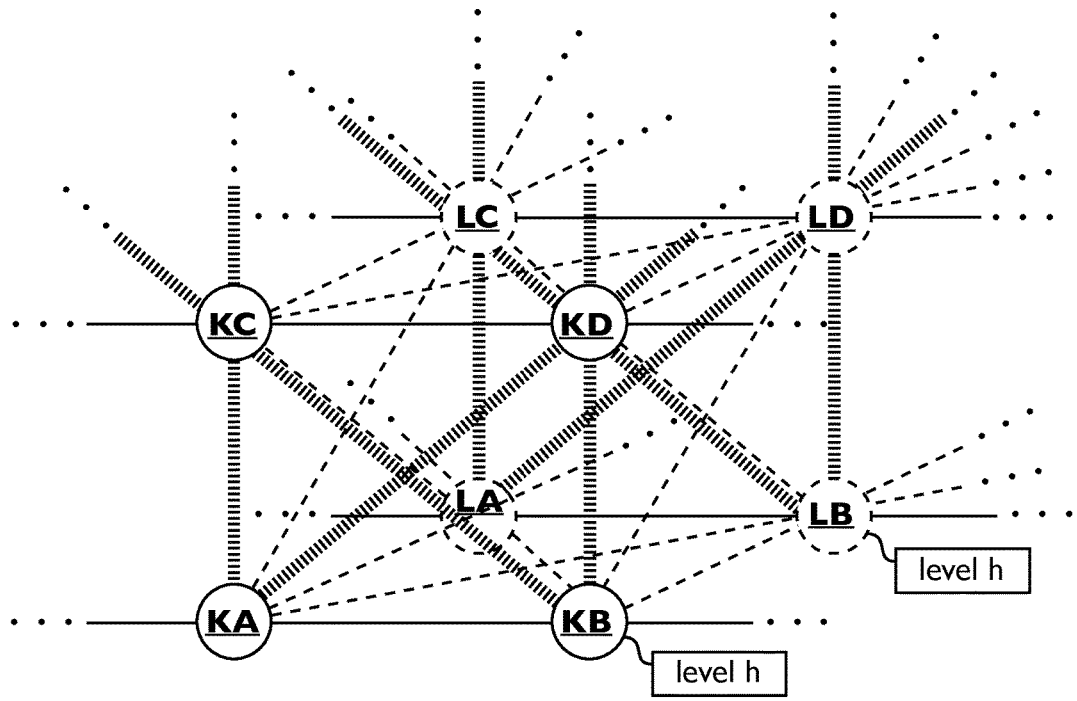
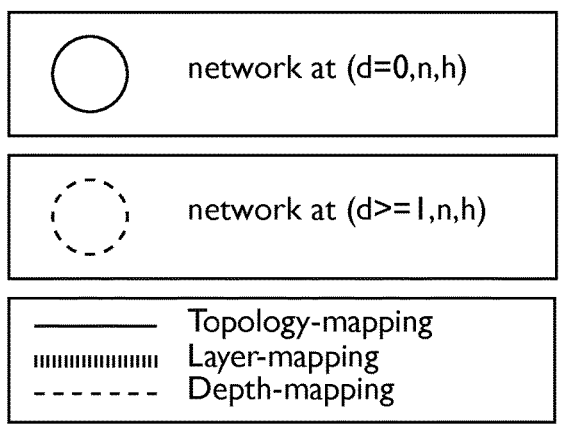
FIG. 3C

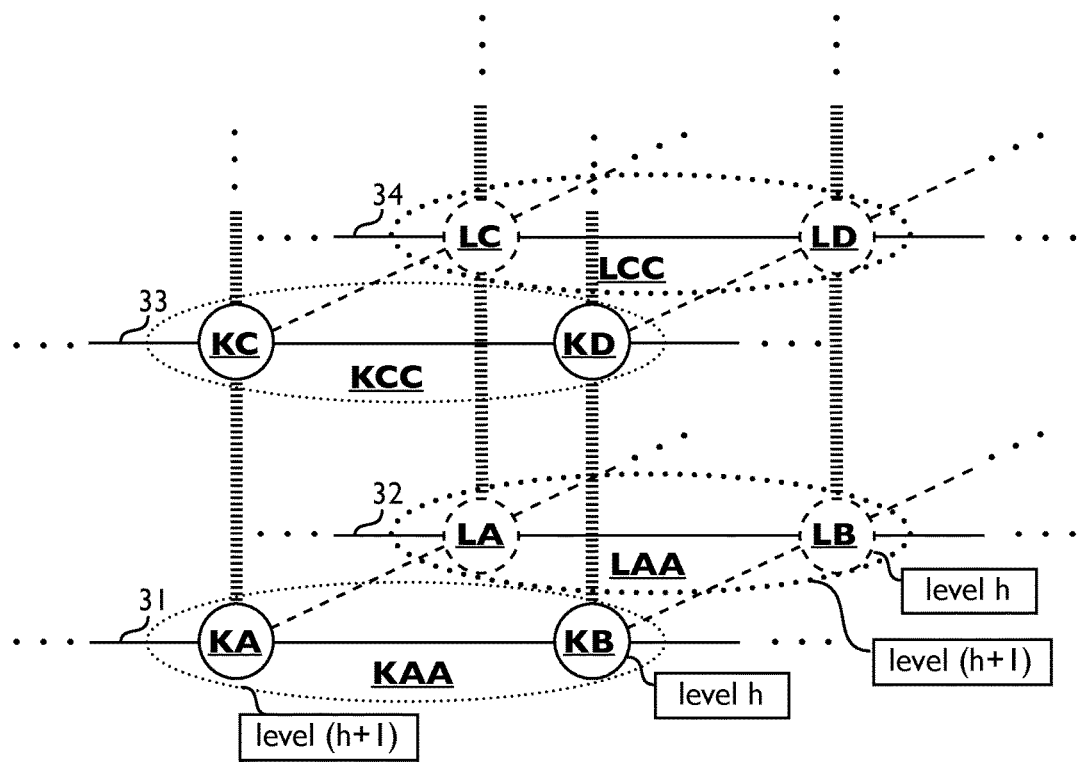
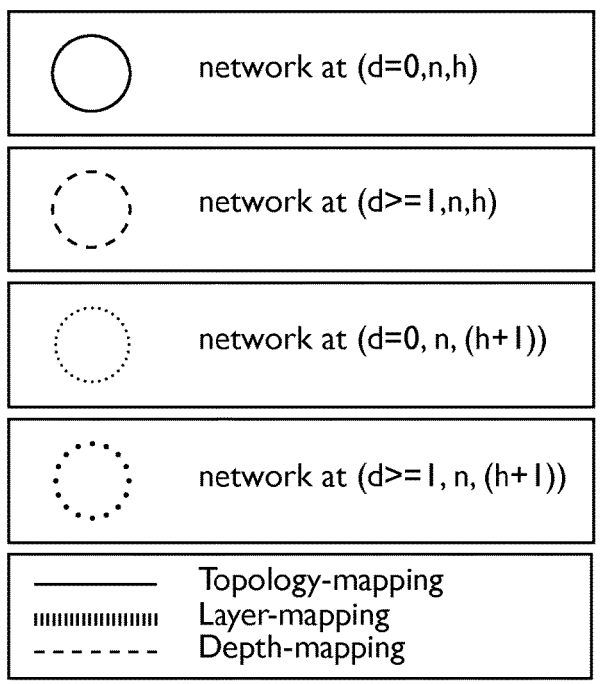
FIG. 3D

FIRST EDGE-NAME = FIRST NETWORK - (FIRST MAPPING-TYPE    FIRST POA :: SECOND POA) -> SECOND NETWORK

FIG. 6A

SECOND EDGE-NAME = SECOND NETWORK - (SECOND MAPPING-TYPE    THIRD POA :: FOURTH POA) -> THIRD NETWORK

FIG. 6B

THIRD EDGE-TYPE    THIRD EDGE-NAME = FIRST EDGE-NAME / THIRD EDGE-NAME + SECOND EDGE-NAME / THIRD EDGE-NAME

FIG. 6C

THIRD EDGE-TYPE    THIRD EDGE-NAME =
FIRST NETWORK - (FIRST MAPPING-TYPE    FIRST POA : FIRST SET OF EDGE-RELATIONSHIPS : SECOND POA) ->
SECOND NETWORK - (SECOND MAPPING-TYPE    THIRD POA : SECOND SET OF EDGE-RELATIONSHIPS : FOURTH POA) ->
THIRD NETWORK

FIG. 6D

L5 = KA-(topmap p701::p702)->KB
L6 = KB-(topmap p702::p701)->KA

L7 = KC-(laymap p704::p703)->KA
L8 = KA-(laymap p703::p704)->KC
L9 = KD-(laymap p706::p705)->KB
L10 = KB-(laymap p705::p706)->KD L12 = LA-(depmap)->KA
L13 = KB-(depmap)->LB
L15 = KA-(depmap)->LA
L16 = LB-(depmap)->KB
L17 = LC-(depmap)->KC
L18 = KD-(depmap)->LD
L24 = KC-(depmap)->LC
L25 = LD-(depmap)->KD

FIG. 7A toppath L11 = L5/L11
topmap L14 = L12/L14+L11/L14+L13/L14
laymap L19 = L17/L19+L7/L19+L15/L19
laymap L20 = L16/L20+L10/L20+L18/L20
toppath L21 = L14/L21
topmap L22 = L19/L22+L21/L22+L20/L22
toppath L23 = L22/L23

FIG. 7B

| Step 1 | toppath L23 = L22/L23 = |
|---|---|
| Step 2 | L19/L22/L23+L21/L22/L23+L20/L22/L23 = |
| Step 3 | L19/L22/L23+L14/L21/L22/L23+L20/L22/L23 = |
| Step 4 | L17/L19/L22/L23+L7/L19/L22/L23+L15/L19/L22/L23+<br>L12/L14/L21/L22/L23+L11/L14/L21/L22/L23+<br>L13/L14/L21/L22/L23+L16/L20/L22/L23+L10/L20/L22/L23+<br>L18/L20/L22/L23 = |
| Step 5 | L17/L19/L22/L23+L7/L19/L22/L23+L15/L19/L22/L23+<br>L12/L14/L21/L22/L23+L5/L11/L14/L21/L22/L23+<br>L13/L14/L21/L22/L23+L16/L20/L22/L23+L10/L20/L22/L23+<br>L18/L20/L22/L23 = |
| Step 6 | LC-(depmap L17/L19/L22/L23)-><br>KC-(laymap p204:L7/L19/L22/L23:p203)-><br>KA-(depmap L15/L19/L22/L23)-><br>LA-(depmap L12/L14/L21/L22/L23)-><br>KA-(topmap p201:L5/L11/L14/L21/L22/L23:p202)-><br>KB-(depmap L13/L14/L21/L22/L23)-><br>LB-(depmap L16/L20/L22/L23)-><br>KB-(laymap p205:L10/L20/L22/L23:p206)-><br>KD-(depmap L18/L20/L22/L23)->LD |

FIG. 7C

```
J1 = QA-(topmap p431::p432)->QB
J2 = QB-(topmap p433::p434)->QC
J3 = QC-(topmap p435::p436)->QD
J4 = QD-(topmap p437::p438)->QE
J5 = QE-(topmap p439::p440)->QF J6 = NA-(depmap)->QA
J7 = QB-(depmap)->NB
J8 = NB-(depmap)->QB
J13 = QE-(depmap)->NE
J14 = NE-(depmap)->QE
J15 = QF-(depmap)->NF
```

FIG. 11D

```
topmap J24 = J6/J24 +J1/J24+J7/J24
topmap J28 = J14/J28+J5/J28+J15/J28
topmap J53 = J8/J53+J2/J53+J3/J53+J4/J53+J13/J53
toppath J54 = J24/J54+J53/J54+J28/J54
```

FIG. 11E

```
NA-(depmap J6/J24/J54)->
QA-(topmap p431:J1/J24/J54:p432)->
QB-(depmap J7/J24/J54)->
NB-(depmap J8/J53/J54)->
QB-(topmap p433:J2/J53/J54:p434)->
QC-(topmap p435:J3/J53/J54:p436)->
QD-(topmap p437:J4/J53/J54:p438)->
QE-(depmap J13/J53/J54)->
NE-(depmap J14/J28/J54)->
QE-(topmap p439:J5/J28/J54:p440)->
QF-(depmap J15/J28/J54)->NF
```

FIG. 11F

| NODE | INPUT PORT | OUTPUT PORT | INCOMING SET OF EDGE-RELATIONSHIPS | OUTGOING SET OF EDGE-RELATIONSHIPS |
|---|---|---|---|---|
| NA | NONE | NOT NAMED | NONE | J6/J24/J54 |
| QA | NOT NAMED | p431 | J6/J24/J54 | J1/J24/J54 |
| QB | p432 | NOT NAMED | J1/J24/J54 | J7/J24/J54 |
| NB | NOT NAMED | NOT NAMED | J7/J24/J54 | J8/J53/J54 |
| QB | NOT NAMED | p435 | J8/J53/J54 | J2/J53/J54 |
| QC | p434 | p437 | J2/J53/J54 | J3/J53/J54 |
| QD | p436 | p437 | J3/J53/J54 | J4/J53/J54 |
| QE | p438 | NOT NAMED | J4/J53/J54 | J13/J53/J54 |
| NE | NOT NAMED | NOT NAMED | J13/J53/J54 | J14/J28/J54 |
| QE | NOT NAMED | p439 | J14/J28/J54 | J5/J28/J54 |
| QF | p440 | NOT NAMED | J5/J28/J54 | J15/J28/J54 |
| NF | NOT NAMED | NONE | J15/J28/J54 | NONE |

FIG. 11G

| OPERATION NAME | EDGE | NODE |
|---|---|---|
| ACTION 1 | J54 | NB |
| ACTION 3 | J54 | NE |

FIG. 11H

| EDGE-NAME | SWITCHING-IDENTIFIER |
|---|---|
| J1 | SOURCE p431, DESTINATION p432 |
| J2 | SOURCE p433, DESTINATION p434 |
| J3 | SOURCE p435, DESTINATION p436 |
| J4 | SOURCE p437, DESTINATION p438 |
| J5 | SOURCE p439, DESTINATION p440 |
| J54 | SOURCE NA, DESTINATION NF |

FIG. 11I

| NODE | INPUT PORT | OUTPUT PORT | INCOMING SET OF EDGE-RELATIONSHIPS | OUTGOING SET OF EDGE-RELATIONSHIPS | ADDITIONAL OPERATION |
|---|---|---|---|---|---|
| QA | NONE | p431 | NONE | J1 (SRC p431, DST p432) / J54 (SRC NE, DST NF) | NONE |
| QB | p432 | p433 | J1 (SRC p431, DST p432) / J54 (SRC NE, DST NF) | J2 (SRC p433, DST p434) / J54 (SRC NE, DST NF) | ACTION 1 |
| QC | p434 | p435 | J2 (SRC p433, DST p434) / J54 (SRC NE, DST NF) | J3 (SRC p435, DST p436) / J54 (SRC NE, DST NF) | NONE |
| QD | p436 | p437 | J3 (SRC p435, DST p436) / J54 (SRC NE, DST NF) | J4 (SRC p437, DST p438) / J54 (SRC NE, DST NF) | NONE |
| QE | p438 | p439 | J4 (SRC p437, DST p438) / J54 (SRC NE, DST NF) | J5 (SRC p439, DST p440) / J54 (SRC NE, DST NF) | ACTION 3 |
| QF | p440 | NONE | J5 (SRC p439, DST p440) / J54 (SRC NE, DST NF) | NONE | NONE |

FIG. 11J

R1 = PA-(topmap p201::p202)->PB
R2 = PB-(topmap p203::p204)->PC
R3 = PC-(topmap p205::p206)->PD
R4 = PD-(topmap p207::p208)->PE
R5 = PE-(topmap p209::p210)->PF R20 = PG-(laymap p212::p211)->PA
R21 = PF-(laymap p213::p214)->PH R6 = PA-(depmap)->HA
R7 = HA-(depmap)->PA
R8 = PB-(depmap)->HB
R9 = HB-(depmap)->PB
R10 = PE-(depmap)->HE
R11 = HE-(depmap)->PE
R12 = PF-(depmap)->HF
R13 = HF-(depmap)->PF
R14 = HG-(depmap)->PG
R15 = PH-(depmap)->HH

FIG. 12C topmap R16 = R7/R16 +R1/R16+R8/R16
topmap R17 = R9/R17+R2/R17+R3/R17+R4/R17+R10/R17
topmap R18 = R11/R18+R5/R18+R12/R18
toppath R19 = R16/R19+R17/R19+R18/R19
laymap R22 = R14/R22+R20/R22+R6/R22
laymap R23 = R13/R23+R21/R23+R15/R23
topmap R24 = R22/R24+R19/R24+R23/R24
toppath R25 = R24/R25

FIG. 12D

```
HG-(depmap R14/R22/R24/R25)->
PG-(laymap p112:R20/R22/R24/R25:p111)->
PA-(depmap R6/R22/R24/R25)->
HA-(depmap R7/R16/R19/R24/R25)->
PA-(topmap p201:R1/R16/R19/R24/R25:p202)->
PB-(depmap R8/R16/R19/R24/R25)->
HB-(depmap R9/R17/R19/R24/R25)->
PB-(topmap p203:R2/R17/R19/R24/R25:p204)->
PC-(topmap p205:R3/R17/R19/R24/R25:p206)->
PD-(topmap p207:R4/R17/R19/R24/R25:p208)->
PE-(depmap R10/R17/R19/R24/R25)->
HE-(depmap R11/R18/R19/R24/R25)->
PE-(topmap p209:R5/R18/R19/R24/R25:p210)->
PF-(depmap R12/R18/R19/R24/R25)->
HF-(depmap R13/R23/R24/R25)->
PF-(laymap p213:R21/R23/R24/R25:p214)->
PH-(depmap R15/R23/R24/R25)->HH
```

FIG. 12E

| OPERATION NAME | EDGE | NODE |
|---|---|---|
| ACTION 5 | R19 | HB |
| ACTION 7 | R25 | HE |

FIG. 12F

| EDGE-NAME | SWITCHING-IDENTIFIER |
|---|---|
| R1 | SOURCE p201, DESTINATION p202 |
| R2 | SOURCE p203, DESTINATION p204 |
| R3 | SOURCE p205, DESTINATION p206 |
| R4 | SOURCE p207, DESTINATION p208 |
| R5 | SOURCE p209, DESTINATION p210 |
| R19 | SOURCE 1:2:3:4:11:11:11:10, DESTINATION 1:2:3:5:11:11:11:13, FLOW-LABEL 100 |
| R25 | TCP, SOURCE PORT 80, DESTINATION PORT 80 |

FIG. 12G

| NODE | INPUT PORT | OUTPUT PORT | INCOMING SET OF EDGE-RELATIONSHIPS | OUTGOING SET OF EDGE-RELATIONSHIPS |
|---|---|---|---|---|
| PG | NONE | p212 | NONE | R20/R22/R24/R25 |
| PA | p211 | p201 | R20/R22/R24/R25 | R1/R16/R19/R24/R25 |
| PB | p202 | p203 | R1/R16/R19/R24/R25 | R2/R17/R19/R24/R25 |
| PC | p204 | p205 | R2/R17/R19/R24/R25 | R3/R17/R19/R24/R25 |
| PD | p206 | p207 | R3/R17/R19/R24/R25 | R4/R17/R19/R24/R25 |
| PE | p208 | p209 | R4/R17/R19/R24/R25 | R5/R18/R19/R24/R25 |
| PF | p210 | p213 | R5/R18/R19/R24/R25 | R21/R23/R24/R25 |
| PH | p214 | NONE | R21/R23/R24/R25 | NONE |

FIG. 12H

| EQUIPMENT | NODE | INPUT PORT | OUTPUT PORT | INCOMING SET OF EDGE-RELATIONSHIPS | OUTGOING SET OF EDGE-RELATIONSHIPS | ADDITIONAL OPERATION |
|---|---|---|---|---|---|---|
| FIFTH COMPUTING EQUIPMENT | PG | NONE | p212 | NONE | R25 (TCP, NONE SRC PORT 80, DST PORT 80) | |
| | PA | p211 | p201 | NONE | R1 (SRC p201, DST p202) / R19 (SRC 1:2:3:4:11:11:11:10, DST 1:2:3:5:11:11:11:13, FLOW-LABEL 100) | NONE |
| SIXTH PACKET FORWARDING SYSTEM | PB | p202 | p203 | R1 (SRC p201, DST p202) / R19 (SRC 1:2:3:4:11:11:11:10, DST 1:2:3:5:11:11:11:13, FLOW-LABEL 100) | R2 (SRC p203, DST p204) / R19 (SRC 1:2:3:4:11:11:11:10, DST 1:2:3:5:11:11:11:13, FLOW-LABEL 100) | ACTION 5 |
| SEVENTH PACKET FORWARDING SYSTEM | PC | p204 | p205 | R2 (SRC p203, DST p204) / R19 (SRC 1:2:3:4:11:11:11:10, DST 1:2:3:5:11:11:11:13, FLOW-LABEL 100) | R3 (SRC p205, DST p206) / R19 (SRC 1:2:3:4:11:11:11:10, DST 1:2:3:5:11:11:11:13, FLOW-LABEL 100) | NONE |

FIG.12I (A)

| EQUIPMENT | NODE | INPUT PORT | OUTPUT PORT | INCOMING SET OF EDGE-RELATIONSHIPS | OUTGOING SET OF EDGE-RELATIONSHIPS | ADDITIONAL OPERATION |
|---|---|---|---|---|---|---|
| EIGHTH PACKET FORWARDING SYSTEM | PD | p206 | p207 | R3 (SRC p205, DST p206) / R19 (SRC 1:2:3:4:11:11:11:10, DST 1:2:3:5:11:11:11:13, FLOW-LABEL 100) | R4 (SRC p207, DST p208) / R19 (SRC 1:2:3:4:11:11:11:10, DST 1:2:3:5:11:11:11:13, FLOW-LABEL 100) | NONE |
| NINTH PACKET FORWARDING SYSTEM | PE | p208 | p209 | R4 (SRC p207, DST p208) / R19 (SRC 1:2:3:4:11:11:11:10, DST 1:2:3:5:11:11:11:13, FLOW-LABEL 100) | R5 (SRC p209, DST p210) / R19 (SRC 1:2:3:4:11:11:11:10, DST 1:2:3:5:11:11:11:13, FLOW-LABEL 100) | ACTION 7 |
| | PF | p210 | p213 | R5 (SRC p209, DST p210) / R19 (SRC 1:2:3:4:11:11:11:10, DST 1:2:3:5:11:11:11:13, FLOW-LABEL 100) R25 (TCP, SRC PORT 80, DST PORT 80) | R25 (TCP, SRC PORT 80, DST PORT 80) NONE | NONE |
| SIXTH COMPUTING EQUIPMENT | PH | p214 | NONE | R25 (TCP, SRC PORT 80, DST PORT 80) | NONE | NONE |

FIG.12I (B)

FOURTH EDGE-TYPE FOURTH EDGE-NAME =
& (FIRST CONCATENATION)
& (SECOND CONCATENATION)
. . .

toppath K31 =
K21/K31+K22/K31+(&(K23/K31+K24/K31) &(K25/K31+K28/K31) )

toppath K31 = (K21+K22+(&(K23 +K24) &(K25+K28) ) )/K31

| OPERATION NAME | EDGE(S) | NODE | INCOMING / OUTGOING / TRAVERSING EDGE(S) |
|---|---|---|---|
| F1 | K27 | MF | OUTGOING |
| F2 | K31 | MB | TRAVERSING |
| F3 | K31 | MC | TRAVERSING |
| F4 | K23 | MD | INCOMING |
| F5 | K31 | ME | INCOMING |
| F6 | K28 | MG | OUTGOING |
| F7 | K28/K31 | MH | INCOMING |

| OPERATION NAME | EDGE(S) | NODE | INCOMING / OUTGOING / TRAVERSING EDGE(S) | RELATIONSHIP OPERATION NAME AND DATA | DATA IN | DATA OUT |
|---|---|---|---|---|---|---|
| F1 | K27 | MF | OUTGOING | K27*=F1(MF*) | MF* | K27* |
| F2 | K31 | MB | TRAVERSING | K22*=F2(K21*) | K21* | K22* |
| F3 | K31 | MC | TRAVERSING | (K23*, K25*)=F3(K22*) | K22* | K23* K25* |
| F4 | K23 | MD | INCOMING | K24*=F4(K23*) | K23* | K24* |
| F5 | K31 | ME | INCOMING | ME*=F5(K24*) | K24* | ME* |
| F6 | K28 | MG | OUTGOING | K28*=F6(K25*) | K25* | K28* |
| F7 | K28/K31 | MH | INCOMING | MH*=F7(K28*) | K28* | MH* |

FIG. 13G

```
toppath K32 =
K21/K32+K22/K32+(&K23/K32 &(K25/K32+K26/K32))+K24/K32
```

```
toppath K32 = (K21+K22+(&K23 &(K25+K26))+K24)/K32
```

| OPERATION NAME | EDGE | NODE | RELATIONSHIP OPERATION NAME AND DATA |
|---|---|---|---|
| F8 | K32 | MC | (K23*, K25*)=F8(K22*) |
| F9 | K32 | MD | K24*=F9(K23*, K26*) |
| F10 | K32 | MG | K26*=F10(K25*) |

J1 = QA-(topmap p431::p432)->QB
J2 = QB-(topmap p433::p434)->QC
J3 = QC-(topmap p435::p436)->QD
J4 = QD-(topmap p437::p438)->QE
J5 = QE-(topmap p439::p440)->QF
K6 = QB-(topmap p441::p442)->QG
K7 = QG-(topmap p442::p441)->QB
K8 = QG-(topmap p444::p443)->QD
K9 = QE-(topmap p445::p446)->QH
K10 = QC-(topmap p434::p433)->QB

FIG. 15C

K41 = MA-(depmap)->QA
K42 = QA-(depmap)->MB
K43 = MB-(depmap)->QA
K44 = QB-(depmap)->MC
K45 = MC-(depmap)->QB
K46 = QD-(depmap)->MD
K47 = MD-(depmap)->QD
K48 = QE-(depmap)->ME
K49 = QG-(depmap)->MG
K50 = MF-(depmap)->QA
K51 = MG-(depmap)->QG
K52 = QF-(depmap)->MH
K53 = QH-(depmap)->MH
K54 = QA-(depmap)->MA
K55 = ME-(depmap)->QE
K56 = QA-(depmap)->MF
K57 = MH-(depmap)->QF
K58 = MH-(depmap)->QH

FIG. 15D

```
topmap K21 = K41/K21+K42/K21
topmap K22 = K43/K22+J1/K22+K44/K22
topmap K23 = K45/K23+J2/K23+J3/K23+K46/K23
topmap K24 = K47/K24+J4/K24+K48/K24
topmap K25 = K45/K25+K6/K25+K49/K25
topmap K26 = K51/K26+K8/K26+K46/K26
topmap K27 = K50/K27+J1/K27+K6/K27+K49/K27
topmap K28 = K51/K28+K8/K28+J4/K28+
           ( &(J5/K28+K52/K28) &(K9/K28+K53/K28))
topmap K29 = K51/K29+K7/K29+K44/K29
```

FIG. 15E

```
MA-(depmap K41/K21/K31)->
QA-(depmap K42/K21/K31)->
MB-(depmap K43/K22/K31)->
QA-(topmap p431:J1/K22/K31:p432)->
QB-(depmap K44/K22/K31)->
(&(MC-(depmap K45/K23/K31)->
QB-(topmap p433:J2/K23/K31:p434)->
QC-(topmap p435:J3/K23/K31:p436)->
QD-(depmap K46/K23/K31)->
MD-(depmap K47/K24/K31)->
QD-(topmap p437:J4/K24/K31:p438)->
QE-(depmap K48/K24/K31)->ME)
&(MC-(depmap K45/K25/K31)->
QB-(topmap p441:K6/K25/K31:p442)->
QG-(depmap K49/K25/K31)->
MG-(depmap K51/K28/K31)->
QG-(topmap p444:K8/K28/K31:p443)->
QD-(topmap p437:J4/K28/K31:p438)->
( &(QE-(topmap p439:J5/K28/K31:p440)->
QF-(depmap K52/K28/K31)->MH)
&(QE-(topmap p445:K9/K28/K31:p446)->
QH-(depmap K53/K28/K31)->MH))))
```

FIG. 15F

| NODE | INPUT PORT | OUTPUT PORT | INCOMING SET OF EDGE-RELATIONSHIPS | OUTGOING SET OF EDGE-RELATIONSHIPS | OPERATION NAME |
|---|---|---|---|---|---|
| MA | NONE | | NONE | K41/K21/K31 | |
| QA | | | K41/K21/K31 | K42/K21/K31 | |
| MB | | p431 | K42/K21/K31 | K43/K22/K31 | F2 |
| QA | p432 | | K43/K22/K31 | J1/K22/K31 | |
| QB | | | J1/K22/K31 | K44/K22/K31 | |
| (&(MC | | | K44/K22/K31 | K45/K23/K31 | F3 |
| QB | | p433 | K45/K23/K31 | J2/K23/K31 | |
| QC | p434 | p435 | J2/K23/K31 | J3/K23/K31 | |
| QD | p436 | | J3/K23/K31 | K46/K23/K31 | |
| MD | | p437 | K46/K23/K31 | K47/K24/K31 | F4 |
| QD | p438 | | K47/K24/K31 | J4/K24/K31 | |
| QE | | | J4/K24/K31 | K48/K24/K31 | |
| ME) | | NONE | K48/K24/K31 | NONE | F5 |

FIG. 15G(A)

| NODE | INPUT PORT | OUTPUT PORT | INCOMING SET OF EDGE-RELATIONSHIPS | OUTGOING SET OF EDGE-RELATIONSHIPS | OPERATION NAME |
|---|---|---|---|---|---|
| &(MC | | | K44/K22/K31 | K45/K25/K31 | F3 |
| QB | | p441 | K45/K25/K31 | K6/K25/K31 | |
| QG | p442 | | K6/K25/K31 | K49/K25/K31 | |
| MG | | p444 | K49/K25/K31 | K51/K28/K31 | F6 |
| QG | | p437 | K51/K28/K31 | K8/K28/K31 | |
| QD | p443 | p439 | K8/K28/K31 | J4/K28/K31 | |
| &(QE | p438 | | J4/K28/K31 | J5/K28/K31 | |
| QF | p440 | | J5/K28/K31 | K52/K28/K31 | |
| MH) | | NONE | K52/K28/K31 | NONE | F7 |
| &(QE | p438 | p445 | J4/K28/K31 | K9/K28/K31 | |
| QH | p446 | | K9/K28/K31 | K53/K28/K31 | |
| MH)))) | NONE | | K53/K28/K31 | NONE | F7 |

FIG. 15G(B)

| NODE | INPUT PORT | OUTPUT PORT | INCOMING SET OF EDGE-RELATIONSHIPS | OUTGOING SET OF EDGE-RELATIONSHIPS | OPERATION NAME | NETWORKING OPERATION |
|---|---|---|---|---|---|---|
| QA | NONE | p431 | NONE | J1/K22/K31 | F2 | TRANSMIT |
| QB | p432 | p433 | J1/K22/K31 | J2/K23/K31 | F3 | SWITCH |
|  |  | p441 |  | K6/K25/K31 |  |  |
| QC | p434 | p435 | J2/K23/K31 | J3/K23/K31 |  | SWITCH |
| QD | p436 | p437 | J3/K23/K31 | J4/K24/K31 | F4 | SWITCH |
| QD | p443 | p437 | K8/K28/K31 | J4/K28/K31 |  | SWITCH |
| QE | p438 | NONE | J4/K24/K31 | NONE | F5 | RECEIVE |
| QE | p438 | p439 | J4/K28/K31 | J5/K28/K31 |  | SWITCH |
|  |  | p445 |  | K9/K28/K31 |  |  |
| QF | p440 | NONE | J5/K28/K31 | NONE | F7 | RECEIVE |
| QG | p442 | p444 | K6/K25/K31 | K8/K28/K31 | F6 | SWITCH |
| QH | p446 | NONE | K9/K28/K31 | NONE | F7 | RECEIVE |

FIG. 15H

| NODE | INPUT PORT | OUTPUT PORT | INC. S.E.R. | OUTG. S.E.R. | ADDITIONAL OPERATION | INC. DATA | OUTG. DATA | NETWORKING OPERATION |
|---|---|---|---|---|---|---|---|---|
| QA | NONE | p431 | NONE | J1/K22/K31 | K22*=F2(K21*) | MA* | K22* | TRANSMIT |
| QB | p432 | p433 | J1/K22/K31 | J2/K23/K31 | (K23*,K25*)=F3(K22*) | K22* | K23* | SWITCH |
|  |  | p441 |  | K6/K25/K31 |  |  | K25* |  |
| QC | p434 | p435 | J2/K23/K31 | J3/K23/K31 |  |  |  | SWITCH |
| QD | p436 | p437 | J3/K23/K31 | J4/K24/K31 | K24*=F4(K23*) | K23* | K24* | SWITCH |
| QD | p443 | p437 | K8/K28/K31 | J4/K28/K31 |  |  |  | SWITCH |
| QE | p438 | NONE | J4/K24/K31 | NONE | ME*=F5(K24*) | K24* | ME* | RECEIVE |
| QE | p438 | p439 | J4/K28/K31 | J5/K28/K31 |  |  |  | SWITCH |
|  |  | p445 |  | K9/K28/K31 |  |  |  |  |
| QF | p440 | NONE | J5/K28/K31 | NONE | MH*=F7(K28*) | K28* | MH* | RECEIVE |
| QG | p442 | p444 | K6/K25/K31 | K8/K28/K31 | K28*=F6(K25*) | K25* | K28* | SWITCH |
| QH | p446 | NONE | K9/K28/K31 | NONE | MH*=F7(K28*) | K28* | MH* | RECEIVE |

FIG. 15I

| NODE | CODE | COMMENT |
|---|---|---|
| QA | K21* = MA* | DATA-IN-MOTION K21* EQUALS DATA-AT-REST MA* |
|  | K22* = F2(K21*) | APPLY ADDITIONAL OPERATION F2 |
|  | p431 ! {J1/K22/K31,K22*} | SEND PACKET FROM OUTPUT PORT p431 |
| QB | RECEIVE | RECEIVE PACKET USING PATTERN-MATCHING |
|  | {p432, J1/K22/K31, _K22*} -> | ON INPUT PORT p432, INCOMING S.E.R. J1/K22/K31 |
|  | (K23*,K25*) = F3(_K22*); | APPLY ADDITIONAL OPERATION F3 |
|  | p433 ! {J2/K23/K31, _K23*}; | SEND PACKET FROM OUTPUT PORT p433 |
|  | p441 ! {K6/K25/K31, _K25*} | SEND PACKET FROM OUTPUT PORT p441 |
| QC | RECEIVE | RECEIVE PACKET USING PATTERN-MATCHING |
|  | {p434, J2/K23/K31, _X} -> | ON INPUT PORT p434, INCOMING S.E.R. J2/K23/K31 |
|  | p435 ! {J3/K23/K31, _X} | SEND PACKET FROM OUTPUT PORT p435 |
| QD | RECEIVE | RECEIVE PACKET USING PATTERN-MATCHING |
|  | {p436, J3/K23/K31, _K23*} -> | ON INPUT PORT p436, INCOMING S.E.R. J3/K23/K31 |
|  | K24* = F4(_K23*); | APPLY ADDITIONAL OPERATION F4 |
|  | p437 ! {J4/K24/K31, _K24*} | SEND PACKET FROM OUTPUT PORT p437 |
| QD | RECEIVE | RECEIVE PACKET USING PATTERN-MATCHING |
|  | {p443, K8/K28/K31, _X} -> | ON INPUT PORT p443, INCOMING S.E.R. K8/K28/K31 |
|  | p437 ! {J4/K28/K31, _X} | SEND PACKET FROM OUTPUT PORT p437 |

FIG. 16(A)

| NODE | CODE | COMMENT |
|---|---|---|
| QE | RECEIVE<br>{p438, J4/K24/K31, _K24*} -><br>ME* = J5(_K24*) | RECEIVE PACKET USING PATTERN-MATCHING ON INPUT PORT p438, INCOMING S.E.R. J4/K28/K31<br>APPLY ADDITIONAL OPERATION F5 |
| QE | RECEIVE<br>{p438, J4/K28/K31, _X} -><br>p439 ! {J5/K28/K31, _X};<br>p445 ! {K9/K28/K31, _X} | RECEIVE PACKET USING PATTERN-MATCHING ON INPUT PORT p438, INCOMING S.E.R. J4/K28/K31<br>SEND PACKET FROM OUTPUT PORT p439<br>SEND PACKET FROM OUTPUT PORT p445 |
| QF | RECEIVE<br>{p440, J5/K28/K31, _K25*} -><br>MH* = F7(_K28*) | RECEIVE PACKET USING PATTERN-MATCHING ON INPUT PORT p440, INCOMING S.E.R. J5/K28/K31<br>APPLY ADDITIONAL OPERATION F7 |
| QG | RECEIVE<br>{p442, K6/K25/K31, _K25*} -><br>K28* = F6(_K25*);<br>p444 ! {K8/K28/K31, K28*} | RECEIVE PACKET USING PATTERN-MATCHING ON INPUT PORT p442, INCOMING S.E.R. K6/K25/K31<br>APPLY ADDITIONAL OPERATION F6<br>SEND PACKET FROM OUTPUT PORT p444 |
| QH | RECEIVE<br>{p446, K9/K28/K31, _K28*} -><br>MH* = F7(_K28*) | RECEIVE PACKET USING PATTERN-MATCHING ON INPUT PORT p446, INCOMING S.E.R. K9/K28/K31<br>APPLY ADDITIONAL OPERATION F7 |

FIG. 16(B)

```
L51 = ?X1-(depmap)->MA
L52 = MA-(depmap)->?X1
L53 = ?X2-(depmap)->MB
L54 = MB-(depmap)->?X2
L55 = ?X3-(depmap)->MC
L56 = MC-(depmap)->?X3
L57 = ?X4-(depmap)->MD
L58 = MD-(depmap)->?X4
L59 = ?X5-(depmap)->ME
L60 = ME-(depmap)->?X5
L61 = ?X6-(depmap)->MF
L62 = MF-(depmap)->?X6
L63 = ?X7-(depmap)->MG
L64 = MG-(depmap)->?X7
L65 = ?X8-(depmap)->MH
L66 = MH-(depmap)->?X8
L67 = ?X9-(depmap)->MH
L68 = MH-(depmap)->?X9
```

FIG. 17B

```
topmap K21 = L52/K21+?L71[toppath]/K21+L53/K21
topmap K22 = L54/K22+?L72[toppath]/K22+L55/K22
topmap K23 = L56/K23+?L73[toppath]/K23+L57/K23
topmap K24 = L58/K24+?L74[toppath]/K24+L59/K24
topmap K25 = L56/K25+?L75[toppath]/K25+L63/K25
topmap K26 = L64/K26+?L76[toppath]/K26+L57/K26
topmap K27 = L62/K27+?L77[toppath]/K27+L63/K27
topmap K28 = L64/K28+(&(?L78[toppath]/K28+L65/K28)
                     &(?L79[toppath]/K28+L67/K28))
topmap K29 = L64/K29+?L80[toppath]/K29+L55/K29
```

FIG. 17C

| Step 1 | topmap K21 = L52/K21+?L71[toppath]/K21+L53/K21 = |
|---|---|
| Step 2 | MA-(depmap L52/K21)-><br>?X1-?L71[toppath]/K21->?X2-(depmap L53/K21)->MB |

FIG. 17D

| topmap K21 | MA-(depmap L52/K21)-><br>?X1-?L71[toppath]/K21->?X2-(depmap L53/K21)->MB |
|---|---|
| topmap K22 | MB-(depmap L54/K22)-><br>?X2-?L72[toppath]/K22->?X3-(depmap L55/K22)->MC |
| topmap K23 | MC-(depmap L56/K23)-><br>?X3-?L73[toppath]/K23->?X4-(depmap L57/K23)->MD |
| topmap K24 | MD-(depmap L58/K24)-><br>?X4-?L74[toppath]/K24->?X5-(depmap L59/K24)->ME |
| topmap K25 | MC-(depmap L56/K25)-><br>?X3-?L75[toppath]/K25->?X7-(depmap L63/K25)->MG |
| topmap K26 | MG-(depmap L64/K26)-><br>?X7-?L76[toppath]/K26->?X4-(depmap L57/K26)->MD |
| topmap K27 | MF-(depmap L62/K27)-><br>?X6-?L77[toppath]/K27->?X7-(depmap L63/K27)->MG |
| topmap K28 | MG-(depmap L64/K28)-><br>(&(?X7-?L78[toppath]/K28->?X8-(depmap L65/K28)->MH)<br>&(?X7-?L79[toppath]/K28->?X9-(depmap L67/K28)->MH)) |
| topmap K29 | MG-(depmap L64/K29)-><br>?X7-?L80[toppath]/K29->?X3-(depmap L55/K29)->MC |

FIG. 17E

| | |
|---|---|
| PHYSICAL ENTITIES OF TOPMAP K21 | ?X1-?L71[toppath]/K21->?X2 |
| PHYSICAL ENTITIES OF TOPMAP K22 | ?X2-?L72[toppath]/K22->?X3 |
| PHYSICAL ENTITIES OF TOPMAP K23 | ?X3-?L73[toppath]/K23->?X4 |
| PHYSICAL ENTITIES OF TOPMAP K24 | ?X4-?L74[toppath]/K24->?X5 |
| PHYSICAL ENTITIES OF TOPMAP K25 | ?X3-?L75[toppath]/K25->?X7 |
| PHYSICAL ENTITIES OF TOPMAP K26 | ?X7-?L76[toppath]/K26->?X4 |
| PHYSICAL ENTITIES OF TOPMAP K27 | ?X6-?L77[toppath]/K27->?X7 |
| PHYSICAL ENTITIES OF TOPMAP K28 | (&(?X7-?L78[toppath]/K28->?X8) &(?X7-?L79[toppath]/K28->?X9)) |
| PHYSICAL ENTITIES OF TOPMAP K29 | ?X7-?L80[toppath]/K29->?X3 |

FIG. 17F

| | |
|---|---|
| SEARCH STATEMENT | (?X1-?L71[toppath]/K21->?X2) AND (?X2-?L72[toppath]/K22->?X3) AND (?X3-?L73[toppath]/K23->?X4) AND (?X4-?L74[toppath]/K24->?X5) AND (?X3-?L75[toppath]/K25->?X7) AND (?X7-?L76[toppath]/K26->?X4) AND (?X6-?L77[toppath]/K27->?X7) AND (&(?X7-?L78[toppath]/K28->?X8) &(?X7-?L79[toppath]/K28->?X9)) AND (?X7-?L80[toppath]/K29->?X3) |

FIG. 17G

| REQUIREMENTS LOGICAL TOPOLOGY-MAPPPING | REQUIREMENTS UNKNOWN PHYSICAL TOPOLOGY-PATH |
|---|---|
| K21 | ?L71 |
| K22 | ?L72 |
| K23 | ?L73 |
| K24 | ?L74 |
| K25 | ?L75 |
| K26 | ?L76 |
| K27 | ?L77 |
| K28 | ?L78 |
| | ?L79 |
| K29 | ?L80 |

FIG. 17H

| REQUIRE-MENTS LOGICAL NODE | REQUIRE-MENTS OPERATION NAME | REQUIREMENTS UNKNOWN PHYSICAL NODE |
|---|---|---|
| MA | NONE | ?X1 |
| MB | F2 | ?X2 |
| MC | F3, F8 | ?X3 |
| MD | F4, F9 | ?X4 |
| ME | F5 | ?X5 |
| MF | F1 | ?X6 |
| MG | F6, F10 | ?X7 |
| MH | F7 | ?X8 |
|  |  | ?X9 |

FIG. 17I

| UNKNOWN PHYSICAL NODE | PHYSICAL NODE |
|---|---|
| ?X1 | QA |
| ?X2 | QA |
| ?X3 | QB |
| ?X4 | QD |
| ?X5 | QE |
| ?X6 | QA |
| ?X7 | QG |
| ?X8 | QF |
| ?X9 | QH |

FIG. 18A

| UNKNOWN PHYSICAL TOPOLOGY-PATH | PHYSICAL TOPOLOGY-PATH |
|---|---|
| ?L71[toppath] | NONE |
| ?L72[toppath] | toppath L72=J1/L72 |
| ?L73[toppath] | toppath L73=J2/L73+J3/L73 |
| ?L74[toppath] | toppath L74=J4/L74 |
| ?L75[toppath] | toppath L75=K6/L75 |
| ?L76[toppath] | toppath L76=K8/L76 |
| ?L77[toppath] | toppath L77=J1/L77+K6/L77 |
| ?L78[toppath] | toppath L78=K8/L78+J4/L78+J5/L78 |
| ?L79[toppath] | toppath L79=K8/L79+J4/L79+K9/L79 |
| ?L80[toppath] | toppath L80=K7/L80 |

FIG. 18B

L51 = QA-(depmap)->MA
L52 = MA-(depmap)->QA
L53 = QA-(depmap)->MB
L54 = MB-(depmap)->QA
L55 = QB-(depmap)->MC
L56 = MC-(depmap)->QB
L57 = QD-(depmap)->MD
L58 = MD-(depmap)->QD
L59 = QE-(depmap)->ME
L60 = ME-(depmap)->QE
L61 = QA-(depmap)->MF
L62 = MF-(depmap)->QA
L63 = QG-(depmap)->MG
L64 = MG-(depmap)->QG
L65 = QF-(depmap)->MH
L66 = MH-(depmap)->QF
L67 = QH-(depmap)->MH
L68 = MH-(depmap)->QH

FIG. 18C topmap K21 = L52/K21+L71/K21+L53/K21
topmap K22 = L54/K22+L72/K22+L55/K22
topmap K23 = L56/K23+L73/K23+L57/K23
topmap K24 = L58/K24+L74/K24+L59/K24
topmap K25 = L56/K25+L75/K25+L63/K25
topmap K26 = L64/K26+L76/K26+L57/K26
topmap K27 = L62/K27+L77/K27+L63/K27
topmap K28 = L64/K28+(&(L78/K28+L65/K28)
                     &(L79/K28+L67/K28))
topmap K29 = L64/K29+L80/K29+L55/K29

FIG. 18D

```
MA-(depmap L52/K21/K31)->QA+
QA-(depmap L53/K21/K31)->
MB-(depmap L54/K22/K31)->
QA-(topmap p431:J1/L72/K22/K31:p432)->
QB-(depmap L55/K22/K31)->
(&(MC-(depmap L56/K23/K31)->
QB-(topmap p433:J2/L73/K23/K31:p434)->
QC-(topmap p435:J3/L73/K23/K31/K23/K31:p436)->
QD-(depmap L57/K23/K31)->
MD-(depmap L58/K24/K31)->
QD-(topmap p437:J4/L74/K24/K31:p438)->
QE-(depmap L59/K24/K31)->ME)
&(MC-(depmap L56/K25/K31)->
QB-(topmap p441:K6/L75/K25/K31:p442)->
QG-(depmap L63/K25/K31)->
MG-(depmap L64/K28/K31)->
(&(QG-(topmap p444:K8/L78/K28/K31:p443)->
QD-(topmap p437:J4/L78/K28/K31:p438)->
QE-(topmap p439:J5/L78/K28/K31:p440)->
QF-(depmap L65/K28/K31)->MH)
&((QG-(topmap p444:K8/L79/K28/K31:p443)->
QD-(topmap p437:J4/L79/K28/K31:p438)->
QE-(topmap p445:K9/L79/K28/K31:p446)->
QH-(depmap L67/K28/K31)->MH))))
```

FIG. 18E

Q1 = KE-(topmap p301::p302)->KF
Q2 = KF-(topmap p302::p301)->KE
Q3 = KF-(topmap p303::p304)->KG
Q4 = KG-(topmap p304::p303)->KF Q5 = KE-(depmap)->FE
Q6 = FE-(depmap)->KE
Q7 = KF-(depmap)->FF
Q8 = FF-(depmap)->KF
Q9 = KG-(depmap)->FG
Q10 = FG-(depmap)->KG
Q11 = KE-(depmap)->FH
Q12 = FH-(depmap)->KE
Q13 = KG-(depmap)->FJ
Q14 = FJ-(depmap)->KG
Q15 = KE-(depmap)->FK
Q16 = FK-(depmap)->KE
Q17 = KG-(depmap)->FL
Q18 = FL-(depmap)->KG Q51 = KE-(laymapdec)->KE
Q52 = KE-(laymapdec)->KE
Q53 = KG-(laymapinc)->KG
Q54 = KG-(laymapinc)->KG
Q55 = KE-(laymapinc)->KE
Q56 = KE-(laymapinc)->KE
Q57 = KG-(laymapdec)->KG
Q58 = KG-(laymapdec)->KG

FIG. 20C

```
topmap Q19 = Q6/Q19+Q1/Q19+Q7/Q19
topmap Q20 = Q8/Q20+Q3/Q20+Q9/Q20
toppath Q21 = Q19/Q21+Q20/Q21
laymap Q22 = Q12/Q22+Q51/Q22+Q5/Q22
laymap Q23 = Q10/Q23+Q53/Q23+Q13/Q23
topmap Q24 = Q22/Q24+Q21/Q24+Q23/Q24
toppath Q25 = Q24/Q25
laymap Q26 = Q16/Q26+Q52/Q26+Q11/Q26
laymap Q27 = Q14/Q27+Q54/Q27+Q17/Q27
topmap Q28 = Q26/Q28+Q25/Q28+Q27/Q28
toppath Q29 = Q28/Q29
```

FIG. 20D

| EDGE-NAME | SWITCHING-IDENTIFIER |
|---|---|
| Q1 | SRC p301, DST p302 |
| Q3 | SRC p303, DST p304 |
| Q21 | SRC 1:2:3:4:11:11:11:10,<br>DST 1:2:3:5:11:11:11:13,<br>FLOW-LABEL 100 |
| Q25 | TCP,<br>SRC PORT 80, DST PORT 80 |
| Q29 | HTTP REQUEST 1 |

FIG. 20E

| EQUIPMENT | NODE | INPUT PORT | OUTPUT PORT | RELEVANT INCOMING SET OF EDGE-RELATIONSHIPS | RELEVANT OUTGOING SET OF EDGE-RELATIONSHIPS |
|---|---|---|---|---|---|
| FIRST PHYSICAL EQUIPMENT | KE | NONE | p301 | NONE | Q1 (SRC p301, DST p302) / Q21 (SRC 1:2:3:4:11:11:11:10, DST 1:2:3:5:11:11:11:13, FLOW-LABEL 100) / Q25 (TCP, SRC PORT 80, DST PORT 80) / Q29 (HTTP REQUEST 1) |
| SECOND PHYSICAL EQUIPMENT | KF | p302 | p303 | Q1 (SRC p301, DST p302) / Q21 (SRC 1:2:3:4:11:11:11:10, DST 1:2:3:5:11:11:11:13, FLOW-LABEL 100) / | Q3 (SRC p303, DST p304) / Q21 (SRC 1:2:3:4:11:11:11:10, DST 1:2:3:5:11:11:11:13, FLOW-LABEL 100) / |
| THIRD PHYSICAL EQUIPMENT | KG | p304 | NONE | Q3 (SRC p303, DST p304) / Q21 (SRC 1:2:3:4:11:11:11:10, DST 1:2:3:5:11:11:11:13, FLOW-LABEL 100) / Q25 (TCP, SRC PORT 80, DST PORT 80) / Q29 (HTTP REQUEST 1) | NONE |

FIG. 20H

```
topmap Q30 = Q8/Q30+Q2/Q30+Q5/Q30
topmap Q31 = Q10/Q31+Q4/Q31+Q7/Q31
toppath Q32 = Q31/Q32+Q30/Q32
laymap Q33 = Q6/Q33+Q55/Q33+Q11/Q33
laymap Q34 = Q14/Q34+Q57/Q34+Q9/Q34
topmap Q35 = Q34/Q35+Q32/Q35+Q33/Q35
toppath Q36 = Q35/Q36
laymap Q37 = Q12/Q37+Q56/Q37+Q15/Q37
laymap Q38 = Q18/Q38+Q58/Q38+Q13/Q38
topmap Q39 = Q38/Q39+Q36/Q39+Q37/Q39
toppath Q40 = Q39/Q40
toppath Q41 = Q29/Q41+Q40/Q41
```

| BUFFER CONTENT | PHYSICAL NODE | POA | BUFFER TYPE |
|---|---|---|---|
| B1 | QA | p431 | OUTPUT BUFFER |
| B2 | QB | p432 | INPUT BUFFER |
| B3 | QB | p433 | OUTPUT BUFFER |
| B4 | QC | p434 | INPUT BUFFER |
| B5 | QC | p435 | OUTPUT BUFFER |
| B6 | QD | p436 | INPUT BUFFER |
| B7 | QD | p437 | OUTPUT BUFFER |
| B8 | QE | p438 | INPUT BUFFER |
| B9 | QE | p439 | OUTPUT BUFFER |
| B10 | QF | p440 | INPUT BUFFER |
| B11 | QB | p441 | OUTPUT BUFFER |
| B12 | QG | p442 | INPUT BUFFER |
| B13 | QG | p444 | OUTPUT BUFFER |
| B14 | QD | p443 | INPUT BUFFER |
| B15 | QE | p445 | OUTPUT BUFFER |
| B16 | QH | p446 | INPUT BUFFER |

FIG. 26B

```
MA-(depmap K41/K21/K31)->
QA-(depmap K42/K21/K31)->
MB-(depmap K43/K22/K31)->
QA-[B1](topmap p431:J1/K22/K31:p432)[B2]->
QB-(depmap K44/K22/K31)->
(&(MC-(depmap K45/K23/K31)->
QB-[B3] (topmap p433:J2/K23/K31:p434)[B4]->
QC-[B5] (topmap p435:J3/K23/K31:p436)[B6]->
QD-(depmap K46/K23/K31)->
MD-(depmap K47/K24/K31)->
QD-[B7(1)](topmap p437:J4/K24/K31:p438)[B8(1)]->
QE-(depmap K48/K24/K31)->ME)
&(MC-(depmap K45/K25/K31)->
QB-[B11] (topmap p441:K6/K25/K31:p442)[B12]->
QG-(depmap K49/K25/K31)->
MG-(depmap K51/K28/K31)->
QG-[B13] (topmap p444:K8/K28/K31:p443)[B14]->
QD-[B7(2)] (topmap p437:J4/K28/K31:p438)[B8(2)]->
( &(QE-[B9] (topmap p439:J5/K28/K31:p440)[B10]->
QF-(depmap K52/K28/K31)->MH)
&(QE-[B15] (topmap p445:K9/K28/K31:p446)[B16]->
QH-(depmap K53/K28/K31)->MH))))
```

FIG. 26C

| BUFFER CONTENT | LOGICAL NODE | TOPOLOGY-MAPPING | BUFFER TYPE |
| --- | --- | --- | --- |
| B1 | MB | K22 | OUTPUT BUFFER |
| B2 | MC | K22 | INPUT BUFFER |
| B3 | MC | K23 | OUTPUT BUFFER |
| B4 | MD | K23 | INPUT BUFFER |
| B5 | MD | K23 | INPUT BUFFER |
| B6 | MD | K23 | INPUT BUFFER |
| B7 (1) | MD | K24 | OUTPUT BUFFER |
| B7 (2) | MH | K28 | INPUT BUFFER |
| B8 (1) | ME | K24 | INPUT BUFFER |
| B8 (2) | MH | K28 | INPUT BUFFER |
| B9 | MH | K28 | INPUT BUFFER |
| B10 | MH | K28 | INPUT BUFFER |
| B11 | MC | K25 | OUTPUT BUFFER |
| B12 | MG | K25 | INPUT BUFFER |
| B13 | MG | K28 | OUTPUT BUFFER |
| B14 | MH | K28 | INPUT BUFFER |
| B15 | MH | K28 | INPUT BUFFER |
| B16 | MH | K28 | INPUT BUFFER |

FIG. 26D

S1 = RA-(topmap p501::p502)->RB
S2 = RB-(topmap p503::p504)->RC
S3 = RC-(topmap p505::p506)->RD
S4 = RD-(topmap p507::p508)->RE
S5 = RC-(topmap p509::p510)->RF
S6 = RF-(topmap p510::p509)->RC
S7 = RG-(topmap p512::p511)->RD
S8 = RF-(topmap p513::p514)->RG
S9 = RG-(topmap p514::p513)->RF
S10 = RG-(topmap p515::p516)->RH

FIG. 27C

S21 = MA-(depmap)->RA
S22 = RB-(depmap)->MB
S23 = MB-(depmap)->RB
S24 = RC-(depmap)->MC
S25 = MC-(depmap)->RC
S26 = RD-(depmap)->MD
S27 = MD-(depmap)->RD
S28 = RE-(depmap)->ME
S29 = MF-(depmap)->RF
S30 = RG-(depmap)->MG
S31 = MG-(depmap)->RG
S32 = RH-(depmap)->MH

FIG. 27D

```
topmap K21 = S21/K21+S1/K21+S22/K21
topmap K22 = S23/K22+S2/K22+S24/K22
topmap K23 = S25/K23+S3/K23+S26/K23
topmap K24 = S27/K24+S4/K24+S28/K24
topmap K25 = S25/K25+S5/K25+S8/K25+S30/K25
topmap K26 = S31/K26+S7/K26+S26/K26
topmap K27 = S29/K27+S8/K27+S30/K27
topmap K28 = S31/K28+S10/K28+S32/K28
topmap K29 = S31/K29+S9/K29+S6/K29+S24/K29
```

FIG. 27E

```
MA-(depmap S21/K21/K31)->
RA-(topmap p501:S1/K21/K31:p502)->
RB-(depmap S22/K21/K31)->
MB-[B1](depmap S23/K22/K31)->
RB-(topmap p503:S2/K22/K31:p504)->
RC-(depmap S24/K22/K31)[B2]->
&((MC-[B3] (depmap S25/K23/K31)->
RC-(topmap p505:S3/K23/K31:p506)->
RD-(depmap S26/K23/K31)[B4, B5, B6]->
MD-[B7(1)] (depmap S27/K24/K31)->
RD-(topmap p507:S4/K24/K31:p508)->
RE-(depmap S28/K24/K31)[B8(1)]->ME)
&(MC-[B11] (depmap S25/K25/K31)->
RC-(topmap p509:S5/K25/K31:p510)->
RF-(topmap p513:S8/K25/K31:p514)->
RG-(depmap S30/K25/K31)[B12]->
MG-[B13] (depmap S31/K28/K31)->
RG-(topmap p515:S10/K28/K31:p516)->
RH-(depmap S32/K28/K31)
[B7(2), B8(2), B9, B10, B14, B15, B16]->MH) )
```

FIG. 27F

| BUFFER CONTENT | PHYSICAL NODE | POA | BUFFER TYPE |
|---|---|---|---|
| B1 | RB | p503 | OUTPUT BUFFER |
| B2 | RC | p504 | INPUT BUFFER |
| B3 | RC | p505 | OUTPUT BUFFER |
| B4 | RD | p506 | INPUT BUFFER |
| B5 | RD | p506 | INPUT BUFFER |
| B6 | RD | p506 | INPUT BUFFER |
| B7 (1) | RD | p507 | OUTPUT BUFFER |
| B7 (2) | RH | p516 | INPUT BUFFER |
| B8 (1) | RE | p508 | INPUT BUFFER |
| B8 (2) | RH | p516 | INPUT BUFFER |
| B9 | RH | p516 | INPUT BUFFER |
| B10 | RH | p516 | INPUT BUFFER |
| B11 | RC | p509 | OUTPUT BUFFER |
| B12 | RG | p514 | INPUT BUFFER |
| B13 | RG | p515 | OUTPUT BUFFER |
| B14 | RH | p516 | INPUT BUFFER |
| B15 | RH | p516 | INPUT BUFFER |
| B16 | RH | p516 | INPUT BUFFER |

FIG. 27G

COMPILER FOR AND METHOD OF SOFTWARE DEFINED NETWORKING, STORAGE AND COMPUTE PERFORMING OPERATIONS

TECHNICAL FIELD

The present invention relates to communication networks, storage equipment and computing equipment. Such networks may be packet switched. In particular, the present invention relates to a method for configuring packet forwarding devices, storage equipment, computing equipment, virtual switches, virtual machines and containers in physical and virtual networks.

BACKGROUND INFORMATION

Recent developments in the field of Packet Switched Networking (PSN) and Computing have lead to the notion of Software Defined Networking (SDN). Within the context of this invention we consider Software Defined Networking as the capability to define a network in a high-level specification (such as, but not limited to, a high-level programming or scripting language) and through an automated process instruct the appropriate physical and virtual networking, storage and computing resources in accordance with this specification.

Such recent developments can be found in WO2010115060 "Method and apparatus for implementing and managing virtual switches" and WO2012082988 "Methods for configuring network switches".

Recently, it has become possible to instruct packet forwarding devices with the desired forwarding behavior using an open interface through a standardized protocol. The current leading protocol for this is OpenFlow, but the present invention is not limited or bound to the OpenFlow protocol, but generic in nature and could work with future protocols that provide programmatic access to forwarding table(s) of packet forwarding devices. The forwarding table(s) contains the information against which information from the incoming packet and input port is matched, providing the desired output port(s) to forward the packet out to.

We will refer to 'packet forwarding device' as 'switch' throughout the remainder of this document, referencing to any device performing packet forwarding, not limited to Open Systems Interconnection (OSI) Layer 2. Besides the forwarding functionality a switch might provide additional operation(s) on the packet, such as but not limited to monitoring and/or recording and/or buffering and/or modifying of the incoming packet header and/or payload before forwarding the packet to one or more of it's output ports. The switch might also not forward (block) the packet. These type of devices performing additional operation(s) on the packet other than packet switching are typically referred to as middleboxes and are included in the definition of a switch used in this document.

Recently, interest has grown to perform switching and middlebox functions in virtual machines running on virtualized physical servers or in containers, typically referred to as Network Functions Virtualization (NFV), to allow for greater flexibility and agility in deploying network functionality and to potentially reduce cost. An SDN Compiler, as described and claimed in the present invention, should have the capability to create forwarding instructions for these virtual machines or containers.

The distribution of these forwarding tables to switches is typically done by a so-called 'SDN controller'. The SDN controller is functionally a central place (implementations are typically redundant) at which the centrally specified forwarding tables are distributed among the typically geographically distributed switches in the network. Further, the SDN controller provides at its northbound interface a centralized view of the physical and/or virtual network resources, e.g. switches in the network, their topology, status of individual links.

The above outlines an important difference between SDN and traditional networking: the forwarding tables for the switches in the network are calculated in a centralized manner, as opposed to the distributed manner traditional networks operate which is based on a large variety of networking control protocols. This allows the user of the SDN network (user in the broadest sense: e.g. but not limited to network operator, IT operator, operations system, application, other network, other SDN Compiler) to centrally specify the desired behavior of the network, greatly enhancing the control over the network. Further, with the introduction of the Cloud Computing, a tight integration between and centralized control over computing, storage and networking resources has become a mandatory requirement.

Currently, the networking industry is focused on programmatic access to forwarding table(s) of packet forwarding devices. In order to create a tight integration between networking, storage and computing, however, there is a need to provide instructions to physical hosts, virtual hosts and physical NICs as well. E.g. a host could be instructed over which interface to send a packet to a particular destination node. E.g. a host could be instructed which packets to accept and which to drop. E.g. a NIC could be instructed which packets to forward and which to drop. This requires a holistic approach to Software Defined Networking including physical and virtual networking, storage and computing resources.

In the field of computing it has become common practice to virtualize physical servers into one or more virtual machines, resulting in aforementioned Cloud Computing. The process of server virtualization creates a logical abstraction of physical computing resources. Given today's tight integration between computing and networking a need has arisen for logical abstraction of physical and virtual networking resources.

US 2013/058215 discloses a virtualizer for managing a plurality of managed switching elements that forward data through a network. The virtualizer comprises a first set of tables for storing input logical forwarding plane data and a second set of tables for storing output physical control plane data. It also includes a table mapping engine for mapping the input logical forwarding plane data in the first set of tables to output physical control plane data in the second set of tables by performing a set of database join operations on the input logical forwarding plane data in the first set of tables. In some embodiments, the physical control plane data is subsequently translated into physical forwarding behaviors that direct the forwarding of data by the managed switching elements. In this prior art document a managed switch converts this physical control plane data to physical forwarding plane data that specifies the forwarding behavior of the managed switch (cf. [0197]), having the disadvantage of placing a requirement on physical nodes to perform this conversion and using resources in said physical nodes. The prior art presented in US2013/044641 creates an overlay virtual network, in terminology of this application a logical network, based on tunnels in an underlay, typically IP-based network. This approach has the disadvantage of operating both the virtual overlay network and the underlay network complicating operations. Moreover, the prior art according to US2013/044641 models a virtual node, in terminology of this application a logical node, after a physical node, having the disadvantage of continuing to configure and manage networks based on network element operations rather than network services.

SUMMARY OF THE INVENTION

The present patent-application claims priority from EP14185824.1 which is not pre-published but filed on 22 Sep. 2014.

The present patent-application claims priority from EP14185825.8 which is not pre-published but filed on 22 Sep. 2014.

The present patent-application claims priority from EP14186045.2 which is not pre-published but filed on 23 Sep. 2014.

The present patent-application claims priority from EP14196330.6 which is not pre-published but filed on 4 Dec. 2014.

Not pre-published patent application PCT/EP2014/055640 of the same inventor as the present application describes a method and a compiler that addresses the above mentioned tight integration between computing and networking, and need for logical abstraction of physical and virtual networking resources.

Thus, PCT/EP2014/055640 describes a method for translating or compiling a high-level network specification into a set of instructions for the appropriate physical and/or virtual networking and/or computing resources. These instructions state which actions to perform on incoming packets such as forwarding, receiving, dropping incoming packets as well as how to send packets from a source node.

The invention described in PCT/EP2014/055640 also relates to a SDN compiler arranged to perform such a method.

In order to accomplish this task, the SDN compiler retains a model of each logical network that is defined through a high-level network specification. Also, the SDN compiler retains a model of physical and/or virtual networking and/or computing resources. Both models as well as their relationship are represented in a set of relations, such as matrices. The logical network comprises logical nodes. The forwarding path between each logical source and logical destination node is determined through operations performed on these matrices resulting in a list of Points-of-Attachments (e.g. but not limited to an Ethernet Media Access Control (MAC) Address) of physical and virtual resources. From these forwarding paths stored in matrices the above mentioned appropriate instructions are derived. The above approach allows for definition and creation of multiple simultaneous logical networks on the same physical and virtual resources.

The method described in PCT/EP2014/055640 can be applied to currently available OpenFlow-based products, but is not limited to OpenFlow and could work with future protocols that provide programmatic access to forwarding table(s) of packet forwarding devices. The described method can be applied to currently widely used identifiers of Point-of-Attachment, such as Ethernet MAC Addresses. The described method can be applied to IPv4 and IPv6 naming and packet formats.

The invention described in PCT/EP2014/055640 does not require any conversion in a physical node, creating forwarding entries that can directly be used for making forwarding decisions on incoming packets, allowing for less complex forwarding hardware and software forwarding implementations. The described invention does not require an underlay network, simplifying operations, by compiling a logical network using a logical namespace to physical networking resources. The described invention uses a network abstraction based on a directed graph allowing a user of an SDN Compiler to specify network services based on declarative request, and an SDN Compiler to implement and maintain said network services, simplifying operations and allowing for specifying, implementing and maintaining complex network services.

PCT/EP2014/055640 describes a SDN Compiler Method and includes the specification of operations performed by a particular physical node (PCT/EP2014/055640 FIG. 61I, pages 245 and 246; other). The present invention extends the method presented in PCT/EP2014/055640 by performing operations for the combination of a particular node or network and a particular edge, allowing the user of the SDN Compiler to specify which one or more operations to perform for a particular edge.

Here, an "edge" is defined as an element of a directed graph that represents the overall network. Such an element connects two adjacent vertices (nodes) of the graph, and has a direction. When represented as a directed graph, a bi-directional physical link between two vertices is represented by two edges. This will be illustrated in more detail in the below specification when explaining the attached figures.

An example of an additional operation is a transfer function, transferring an incoming signal to an outgoing signal in a node. Examples but not limited to such signal are a physical signal, a packet or a bit. Examples but not limited to such transfer functions are an atomic process, a piece of computer code, a physical process altering an incoming signal or digital signal processing. In present IT (Information Technology) deployments there is a loose coupling between networking on one hand, and storage and compute on the other hand. As a result, networks have limited visibility of applications and applications have limited visibility of networks, resulting in sub-optimal performance op IT resources. Also, network operators have limited visibility of applications and their requirements and application developers have limited visibility of networking capabilities, resulting in sub-optimal software development, and application and network operations.

It is an object of the present invention to provide a method and a compiler that address the above mentioned performing of functions for the combination of a particular node or network and a particular edge, allowing for increasing network programmability.

Thus, the present invention provides a method for translating or compiling a high-level network specification, including operations to be performed in one or more nodes on one or more edges, into a set of instructions for the appropriate physical and/or virtual networking and/or storage and/or computing resources, thereby creating a tight coupling between operations of networking, storage and compute.

The invention also relates to a SDN compiler arranged to perform such a method, as well as a computer program product comprising instructions and data arranged such that, when operated by a computer device such as such a SDN compiler, arranges that computer device to perform the claimed method.

To that end, the present invention provides a method as claimed in claim 1, as well as a compiler defined in an independent apparatus claim and a computer program product as claimed in independent computer program product claim. Another, related aspect of the invention is claimed in claim 16. A further, related aspect of the invention is claimed in claim 17.

BRIEF DESCRIPTION OF DRAWINGS

The invention will be explained in detail with reference to some drawings that are only intended to show embodiments of the invention and not to limit the scope. The scope of the invention is defined in the annexed claims and by its technical equivalents. I.e., a person skilled in the art will understand that features, components, elements, etc. explicitly used to explain the invention can be substituted by technical equivalents unless otherwise stated. Moreover, separate features of different embodiments can be combined, even if not explicitly shown in the drawings or explained in the specification, unless such combination is physically impossible.

The drawings show:

FIG. 2A is a diagram showing a functional representation of physical nodes BA, BB, BC and BD FIG. 2B is a diagram showing a functional representation of physical network BAA, consisting of physical nodes BA, BB, BC and BD interconnected by links.

FIG. 2C is a diagram showing a functional representation of physical network BAA, consisting of physical nodes BA, BB, BC and BD interconnected by physical links, of which the interconnection between a physical node and a physical link is denoted by a physical Point-of-Attachment (PoA), p101 through p108, of which the cost of the physical link in each direction of the physical link is shown FIG. 2D is a diagram showing a directed graph representation of physical network BAA, consisting of vertices (nodes) BA, BB, BC and BD interconnected by edges, of which the interconnection between a vertex and an edge is denoted by a physical Point-of-Attachment (PoA), p101 through p108, of which the cost of each edge is shown

FIG. 3C is a diagram showing networks KA, KB, KC, KD, LA, LB, LC, LD and their mapping relationships either being a topology-mapping, a layer-mapping or a depth-mapping.

FIG. 3D is a diagram showing networks KA, KB, KC, KD, LA, LB, LC, LD at level h and their mapping relationships as well as networks KAA, KCC, LAA, LCC at level (h+1). Network KAA at (d,n,h+1) contains networks KA and KB both at (d,n,h). Network KCC at (d,n+1,h+1) contains networks KC and KD both at (d,n+1,h). Network LAA at (d+1,n,h+1) contains networks LA and LB both at (d+1,n,h). Network LCC at (d+1,n+1,h+1) contains networks LC and LD both at (d+1,n+1,h). Diagonal layer-mappings between nodes KA and KD, KB and KC, LA and LD, LB and LC which were shown in FIG. 3C have been omitted in this figure to simplify the figure. Diagonal depth-mappings between nodes KA and LA, KB and LA, KC and LD, KD and LC, KA and LC, KC and LA, KB and LD, KD and LB which were shown in FIG. 3C have been omitted in this figure to simplify the figure.

FIG. 4A also shows the topology-mappings between networks at (d, n, h).

FIG. 4B also shows the level-mappings between networks at (d, n) as well as the topology-mappings between networks at (d, n, h).

FIG. 6A is a diagram showing the notation used for a first mapping of a first mapping-type with a first mapping-name from a first network to a second network.

FIG. 6B is a diagram showing the notation used for a second mapping of a second mapping-type with a second mapping-name from a second network to a third network.

FIG. 6C is a diagram showing the notation used for a third edge of a third edge-type with a third edge-name being a concatenation of a first edge with a first edge-name and a second edge with a second edge-name.

FIG. 6D is a diagram showing the notation used for a third edge of a third edge-type with a third edge-name being a concatenation of a first mapping with a first set of edge-relationships and a second mapping with a second set of edge-relationships.

FIG. 7A is a diagram showing topology-mappings L5 and L6, layer-mappings L7, L8, L9 and L10 and depth-mappings L12, L13, L15, L16, L17, L18, L24 and L25.

FIG. 7B is a diagram showing topology-mappings L14 and L22, layer-mappings L19 and L20 and topology-paths L11, L21 and L23.

FIG. 7C is a diagram showing in step 1 a topology-path named L23 from network LC to network LD and in step 6 the recursive-path of the topology-path named L23 from network LC to network LD, using the notation of FIG. 7A, step 2 through step 5 being intermediate steps of the calculation.

FIG. 8 also shows physical networks QA, QB, QC, QD, QE and QF at (d=0, n=0, h=0). FIG. 8 also shows the topology-mappings, depth-mapping, level-mappings and topology-path between networks, as well as the name of each topology-mapping, level-mapping and topology-path and edge-relationships.

FIG. 9 also shows a User and SDN Controller and an SDN Node and message flows 51 through 61.

FIG. 11A also shows operations named 'Action 1' and 'Action 3'

FIG. 11C also shows that node QB can possibly perform an operation named 'action 1', node QC can possibly perform an operation named 'action 2', node QE can possibly perform operations named 'action 3' and 'action 4'.

FIG. 11D is a diagram showing physical topology-mappings named J1 through J5 and depth-mappings named J6, J7, J8, J13, J14, J15, per the notation of FIG. 6A.

FIG. 11E is a diagram showing topology-mappings named J24, J28 and J53, and a topology-path named J54, per the notation of FIG. 6C.

FIG. 11F is a diagram showing the recursive-path of the topology-path named J54

FIG. 11G is a diagram showing for all nodes in the recursive-path calculated from the requested topology-path named J54 an input port, an output port, incoming set of edge-relationships and outgoing set of edge-relationships.

FIG. 11H is a diagram showing a first operation call and a second operation call FIG. 11I is a diagram showing switching-identifiers for the edges named J1 through J5 and J54.

FIG. 11J is a diagram showing for networks at (d=0, h=0), being physical nodes QA, QB, QC, QD, QE, QF, in the recursive-path calculated from the requested topology-path named J54 forwarding instructions comprising an input port, an output port, incoming set of edge-relationships and switching-identifiers of each edge in said incoming set of edge-relationships, and outgoing set of edge-relationships and switching-identifiers of each edge in said outgoing set of edge-relationships, and an additional operation to perform.

FIG. 12B also shows that node PB can possibly perform an operation named 'action 5', node PC can possibly perform an operation named 'action 6', node PE can possibly perform operations named 'action 7' and 'action 8'.

FIG. 12C is a diagram showing physical topology-mappings named R1 through R5, layer-mappings named R20 and R21 and depth-mappings named R6 through R15 per the notation of FIG. 6A.

FIG. 12D is a diagram showing topology-mappings named R16, R17, R18, R24, R25, layer-mappings named R22 and R23, and topology-paths named R19 and R25 per the notation of FIG. 6C.

FIG. 12E is a diagram showing the recursive-path of the topology-path named R25

FIG. 12F is a diagram showing a third operation call and a fourth operation call FIG. 12G is a diagram showing switching-identifiers for the edges named R1 through R5, R19 and R25.

FIG. 12H is a diagram showing for all nodes in the recursive-path calculated from the requested topology-path named R25 an input port, an output port, incoming set of edge-relationships and outgoing set of edge-relationships.

FIG. 12I is a diagram showing for networks at (d=0, h=0), being physical nodes PA, PB, PC, PD, PE, PF, PG, PH, in the recursive-path calculated from the requested topology-path named R25 forwarding instructions comprising an input port, an output port, incoming set of edge-relationships and switching-identifiers of each edge in said incoming set of edge-relationships, and outgoing set of edge-relationships and switching-identifiers of each edge in said outgoing set of edge-relationships, and an additional operation to perform.

FIG. 13G is a diagram showing operation calls comprising of an operation name denoting an operation, at least one edge, a node denoting a location at which said operation is to be performed. FIG. 13G also shows relationship between operation and data, input data and output data of said operation.

FIG. 14D also shows input data and output data of said operation.

FIG. 15C is a diagram showing physical topology-mappings named J1 through J5 and K6 through K10 per the notation of FIG. 6A.

FIG. 15D is a diagram showing depth-mappings named K41 through K58 per the notation of FIG. 6A.

FIG. 15E is a diagram showing topology-mappings named K21 through K29 per the notation of FIG. 6C.

FIG. 15F is a diagram showing the recursive-path of the topology-path named K31.

FIG. 15G is a diagram showing for physical nodes QA, QB, QC, QD, QE, QF, QG, QH and logical nodes MA, MB, MC, MD, ME, MG, MH in the recursive-path calculated from the requested topology-path named K31 an input port, an output port, incoming set of edge-relationships, outgoing set of edge-relationships. FIG. 15G also shows for logical nodes MA, MB, MC, MD, ME, MG, MH an additional operation to perform, denoted by an operation name.

FIG. 15H is a diagram showing for physical nodes QA, QB, QC, QD, QE, QF, QG, QH in the recursive-path calculated from the requested topology-path named K31 an input port, an output port, incoming set of edge-relationships, outgoing set of edge-relationships. FIG. 15H also shows for physical nodes QA, QB, QD, QE, QF, QG, QH an additional operation to perform, denoted by an operation name.

FIG. 15I is a diagram showing for physical nodes QA, QB, QC, QD, QE, QF, QG, QH in the recursive-path calculated from the requested topology-path named K31 an input port, an output port, incoming set of edge-relationships, outgoing set of edge-relationships. FIG. 15I also shows for physical nodes QA, QB, QD, QE, QF, QG, QH an additional operation to perform, incoming data and outgoing data.

FIG. 16 is a diagram showing for physical nodes QA, QB, QC, QD, QE, QF, QG, QH in the recursive-path calculated from the requested topology-path named K31 pseudo-code to be executed.

In FIG. 17A questions marks indicate unknown physical nodes and unknown physical topology-paths.

FIG. 17B is a diagram showing depth-mappings named L51 through L68, per the notation of FIG. 6A.

FIG. 17C is a diagram showing topology-mappings K21 through K29, per the notation of FIG. 6C. In FIG. 17C '?L71[toppath]' denotes that L71 is an unknown topology-path.

FIG. 17D is a diagram showing the topology-mapping named K21.

FIG. 17E is a diagram showing the topology-mappings named K21 through K29.

FIG. 17F is a diagram showing physical entities of the topology-mapping named K21 through K29, said physical entities being used as a search statement.

FIG. 17G is a diagram showing a search statement.

FIG. 17H is a diagram showing how requirements of a logical topology-mapping named K21 through K29 are related to requirements of an unknown physical topology-paths named ?L71 through ?L80.

FIG. 17I is a diagram showing how requirements of a logical node are related to requirements of an unknown physical node, including the requirements specified by an operation name.

FIG. 18A is a diagram showing how an unknown physical node is related to a physical node.

FIG. 18B is a diagram showing how an unknown physical topology-path is related to a physical topology-path.

FIG. 18C is a diagram showing depth-mappings named L51 through L68, per the notation of FIG. 6A.

FIG. 18D s a diagram showing topology-mappings K21 through K29, per the notation of FIG. 6C.

FIG. 18E is a diagram showing the recursive-path of the topology-path named K31.

Figure 20A:
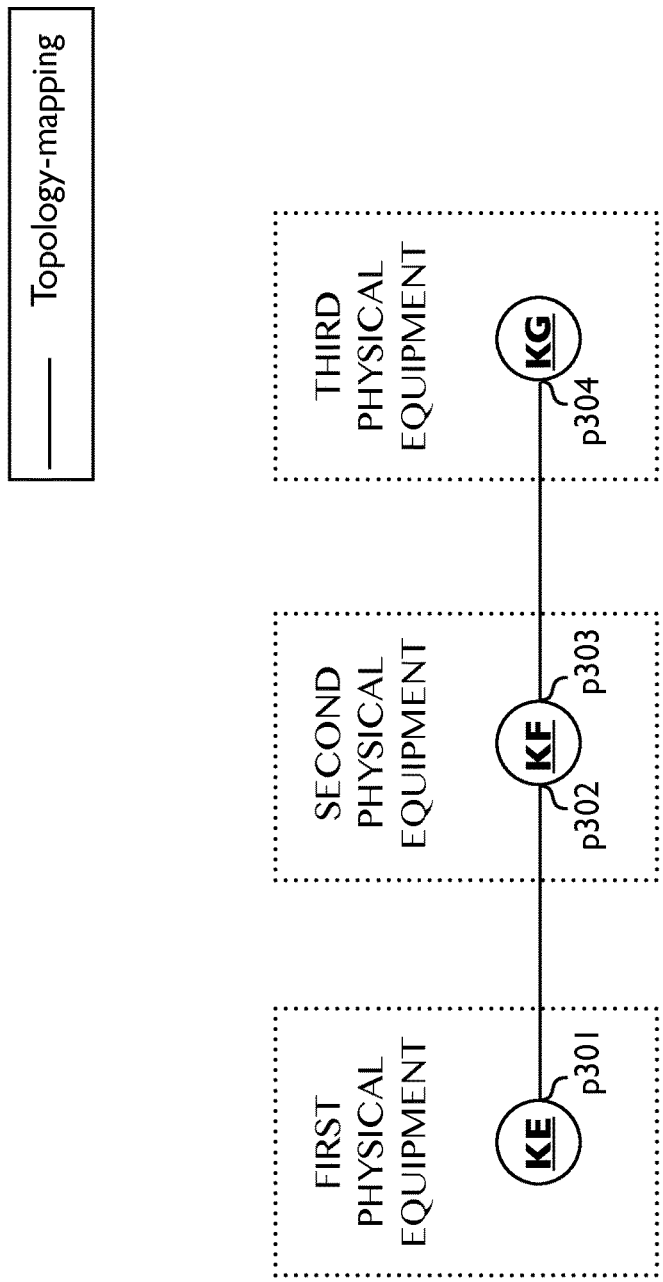

FIG. 20A is a diagram showing a first physical equipment, represented by physical node KE, a second physical equipment, represented by physical node KF and a third physical equipment, represented by physical node KG, connected by topology-mappings being physical links. FIG. 20A also shows Point-of-Attachment (PoA) p301 through p304.

Figure 20B:
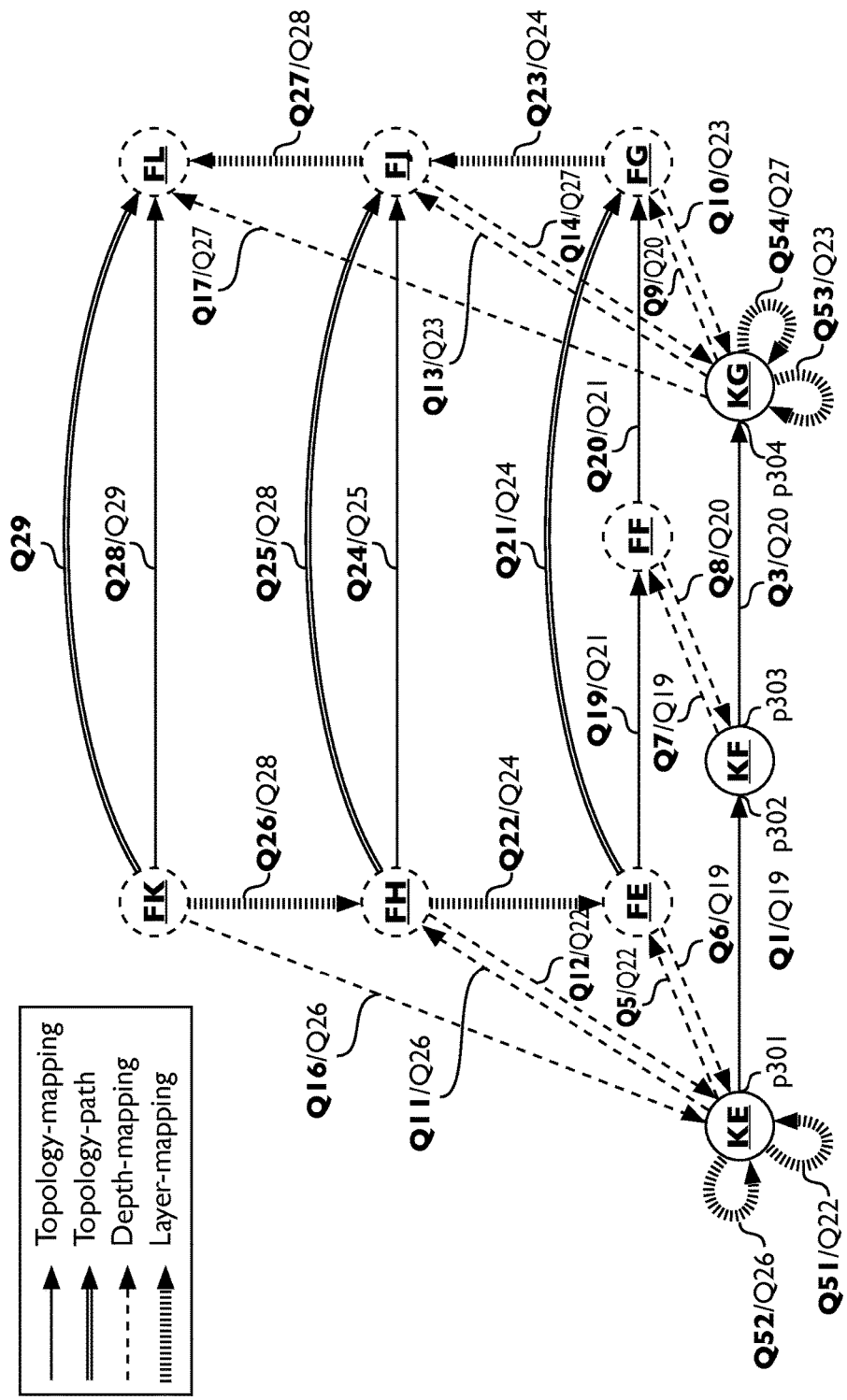

FIG. 20B is a diagram showing a physical node KE at (d=0, n=0, h=0), representing a first physical equipment, a physical node KF at (d=0, n=0, h=0), representing a second physical equipment, and a physical node KG at (d=0, n=0, h=0), representing a third physical equipment, logical nodes FE, FF and FG at (d=1, n=1, h=0), logical nodes FH and FJ at (d=1, n=2, h=0), and logical nodes FK and FL at (d=1, n=3, h=0). FIG. 20B also shows topology-mappings named Q1, Q3, Q19, Q20, Q24, Q28, depth-mappings named Q5 through Q14, Q16, Q17, layer-mappings named Q22, Q23, Q26, Q27 and Q51 through Q54, and topology-paths named Q21, Q25, Q29, represented as directed edges in a graph.

FIG. 20C is a diagram showing topology-mappings named Q1 through Q4, depth-mappings named Q5 through Q18, and layer-mappings named Q51 through Q58, per the notation of FIG. 6A.

FIG. 20D is a diagram showing topology-mappings Q19, Q20, Q24, Q28, layer-mappings named Q22, Q23, Q26, Q27 and topology-paths named Q21, Q25, Q29, per the notation of FIG. 6C.

FIG. 20E is a diagram showing switching-identifiers for the edges named Q1, Q3, Q21, Q25 and Q29.

Figure 20F:
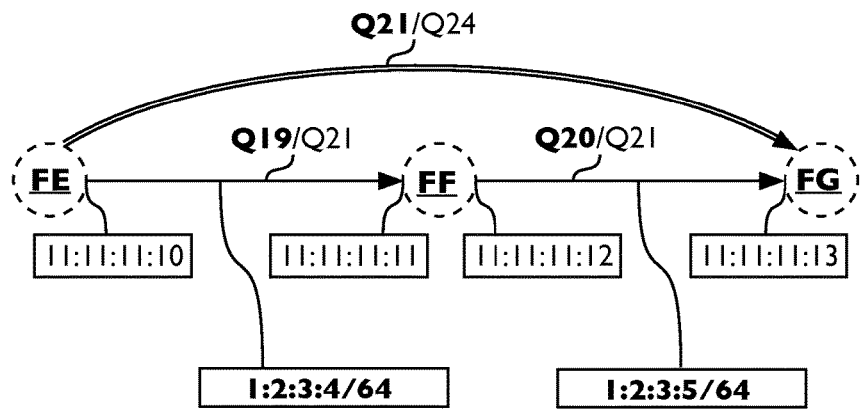

FIG. 20F is a diagram showing logical nodes FE, FF and FG, topology-mapping named Q19 with subnet-identifier 1:2:3:4/64, topology-mapping named Q20 with subnet-identifier 1:2:3:5/64 and PoAs 11.11.11.10, 11.11.11.11, 11.11.11.12, 11.11.11.13.

Figure 20G:
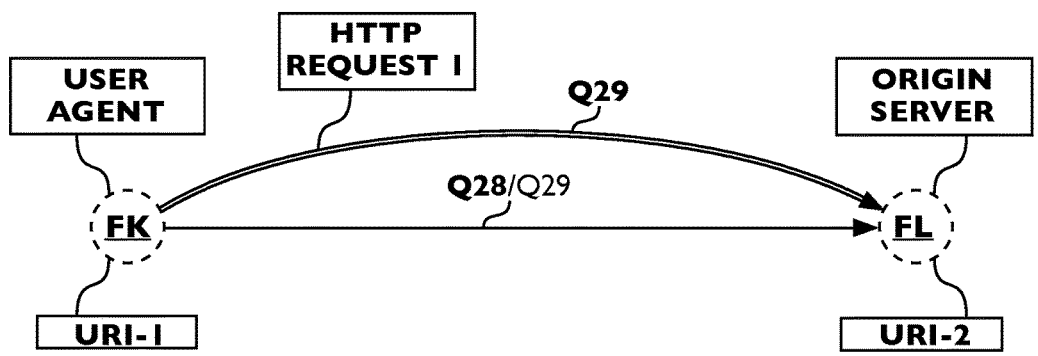

FIG. 20G is a diagram showing logical node FK, being a user agent with logical name URI-1, and logical node FL, being an origin server with logical name URI-2, topology-mapping named Q28, and topology-path named Q29 denoting 'HTTP Request 1'.

FIG. 20H is a diagram showing for networks at (d=0, h=0), being physical nodes KE, KF and KG, in the recursive-path calculated from the requested topology-path named Q29 forwarding instructions comprising an input port, an output port, relevant incoming set of edge-relationships and switching-identifiers of each edge in said relevant incoming set of edge-relationships, and relevant outgoing set of edge-relationships and switching-identifiers of each edge in said relevant outgoing set of edge-relationships.

Figure 21A:
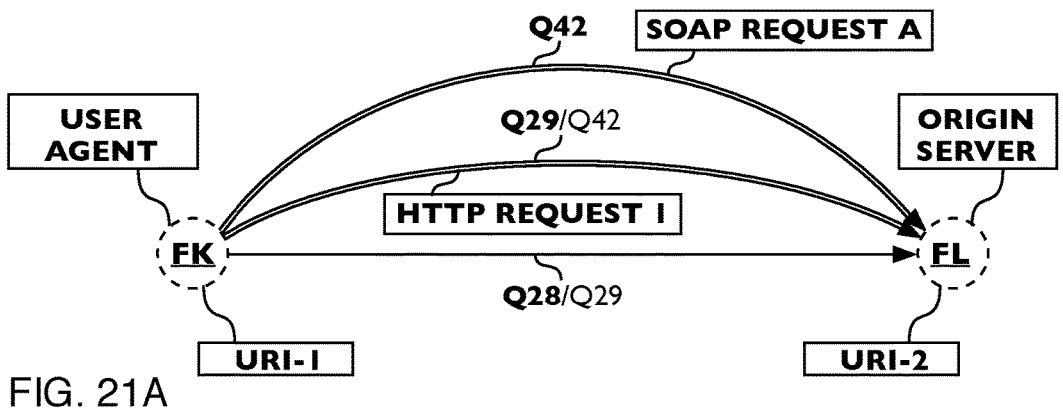

FIG. 21A is a diagram showing logical node FK, being a user agent with logical name URI-1, and logical node FL, being an origin server with logical name URI-2, topology-mapping named Q28, topology-path named Q29 denoting 'HTTP Request 1', and topology-path named Q42 denoting 'SOAP Request A'.

Figure 21B:
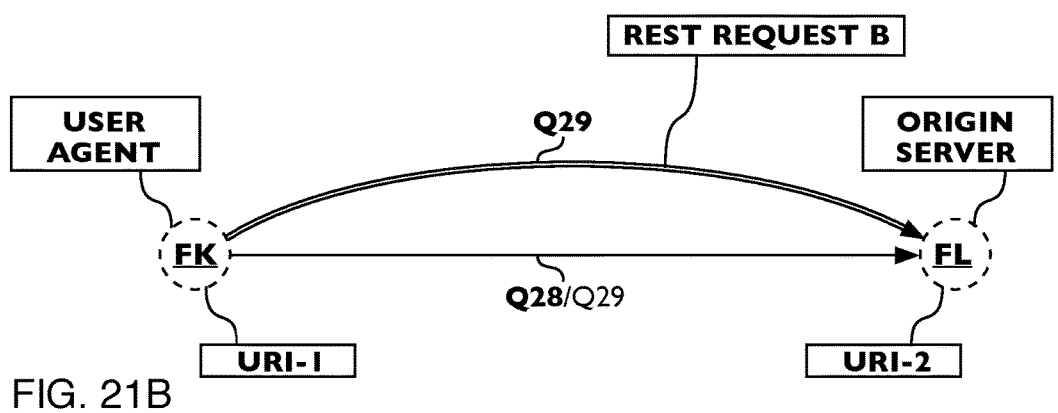

FIG. 21B is a diagram showing logical node FK, being a user agent with logical name URI-1, and logical node FL, being an origin server with logical name URI-2, topology-mapping named Q28, topology-path named Q29 denoting 'REST Request B'.

Figure 22A:
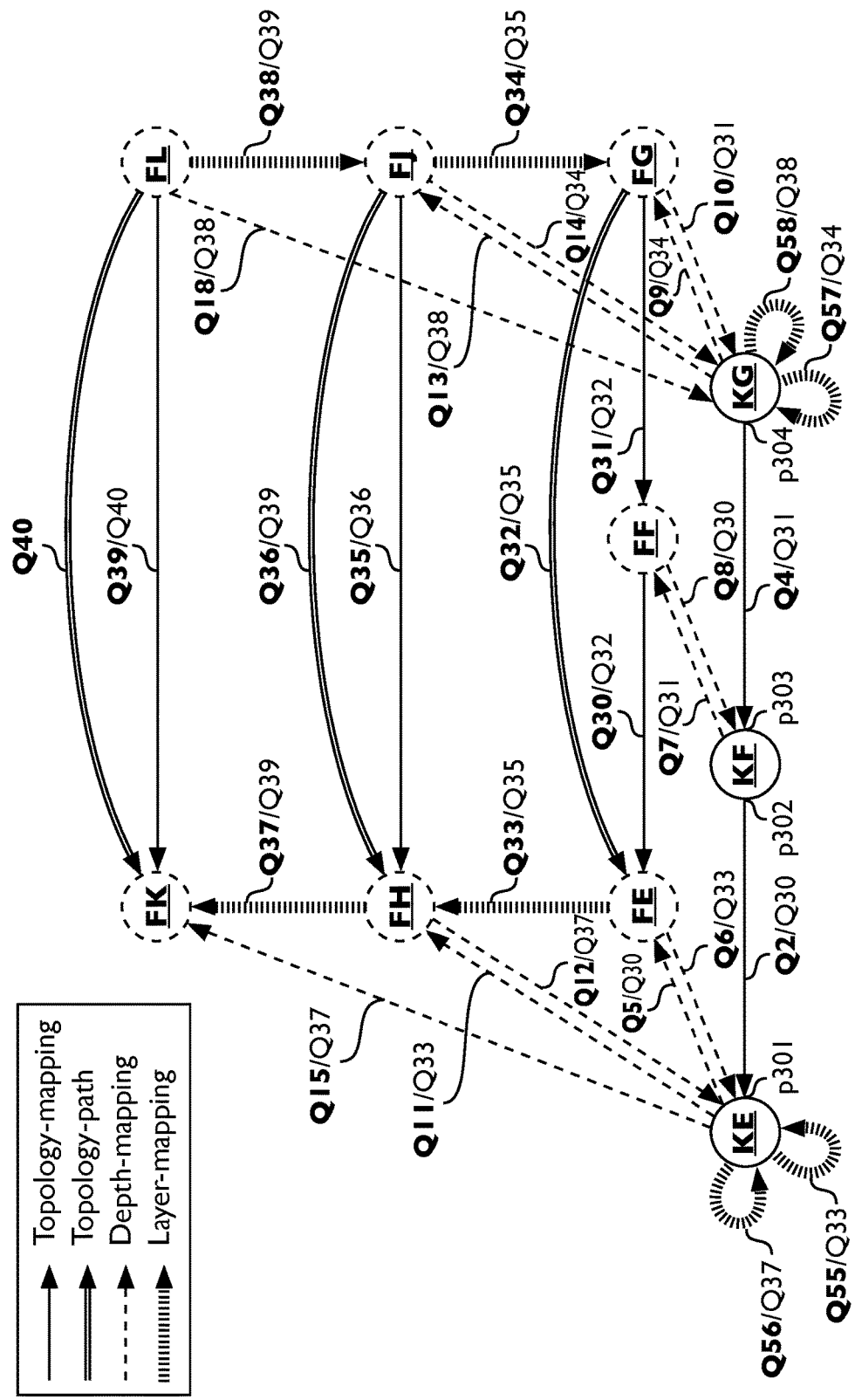

FIG. 22A is a diagram showing a physical node KE at (d=0, n=0, h=0), representing a first physical equipment, a physical node KF at (d=0, n=0, h=0), representing a second physical equipment, and a physical node KG at (d=0, n=0, h=0), representing a third physical equipment, logical nodes FE, FF and FG at (d=1, n=1, h=0), logical nodes FH and FJ at (d=1, n=2, h=0), and logical nodes FK and FL at (d=1, n=3, h=0). FIG. 22A also shows topology-mappings named Q2, Q4, Q30, Q31, Q35, Q39, depth-mappings named Q5 through Q15, Q18, layer-mappings named Q33, Q34, Q37, Q38 and Q55 through Q58, and topology-paths named Q32, Q36, Q40, represented as directed edges in a graph.

Figures 22B, 22C:
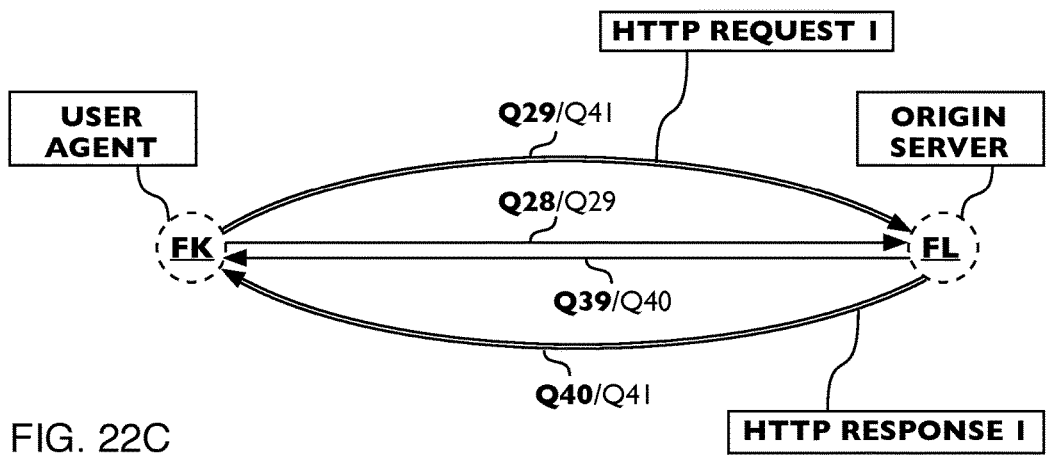

FIG. 22B is a diagram showing topology-mappings Q30, Q31, Q35, Q39, layer-mappings named Q33, Q34, Q37, Q38 and topology-paths named Q32, Q36, Q40, Q41, per the notation of FIG. 6C.

FIG. 22C is a diagram showing logical node FK, being a user agent with logical name URI-1, and logical node FL, being an origin server with logical name URI-2, topology-mappings named Q28 and Q39, topology-path named Q29 denoting 'HTTP Request 1', and topology-path named Q40 denoting 'HTTP Response 1'.

Figure 23A:
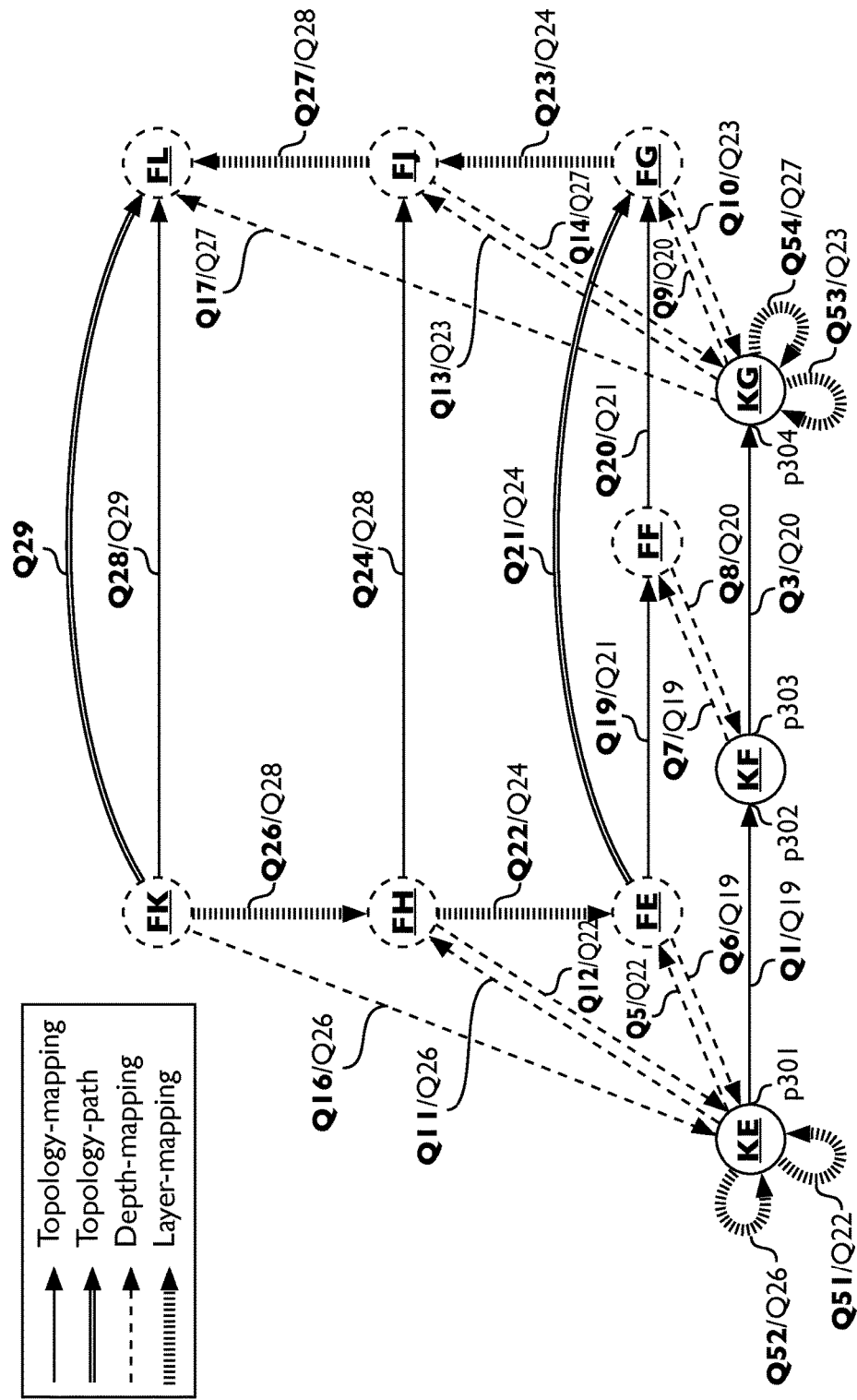

FIG. 23A is a diagram showing a physical node KE at (d=0, n=0, h=0), representing a first physical equipment, a physical node KF at (d=0, n=0, h=0), representing a second physical equipment, and a physical node KG at (d=0, n=0, h=0), representing a third physical equipment, logical nodes FE, FF and FG at (d=1, n=1, h=0), logical nodes FH and FJ at (d=1, n=2, h=0), and logical nodes FK and FL at (d=1, n=3, h=0). FIG. 23A also shows topology-mappings named Q1, Q3, Q19, Q20, Q24, Q28, depth-mappings named Q5 through Q14, Q16, Q17, layer-mappings named Q22, Q23, Q26, Q27 and Q51 through Q54, and topology-paths named Q21, Q29, represented as directed edges in a graph.

Figure 23B:
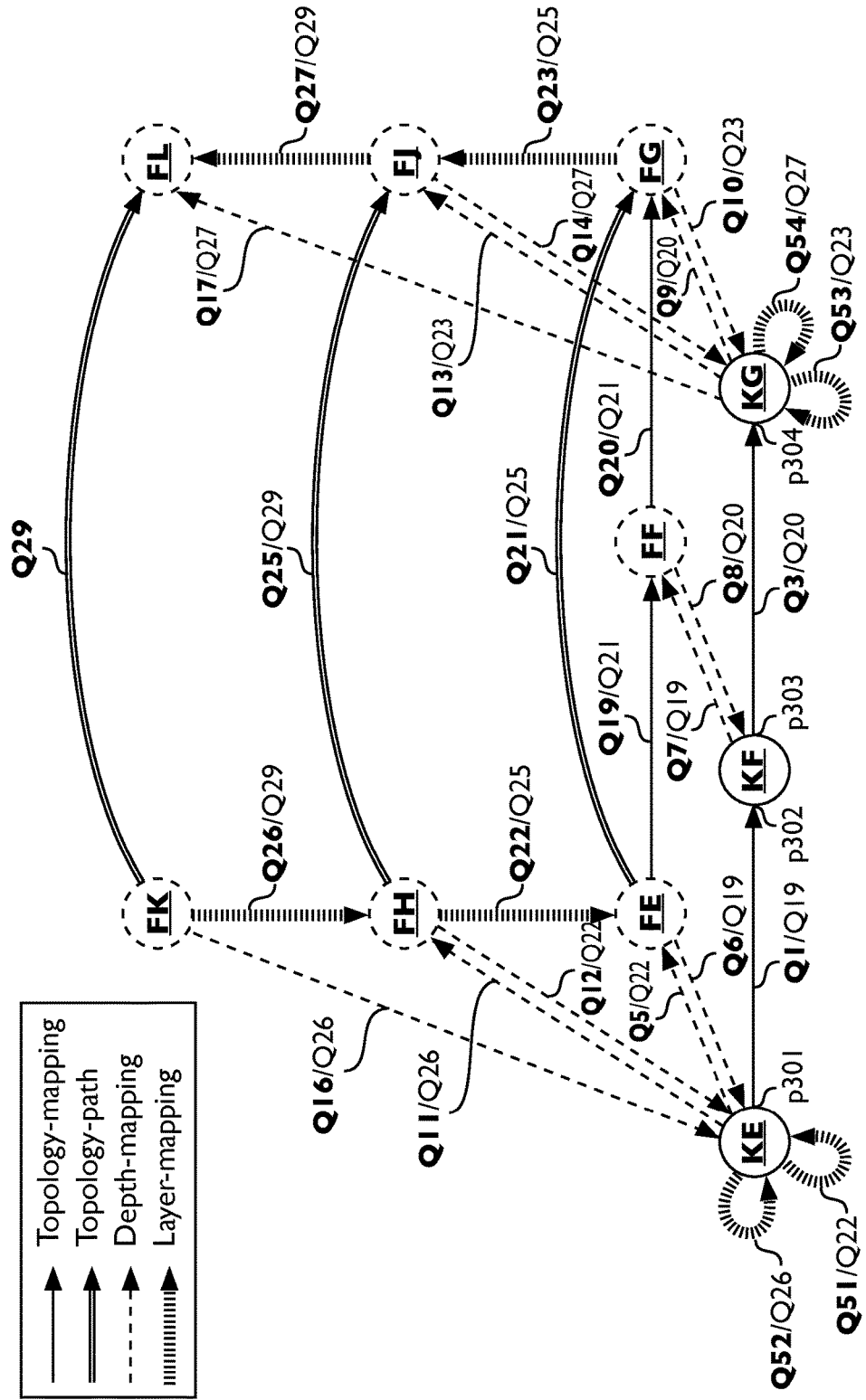

FIG. 23B is a diagram showing a physical node KE at (d=0, n=0, h=0), representing a first physical equipment, a physical node KF at (d=0, n=0, h=0), representing a second physical equipment, and a physical node KG at (d=0, n=0, h=0), representing a third physical equipment, logical nodes FE, FF and FG at (d=1, n=1, h=0), logical nodes FH and FJ at (d=1, n=2, h=0), and logical nodes FK and FL at (d=1, n=3, h=0). FIG. 23B also shows topology-mappings named Q1, Q3, Q19, Q20, depth-mappings named Q5 through Q14, Q16, Q17, layer-mappings named Q22, Q23, Q26, Q27 and Q51 through Q54, and topology-paths named Q21, Q25, Q29, represented as directed edges in a graph.

Figure 24A:
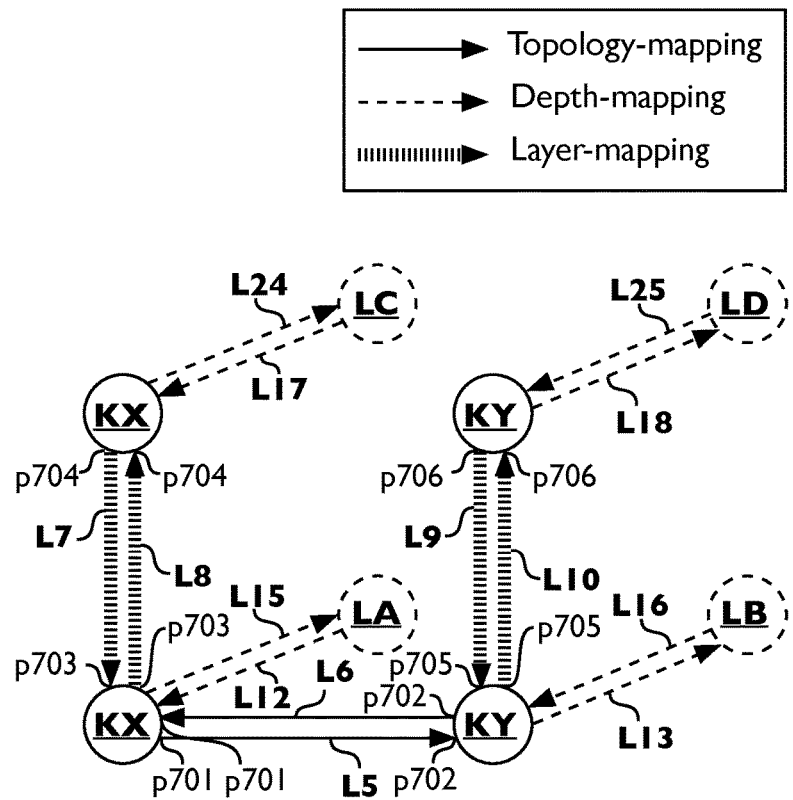

FIG. 24A is a diagram showing physical nodes KX, KY and logical nodes LA, LB, LC, LD and named topology-mappings, layer-mappings and depth-mappings.

Figure 24B:
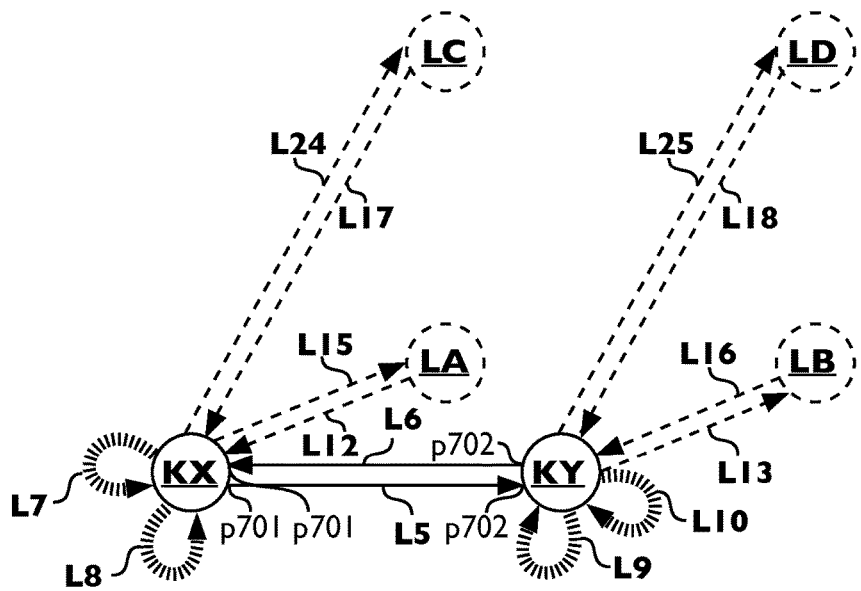

FIG. 24B is a diagram showing physical nodes KX, KY and logical nodes LA, LB, LC, LD and named topology-mappings, layer-mappings and depth-mappings.

Figure 25:
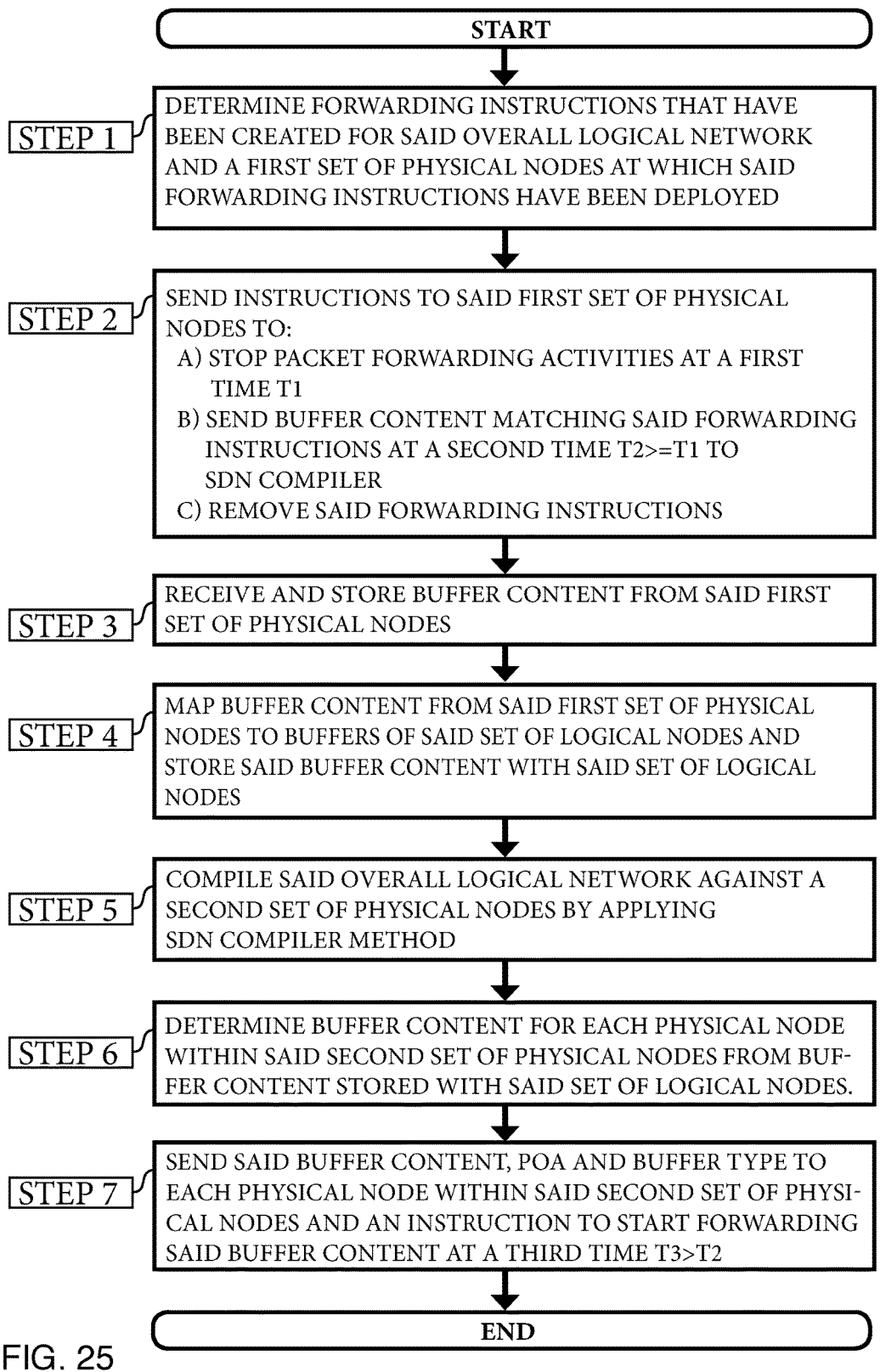

FIG. 25 is a flowchart of a method to perform a migration of an overall logical network.

Figure 26A:
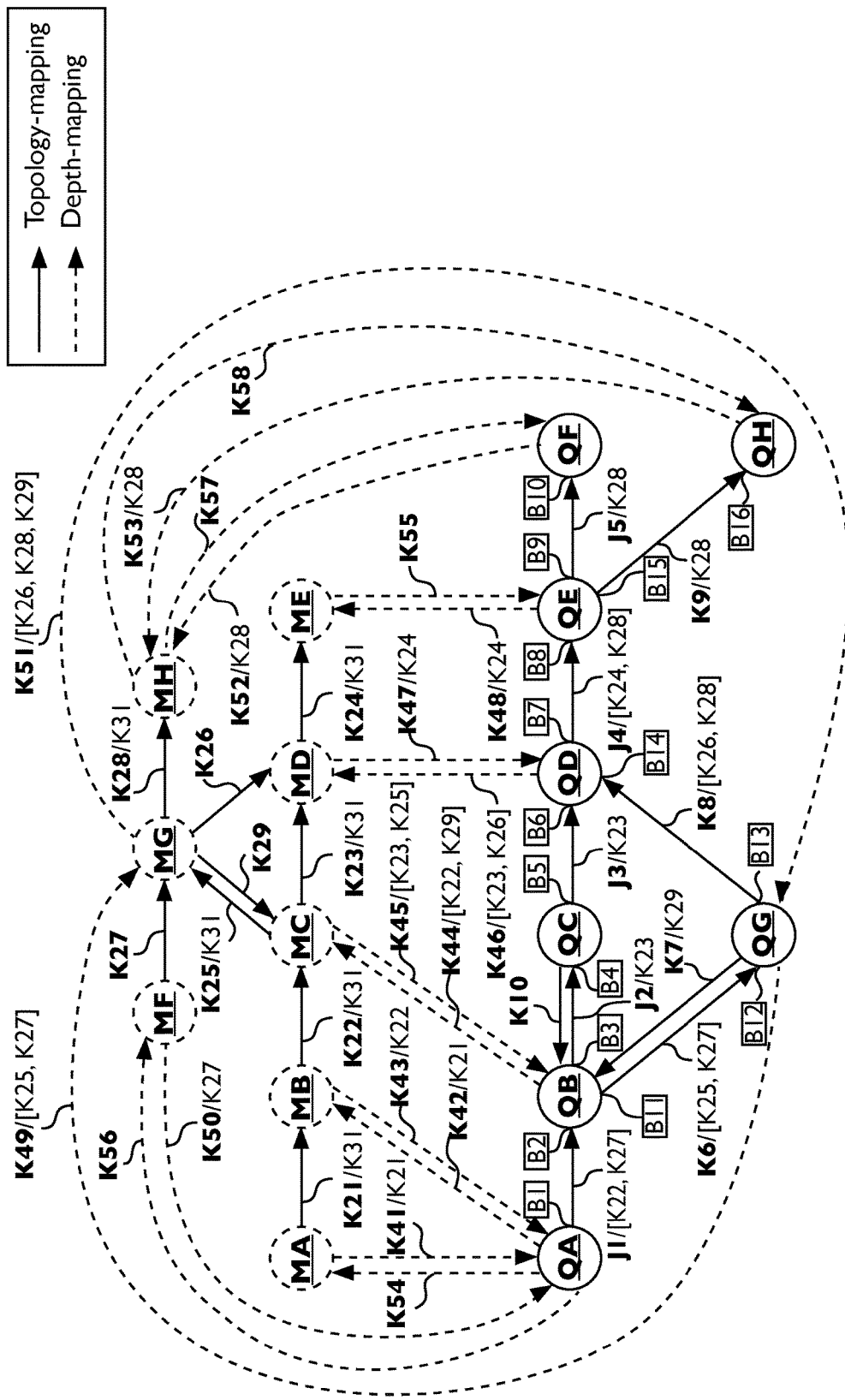

FIG. 26A is a diagram showing physical nodes QA, QB, QC, QD, QE, QF, QG, QH and logical nodes MA, MB, MC, MD, ME, MF, MG, MH, depth-mappings, topology-mappings and buffer content B1 through B16.

FIG. 26B is a diagram showing buffer content B1 through B16, a physical node, a Point-of-Attachment (PoA) and a buffer type.

FIG. 26C is a diagram showing the recursive-path of the topology-path named K31 including buffer content B1 through B16.

FIG. 26D is a diagram showing buffer content B1 through B16, a logical node, a topology-mapping and a buffer type.

Figure 27A:
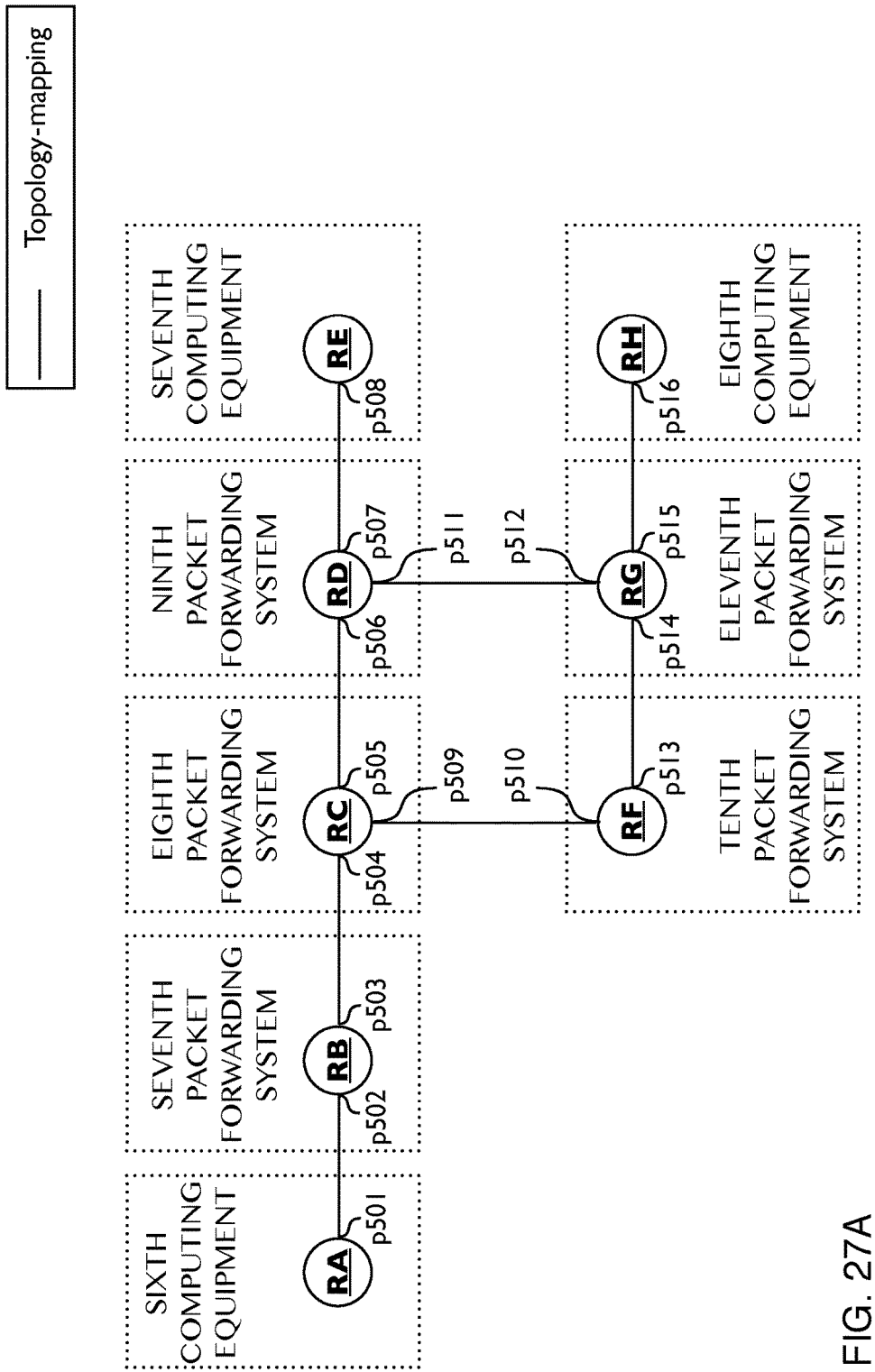

FIG. 27A is a diagram showing a physical node RA, representing a sixth computing equipment, a physical node RB, representing a seventh packet forwarding system, a physical node RC, representing a eighth packet forwarding system, a physical node RD, representing a ninth packet forwarding system, a physical node RE, representing a seventh computing equipment, a physical node RF, representing a tenth packet forwarding system, a physical node RG, representing a eleventh packet forwarding system and a physical node RH, representing a eighth computing equipment interconnected by physical links.

Figure 27B:
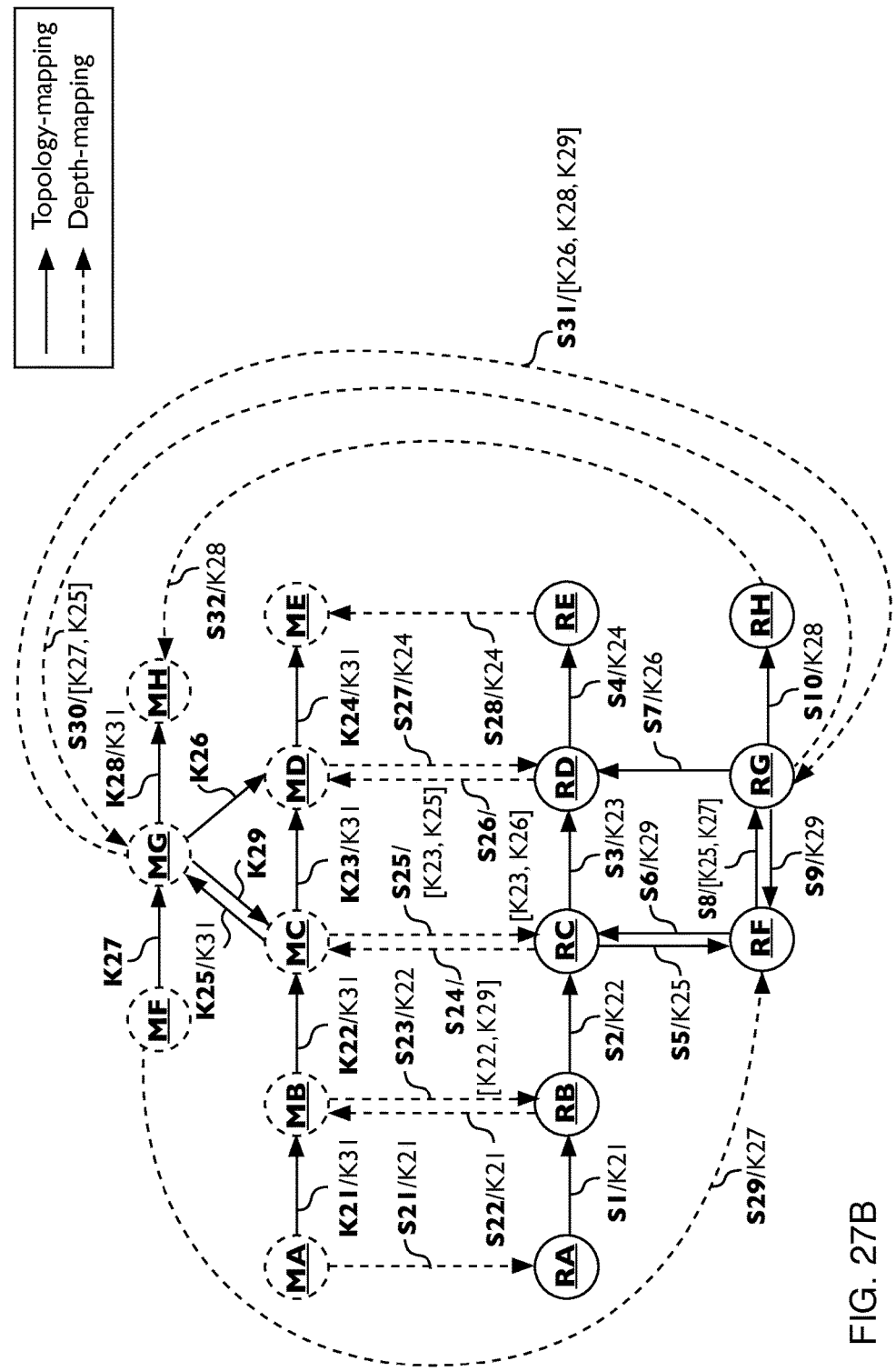

FIG. 27B is a diagram showing physical nodes RA, RB, RC, RD, RE, RF, RG, RH and logical nodes MA, MB, MC, MD, ME, MF, MG, MH, depth-mappings and topology-mappings.

FIG. 27C is a diagram showing physical topology-mappings named S1 through S10 per the notation of FIG. 6A.

FIG. 27D is a diagram showing depth-mappings named S21 through S32 per the notation of FIG. 6A.

FIG. 27E is a diagram showing topology-mappings named K21 through K29 per the notation of FIG. 6C.

FIG. 27F is a diagram showing the recursive-path of the topology-path named K31 including buffer content B1 through B16.

FIG. 27G is a diagram showing buffer content B1 through B16, a physical node, a Point-of-Attachment (PoA) and a buffer type.

Figure 28A:
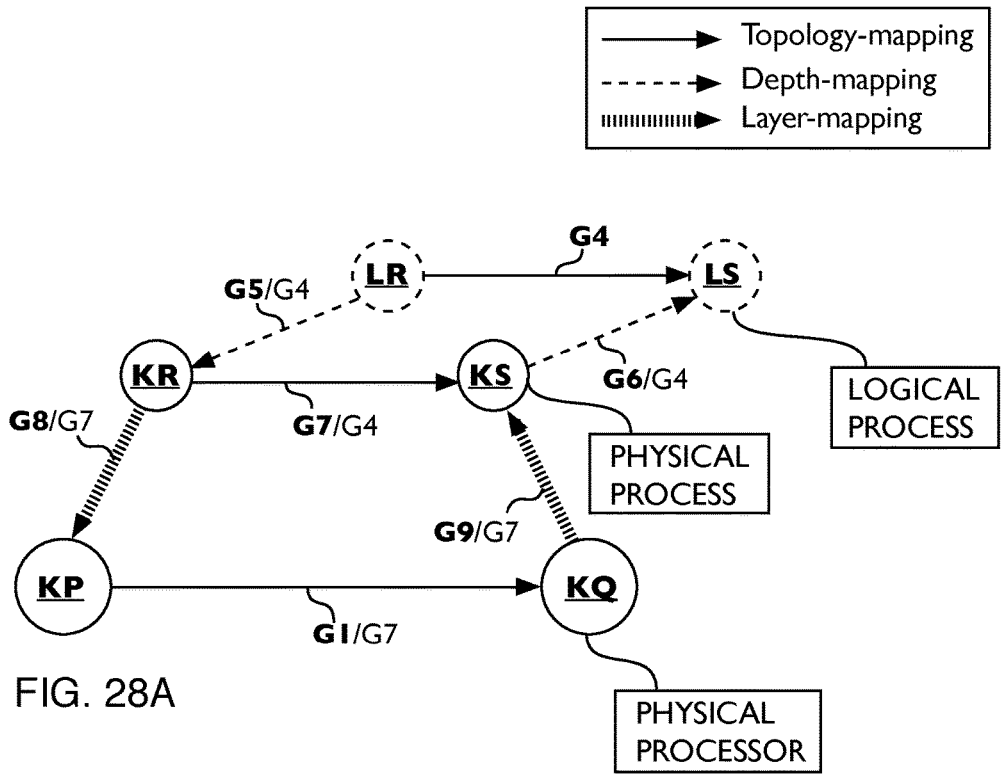

FIG. 28A is a diagram showing physical nodes KP and KQ representing physical processors, logical nodes LR and LS representing logical processes, depth-mappings and topology-mappings.

Figure 28B:
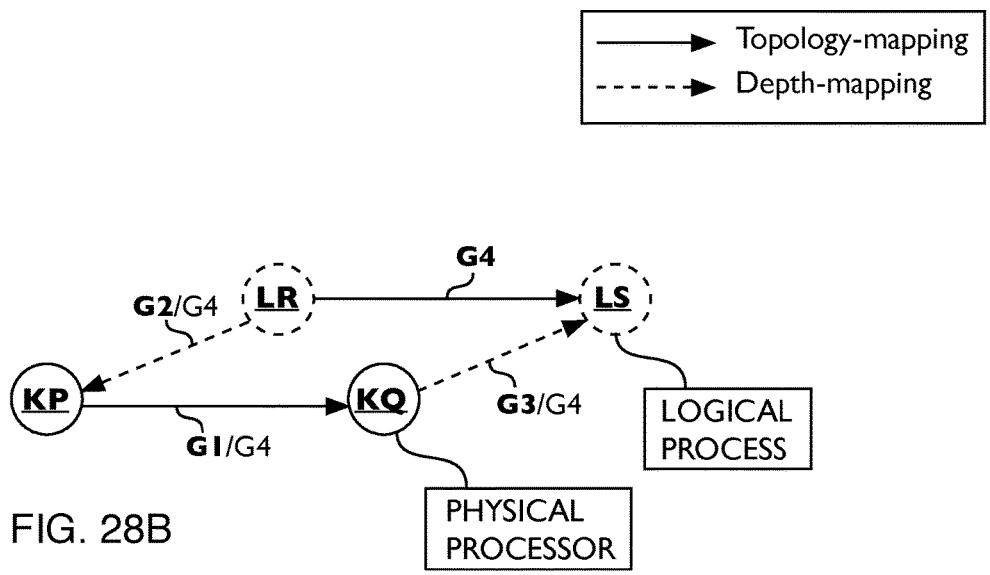

FIG. 28B is a diagram showing physical nodes KP and KQ representing physical processors, physical nodes KR and KS representing physical processes, logical nodes LR and LS representing logical processes, depth-mappings, level-mappings and topology-mappings.

DETAILED DESCRIPTION OF THE INVENTION AND PREFERRED EMBODIMENT

Non-pre-published prior art PCT/EP2014/055640 describes a compiler for and method of Software Defined Networking (SDN). Below a summary of the main elements of said method is described. However, it is noted that all features already described in PCT/EP2014/0055640 may also be applied in the present invention. Also combinations with features/examples as described in PCT/EP2014/0055640 which are not explicitly described here, are also possible embodiments within the context of the present invention. So, all passages of PCT/EP2014/0055640 referred to below are incorporated in the present document by way of reference.

Figure 1:
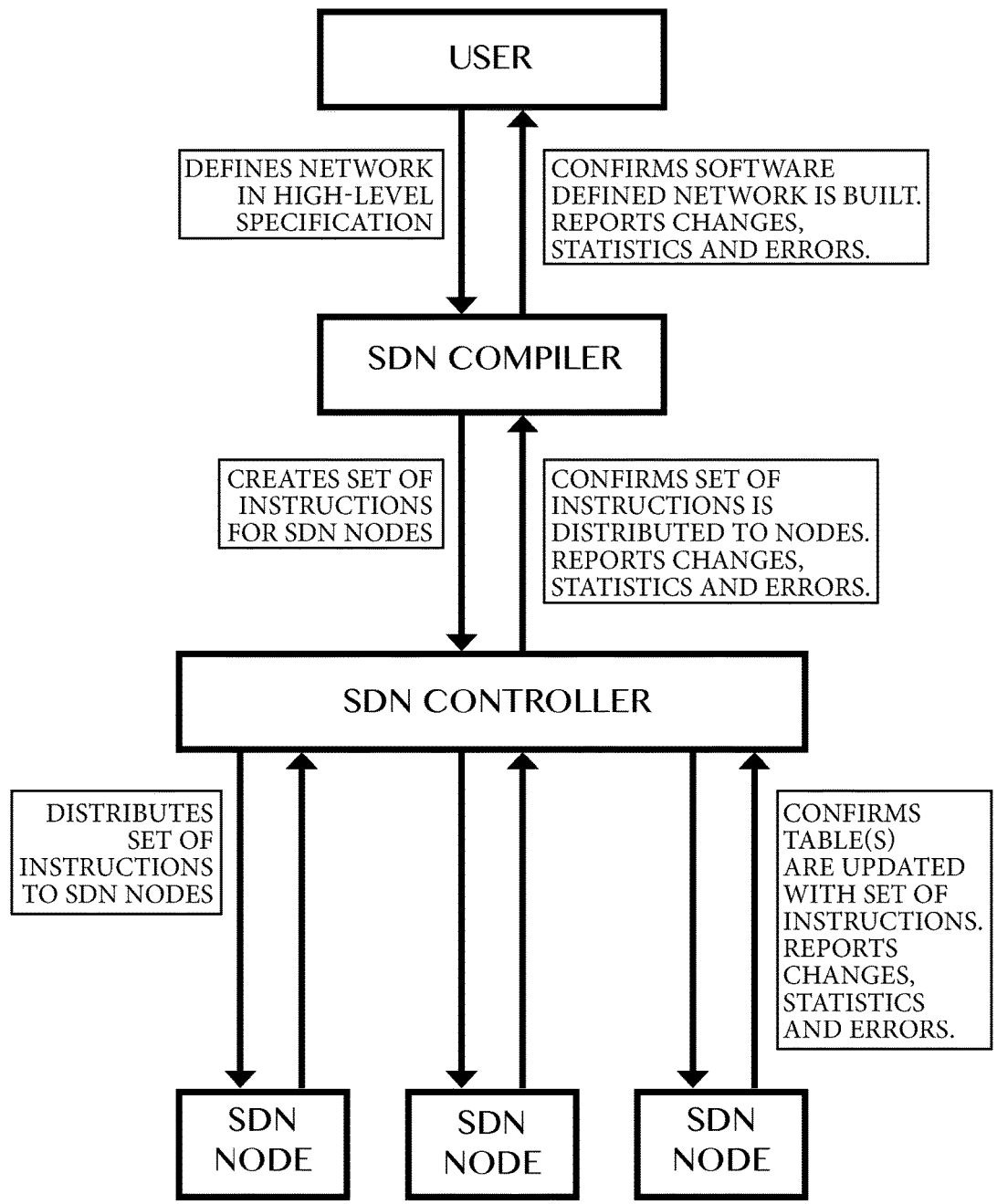
FIG. 1 is a diagram depicting the various components of a Software Defined Network

The definition of SDN as given in the introduction above, has lead the inventor of the present invention to a system comprising the following components, as depicted in FIG. 1 (cf PCT/EP2014/055640 FIG. 1, page 35).
1. A User defining a network in a high-level network specification.
2. A SDN Compiler translating the high-level network specification into a set of instructions for physical and virtual networking and computing resources.
3. A SDN Controller distributing this set of instructions to physical and virtual networking and computing resources.
4. Physical and virtual networking and computing resources performing an action on an incoming packet in accordance with the received set of instructions. In FIG. 1, they are indicated with the term "SDN node".

Figure 10:
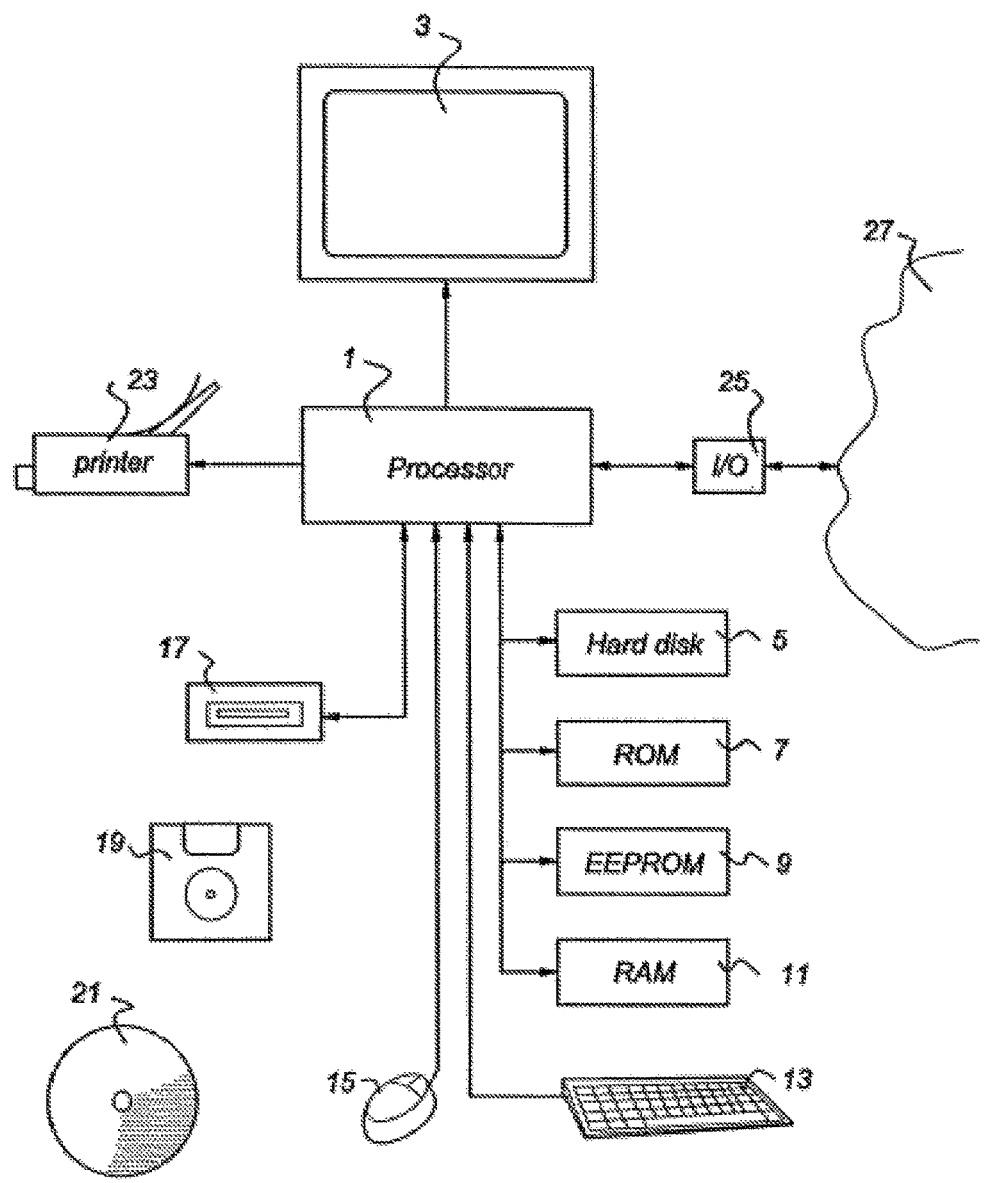
FIG. 10 is a diagram of a general outline of a computer arrangement

A user mentioned at point 1 above could be, but is not limited to, a person, a network management system, a cloud management system, an application, another SDN Compiler. So, a User may refer to "user equipment", i.e., any suitable computer equipment like a computer work station that may be stand-alone or part of a larger network. An example of such a computer equipment is shown in FIG. 10 and will be described later.

In FIG. 1, in the direction from bottom to top, the various components report on their northbound interface that particular tasks have been performed and report changes, statistics and errors.

The resources mentioned at point 4 comprise typical networking and computing resources such as, but not limited to:

Physical packet forwarding devices (such as, but not limited to, layer 2 switch, layer 3 router, firewall, deep packet inspection device, caching node, or other type of middleboxes).

Physical devices acting as network host, such as but not limited to physical server, personal computer, laptop, tablet, mobile phone, Physical Network Interface Cards (NICs), Virtual switches in virtualized physical servers, Virtual machines in virtualized physical servers, Virtual NICs, IPv4-capable routers, IPv6-capable routers, MPLS-switches [MPLS=Multi Protocol Label Switching], application processes providing packet-switching, Circuit-switching nodes as an example, but not limited to, Fiber Cross-Connects cross-connecting optical fibers, Remote-Optical Add/Drop Multiplexers (ROADMs) or Optical Cross-Connects cross-connecting optical wavelengths, Synchronous Digital Hierarchy (SDH) multiplexers or Synchronous Optical NETwork (SONET) multiplexers cross-connecting time-slots, OS (Operating System) kernel, Application processes, Input-buffers and output-buffers of a physical or virtual node, Storage equipment, as an example, but not limited to, storage equipment supporting Fibre Channel over Ethernet (FCoE) or storage equipment supporting Fibre Channel over IP (FCIP), A Wavelength Division Multiplexing (WDM) multiplexer, Physical and/or virtual nodes in each of the above mentioned layers are either packet-switching or circuit-switching nodes. For both packet-switching nodes and circuit-switching nodes a set of instructions is created by the SDN Compiler. In case of a packet-switching node, these instructions comprise forwarding table entries. In case of a circuit-switching node, these instructions comprise cross-connect settings.

Note that above mentioned resources include both components of physical devices, such as for example but not limited to a physical NIC and entire physical devices, such as for example but not limited to a physical packet forwarding device. Therefore, a set of instructions, referred to at point 4, can be created for a component of a physical device or for an entire physical device.

Note that virtual nodes, representing virtual resources such as a Virtual Machine are represented as physical nodes in the method (cf. PCT/EP2014/055640 page 186).

The specification of a logical network abstraction is the 'high-level network specification' inputted by the user and mentioned at point 1 above. Ideally, this specification specifies an arbitrary logical network, consisting of an arbitrary number of logical nodes in an arbitrary topology, the logical nodes being mapped to arbitrary physical and virtual network and computing resources. Multiple logical networks can be defined and created simultaneously on the same physical and virtual networking and computing resources.

Point 2 above refers to 'Translation of the high-level network specification into a set of instructions for networking and computing resources'. In case of a packet forwarding switch, these instructions are the forwarding table entries of that switch according to which packets should be forwarded. In case of a host, these instructions are the filter table entries according to which packets should be accepted or dropped and instructions to which output port to send packets originating from that host node to a particular destination node. In case of a NIC these instructions are the filter table entries according to which packets should be forwarded or dropped. Point 2 referred to above provides the translation or compilation from a high-level network specification into a set of instructions for the appropriate physical and virtual networking and computing resources. We have termed this process an 'SDN Compiler' process in analogy with compilers used in computing, translating a high-level language into lower-level instructions. Please note that the above process should provide instructions to both the physical and virtual networking and computing resources, in contrast to so-called 'overlay' virtual networks (such as proposed e.g. by Nicira/VMWare) which essentially create a virtual tunnel on top of the physical network, without configuring the physical switches, except for the tunnel in- and egress switches. The desired SDN Compiler method should provide an integral approach including both the virtual and physical resources, including the entire physical network. Further, the desired SDN Compiler method should also instruct non-switching network devices, referred to above, with the required instructions. Moreover, as current OpenFlow implementations are available in software (e.g. Open vSwitch providing a Virtual Switch running in a virtualized physical server) as well as in hardware (e.g. NEC ProgrammableFlow PF5240 Switch), there is a need to determine the aforementioned instructions across virtual and physical networking and computing resources. In an implementation, functionality of the 'SDN Compiler', or at least part of it, and functionality of the 'SDN Controller', or at least part of it, could be combined into a single system.

We will now first describe the physical and virtual resources for which the SDN compiler creates the appropriate instructions, using a functional representation. FIGS. 2A, 2B, 2C and 2D (cf. PCT/EP2014/055640 FIG. 2A, 2B, 2F, 2G page 37) depict the components of a physical network. Example physical nodes are shown in FIG. 2A and are considered physical resources onto which a logical network is created. As such the name of the physical node (BA through BD in FIG. 2A) is only used to identify the physical resource and not used to make any forwarding decision upon. As depicted in FIG. 2B, we define a physical network (identified with BAA in FIG. 2B) as a collection of physical nodes. Physical nodes are interconnected by physical links (denoted by a solid line).

In case a physical link is bidirectional, a physical link creates a pair of adjacencies between a pair of physical nodes, one adjacency in each direction. In case a physical link is unidirectional, a physical link creates a single adjacency between a pair of physical nodes. The physical link can be any physical medium, including but not limited to, fiber optic cable, copper cable, air. The physical link can also be a path provided by another networking technology, such as but not limited to an optical wavelength, a Time Division Multiplexing (TDM) circuit, a multi protocol label switching (MPLS) path. The set of physical nodes combined with the set of physical links determines the physical topology of the network. The physical network can consist of an arbitrary number of nodes, with arbitrary links, resulting in an arbitrary topology.

A typical representation of a physical network is illustrated in FIG. 2C showing the physical network BAA and physical nodes BA through BD. As depicted in FIG. 2C, the interface between the physical node and the physical link is referred to as Physical 'Point-of-Attachment' (PoA), indicated by p101 to p108. A typical example of a Physical PoA identifier in currently deployed networks is an Ethernet Media Access Control (MAC) Address, but our invention is not limited to this. The PoA identifier has to be unique within the collection of networks that is under control of the SDN Compiler. The PoA identifies both the 'Input Port' of a node when a packet or signal is received by a node and the 'Output Port' of a node when a packet or signal is sent from a node. As depicted in FIG. 2C, each physical link has one or multiple cost types and a cost value(s) associated with each cost type in each direction. A typical cost type used in physical networks is the delay of the link, with cost values typically expressed in milliseconds, but any type of cost can be used, representing a property of said link. Each bidirectional physical link has 2 cost values, one for each direction. Each unidirectional physical link has 1 cost value for each cost type. The cost value of a physical link in a particular direction is shown closest to the physical node from which the packets originate for that particular direction. E.g. the link from BA to BB has a cost value of 1. The link from BB to BA has a cost value of 3. While a physical link denotes the adjacency-relationship(s) between a pair of physical nodes, a physical path denotes a physical route a packet or signal follows from a physical source node to a physical destination node, in case of unicast networking. In case of multicast or broadcast networking there are physical path relationships between a single physical source node and multiple physical destination nodes. Then, a physical node is mapped to more than one logical node through a depth-mapping resulting in multicasting. Physical paths can have multiple cost types in each direction with typically a cost value equal to the sum of the cost values of that particular cost type in that particular direction of the physical links it consists of. A physical path is a sequence of physical PoAs through which the packet traverses from source node to destination node. Alternative terminology for a 'path' is a 'flow', e.g. the OpenFlow specification uses the terminology 'flow'.

We represent the network also as a directed graph. Said directed graph may be weighted. The directed graph of network BAA is given in FIG. 2D, showing the vertices (nodes) BA through BD and the directed edges that connect pairs of vertices. In FIG. 2D, an "edge", is indicated with an arrow connecting one vertex with another vertex where the direction of the arrow indicates the direction of flow of data. When represented as a directed graph, a bi-directional physical link between two vertices is represented by two edges. Each edge corresponds to an adjacency.

PCT/EP2014/055640 (pages 39, 41, 42) describes properties of a physical switch node, a physical host node, a physical NIC, a virtual switch node and a virtual host node in accordance with common usage of these terms. An example, but not limited to, a host node is Computing Equipment or a storage equipment (cf. PCT/EP2014/055640 pages 155 and 204).

By now, we have provided a functional model of the physical and virtual networking and computing resources. Now, to illustrate the present invention, we consider a logical network that can be defined in a high-level specification and is independent from physical and virtual resources.

The logical network is defined by specifying:
1. Name of the logical network
2. Name of the logical nodes of which the logical network consists
3. Adjacencies between logical nodes
4. One or more Cost Types of the logical network
5. Cost(s) of logical adjacencies between logical nodes for each Cost Type
6. Forwarding policy of logical network
7. Mapping from physical and/or virtual nodes to logical nodes Cost types and values represent properties of links and can be used to determine a forwarding policy.

The physical and/or virtual nodes as explained above are mapped to logical nodes using a 1:1, 1:N or N:1 mapping, as follows:
1:1 physical to logical mapping
1:N physical to logical mapping
N:1 physical to logical mapping
1:1 virtual to logical mapping
1:N virtual to logical mapping
N:1 virtual to logical mapping
N:1 physical and virtual to logical mapping As mentioned above, virtual nodes are represented as physical nodes in the method (cf. PCT/EP2014/055640 page 186), reducing above mappings to:
1:1 physical to logical mapping
1:N physical to logical mapping
N:1 physical to logical mapping The functional representation of a logical node is a dashed circle, as depicted in FIG. 3C. A physical/virtual to logical mapping can have an optional cost value for each direction of the mapping.

The user of the SDN Compiler defines the logical network. The user could be, but is not limited to, a person, a network management system, a cloud management system, an application, another SDN Compiler. The logical network can consist of an arbitrary number of logical nodes, with arbitrary logical adjacencies, resulting in an arbitrary logical topology. As an example the logical network could be specified as a graph in a high-level programming language, with the physical and/or virtual node(s) to which the logical node has been mapped being an attribute of each logical node.

For the logical nodes, we use a logical name space that is independent from the namespace of the physical and virtual resources. The logical network can now be defined in terms of logical node names, which may be expressed in any suitable form with any suitable number of unique characters and are mapped to the appropriate virtual and physical resources as required. By changing this mapping, the logical network can be re-mapped to other virtual and physical resources.

1:N physical to logical mapping allows for naming a single physical resource with multiple logical names. 1:N virtual to logical mapping allows for naming a single virtual resource with multiple logical names. Please note that the logical network is independent from the physical network and virtual resources, of course with the constraint a path exists between physical and virtual resources, and as such provides an abstraction of the physical network and virtual resources.

The name of the logical node is used to make forwarding decisions upon (cf PCT/EP2014/055640 page 47). Please note that the logical node itself is named, not its interfaces. In analogy with the physical network, we define a logical network as a collection of logical nodes Logical nodes are interconnected by logical links (denoted by a solid line). In case a logical link is bidirectional, a logical link creates a pair of adjacencies between a pair of logical nodes. In case a logical link is unidirectional, a logical link creates a single adjacency between a pair of physical nodes. The set of logical nodes combined with the set of logical links determines the logical topology of the network. While a logical link denotes the adjacency-relationship(s) between a pair of logical nodes, a logical path denotes a logical route a packet follows from a logical source node to a logical destination node, in case of unicast networking. In case of multi-cast or broadcast networking there are logical path relationships between a single logical source node and multiple logical destination nodes. A logical path is a sequence of physical PoAs and/or virtual PoAs through which the packet traverses from logical source node to logical destination node. Here we have arrived at an important relationship: a relationship between logical source and logical destination nodes and a path described in terms of physical and virtual PoA's. This will allow us to define a network in logical node names and translate (compile) the defined network into instructions in terms of physical and/or virtual PoAs for the physical and/or virtual networking and/or computing resources.

A logical network can be created from a physical network, a virtual network or a combined physical/virtual network (cf. PCT/EP2014/055640 page 93). Also, a logical network can be created from another logical network. In order to avoid any ambiguity, hereafter we will reference to a network at depth d created from a network at depth (d−1). We refer to a particular depth as depth d, with d being a positive integer starting at 0 (zero). Depth d=0 is equal to a physical or virtual network referred to thus far. Depth d>=1 is equal to a logical network referred to thus far. The combined physical and virtual network is consisting of one or more layers (cf. PCT/EP2014/055640 page 91). At each layer nodes can be interconnected through physical and/or virtual links. The physical link can be any physical medium, including but not limited to, fiber optic cable, copper cable, air. The physical link can also be a path provided by another networking technology, such as but not limited to an optical wavelength, a Time Division Multiplexing (TDM) circuit, a Multi Protocol Label Switching (MPLS) path. The physical link can also be a tunnel provided by another networking technology such as but not limited to a GRE-tunnel [GRE=Generic Routing Encapsulation], NVGRE-tunnel [NVGRE=Network Virtualization using Generic Routing Encapsulation], VXLAN tunnel [VXLAN=Virtual Extensible Local Area Network]. The virtual link can be a virtual connection, including but not limited to, virtual links between virtual switches and virtual machines, virtual links between virtual machines, network sockets. A layer might provide services to a higher layer and might consume services from a lower layer. The lowest packet-switching layer provides for Media-Access Control (MAC). A logical network is consisting of one or more layers.

We refer to a particular layer as layer n, with n being a positive integer starting at n_min which may have a value of 0 (zero). We refer to layer n=n_min (d) as the 'lowest layer' at depth d. (cf. PCT/EP2014/055640 pages 93 and 141). Examples of layers in current networks are, but not limited to, physical medium layer, frequency- or wavelength-division multiplexing layer, time-division multiplexing layer, data link layer, network layer, transport layer, application layer. Within an overall network a layer n provides services to a layer (n+1) and a layer (n+1) consumes services provided by layer n.

Each layer consists of an arbitrary number of sub-networks within a hierarchy of sub-networks with arbitrary number of hierarchy-levels. A network can be abstracted to a node and can become a node within another network. As an example, but not limited to, network BAA, shown in FIG. 2C, can be abstracted to a node in a network-of-networks. In order to avoid any ambiguity, hereafter we will reference to a network at level h consisting of networks at level (h−1) and consider the lowest hierarchy level to be h_min(d, n) at depth d and layer n (cf. PCT/EP2014/055640 pages 93 and 146). A network at level h_min(d, n) is a node. This applies to physical networks and logical networks. Using this terminology, physical network BAA at level h, shown in FIG. 2D, consists of physical network BA, BB, BC, BD at level (h−1).

Figure 3A:
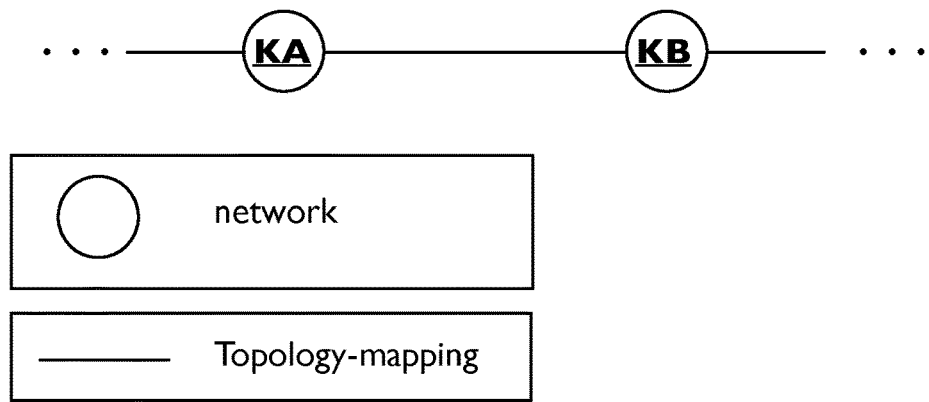
FIG. 3A is a diagram showing networks KA and KB and their topology-mapping relationships.

The above is illustrated in FIGS. 3A through 3D (cf. PCT/EP2014/055640 FIGS. 33A, 33B, 33C, 34A, page 94). FIG. 3A depicts networks KA and KB being at the same level h and being interconnected by a link. As indicated in FIG. 3A, network KA and network KB could be interconnected to other networks as well. The relationships between networks are referred to as mappings. In order to have a consistent naming for the various mappings that will be introduced hereafter, we will reference to a topology-mapping rather than an adjacency in the modeling of a link in the text below. In case a link is bi-directional, a link creates a pair of topology-mappings between a pair of networks. In case a link is unidirectional, a link creates a single topology-mapping between a pair of networks. A topology-mapping is a mapping from a first network to a second network, the first and second network being at the same depth d and same layer n and same level h (cf. PCT/EP2014/055640 FIG. 49, page 179)

Figure 3B:
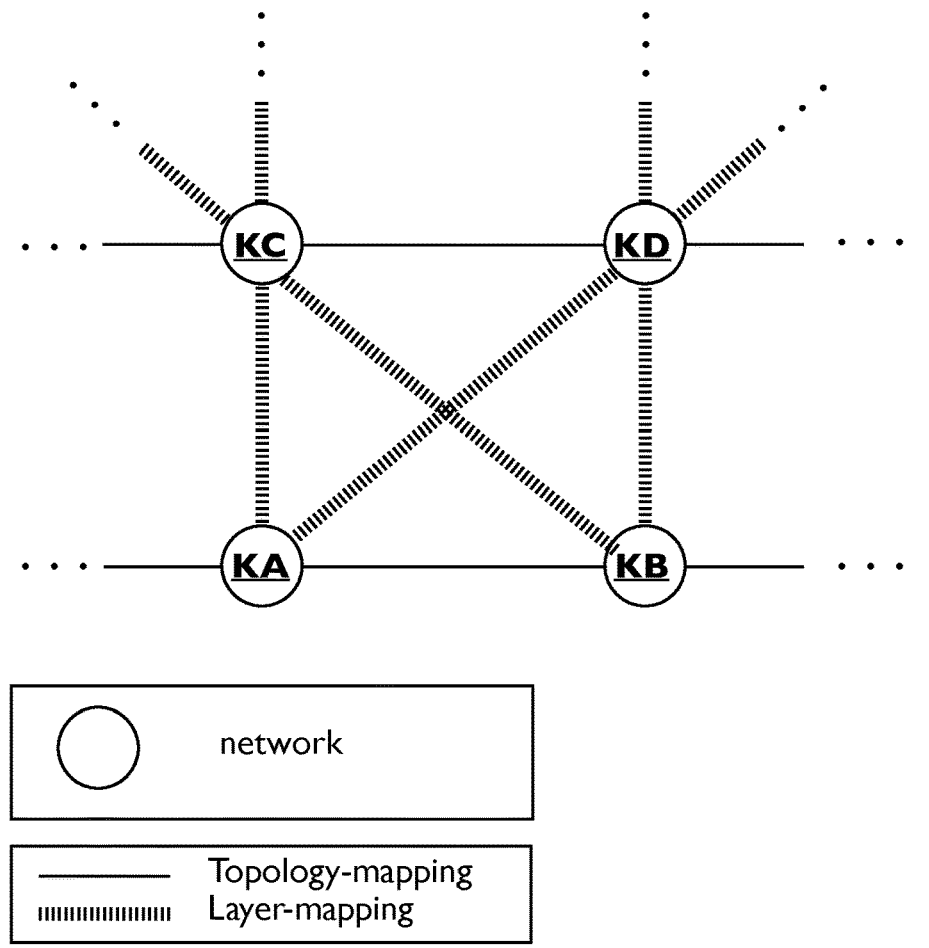
FIG. 3B is a diagram showing networks KA, KB, KC, KD and their mapping relationships either being a topology-mapping or a layer-mapping.

FIG. 3B depicts networks KA, KB, KC, KD being at the same level h. Networks KA and KB are interconnected by links, represented as a topology-mapping. Networks KA and KC are interconnected by links, represented as a layer-mapping. Networks KB and KC are interconnected by links, represented as a layer-mapping. A layer-mapping is a mapping from a first network to a second network, the first and second network being at different layers n.

In FIG. 3C networks KA, KB, KC, KD, LA, LB, LC, LD are shown. Within this diagram each network has the same level h. In case the hierarchy level starts at h=0, a network at h=0 in FIG. 3C is equal to a 'node' referred to thus far, in case h=1 a network in FIG. 3C is equal to a 'network-of-nodes' referred to below, in case h=2 a network in FIG. 3 is equal to a 'network-of-networks-of-nodes' referred to below, etc. Each network is situated at a particular depth d and layer n. When networks KA and KB are at depth d, layer n, networks KC and KD are at depth d, layer (n+1), networks LA and LB are at depth (d+1), layer n, networks LC and LD are at depth (d+1), layer (n+1).

We distinguish between 3 types of mappings between networks at a particular level h (cf. PCT/EP2014/055640 pages 94, 128 and 129):

Topology-mappings are adjacencies between networks with the same depth d and layer n. Note that an adjacency is a mapping. We define a topology-mapping as a mapping from a network at (d, n, h) to a network at (d, n, h). FIG. 3A shows only topology-mappings between 2 networks (KA and KB, KC and KD, LA and LB, LC and LD) as our illustration is limited to 3 dimensions. In general topology-mappings can exist between an arbitrary number of networks and are typically presented as a 2-dimensional layout and are supported by the SDN Compiler method presented here. Topology-mappings are shown as solid lines. Physical to virtual mappings are a special type of topology-mappings between physical and virtual nodes.

Layer-mappings are relationships between networks at different layers n and same depth d. We define a layer-mapping as a mapping from a network at (d, n, h) to a network at (d, n−y, h) or a mapping from a network at (d, n−y, h) to a network at (d, n, h), with y being larger than zero and smaller than or equal to n−n_min (d), n_min(d) being the lowest layer at depth d. Layer-mappings are shown as stripes.

Depth-mappings are relationships between networks at different depths d. We define a depth-mapping as a mapping from a network at (d, n1, h) to a network at (d−x, n2, h) or a mapping from a network at (d−x, n1, h) to a network at (d, n2, h), with x being larger than zero and smaller than or equal to d, where n1 may be equal to n2. Depth-mappings are shown as dashed lines.

The functional representation of a physical node is a circle with a solid circle, as depicted in FIG. 3A. The functional representation of a logical node is a dashed circle, as depicted in FIG. 3A. In FIG. 3A depth-mappings between network KA and network LD, between network KB and network LC, between network KC and network LB, between network KD and network LA are not shown to keep the figure relatively simple. In FIG. 3A topology-, layer- and depth-mappings are shown that are connected to only a single network KA, KB, KC, KD, LA, LB, LC or LD and are open-ended with ' . . . ' on the other side. These layer-mappings illustrate that layer-mappings can be extended to an arbitrary number of layers. The depth-mappings connected to only a single network illustrate that depth-mappings can be extended to an arbitrary number of depths. The topology-mappings connected to only a single network at level h depict topology-mappings at level (h+1) as will be explained below.

Between networks at different levels we regard level-mappings:

Level-mappings are relationships between networks at different levels and same depth d and same layer n. We define a level-mapping as a mapping from a network at (d, n, h) to a network at (d, n, h−z) or a mapping from a network at (d, n, h−z) to a network at (d, n, h), with z larger than zero and smaller than or equal to h−h_min (d, n), h_min(d, n) being the lowest level at depth d and layer n. We will reference to a network at depth d=0, layer n, level h=h_min(d, n) rather than a physical node. We will reference to a network at depth d>=1, layer n, level h=h_min(d, n) rather than a logical node.

A level-mapping is illustrated in FIG. 3D. FIG. 3D shows networks KA, KB, KC, KD, LA, LB, LC, LD at level h and their topology-mapping, layer-mapping and depth-mapping relationships. Diagonal layer-mappings between nodes KA and KD, KB and KC, LA and LD, LB and LC which were shown in FIG. 3C have been omitted in this figure to simplify the figure. Diagonal depth-mappings between nodes KA and LA, KB and LA, KC and LD, KD and LC, KA and LC, KC and LA, KB and LD, KD and LB which were shown in FIG. 3C have been omitted in this figure to simplify the figure. FIG. 3D also shows networks KAA, KCC, LAA, LCC at level (h+1). Network KAA at (d,n,h+1) contains networks KA and KB both at (d,n,h), in other words network KAA is mapped through a level-mapping to networks KA and KB. Network KCC at (d,n+1,h+1) contains networks KC and KD both at (d,n+1,h), in other words network KCC is mapped through a level-mapping to networks KC and KD. Network LAA at (d+1,n,h+1) contains networks LA and LB both at (d+1,n,h), in other words network LAA is mapped through a level-mapping to networks LA and LB. Network LCC at (d+1,n+1,h+1) contains networks LC and LD both at (d+1,n+1,h), in other words network LCC is mapped through a level-mapping to networks LC and LD.

Figure 4A:
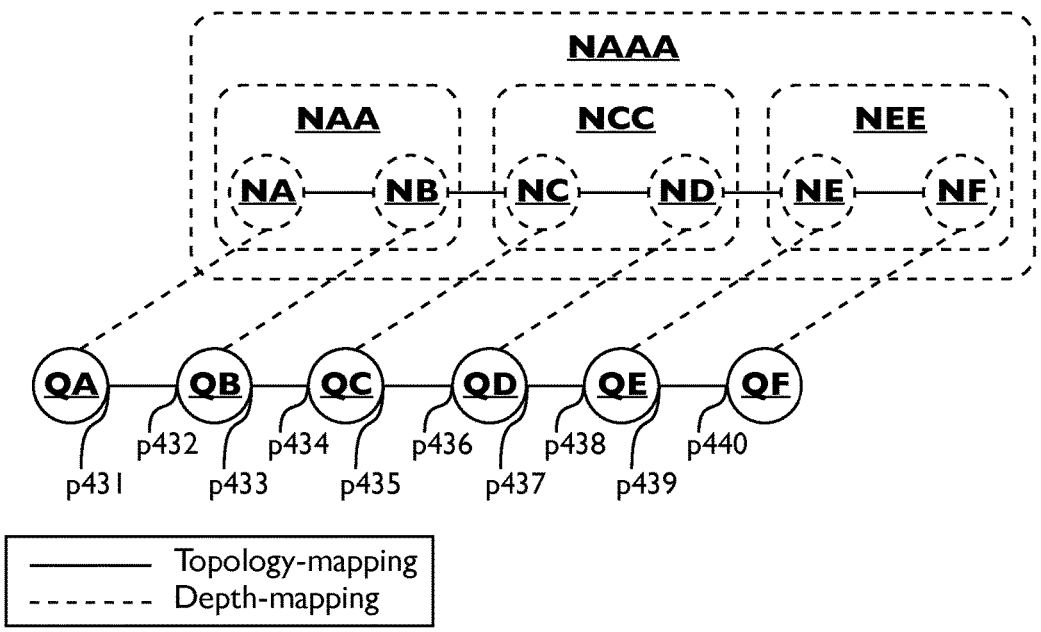
FIG. 4A is a diagram showing network NAAA at (d, n, h+2) consisting of networks NAA, NCC and NEE at (d, n, h+1). Network NAA consists of networks NA and NB at (d, n, h). Network NCC consists of networks NC and ND at (d, n, h). Network NEE consists of networks NE and NF at (d, n, h).
Figure 4B:
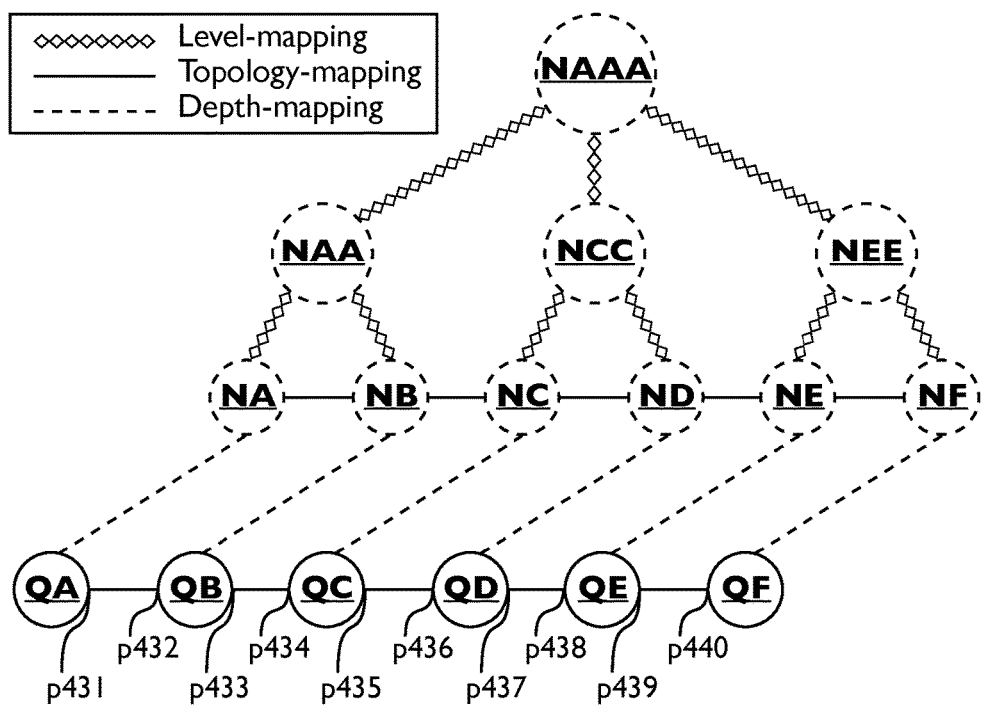
FIG. 4B is a diagram showing network NAAA at (d, n, h+2) consisting of networks NAA, NCC and NEE at (d, n, h+1). Network NAA consists of networks NA and NB at (d, n, h). Network NCC consists of networks NC and ND at (d, n, h). Network NEE consists of networks NE and NF at (d, n, h).

A level-mapping is illustrated in FIG. 4A (cf. PCT/EP2014/055640 FIGS. 42A and 42, page 146). FIG. 4A shows network NAAA at (d, n, h+2) consisting of networks NAA, NCC and NEE at (d, n, h+1). Network NAA consists of networks NA and NB at (d, n, h). Network NCC consists of networks NC and ND at (d, n, h). Network NEE consists of networks NE and NF at (d, n, h). FIG. 4A also shows the topology-mappings between networks at (d, n, h). FIG. 4B shows an alternative representation of the set of networks NAAA, NAA, NCC, NEE, NA, NB, NC, ND, NE and NF of FIG. 4A by showing the level-mappings between networks at (d=1, n=0). As an example, network NAAA at (d=1, n=0, h=2) consists of networks NAA, NCC and NEE at (d=1, n=0, h=1). Therefore, a level-mapping is shown between network NAAA and network NAA, a level-mapping is shown between network NAAA and network NCC and a level-mapping is shown between network NAAA and network NEE. Note that in this way a hierarchical network, being a hierarchical graph, is represented as a non-hierarchical graph. A topology-mapping, layer-mapping, depth-mapping or level-mapping from a first network to a second network can be a 1:1, 1:N or N:1 mapping (first network: second network), (cf. PCT/EP2014/055640 page 96).

In order to make the proposed approach scalable, we introduce hierarchy in the logical naming of networks and nodes of the following form (cf PCT/EP2014/055640 page 80):

. . . Network-of-Networks-of-Networks. Network-of-Networks. Network. Node

The dot symbol "." separates the different elements the logical name consists of. We will refer to Network-of-Networks-of-Networks as NoNoNs and to Network-of-Networks as NoNs. The above naming structure introduces hierarchy in a recursive way:

A Network is a collection of Nodes
A NoNs is a collection of Networks
A NoNoNs is a collection of NoNs
And so on, as indicated by ' . . . ' in the above definition of the used naming form.

This creates an arbitrary number of hierarchy-levels in the network, obviously in a deployment limited to practical constraints.

Using the above structure a Node is located by:
. . . Network-of-Networks-of-Networks. Network-of-Networks. Network. Node
Similarly, a Network is located by:
. . . Network-of-Networks-of-Networks. Network-of-Networks. Network
Similarly, a NoNs is located by:
. . . Network-of-Networks-of-Networks. Network-of-Networks
And so on for various levels in the hierarchy.

Note that each dot symbol "." represents a level-mapping (cf PCT/EP2014/055640 page 119), therefore the address structure follows exactly the hierarchical structure of a network as represented by level-mappings. Note that also within a physical network hierarchical naming can be used.

We now extend the address to the following form:
. . . Network-of-Network-of-Networks. Network-of-Networks. Network. Node. Sub-identifier 1. Sub-identifier 2 . . .

In which each dot symbol "." within "Network-of-Network-of-Networks. Network-of-Networks. Network" represents a level-mapping and in which each dot symbol "." within "Node. Sub-identifier 1. Sub-identifier 2 . . . " represents a layer-mapping. The " . . . ." before "Network-of-Network-of-Networks" identifies that the hierarchical naming can be extended to an arbitrary number of levels. The " . . . ." after "Sub-identifier 2" identifies that the address can include an arbitrary number of layers. A sub-identifier is a node. A sub-identifier at layer n provides a service to layer (n+1). An example but not limited to such a service is a multiplexing service. Using this approach logical naming of various layers can be combined into a single logical address-space. This makes it possible to perform forwarding using a logical address-space spanning multiple layers. This provides a means to locate the node, through it's address, within a hierarchical network. Further, the above approach abstracts every network to a node at its particular level in the naming hierarchy. E.g. A NoNs is consisting of a collection of Networks with adjacencies between Networks, in the same way as a Network is consisting of a collection of Nodes with adjacencies between nodes.

A topology-path is a concatenation of topology-mappings (cf PCT/EP2014/055640 page 174). A first topology-path can comprise of a second topology-path, creating a nesting of the first topology-path and the second topology-path. A topology-path can be created using the following method: Calculating and storing a topology-path from a first network at (d, n, h) to a second network at (d, n, h) as a concatenation of zero or more topology-mappings at (d, n, h) and zero or more topology-paths at (d, n, h), said number of topology-mappings and said number of topology-paths being such that their sum is at least one. This method is referred to as the method to calculate a topology-path. (cf. PCT/EP2014/055640 pages 181, 182). Note that a concatenation of one topology-mapping refers to a situation in which said topology-path from a first network at (d, n, h) to a second network at (d, n, h) comprises of a single topology-mapping. The term 'a concatenation of one' is used to avoid the or-statement in order to keep the description relatively simple.

We define a level-path as a concatenation of level-mappings (cf PCT/EP2014/055640 page 146), A first level-path can comprise of a second level-path, creating a nesting of the first level-path and the second level-path (cf. PCT/EP2014/055640 page 174). A level-path can be created using the following method: Calculating and storing a level-path from a first network at (d, n, h1) to a second network at (d, n, h2) as a concatenation of zero or more level-mappings at (d, n) and zero or more level-paths at (d, n), said number of level-mappings and said number of level-paths being such that their sum is at least one. This method is referred to as the method to calculate a level-path. We refer to a level-path for which forwarding entries are requested by a user as a requested level-path.

As one or more topology-paths and one or more level-paths can be concatenated, we refer to a topology-level-path from a first network at (d, n, h1) to a second network at (d, n, h2) as a concatenation of zero or more topology-paths at (d, n) and zero or more level-paths at (d, n) and zero or more topology-level-paths at (d, n), said number of topology-paths and said number of level-paths and said number of topology-level-paths being such that their sum is at least one. This method is referred to as the method to calculate a topology-level-path. Note that a first topology-level-path can comprise of a second topology-level-path, creating a nesting of the first topology-level-path and the second topology-level-path. Note that a topology-level-path can be a single topology-path or can be a single level-path.

We refer to a topology-path, level-path and topology-level-path for which forwarding entries are requested as a requested topology-path, requested level-path and requested topology-level-path respectively (cf. PCT/EP2014/055640 page 182). As an example, but not limited to, a requested topology-path could be requested by an SDN Controller, a physical node, a user of the SDN Compiler. Such request could be a proactive path-instantiation or a reactive path-instantiation. We refer to a topology-mapping, depth-mapping, layer-mapping, level-mapping, topology-path, level-path and topology-level-path as an edge.

Note that as an example, but not limited to a topology-level-path can comprise of a single topology-path, a single level-path, a single topology-mapping or a single level-mapping.

A topology-mapping can be created using any of the following methods:

A first method for calculating a topology-mapping, comprising the following actions:
  Calculating and storing a topology-mapping from a first network at (d, n1, h) to a second network at (d, n1, h) as a concatenation of a depth-mapping from said first network to a third network at (d−x, n2, h), a topology-level-path from said third network to a fourth network at (d−x, n2, h) and a depth-mapping from said fourth network to said second network with x being larger than zero and smaller than or equal to d, where n1 may be equal to n2.

A second method for calculating a topology-mapping, comprising the following actions:
  Calculating and storing a topology-mapping from a first network at (d, n, h) to a second network at (d, n, h) as a concatenation of a layer-mapping from said first network to a third network at (d, n−y, h), a topology-level-path from said third network to a fourth network at (d, n−y, h) and a layer-mapping from said fourth network to said second network with y being larger than zero and smaller than or equal to n−n_min(d), n_min(d) being a lowest layer at particular depth d and n_min(d) being =>0.

A third method for calculating a topology-mapping, comprising the following actions:
  Calculating and storing a topology-mapping from a first network at (d, n, h) to a second network at (d, n, h) as a concatenation of one or more level-mappings with decreasing level from the first network to a third network at (d, n, h−z), a topology-path from the third network to a fourth network at (d, n, h−z) and one or more level-mappings with increasing level from the fourth network to the second network, with z larger than zero and smaller than or equal to h−h_min, h_min being the lowest level at depth d and layer n.

The topology-level-path used in the first method and second method to calculate a topology-mapping can be a topology-level-path, a topology-path or a level-path, as a topology-level-path can comprise of a single topology-path and a topology-level-path can comprise of a single level-path. When creating a topology-mapping the topology-level-path used in the calculation of the topology-mapping can either a topology-level-path that is explicitly created or can be concatenation of topology-mappings and level-mappings.

A layer-mapping can be created using any of the following methods:

A first method for calculating a layer-mapping, comprising the following actions:
  Calculating and storing a layer-mapping from a first network at (d, n1, h) to a second network at (d, n1−y, h) as a concatenation of a depth-mapping from said first network to a third network at (d−x, n2, h), zero or more layer-mappings from said third network to a fourth network at (d−x, n2−y, h) and a depth-mapping from said fourth network to said second network with x larger than zero and smaller than or equal to d, with y larger than zero and smaller than or equal to n1−n1 min and smaller than or equal to n2−n2_min, n1_min being the lowest layer at depth d, n2_min being the lowest layer at depth d−x, A second method for calculating a layer-mapping, comprising the following actions:
  Calculating and storing a layer-mapping from a first network at (d, n1, h) to a second network at (d, n1+y, h) as a concatenation of a depth-mapping from said first network to a third network at (d−x, n2, h), zero or more layer-mappings from said third network to a fourth network at (d−x, n2+y, h) and a depth-mapping from said fourth network to said second network with x larger than zero and smaller than or equal to d, with y larger than zero and smaller than or equal to n1_max−n1 and smaller than or equal to n2_max−n2, n1_max being the highest layer at depth d, n2_max being the highest layer at depth d−x.

Note that in the first method for calculating a layer-mapping, the third and fourth network can be the same network at (d−x, n2, h) or at (d−x, n2−y, h). Note that in the second method for calculating a layer-mapping, the third and fourth network can be the same network at (d−x, n2, h) or at (d−x, n2+y, h). Note that a layer-mapping from a first node at layer n to a second node at layer (n−1) followed by a topology-mapping results in a multiplexing action, such as for example but not limited to in node KA (cf PCT/EP2014/055640 page 236). Therefore, the SDN Compiler should be aware of the multiplexing and de-multiplexing capabilities of physical nodes when providing forwarding entries on component level rather than equipment level. As an example, but not limited to, the multiplexing and de-multiplexing capabilities could be provided to the SDN Compiler by an Element Management System (EMS).

We name each edge and we use the notation shown in FIGS. 6A through 6D to denote mappings and topology-level-paths (cf. PCT/EP2014/055640 FIGS. 51A through 51D, page 182). FIG. 6A shows the notation used for a first mapping with a first edge name, the first mapping being of a first mapping-type, the first mapping-type being a topology-mapping, depth-mapping, layer-mapping or level-mapping from a first network to a second network. The first network and the first mapping interface at the first Point-of-Attachment (PoA), the second network and the first mapping interface at the second PoA. The first PoA and the second PoA are optional. The '-( )->' sign indicating the direction of the mapping.

Figure 5A:
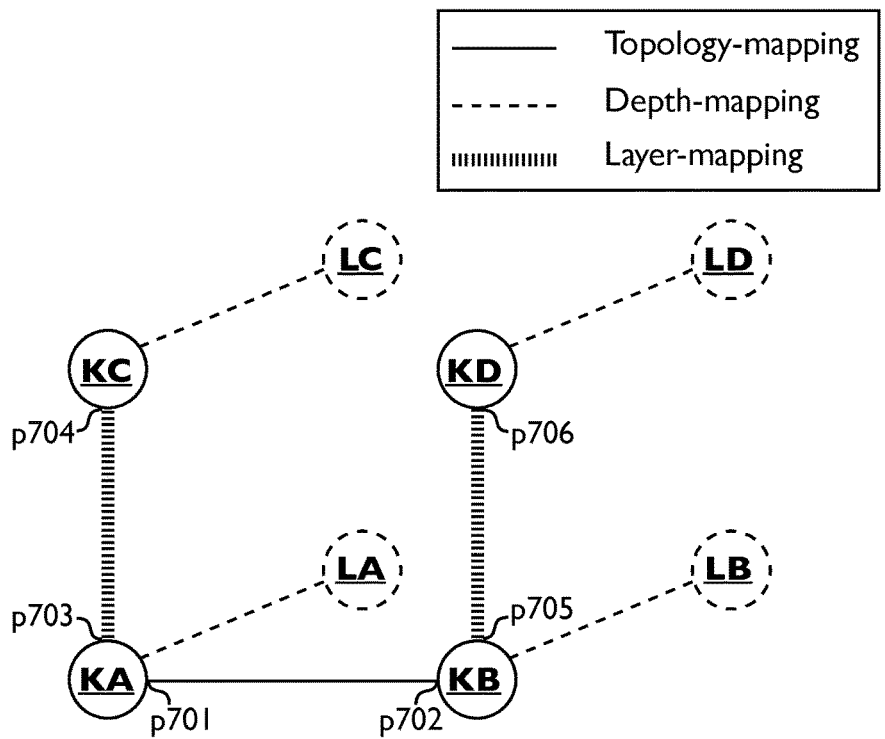
FIG. 5A is a diagram showing networks KA, KB, KC, KD, LA, LB, LC, LD and a topology-mapping between network KA and network KB, a layer-mapping between network KA and network KC, a layer-mapping between network KB and network KD, a depth-mapping between network KA and network LA, a depth-mapping between network KB and network LB, a depth-mapping between network KC and network LC, and a depth-mapping between network KD and network LD. Also the PoAs of the topology-mapping and layer-mappings are shown.

We illustrate the naming of edges and notation with the example of FIG. 5A, which shows networks KA, KB, KC, KD, LA, LB, LC, LD, as shown in FIG. 3C above and a topology-mapping between network KA and network KB, a layer-mapping between network KA and network KC and a layer-mapping between network KB and network KD. FIG.

Figure 5B:
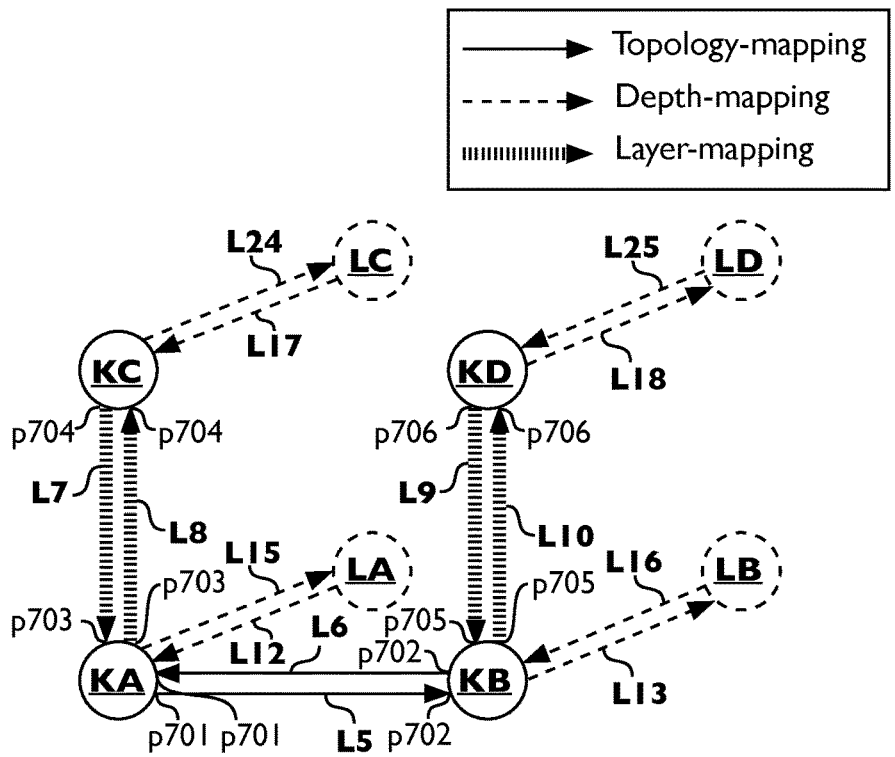
FIG. 5B is a diagram showing networks KA, KB, KC, KD, LA, LB, LC, LD and named topology-mappings, layer-mappings and depth-mappings. Also the PoAs of the topology-mappings and layer-mappings are shown.

5A also shows Point-of-Attachments (PoAs) p701 through p706. As networks KA, KB, KC and KD are physical networks, the topology-mapping between network KA and network KB is representing a physical link, the layer-mapping between network KA and network KC is representing a physical link and the layer-mapping between network KB and network KD is representing a physical link. As a physical link can be uni-directional or bi-directional we represent a topology-mapping, depth-mapping, layer-mapping, level-mapping, topology-path, level-path or topology-level-path from a first network to a second network by a directed edge in a graph. This is shown in FIG. 5B, which shows networks KA, KB, KC, KD, LA, LB, LC, LD, topology-mappings, layer-mappings and depth-mappings. FIG. 7A shows the mappings of FIG. 5B in the notation of FIG. 6A. As an example, the topology-mapping named L5 from network KA to network KB is represented by: L5=KA-(topmap p701::p702)->KB, in which 'topmap' refers to 'topology-mapping'. Similarly, 'depmap' refers to 'depth-mapping', 'laymap' refers to 'layer-mapping', 'levmap' refers to 'level-mapping', 'toppath' refers to 'topology-path' and 'levpath' refers to 'level-path' in the notation used. Optionally, the direction of a depth-mapping, a layer-mapping and a level-mapping can be included in the mapping type (cf PCT/EP2014/055640 page 180).

Figure 5C:
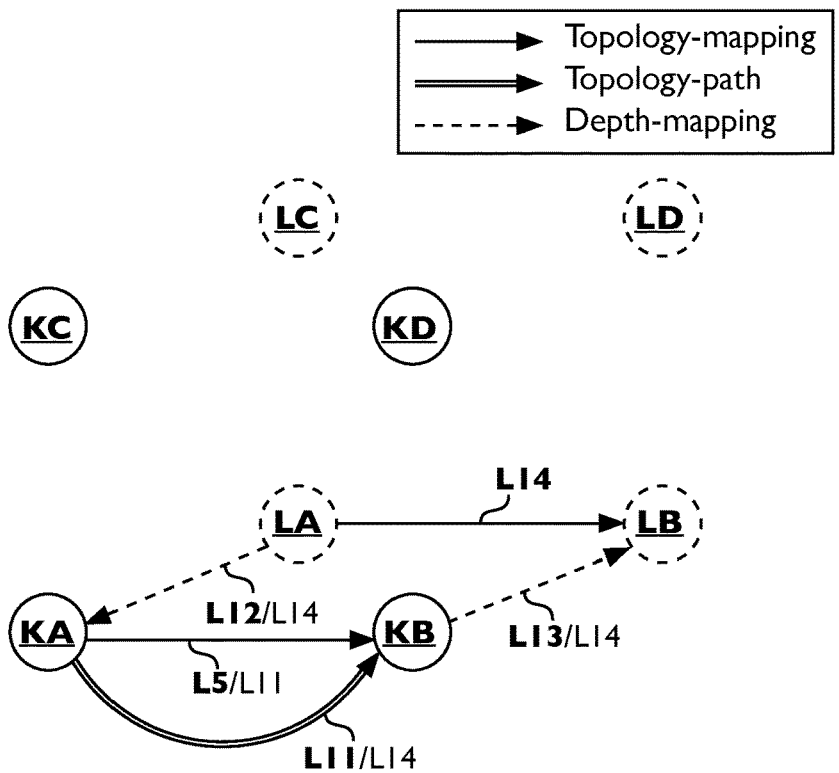
FIG. 5C is a diagram showing networks KA, KB, KC, KD, LA, LB, LC, LD and calculating and storing a topology-mapping named L14 from network LA to network LB as a concatenation of a depth-mapping named L12 from network LA to network KA, a topology-path named L11 from network KA network KB and a depth-mapping named L13 from network KB to network LB, the topology-path named L11 being a single topology-mapping named L5 from network KA to network KB

Using the same notation as FIG. 6A, FIG. 6B shows a second mapping with a second edge-name, the second mapping being of a second mapping-type from the second network to a third network. As shown in FIG. 5C, by applying the first method for calculating a topology-mapping described above, we calculate and store a topology-mapping named L14 from network LA to network LB as a concatenation of a depth-mapping named L12 from network LA to network KA, a topology-path named L11 from network KA network KB and a depth-mapping named L13 from network KB to network LB, the topology-path named L11 from network KA to network KB comprising of a single topology-mapping named L5 from network KA to network KB. Alternatively, creating the topology-path named L11 could also have been omitted and the topology-mapping named L14 could have been created from topology-mapping L5 directly. In FIG. 5C the topology-mapping named L5 from network KA to network KB is labeled with L5/L11 indicating that topology-mapping L5 is used to calculate topology-path L11 or in other words that topology-path L11 is mapped to topology-mapping L5.

We refer to a relationship between two edges as an edge-relationship, in which a second edge is multiplexed or mapped to a first edge and we represent such edge-relationship by "first edge/second edge", using a forward-slash symbol. As an example, we refer to L5/L11 as shown in FIG. 5C as an edge-relationship between a topology-mapping indicated by edge name L5 and a topology-path indicated by edge name L11, in which topology-path named L11 is mapped to topology-mapping named L5, or in other words, in which topology-mapping L5 is used to calculate topology-path L11. In FIG. 5C the name of an edge is shown in bold when labeling such edge. FIG. 6C shows the notation of a third edge with a third edge-name, the third edge being of a third edge-type and being concatenation of a first edge and a second edge, the plus symbol indicating the concatenation and the forward-slash symbol representing an edge-relationship. As an example FIG. 7B shows the creation of the topology-mapping named L14 as "topmap L14=L12/L14+L11/L14+L13/L14" and the topology-path named L11 as "toppath L11=L5/L11", using the notation of FIG. 6C.

Figure 5D:
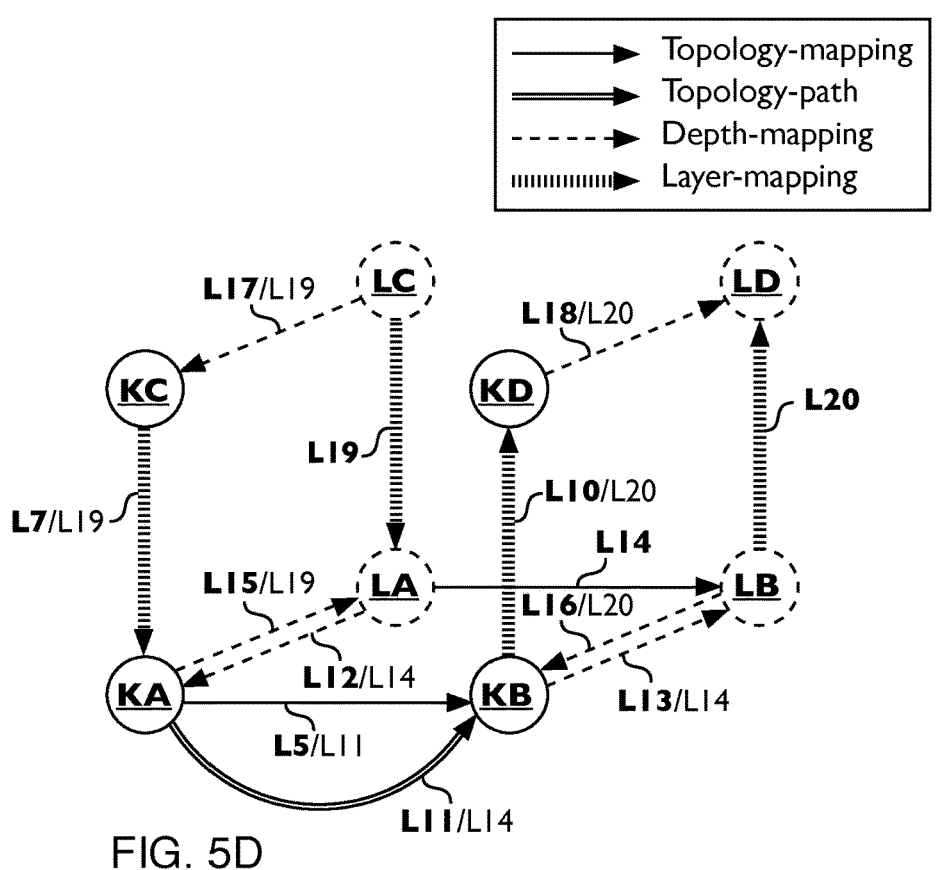
FIG. 5D is a diagram showing networks KA, KB, KC, KD, LA, LB, LC, LD and additional to FIG. 5C calculating and storing a layer-mapping named L19 from network LC to network LA as a concatenation of a depth-mapping named L17 from network LC to network KC, a layer-mapping named L7 from network KC network KA and a depth-mapping named L15 from network KA to network LA and calculating and storing a layer-mapping named L20 from network LB to network LD as a concatenation of a depth-mapping named L16 from network LB to network KB, a layer-mapping named L10 from network KB network KD and a depth-mapping named L18 from network KD to network LD.

As shown in FIG. 5D, by applying the first method and second method for calculating a layer-mapping, we calculate and store a layer-mapping named L19 from network LC to network LA as a concatenation of a depth-mapping named L17 from network LC to network KC, a layer-mapping named L7 from network KC network KA and a depth-mapping named L15 from network KA to network LA and we calculate and store a layer-mapping named L20 from network LB to network LD as a concatenation of a depth-mapping named L16 from network LB to network KB, a layer-mapping named L10 from network KB to network KD and a depth-mapping named L18 from network KD to network LD.

Figure 5E:
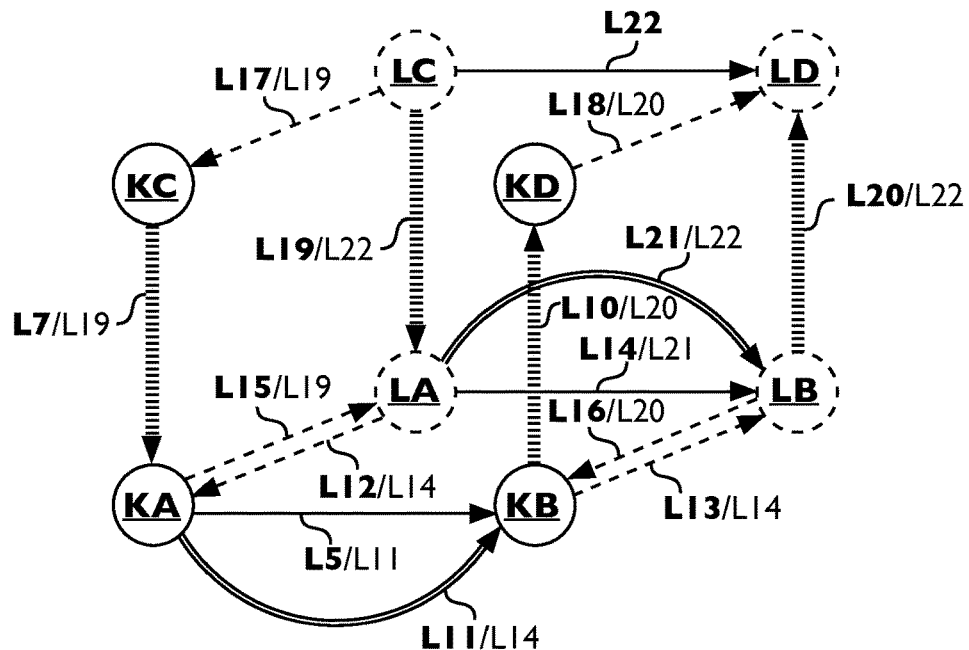
FIG. 5E is a diagram showing networks KA, KB, KC, KD, LA, LB, LC, LD and additional to FIG. 5D calculating and storing a topology-mapping named L22 from network LC to network LD as a concatenation of a layer-mapping named L19 from network LC to network LA, a topology-path named L21 from network LA network LB and a layer-mapping named L20 from network LB to network LD, the topology-path named L21 being a single topology-mapping named L14 from network LA to network LB.

As shown in FIG. 5E, by applying the second method for calculating a topology-mapping, we calculate and store a topology-mapping named L22 from network LC to network LD as a concatenation of a layer-mapping named L19 from network LC to network LA, a topology-path named L21 from network LA network LB and a layer-mapping named L20 from network LB to network LD, the topology-path named L21 from network LA to network LB comprising of a single topology-mapping named L14 from network LA to network LB.

Figure 5F:
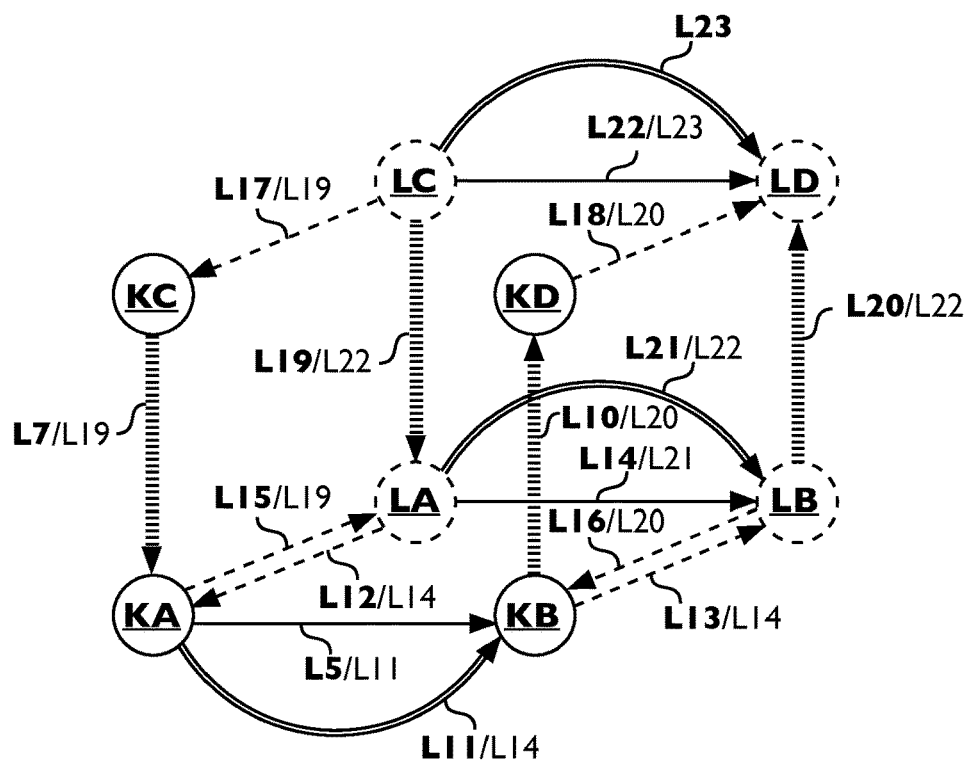
FIG. 5F is a diagram showing networks KA, KB, KC, KD, LA, LB, LC, LD and additional to FIG. 5E calculating and storing a topology-path named L23 from network LC to network LD as a single topology-mapping named L22 from network LC to network LD.

As shown in FIG. 5F, we calculate and store a topology-path named L23 from network LC to network LD as a single topology-mapping named L22 from network LC to network LD.

FIG. 7B shows the creation of topology-paths L11, L21 and L23, topology-mappings L14 and L22 and layer-mappings L19 and L20 using the notation of FIG. 6C. The edge-relationships shown in FIG. 5F can be used to calculate a set of edge-relationships through recursion. Here, the term "recursion" refers to a mathematical recursion operation. Said set of edge-relationships comprises of nested edge-relationships. Here, the term "nested" in "nested edge-relationship" refers to edge-relations having a mathematically nested format.

As an example but not limited to, the topology-mapping from network KA to network KB has edge-relationship L5/L11, the topology-path from network KA to network KB has edge-relationship L11/L14, the topology-mapping from network LA to network LB has edge-relationship L14/L21, the topology-path from network LA to network LB has edge-relationship L21/L22, the topology-mapping from network LC to network LD has edge-relationship L22/L23 and the topology-path from network LC to network LD has name L23, therefore the topology-mapping named L11 from network KA to network KB has an example set of edge-relationships L5/L11/L14/L21/L22/L23. We refer to a single edge-relationship and to two or more edge-relationships combined through recursion as a set of edge-relationships. A first example but not limited to of a set of edge-relationships of topology-mapping named L5 is L5/L11/L14/L21/L22/L23. A second example but not limited to of a set of edge-relationships of topology-mapping named L5 is L5/L14/L23.

Note that the first edge name in a set of edge-relationships is the name of said edge. We calculate the recursive-path of the requested topology-path L23 through recursion and store the nested edge-relationships in a set of edge-relationships for each edge. Here, a recursive-path is defined as a path that is calculated using recursion as a mathematical technique. An example of a recursive-path is L23 in FIG. 5F.

FIG. 7C illustrates the calculation of a recursive-path of the topology-path named L23 from network LC to network LD. As shown in FIG. 5F, above we calculated and stored a topology-path named L23 from network LC to network LD as the single topology-mapping named L22 from network LC to network LD, and represented the topology-path named L23 in FIG. 7B as "toppath L23=L22/L23", per the notation described above, shown in step 1. Using the relationships shown in FIG. 7B we recursively calculate the recursive-path and a set of edge-relationships comprising nested edge-relationships for each edge as shown in step 5 of FIG. 7C. Steps 2 through 4 of FIG. 7C are intermediate steps in the calculation. In FIG. 6D a notation for a topology-path, level-path or topology-level-path is shown, using the notations of FIGS. 6A, 6B and 6C. In step 6 of FIG. 7C the recursive-path of step 5 is shown using the notation of FIG. 6D by combining step 5 of FIG. 7C with FIG. 7A.

Figure 8:
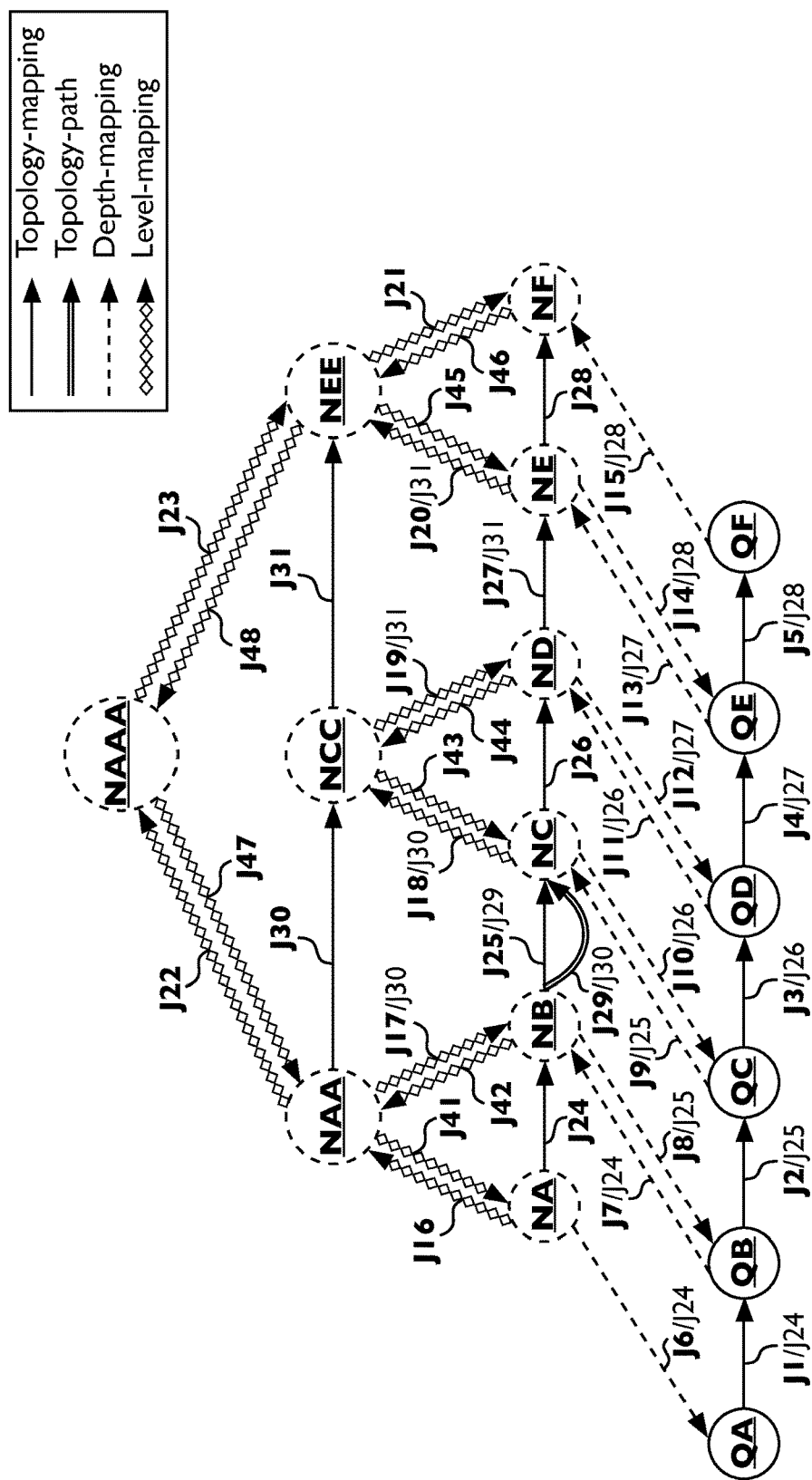
FIG. 8 is a diagram showing logical network NAAA at (d=1, n=0, h=2) consisting of logical networks NAA, NCC and NEE at (d=1, n=0, h=1). Logical Network NAA consisting of networks logical networks NA and NB at (d=1, n=0, h=0). Logical Network NCC consisting of logical networks NC and ND at (d=1, n=0, h=0). Logical network NEE consisting of networks NE and NF at (d=1, n=0, h=0).

We now include the naming of edges in a set of hierarchical networks. FIG. 8 shows networks NAAA, NAA, NCC, NEE, NA, NB, NC, ND, NE, NF, QA, QB, QC, QD, QE, QF and the topology-mappings at (d=0, n=0, h=0), the topology-mappings at (d=1, n=0, h=0) and the depth-mappings, being a representation using directed edges of the network shown in FIGS. 4A and 4B. Note that each a level-mapping of FIG. 4B being a relationship between a first network at level h and a second network at level h+1, such as but not limited to, the level-mapping between network NAA and network NAAA, is represented by a pair of level-mappings being directed edges, such as but not limited to, a level-mapping from network NAA to network NAAA and a level-mapping from network NAAA to network NAA. The level-mapping from network NAA to network NAAA is named J22 and is shown in FIG. 8. The level-mapping from network NAAA to network NAA is named J47 and is shown in FIG. 8. PCT/EP2014/055640 (FIG. 53E) describes physical topology-mappings, depth-mappings and level-mappings, per the notation of FIG. 6A. As shown in FIG. 8 we calculate and store a topology-mapping named J30 from network NAA to network NCC as a concatenation of a level-mapping named J17 from network NAA to network NB, a topology-path named J29 from network NB network NC and a level-mapping named J18 from network NC to network NCC, the topology-path named J29 from network NB to network NC comprising of a single topology-mapping named J25 from network NB to network NC, using the third method for calculating topology-mappings described above. We calculate and store a topology-mapping named J31 from network NCC to network NEE as a concatenation of a level-mapping named J19 from network NCC to network ND, a topology-mapping named J27 from network ND network NE and a level-mapping named J20 from network NE to network NEE, using the third method for calculating topology-mappings described above. By creating the topology-mappings named J30 and J31 we can specify forwarding behavior between networks-of-nodes NAA, NCC and NEE. As will be understood by a person skilled in the art, the creation of topology-mappings can be repeated at arbitrary number of hierarchy levels. PCT/EP2014/055640 (pages 213) describes how a level-path is changed to a topology-path.

In order to allow for packet forwarding or switching in a Packet Switched Network (PSN) comprising of packet-switching nodes or relaying or switching of a physical signal in a non-packet-switching network, above we assign zero or one switching-identifiers per topology-mapping, topology-path, level-path and topology-level-path. (cf. PCT/EP2014/055640 page 188). A switching-identifier depends on the depth d and layer n in which a topology is created comprising of networks and topology-mappings. Networks at a particular depth d and layer n are either all packet-switched networks or all non-packet-switched-networks. Nodes at a particular depth d and layer n are either all packet-switched nodes or all non-packet-switched-nodes. We distinguish between the following types, but not limited to, of switching-identifiers:

i. switching-identifiers at depth d=0 and at arbitrary layer n comprising of a physical signal, the nodes at depth d and layer n being non-packet-switching nodes.

ii. switching-identifiers at depth d=0 and a layer performing Media Access Control (MAC), the nodes at depth d and layer n being packet-switching nodes.

iii. switching-identifiers at arbitrary depth d and at arbitrary layer n comprising of logical identifiers, the nodes at depth d and layer n being packet-switching nodes.

PCT/EP2014/055640 (pages 189 through 192) describes examples of switching-identifiers of type i), type ii) and type iii).

Before or at creation a first network at a depth d, layer n the SDN Compiler should be instructed by a user, such as for example, but not limited to a network administrator (cf. PCT/EP2014/055640 page 191):

i. whether networks at said depth d and said layer n are packet-switching networks or non-packet-switching networks ii. how to construct switching-identifiers for said depth d and said layer n. PCT/EP2014/055640 (pages 192, 201 through 203) describes examples of how to construct switching-identifiers.

This is done at initialization of said depth d and said layer n, as this information is identical for each network at said depth d and said layer n. This is done at initialization of said depth d and said layer n, therefore a user of an SDN Compiler will not have to specify this information with each network that is created. The information at i) above is used by the SDN Compiler to select the method for creation of forwarding entries for a physical packet-switching node or of forwarding entries for a physical non-packet-switching node.

In the method we calculate from said recursive-path forwarding entries for a requested topology-level-path. The recursive-path contains the following information for each node at d=0, h=h_min being a physical node (cf. PCT/EP2014/055640 pages 192 and 193):

an input port, being a PoA between the physical or virtual node and a topology-mapping or a layer-mapping, with the exception of the first node in the recursive-path which does not have an input port as the packet or signal is created by the first node in the recursive-path an output port, being a PoA between the physical or virtual node and a topology-mapping or a layer-mapping, with the exception of the last node in the recursive-path which does not have an output port as the packet or signal is received by the last node in the recursive-path Additionally, when a set of edge-relationships has been calculated for each edge, the recursive-path also contains:

a set of incoming edge-relationships at the incoming topology-mapping or layer-mapping with the exception of the first node in the recursive-path which does not have an incoming topology-mapping or a layer-mapping a set of outgoing edge-relationships at the outgoing topology-mapping or layer-mapping with the exception of the last node in the recursive-path which does not have an outgoing topology-mapping or a layer-mapping The combination of above input port, output port, a set of incoming edge-relationships, a set of outgoing edge-relationships, and switching-identifiers result in forwarding entries for physical nodes, also referred to as forwarding instructions, will be further explained in an example below. Forwarding entries for each physical node in the recursive-path comprise of an input port, an output port, the switching-identifiers of incoming set of edge-relationships and the switching-identifiers of outgoing set of edge-relationships. Above forwarding entries, are send to the physical nodes in the recursive-path, either directly or indirectly, as an example but not limited to, through an SDN Controller. PCT/EP2014/055640 (page 197) describes that for a node the number of edges within a set of incoming edge-relationships may be reduced by determining a relevant incoming set of edge-relationships. For a node, the relevant incoming set of edge-relationships are the set of edge-relationships of an incoming topology-mapping or an incoming layer-mapping at depth, layer, level of said node and at depth, layer, level of all networks in the recursive-path mapped to said node through one or more depth-mappings. PCT/EP2014/055640 (page 197) describes that for a node the number of edges within a set of outgoing edge-relationships may be reduced by determining a relevant outgoing set of edge-relationships. For a node, the relevant outgoing set of edge-relationships are the set of edge-relationships of an outgoing topology-mapping or an outgoing layer-mapping at depth, layer, level of said node and at depth, layer, level of all networks in the recursive-path mapped to said node through one or more depth-mappings.

In order to create appropriate forwarding instructions we distinguish between a physical node in a Packet-Switching Network (PSN) and a physical node in a non-PSN. A physical node in a PSN, referred to as a physical packet-switching node, performs forwarding and statistical multiplexing of packets. A physical node in a non-PSN, referred to as physical non-packet-switching node, performs relaying and multiplexing of physical signals. An example, but not limited to, of a non-PSN is a Circuit-Switching Node (CSN). An example, but not limited to, of a non-PSN is a node in a wireless network performing multiplexing of physical signals. PCT/EP2014/055640 (pages 193 and 194) describes the calculation of forwarding entries for a physical packet-switching node. PCT/EP2014/055640 (pages 195 and 196) describes the calculation of forwarding entries for a physical non-packet-switching node. PCT/EP2014/055640 (pages 198 through 200) describes the creation of a single forwarding entry for a physical equipment comprising of two or more physical nodes.

When creating a topology-mapping, layer-mapping, topology-path, level-path or topology-level-path per above described method, optionally one or more requirements are taken into account when creating said topology-mapping, layer-mapping, topology-path, level-path or topology-level-path (cf PCT/EP2014/055640 page 221). Only if said topology-mapping, layer-mapping, topology-path, level-path or topology-level-path complies with said one or more requirements, said topology-mapping, layer-mapping, topology-path, level-path or topology-level-path is created. In other words, a topology-mapping, layer-mapping, topology-path, level-path or topology-level-path is only created when requirements for said topology-mapping, layer-mapping, topology-path, level-path or topology-level-path are met by the calculated said topology-mapping, layer-mapping, topology-path, level-path or topology-level-path. A requested topology-path, level-path or topology-level-path can be considered as a service for a user (cf. PCT/EP2014/055640 page 222). An example, but not limited to, of said user being a person, an organization, an application. Typically, the requirements of said service are stored in a contract, being a Service-Level-Agreement (SLA) between said user and the provider of said service. As will be understood be a person skilled in the art, the above method allows said provider of said service to offer much richer services, based on said more complex requirements that can be used when establishing said service. Edge-relationships are used to determine the impact of any changes in a set of networks. As an example, but not limited to, as shown in FIG. 50C the topology-mapping named L5 from network KA to network KB is with edge-relationship L5/L11, therefore if the first edge named L5 is changed, the second edge named L11 is impacted. In case the topology-mapping named L5 is deleted, for example but not limited to, the topology-mapping L5 being a physical fiber link which is cut, the topology-mapping named L11 is impacted, as per the edge-relationship L5/L11, and will have to be recalculated by the SDN Compiler. In case the topology-path L23 is a requested topology-path and the topology-path named L23 can not be recalculated, as in the example of FIG. 50F, the Service-Level-Agreement (SLA) of said requested topology-path is violated.

Note that the described method allows for multi-layer survivability in a set of networks. Also, note that the described method allows for a much deeper analysis of SLA's. As an example but not limited to a large number of failure scenario's could be simulated from the information stored by the method and the impact on one or more SLA's could be determined. As an example but not limited to this allows for checking SLA violation probability versus incurred penalties of said SLA violation. Note that the described method allows for storing each SLA violation, therefore building a record for said SLA.

Reference is made to forwarding entries also in the case of a non-packet-switching network as the SDN Compiler provides a uniform approach to create instructions for both packet-switching nodes and non-packet-switching nodes. A forwarding entry in case of a non-packet-switching network is an instruction specifying how an incoming signal at an input port should be relayed to an output port after optional modification of said incoming signal. As an example but not limited to, in case of a WDM ROADM, the SDN Compiler creates an instruction specifying how an incoming wavelength at an input port should be relayed, also referred to as cross-connected, to an output port after optional modification of said incoming wavelength, such as for example changing the frequency of the incoming wavelength. Forwarding entries, are send to the physical nodes in the recursive-path, either directly or indirectly, as an example but not limited to, through an SDN Controller.

The method described can be implemented using a graph database, wherein networks, mappings, topology-paths, level-paths and topology-level-paths are stored in a graph database, wherein a network is stored as a named vertex in a graph database, wherein a mapping, being a topology-mapping, depth-mapping, layer-mapping or level-mapping is stored as a named and directed edge in a graph database, wherein a topology-path, level-path or topology-level-path is stored as a named and directed edge in a graph database, wherein properties of said networks are stored as vertex attributes in said graph database, wherein properties of said mappings are stored as edge attributes in said graph database, wherein properties of said topology-paths, level-paths or topology-level-paths are stored as edge attributes in said graph database (cf PCT/EP2014/055640 FIG. 57, pages 145 and 230). The type of mapping and the direction of said mapping can be stored as an edge type in said graph database. The type of topology-level-path, being a topology-path, level-path or topology-level-path can be stored as an edge type in said graph database. An example of a type of mapping and a direction of said mapping is an increasing depth-mapping. A graph database supporting more than one edge type is typically referred to as a graph database supporting property graphs. A graph database is typically, but not limited to, based on a property graph model consisting of vertices having properties and directed edges having properties. The network properties within the SDN Compiler method can be stored as vertex properties. Such vertex properties, also referred to as vertex attributes, could comprise the network-related inputs of the SDN Compiler method described above as well as additional network information such as for example but not limited to geographic longitude of the physical or virtual node, geographic latitude of the physical or virtual node and uptime of the node. The topology-mapping, layer-mapping and depth-mapping properties within the SDN Compiler method can be stored as edge properties. The first method to calculate a topology-mapping, the second method to calculate a topology-mapping, the third method to calculate a topology-mapping, the first method to calculate a layer-mapping, the second method to calculate a layer-mapping, the method to calculate a topology-path, the method to calculate a level-path and the method to calculate a topology-level-path, used to create or recalculate a mapping or a topology-path, level-path or topology-level-path, can be implemented as a query in a graph database. Additional requirements as described above can be included in such query. As an example, but not limited to, a query of the first method to calculate a topology-mapping could be a graph database query for a path from a first node to a second node matching a depth-mapping decreasing in depth from said first node to a third node, matching a depth-mapping increasing in depth from a fourth node to said second node, matching a topology-path from said third node to a fourth node. Optionally, additional requirements could be specified in said example query.

Figure 9:
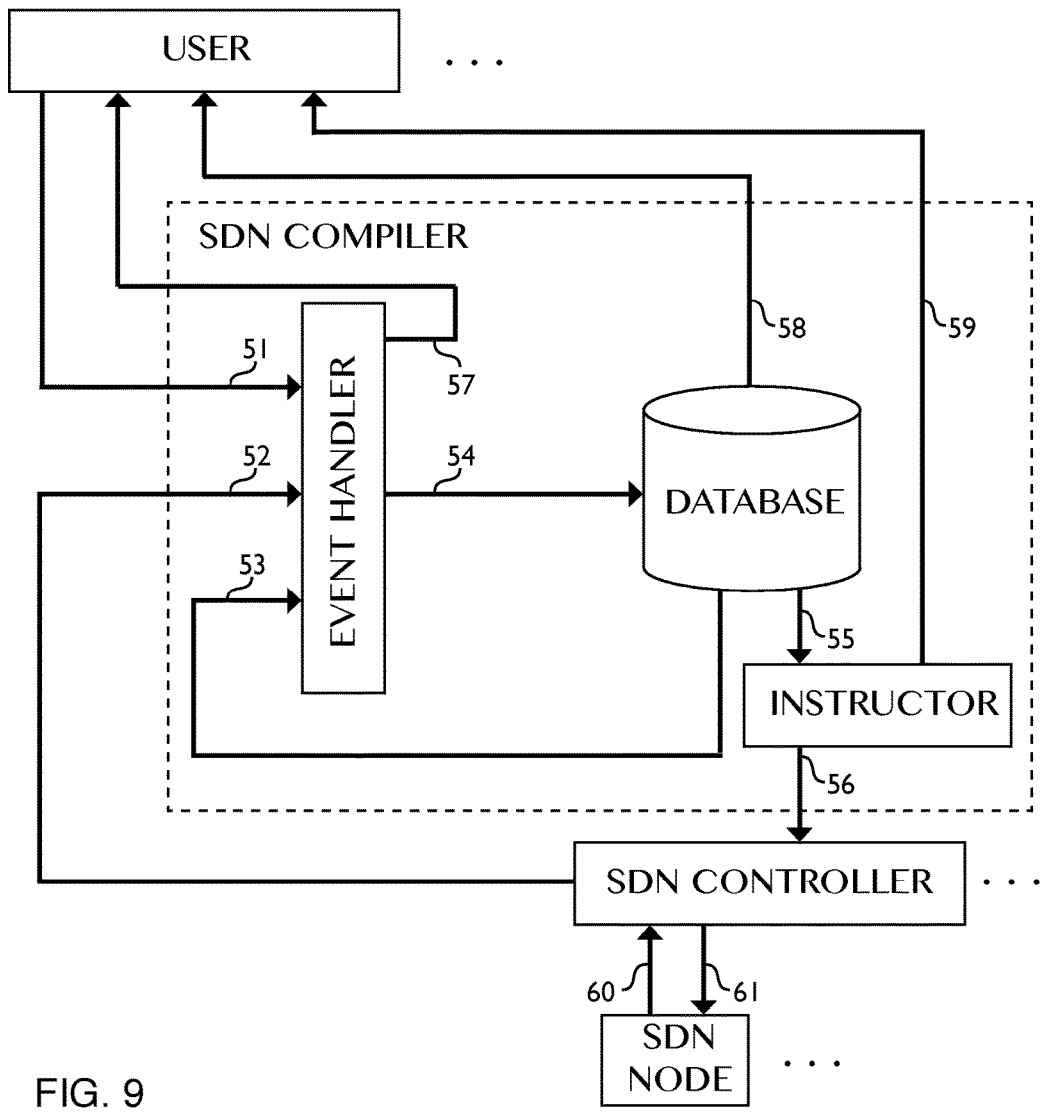
FIG. 9 is a diagram showing an example SDN Compiler apparatus comprising of a Database, an Event Handler and an Instructor.

We now consider an example SDN Compiler apparatus comprising of a Database, an Event Handler and an Instructor, as shown in FIG. 9 (cf. PCT/EP2014/055640 FIG. 57, page 232). FIG. 9 also shows the USER of the SDN Compiler, one ore more SDN Controllers and one or more physical SDN nodes. All information of the networks, topology-mappings, depth-mappings, layer-mappings, level-mappings, topology-paths, level-paths, topology-level-paths in stored in a database. An example, but not limited to, such a database is a graph database. The event handler handles all incoming events from the USER, one or more SDN Controllers and from the database. Alternatively, the database could directly query itself, but to allow for event-handling and prioritization database requests from to database to the database flow through the event-handler. The event-handler allows for event prioritization and protects the database from query attacks.

The instructor is responsible for creating forwarding entries for a user-requested topology-path, level-path or topology-level-path after this topology-path, level-path or topology-level-path is created in the database. One or more SDN controllers can send requests to the event handler. Alternatively, an additional monitor could be used that polls one or more SDN Controllers.

In FIG. 9 the following message flows are shown:

51 USER to EVENT HANDLER, for example for GET request, scripting, command interface, GUI.
52 SDN CONTROLLER to EVENT HANDLER
53 DATABASE to EVENT HANDLER, for example for requirement violations triggering recalculation and error reporting.
54 DATABASE QUERY+ACTION from EVENT HANDLER TO DATABASE
55 DATABASE to INSTRUCTOR, comprising of requested topology-path, level-path or topology-level-path information
56 INSTRUCTOR to CONTROLLER, comprising forwarding instructions
57 EVENT HANDLER to USER, for example for error reporting
58 DATABASE to USER, for example for viewing, error reporting
59 INSTRUCTOR to USER, for example for error reporting, for statistics
60 NODE to CONTROLLER for example for error reporting, for status reporting
61 SDN CONTROLLER to NODE, comprising forwarding instructions Note that said event handler translates a logical network specification, specified by a user of an SDN Compiler, to a database query using any of the methods to create such logical network specification, such as for example but not limited to the first method to create a topology-mapping.

Reference is made to forwarding entries also in the case of a non-packet-switching network as the SDN Compiler provides a uniform approach to create instructions for both packet-switching nodes and non-packet-switching nodes (cf PCT/EP2014/055640 page 196). A forwarding entry in case of a non-packet-switching network is an instruction specifying how an incoming signal at an input port should be relayed to an output port after optional modification of said incoming signal. Note that in a non-packet-switched network in which no logical nodes and networks exist, to which above method applies, one or more topology-mappings can be created using the second method to create topology-mappings, forwarding entries can be calculated using the method to calculate forwarding entries for non-packet-switching nodes, edges can be recalculated, a service can be requested in accordance with a set of requirements. As an example, but not limited to, the above method can be implemented using a graph database.

PCT/EP2014/055640 (pages 207 through 211, FIG. 52N) describes that as an alternative to creating logical nodes, a logical name can be assigned to a physical node and/or a physical topology-mapping and/or a physical PoA.

PCT/EP2014/055640 (pages 234 through 240, FIG. 59B) describes an example of a non packet-switching network, with or without logical nodes.

In order to support multi-tenancy and to provide each tenant with its own address space, isolated from other tenants, the network at the highest hierarchy level in the namespace for each tenant should be globally unique to ensure isolation from other tenants. As an example, but not limited to, the highest hierarchy level could be an IPv6 flow label or could be an IPv4 identification field repurposed to denote a tenant. As will be understood by a person skilled in the art, much more complex topologies are supported by the SDN Compiler than the relatively simple topologies used in the examples above used to describe the SDN Compiler method. As will be understood by a person skilled in the art, various methods described above fall with the scope of the present invention, such as for example but not limited to, multicasting, tunneling, label-switching.

Non-pre-published prior art PCT/EP2014/055640 (pages 39, 42, 2345) describes a method to optionally perform operation(s) by a physical or virtual node on a packet, such as but not limited to monitoring and/or recording and/or buffering and/or modifying of the incoming packet header and/or payload before forwarding the packet to one or more of it's output ports, or blocking an incoming packet. Said additional optional operations could be specified by a user of the SDN Compiler. Said additional operations could be performed in a virtual node, such as for example but not limited to a virtual machine or a container, resulting in Network Functions Virtualization (NFV), in which a virtual node performs optional operations such as but not limited to monitoring and/or recording and/or buffering and/or modifying of the incoming packet header and/or payload before forwarding the packet to one or more of it's output ports, or blocking an incoming packet.

In a packet-switching network, comprising of packet-switching nodes, we define an additional operation as any operation optionally performed by a node in addition to forwarding, multiplexing and de-multiplexing operations. In a non-packet-switching network, comprising of non-packet-switching nodes, we define an additional operation as any operation optionally performed by a node in addition to switching, multiplexing and de-multiplexing operations. In a packet-switching networking, comprising of packet-switching nodes, a forwarding operation is also referred to as a switching operation.

We denote an operation by an operation name. Each operation name denoting one operation.

We define an operation call as a combination of:
an operation name denoting an operation,
at least one edge,
a node denoting a location at which said operation is to be performed, Said operation is performed on data being in motion, in contrast to data being at rest which is stored at a particular location. In case of a non-packet-switching network said operation is performed on a signal. In case of a packet-switching network said operation is performed on one or more packets in a flow. Said flow is specified by the combination of at least one edge and a switching-identifier of said at least one edge.

Said operation might be an operation on a sequence of packets, such as for example buffering multiple packets, encoding the combined payloads of said multiple packets, and sending said multiple packet to an output port. Note that said at least one edge should be present in the incoming set of edge-relationships of said logical node at which said operation should be performed, and should be present in the outgoing set of edge-relationships of said logical node at which said operation should be performed, as the switching-identifiers of said at least one edge identify a packet or signal on which said operation should be performed. This will be further illustrated below.

An operation is performed at a node. Said node can be regarded a location in a network at which said operation is to be performed.

A path traversing one or more nodes at which at least one operation call is defined results in one or more operation calls being performed sequentially or in parallel, and can be regarded a program comprising of one or more operation calls.

An example of an additional operation is a transfer function. In a packet-switching network said transfer function transfers an incoming packet payload to an outgoing packet payload. A packet payload contains data. As said packet is in motion along a path from a source node to a destination node, said data is in motion, and therefore said transfer function is performed on data in motion. In a non-packet-switching network said transfer function transfers an incoming signal to an outgoing signal. A signal contains data. As said signal is in motion along a path from a source node to a destination node, said data is in motion, and therefore said transfer function is performed on data in motion. An example, but not limited to, of a transfer function is a process performed in software in computing equipment. Examples, but not limited to, of a transfer function are a process performed in software, a piece of computer code, a process performed in hardware, a physical process altering an incoming signal or digital signal processing.

As will be understood by a person skilled in the art, a network comprising of nodes in which a transfer function is performed on data in motion resembles a dataflow architecture. In a dataflow architecture the execution of an operation is solely based on the availability, or presence, of input arguments to an operation. In contrast, in a von Neumann architecture the execution of an operation depends on a program counter. In a packet-switched network, said one or more input arguments to an operation are one or more packets. In a non-packet-switched network, said one or more input arguments to an instruction is a signal.

An operation call be specified in a logical network, being a combination of:
an operation name denoting an operation,
at least one edge in a logical network, denoting a packet or signal on which said operation should be performed,
a logical node in a logical network denoting a location at which said operation is to be performed, Note that in case a single operation is performed at a logical node, the operation name denoting the operation and a logical node name being an unique identifier of the logical node may be identical and stored once.

It is our objective to compile a logical network in which additional operations have been defined by a user of an SDN Compiler, in accordance with above description, against physical and virtual resources and create forwarding instructions for said physical and virtual resources including instructions which zero or more operations to perform in a physical node.

A requested-path traversing one or more logical nodes at which at least one operation call is defined results in one or more operation calls being performed sequentially or in parallel, and can be regarded a program comprising of one or more operation calls.

Said operation call and requested-path are defined by a user of an SDN Compiler, thereby providing programmability of a logical network to said user of an SDN Compiler.

In a logical packet-switching network an example, but not limited to, of said at least one edge in a logical network is a 3-tuple of an IPv6 Source Address, IPv6 Destination Address and IPv6 Flow Label [IPv6: Internet Protocol Version 6].

In a logical non-packet-switching network an example, but not limited to, of said at least one edge in a logical network denoting a signal on which said operation is to be performed is a logical identifier added to a physical signal for example, but not limited to, through a modulation technique.

As will be understood by a person skilled in the art, devices commonly referred to as 'middleboxes', such as but not limited to firewalls, deep packet inspection devices, caching nodes are examples of devices in which an additional operation is performed. Today, middle-boxes are typically dedicated hardware devices. Performing additional operations in virtual nodes is commonly referred to as Network Functions Virtualization (NFV). The foreseen benefits of NFV are for example but not limited to reduced equipment costs, reduced operational costs and faster provisioning of network services.

Figure 11A:
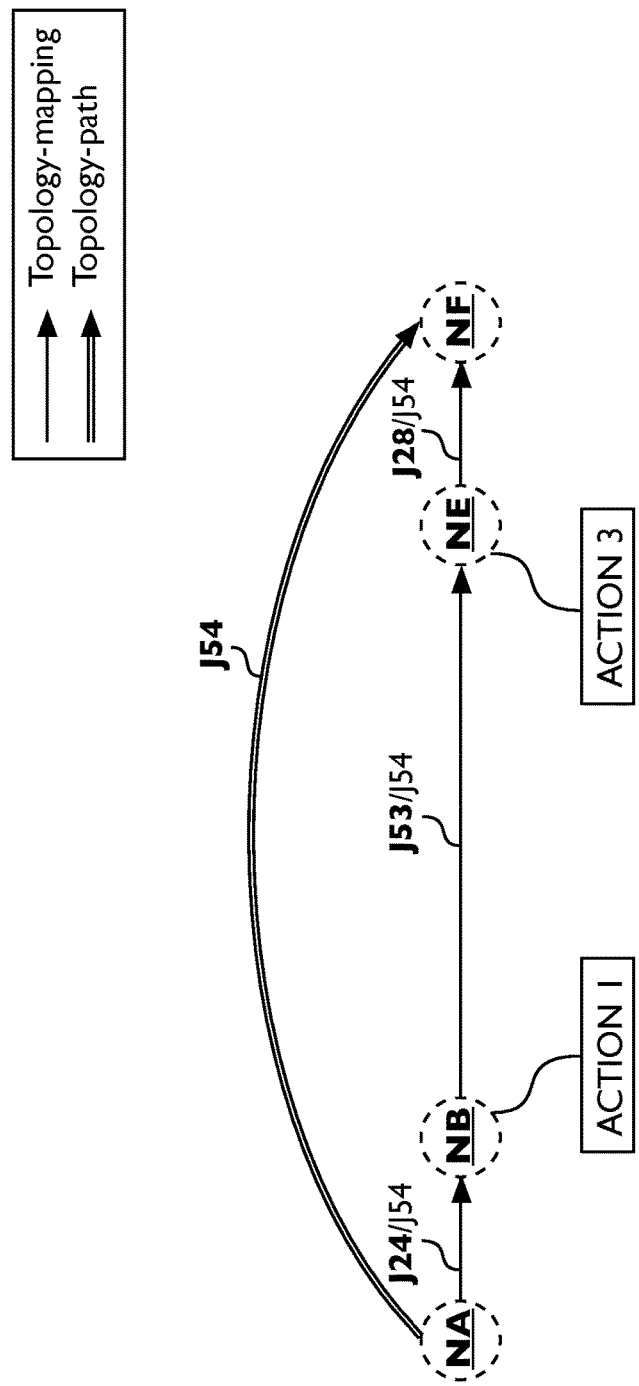
FIG. 11A is a diagram showing logical nodes NA, NB, NE, NF, topology-mappings and a topology-path.

We explain the method using the example shown in FIGS. 11A through 11J. FIG. 11A shows logical nodes NA, NB, NE and NF, topology-mappings named J24, J28 and J53, and a topology-path named J54, represented as directed edges in a graph. We consider logical nodes NA, NB, NE and NF to be packet-switching nodes. We denote a first operation by operation name 'action 1', and we denote a second operation by operation name 'action 3'. We define a first operation call as a combination of:
an operation name 'action 1' denoting an operation,
an edge named J54,
a logical node NB denoting a location at which said operation is to be performed,
We define a second operation call as a combination of:
an operation name 'action 3' denoting an operation,
an edge named J54,
a logical node NE denoting a location at which said operation is to be performed, The first and second operation calls are shown in FIG. 11H. We consider the switching-identifier of the topology-path named J54 to be "Source NA, Destination NF", as shown in FIG. 11I. Therefore, the edge named J54 on which said first operation and said second operation should be performed is identified by the switching-identifier "Source NA, Destination NF". The requested-path named J54 traverses node NB, at which said first operation is performed and traverses node NE, at which said second operation is performed. Note that said first operation and said second operation are performed sequentially. Said operation name and said edge may be specified by a user of an SDN Compiler. We refer to an edge traversing a node when said edge is present in the incoming set of edge-relationships of said node and is present in the outgoing set of edge-relationships of said node.

Figure 11B:
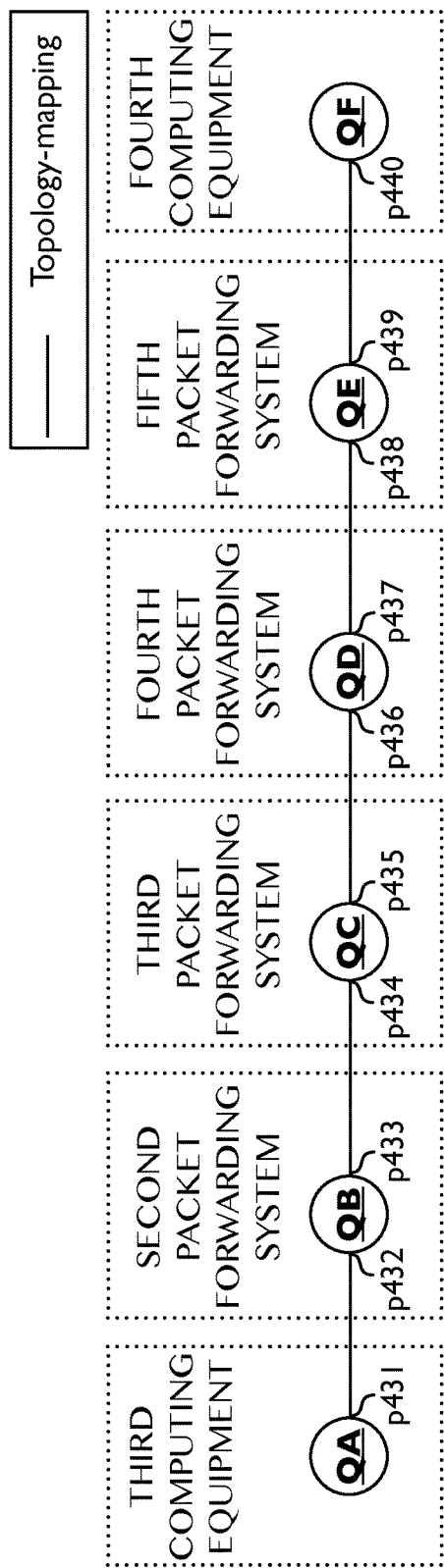
FIG. 11B is a diagram showing a physical node QA, representing a third computing equipment, a physical node QB, representing a second packet forwarding system, a physical node QC, representing a third packet forwarding system, a physical node QD, representing a fourth packet forwarding system, a physical node QE, representing a fifth packet forwarding system and a physical node QF, representing a fourth computing equipment interconnected by physical links.

FIG. 11B shows a third computing equipment, a second packet forwarding system, a third packet forwarding system, a fourth packet forwarding system, a fifth packet forwarding system and a fourth computing equipment interconnected by physical links. FIG. 11B also shows PoAs p431 through p440. Node QA represents the third computing equipment, node QB represents the second packet forwarding system, node QC represents the third packet forwarding system, node QD represents the fourth packet forwarding system, node QE represents the fifth packet forwarding system and node QF represents the fourth computing equipment. Node QB can possibly perform an operation named 'action 1', node QC can possibly perform an operation named 'action 2', node QE can possibly perform operations named 'action 3' and 'action 4'.

Figure 11C:
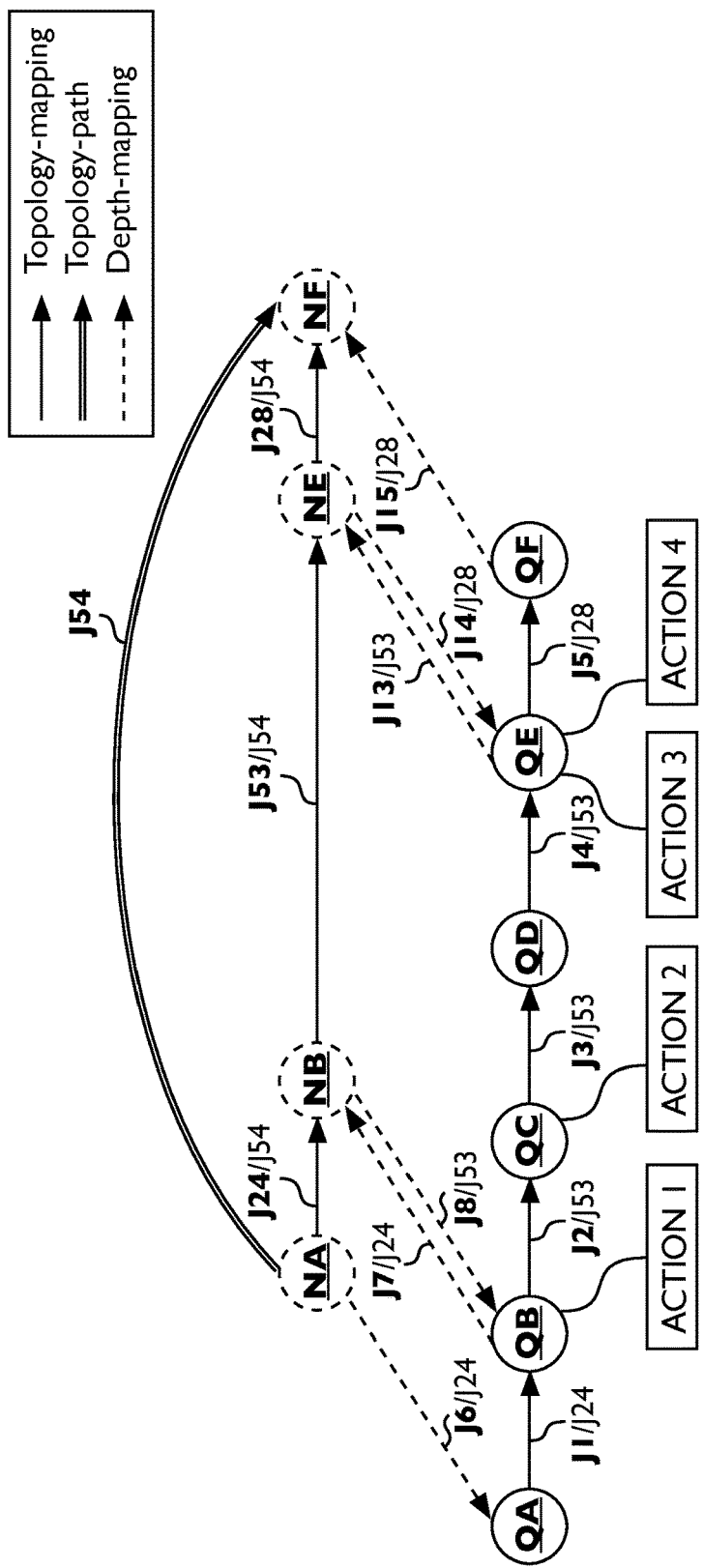
FIG. 11C is a diagram showing physical nodes QA, QB, QC, QD, QE, QF and logical nodes NA, NB, NE, NF, depth-mappings, topology-mappings and a topology-path.

As an example, but not limited to, we consider the logical network comprising of logical nodes NA, NB, NE, NF as shown in FIG. 11A and described above, and compile said logical network against the network diagram shown in FIG. 11B. FIG. 11C shows physical nodes QA, QB, QC, QD, QE and QF at (d=0, n=0, h=0). FIG. 11C shows logical nodes NA, NB, NE and NF at (d=1, n=0, h=0). FIG. 11C also shows topology-mappings named J1 through J5, J24, J28 and J53, depth-mappings named J6, J7, J8, J13, J14 and J15, and a topology-path named J54, represented as directed edges in a graph. FIG. 11D shows topology-mappings named J1 through J5, and depth-mappings named J6, J7, J8, J13, J14 and J15, per the notation of FIG. 6A. FIG. 11E shows topology-mappings named J24, J28 and J53 and a topology-path named J54, per the notation of FIG. 6C. The topology-mappings named J1 through J5 represent physical links in a single direction. The topology-mappings named J24, J28 and J53 are calculated using the first method to calculate a topology-mapping, as shown in FIGS. 11C and 11E. The topology-path named J54 is calculated as a concatenation of the topology-mapping named J24, the topology-mapping named J53 and the topology-mapping named J28, as shown in FIGS. 11C and 11E. We calculate the recursive-path of the requested topology-path named J54, as described above. Using the relationships shown in FIG. 11E we recursively calculate said recursive-path and a set of edge-relationships comprising nested edge-relationships for each edge. The resulting recursive-path of the topology-path named J54 is shown in FIG. 11F.

The recursive-path contains the following information for each node:
an input port,
an output port,
a set of incoming edge-relationships,
a set of outgoing edge-relationships,
as shown in FIG. 11G for the recursive-path of the topology-path named J54. In FIG. 11G 'not named' indicates that an input port or output port is not specified. As described above we define an operation call as a combination of:
an operation name denoting an operation,
at least one edge,
a node denoting a location at which said operation is to be performed, Therefore, an operation, denoted by an operation name, can be performed in a node if said at least one edge is present in the incoming set of edge-relationships of said logical node at which said operation should be performed, and is present in the outgoing set of edge-relationships of said logical node at which said operation should be performed. As an example, but not limited to, we consider said first operation call being a combination of: an operation name 'action 1' denoting an operation, an edge named J54 denoting an edge on which said operation is to be performed, and a logical node NB denoting a location at which said operation is to be performed. As shown in the fifth row of FIG. 11G the edge named J54 is present in the incoming set of edge-relationships J7/J24/J54 of logical node NB at which said first operation should be performed, and is present in the outgoing set of edge-relationships J8/J53/J54 of logical node NB at which said first operation should be performed. As shown in the fourth row of FIG. 11G the edge named J54 is present in the incoming set of edge-relationships J1/J24/J54 of physical node QB and is present in the outgoing set of edge-relationships J7/J24/J54 of physical node QB. As shown in the sixth row of FIG. 11G the edge named J54 is present in the incoming set of edge-relationships J8/J53/J54 of physical node QB and is present in the outgoing set of edge-relationships J2/J53/J54 of physical node QB. Physical node QB and logical node NB are related through depth-mappings named J7 and J8 as shown in FIG. 11D. As shown in FIG. 11F the recursive-path of the requested topology-path named J54 contains a concatenation of a depth-mapping increasing in depth named J7 from physical node QB to logical node NB, and a depth-mapping named J8 decreasing in depth from logical node NB to physical node QB.

The SDN Compiler method described in PCT/EP2014/055640 is now extended with the following actions:
i) storing one or more operation names of a physical node, each operation name denoting one operation that can possibly be performed by said physical node, ii) storing one or more operation calls each identified by a combination of an operation name, at least one edge, and a logical node denoting a location at which said operation is to be performed, iii) Creating an instruction to perform an additional operation, being one of said stored operations, on a packet or signal by one of said physical nodes IF an operation call as identified by a combination of an operation name, at least one edge, and said one of said logical nodes, has been defined AND a recursive-path contains a concatenation of one or more first depth-mappings increasing in depth from said one of said physical nodes to one of said logical nodes AND one or more second depth-mappings decreasing in depth from said one of said logical nodes to said one of said physical nodes, AND said at least one edge is contained in a set of incoming edge-relationships of a physical topology-mapping or physical layer-mapping of said one of said physical nodes, AND said at least one edge is contained in a set of outgoing edge-relationships of a physical topology-mapping or physical layer-mapping of said one of said physical nodes, AND said additional operation name is stored with said one of said physical nodes, The above actions i) through iii) are illustrated using the example described above.

Action i): As shown in FIG. 11C, physical node QB can possibly perform action 1, therefore operation name 'action 1' is stored with physical node QB. As shown in FIG. 11C, physical node QC can possibly perform action 2, therefore operation name 'action 2' is stored with physical node QC. As shown in FIG. 11C, physical node QE can possibly perform action 3 and action 4, therefore operation names 'action 3' and 'action 4' are stored with physical node QE.

Action ii): storing one or more operation calls each identified by a combination of an operation name (action 1; action 2) denoting an operation, at least one edge (J54; J54) identifying a packet or signal on which said operation should be performed, and a logical node (NB; NE) at which said operation should be performed, as defined by a user of an SDN Compiler, as shown in FIG. 11H.

Action iii): explained for a first operation call identified by a combination of an operation name ('action 1') denoting an operation, at least one edge (J54) identifying a packet or signal on which said operation should be performed, and a logical node (NB) at which said operation should be performed: creating an instruction to perform an additional operation, being one of said stored operations, named 'action 1' on a on a packet or signal by a physical node QB IF an operation call as identified by a combination of an operation name ('action 1'), at least one edge (J54), and a logical node (NB), has been defined, AND a recursive-path (J54) contains a concatenation of one or more first depth-mappings (J7) increasing in depth from said one of said physical nodes (QB) to one of said logical nodes (NB) of said first operation call and one or more second depth-mappings (J8) decreasing in depth from said one of said logical nodes (NB) of said first operation call, to said one of said physical nodes (QB), AND said at least one edge (J54) of said operation call is contained in a set of incoming edge-relationships (J1/J24/J54) of a physical topology-mapping (J1) or physical layer-mapping of said one of said physical nodes (QB), AND said at least one edge (J54) of said operation call is contained in a set of outgoing edge-relationships (J2/J53/J54) of a physical topology-mapping (J2) or physical layer-mapping of said one of said physical nodes (QB), AND said additional operation name ('action 1') of said first operation call is stored with said one of said physical nodes (QB), Therefore above statement being TRUE.

Action iii) explained for a second operation call identified by a combination of an operation name ('action 3') denoting an operation, at least one edge (J54) identifying a packet or signal on which said operation should be performed, and a logical node (NE) at which said operation should be performed: creating an instruction to perform an additional operation, being one of said stored operations, named 'action 3' on a packet or signal by a physical node QE IF an operation call as identified by a combination of an operation name ('action 3'), at least one edge (J54), and a logical node (NE), has been defined, AND a recursive-path (J54) contains a concatenation of one or more first depth-mappings (J13) increasing in depth from said one of said physical nodes (QE) to one of said logical nodes (NE) of said operation call and one or more second depth-mappings (J14) decreasing in depth from said one of said logical nodes (NE) of said operation call, to said one of said physical nodes (QE), AND said at least one edge (J54) of said operation call is contained in a set of incoming edge-relationships (J4/J53/J54) of a physical topology-mapping (J4) or physical layer-mapping of said one of said physical nodes (QE), AND said at least one edge (J54) of said operation call is contained in a set of outgoing edge-relationships (J5/J28/J54) of a physical topology-mapping (J5) or physical layer-mapping of said one of said physical nodes (QE), AND said additional operation name ('action 3') of said operation call is stored with said one of said physical nodes (QE). Therefore above statement being TRUE.

We create forwarding instructions from the recursive-path of the topology-path named J54 using the switching-identifiers shown in FIG. 11I. FIG. 11I shows, as an example but not limited to, switching-identifiers for the edges named J1 through J5 and J54. The switching-identifiers of edges J1 through J5 denote physical PoA's at the datalink layer, performing Media Access Control (MAC). The switching-identifier of the edge named J54 is "Source NA, Destination NF", using the name of the source node NA of the topology-path named J54 as source and using the name of the destination node NF of the topology-path named J54 as destination.

The recursive-path of the topology-path named J54 contains the following information for each physical node in said recursive-path, being physical nodes QA, QB, QC, QD, QE and QF:
  an input port,
  an output port,
  an incoming set of edge-relationships,
  an outgoing set of edge-relationships, Note that above input port, output port, incoming set of edge-relationships, switching-identifiers of said incoming set of edge-relationships, an outgoing set of edge-relationships, switching-identifiers of said outgoing set of edge-relationships, and an additional operation to perform results in the forwarding entries for physical nodes QA, QB, QC, QD, QE and QF, shown in columns one through five of FIG. 11J. The sixth column of FIG. 11J show additional operations to be performed.

Forwarding entries for a physical packet-switching node, referred to as node in below method, within the recursive-path of a requested-path are calculated by performing the below method comprising the following actions:

i. if the recursive-path does not contain an incoming topology-mapping or an incoming layer-mapping for said physical packet-switching node, and said physical packet-switching node is mapped to a source network of the recursive-path through one or more depth-mappings, creating for each outgoing topology-mapping and each outgoing layer-mapping of said physical packet-switching node in said recursive-path a forwarding entry instructing said physical packet-switching node to create a packet with a packet overhead containing switching-identifiers of an outgoing set of edge-relationships of said outgoing topology-mapping or said outgoing layer-mapping, and to send said packet out of an output port, said output port being a point-of-attachment between said physical packet-switching node and said outgoing topology-mapping or said outgoing layer-mapping, ii. else if the recursive-path does not contain an outgoing topology-mapping or an outgoing layer-mapping for said physical packet-switching node, and said physical packet-switching node is mapped to a destination network of the recursive-path through one or more depth-mappings, creating for each incoming topology-mapping and each incoming layer-mapping of said physical packet-switching node in said recursive-path a forwarding entry instructing said physical packet-switching node to receive at an input port a packet in accordance with switching-identifiers of the incoming set of edge-relationships of said incoming topology-mapping or said incoming layer-mapping, said input port being a point-of-attachment of between said physical packet-switching node and said incoming topology-mapping or said incoming layer-mapping, iii. else if the recursive-path does contain one incoming topology-mapping or one incoming layer-mapping for said physical packet-switching node and the recursive-path does contain one or more outgoing topology-mappings or outgoing layer-mappings for said physical packet-switching node, creating for each outgoing topology-mapping and each outgoing layer-mapping of said physical packet-switching node in said recursive-path a forwarding entry instructing said physical packet-switching node to receive an incoming packet at an input port, said input port being a point-of-attachment between said physical packet-switching node and said incoming topology-mapping or said incoming layer-mapping specified by the recursive-path, said packet in accordance with switching-identifiers of an incoming set of edge-relationships of said incoming topology-mapping or said incoming layer-mapping and to modify said packet in accordance with switching-identifiers of an outgoing set of edge-relationships of said outgoing topology-mapping or said outgoing layer-mapping, and forward said packet out of an output port, said output port being a point-of-attachment between said physical packet-switching node and said outgoing topology-mapping or said outgoing layer-mapping.

Forwarding entries for a physical non-packet-switching node within the recursive-path of a requested-path are calculated by performing the below method comprising the following actions:

i. if the recursive-path does not contain an incoming topology-mapping or an incoming layer-mapping for said physical non-packet-switching node, and said physical non-packet-switching node is mapped to a source network of the recursive-path through one or more depth-mappings, creating for each outgoing topology-mapping and each outgoing layer-mapping of said physical non-packet-switching node in said recursive-path an instruction instructing said physical non-packet-switching node to create a signal in accordance with a switching-identifiers of an outgoing set of edge-relationships of said outgoing topology-mapping or said outgoing layer-mapping, and to send said signal out of an output port, said output port being a point-of-attachment between said physical non-packet-switching node and said outgoing topology-mapping or said outgoing layer-mapping, ii. else if the recursive-path does not contain an outgoing topology-mapping or an outgoing layer-mapping for said physical non-packet-switching node, and said physical non-packet-switching node is mapped to a destination network of the recursive-path through one or more depth-mappings, creating for each incoming topology-mapping and each incoming layer-mapping of said physical non-packet-switching node in said recursive-path an instruction instructing said physical non-packet-switching node to receive at an input port a signal in accordance with switching-identifiers of an incoming set of edge-relationships of said incoming topology-mapping or said incoming layer-mapping, said input port being a point-of-attachment of between said physical non-packet-switching node and said incoming topology-mapping or said incoming layer-mapping, iii. else if the recursive-path does contain one incoming topology-mapping or one incoming layer-mapping for said physical non-packet-switching node and the recursive-path does contain one or more outgoing topology-mappings or outgoing layer-mappings for said physical non-packet-switching node, creating for each outgoing topology-mapping and each outgoing layer-mapping of said physical non-packet-switching node in said recursive-path an instruction instructing said physical non-packet-switching node to receive an incoming signal at an input port in accordance with switching-identifiers of an incoming set of edge-relationships of said incoming topology-mapping or said incoming layer-mapping, said input port being a point-of-attachment between said physical non-packet-switching node and said incoming topology-mapping or said incoming layer-mapping specified by the recursive-path, and to modify said signal in accordance with switching-identifiers of an outgoing set of edge-relationships of said outgoing topology-mapping or said outgoing layer-mapping, and forward said signal out of an output port, said output port being a point-of-attachment between said physical non-packet-switching node and said outgoing topology-mapping or said outgoing layer-mapping.

As will be understood by a person skilled in the art, at action iii) above in case of a physical packet-switching node and at action iii) above in case of a physical non-packet-switching node, a signal may be switched, multiplexed or de-multiplexed, depending on the combination of type of incoming edge and type of outgoing edge as follows:

IF an incoming edge of a physical node is a topology-mapping AND an outgoing edge of said physical node is a topology-mapping, perform a switch operation, IF an incoming edge of a physical node is a layer-mapping increasing in layer AND an outgoing edge of said physical node is a layer-mapping decreasing in layer, perform a switch operation, IF an incoming edge of a physical node is a layer-mapping decreasing in layer AND an outgoing edge of said physical node is a topology-mapping, perform a multiplex operation, IF an incoming edge of a physical node is a layer-mapping decreasing in layer AND an outgoing edge of said physical node is a layer-mapping decreasing in layer, perform a multiplex operation, IF an incoming edge of a physical node is a topology-mapping AND an outgoing edge of said physical node is a layer-mapping increasing in layer, perform a de-multiplex operation, IF an incoming edge of a physical node is a layer-mapping increasing in layer AND an outgoing edge of said physical node is a layer-mapping increasing in layer, perform a de-multiplex operation.

As will be understood by a person skilled in the art, a signal may be transmitted or received in a host node, depending on the combination of type of incoming edge and type of outgoing edge as follows:

At action i) above a transmit operation is performed, depending on the combination of type of incoming edge and type of outgoing edge as follows:

IF an outgoing edge of said physical node is a topology-mapping or a layer-mapping and said physical node has no incoming topology-mapping or layer-mapping, perform a transmit operation, At action ii) above a receive operation is performed, depending on the combination of type of incoming edge and type of outgoing edge as follows:

IF an incoming edge of said physical node is a topology-mapping or a layer-mapping and said physical node has no outgoing topology-mapping or layer-mapping, perform a receive operation.

Figure 12A:
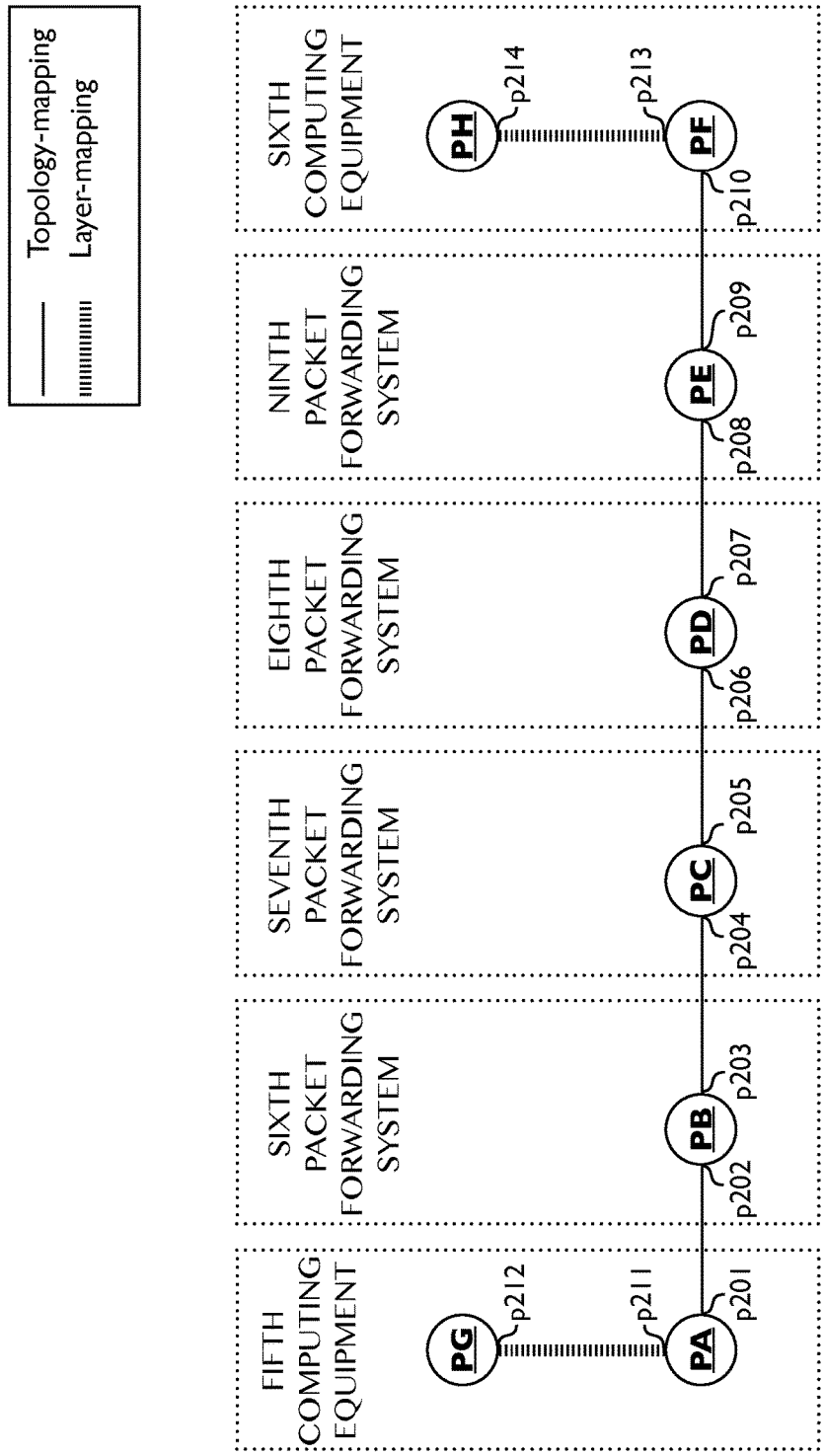
FIG. 12A is a diagram showing physical nodes PA and PG, representing a fifth computing equipment, a physical node PB, representing a sixth packet forwarding system, a physical node PC, representing a seventh packet forwarding system, a physical node PD, representing a eighth packet forwarding system, a physical node PE, representing a ninth packet forwarding system and physical nodes PF and PH, representing a sixth computing equipment interconnected by physical links.
Figure 12B:
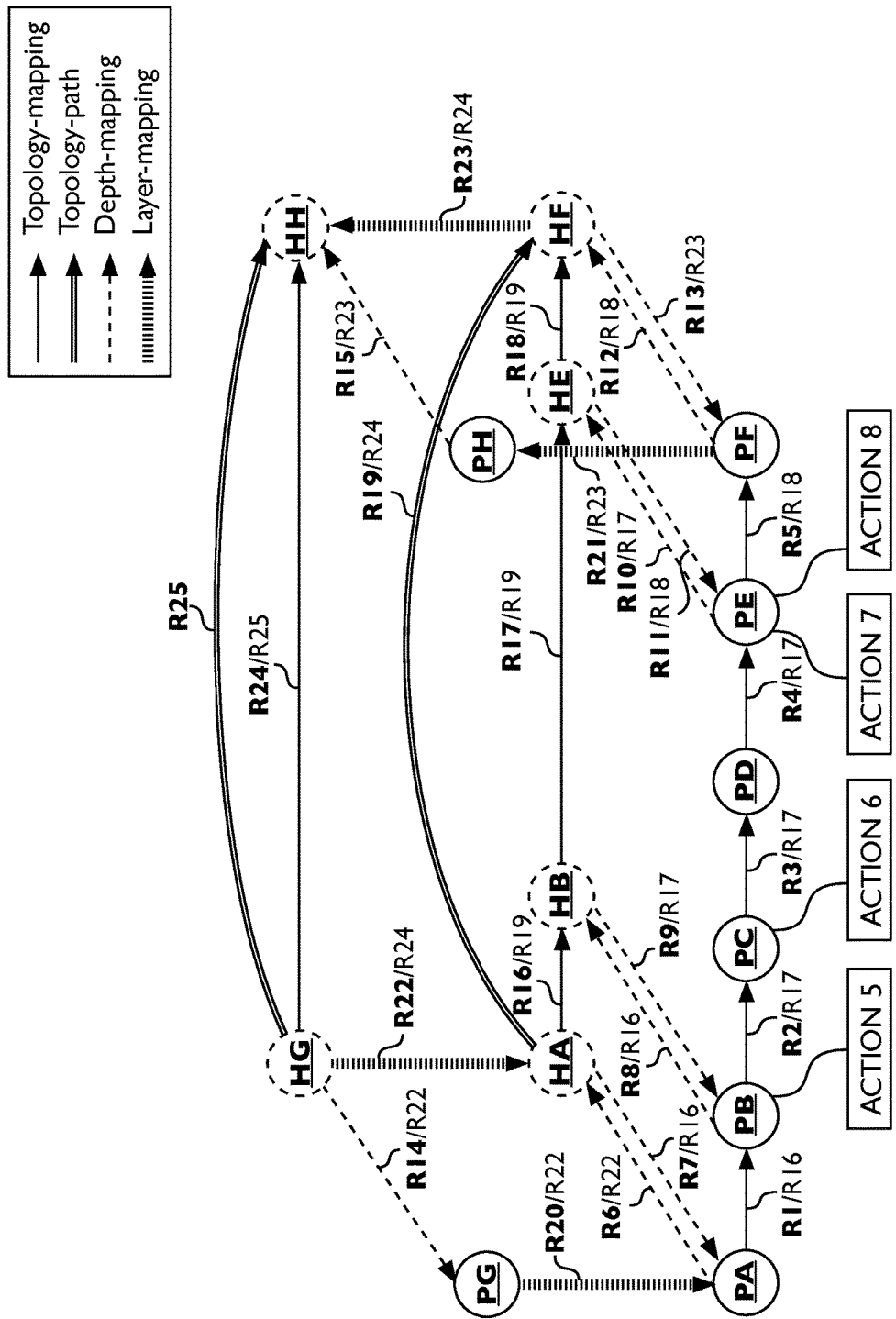
FIG. 12B is a diagram showing physical nodes PA, PB, PC, PD, PE, PF, PG, PH, and logical nodes HA, HB, HE, HF, HG, HH, depth-mappings, topology-mappings and topology-paths.

We now consider a example comprising multiple layers. FIG. 12A shows physical nodes PA and PG, representing a fifth computing equipment, a physical node PB, representing a sixth packet forwarding system, a physical node PC, representing a seventh packet forwarding system, a physical node PD, representing a eighth packet forwarding system, a physical node PE, representing a ninth packet forwarding system and physical nodes PF and PH, representing a sixth computing equipment interconnected by physical links. FIG. 12A also shows PoAs p201 through p214. FIG. 12B shows physical nodes PA, PB, PC, PD, PE, PF at (d=0, n=0, h=0) and physical nodes PG and PH at (d=0, n=1, h=0). FIG. 12B also shows logical nodes HA, HB, HE, HF at (d=1, n=0, h=0) and logical nodes HG and HH at (d=1, n=1, h=0). FIG. 12B also shows topology-mappings named R1 through R5, R16, R17, R18 and R24, depth-mappings named R6 through R15 layer-mappings named R20, R21, R22 and R23, and topology-paths named R19 and R25, represented as directed edges in a graph. FIG. 12B also shows that node PB can possibly perform an operation named 'action 5', node PC can possibly perform an operation named 'action 6', node PE can possibly perform operations named 'action 7' and 'action 8'.

FIG. 12C shows physical topology-mappings named R1 through R5, layer-mappings named R20 and R21 and depth-mappings named R6 through R15 per the notation of FIG. 6A. FIG. 12D shows topology-mappings named R16, R17, R18 and R24, layer-mappings named R22 and R23, and topology-paths named R19 and R25 per the notation of FIG. 6C. The topology-mappings named R1 through R5 represent physical links in a single direction. The topology-mappings named R16, R17 and R18 are calculated using the first method to calculate a topology-mapping, as shown in FIGS. 12B and 12D using the notation of FIG. 6C. The layer-mapping named R22 is calculated using the first method to calculate a layer-mapping The layer-mapping named R23 is calculated using the second method to calculate a layer-mapping. The topology-mapping named R24 is calculated using the second method to calculate a topology-mapping, as shown in FIGS. 12B and 12D. The topology-path named R19 is calculated of a concatenation of the topology-mappings named R16, R17 and R18. The topology-path named R25 comprises of the topology-mapping named R24, as shown in FIGS. 12B and 12D. We calculate the recursive-path of a requested topology-path named R25, as described above. Using the relationships shown in FIG. 12D we recursively calculate said recursive-path and a set of edge-relationships comprising nested edge-relationships for each edge. The resulting recursive-path of the topology-path named R25 is shown in FIG. 12E.

We denote a third operation by operation name 'action 5', and we denote a fourth operation by operation name 'action 7'. We define a third operation call as a combination of:
an operation name 'action 5' denoting an operation,
an edge named R19 denoting a packet on which said operation is to be performed,
a logical node HB denoting a location at which said operation is to be performed, We define a fourth operation call as a combination of:
an operation name 'action 7' denoting an operation,
an edge named R25 denoting a packet on which said operation is to be performed,
a logical node HE denoting a location at which said operation is to be performed, The third and fourth operation calls are shown in FIG. 12F.

The above actions i) through iii) of the method described above are illustrated using the second example.

Action i): As shown in FIG. 12B, physical node PB can possibly perform action 5, therefore operation name 'action 5' is stored with physical node PB. As shown in FIG. 12B, physical node PC can possibly perform action 6, therefore operation name 'action 6' is stored with physical node PC. As shown in FIG. 12B, physical node PE can possibly perform action 7 and action 8, therefore operation names 'action 7' and 'action 8' are stored with physical node PE.

Action ii): storing one or more operation calls each identified by a combination of an operation name (action 5; action 7) denoting an operation, at least one edge (R19; R25), and a logical node (HB; HE) at which said operation should be performed, as defined by a user of an SDN Compiler, as shown in FIG. 12F.

Action iii): explained for said third operation:
creating an instruction to perform an additional operation, being one of said stored operations on a packet or signal by one of said physical nodes (PB) IF an operation call as identified by a combination of an operation name ('action 5'), at least one edge (R19), and a logical node (HB), has been defined, AND a recursive-path (R25) contains a concatenation of one or more first depth-mappings (R8) increasing in depth from said one of said physical nodes (PB) to one of said logical nodes (HB) of said operation call and one or more second depth-mappings (R9) decreasing in depth from said one of said logical nodes (FIB) of said operation call, to said one of said physical nodes (PB), AND said at least one edge (R19) of said operation call is contained in a set of incoming edge-relationships (R1/R16/R19/R24/R25) of a physical topology-mapping (R1) or physical layer-mapping of said one of said physical nodes (PB), AND said at least one edge (R19) of said operation call is contained in a set of outgoing edge-relationships (R2/R17/R19/R24/R25) of a physical topology-mapping (R2) or physical layer-mapping of said one of said physical nodes (PB), AND said additional operation name ('action 5') of said operation call is stored with said one of said physical nodes (PB). Therefore above statement being TRUE.

Action iii): explained for said fourth operation:
  creating an instruction to perform an additional operation, being one of said stored operations on a packet or signal by one of said physical nodes (PE) IF an operation call as identified by a combination of an operation name ('action 7'), at least one edge (R25), and a logical node (HE), has been defined, AND a recursive-path (R25) contains a concatenation of one or more first depth-mappings (R10) increasing in depth from said one of said physical nodes (PE) to one of said logical nodes (HE) of said operation call and one or more second depth-mappings (R11) decreasing in depth from said one of said logical nodes (HE) of said operation call, to said one of said physical nodes (PE), AND said at least one edge (R25) of said operation call is contained in a set of incoming edge-relationships (R4/R17/R19/R24/R25) of a physical topology-mapping (R4) or physical layer-mapping of said one of said physical nodes (PE), AND said at least one edge (R25) of said operation call is contained in a set of outgoing edge-relationships (R5/R18/R19/R24/R25) of a physical topology-mapping (R5) or physical layer-mapping of said one of said physical nodes (PE), AND said additional operation name ('action 7') of said operation call is stored with said one of said physical nodes (PE). Therefore above statement being TRUE.

In this example, but not limited to, physical nodes named PA, PB, PC, PD, PE, PF have physical datalink layer (OSI layer 2) Media Access Control (MAC) and network layer (OSI layer 3) functionality. In this example, but not limited to, physical nodes named PG and PH have transport layer (OSI layer 4) and application layer (OSI layer 7) functionality. We consider nodes at (d=1, n=0, h=0) to represent logical nodes at the networking layer (OSI layer 3). And consider nodes at (d=1, n=1, h=0) to represent logical nodes at the transport layer (OSI layer 4) and application layer combined (OSI layer 7). FIG. 12G shows, as an example but not limited to, switching-identifiers for the edges named R1 through R5, R19 and R25. The switching-identifier of edge R1 is 'Source p201, Destination p202', at (d=0, n=0, h=0), denoting physical PoA's at the datalink layer, performing Media Access Control (MAC). As will be understood by a person skilled in the art, in an implementation an Ethernet MAC address could be used as Point-of-Attachment (PoA), instead of the example PoAs p201 and p202 used in this example. The switching-identifier of edges R2 through R5 also denote physical PoA's at the datalink layer, performing MAC. At (d=1, n=0, h=0) we use the 3-tuple of an IPv6 Source Address, an IPv6 Destination Address and a IPv6 Flow Label, providing IPv6 flow classification. We use an IPv6 address denoting a Point-of-Attachment, being an interface, of logical node HA and the topology-mapping named R16 with value '1:2:3:4:11:11:11:10'. We use an IPv6 address denoting a Point-of-Attachment, being an interface, of logical node HF and the topology-mapping named R18 with value '1:2:3:5:11:11:11:13. The switching-identifier of edge R19 is 'Source 1:2:3:4:11:11:11:10, Destination 1:2:3:5:11:11:11:13, FLOW-LABEL 100', as shown in FIG. 12G. Note that in the representation of the Source and Destination IPv6 addresses leading zeroes have been omitted. A value '100' is used for the IPv6 Flow Label. Alternatively, as described in PCT/EP2014/055640 (page 245), within an IPv6 address the Interface Identifier of an IPv6 address could be used to identify the logical node, while the remainder of the address, consisting of networks that are not nodes, could be denoted by subnetting of the IPv6 Global Routing Prefix and/or Subnet Identifier address.

To allow for mobility, in general terms, a first topology-mapping between a first physical node and a second physical node is removed and a second topology-mapping between said second physical node and a third physical node is created resulting in mobility of said second physical node. For instance, a node could use as its IPv6 address an IPv6 Interface Identifier identifying the node and a special value denoting 'unspecified' as IPv6 Global Routing Prefix or Subnet Identifier. In other words, the address only specifies the node, not the network the node is residing in. Therefore, higher layer protocols such as, but not limited to, TCP as well as applications are not impacted in case of migration of the node to another network. Alternatively, as described in PCT/EP2014/055640 (page 250), an IPv6 address can be used to identify a node and an IPv6 address can be used to identify a network which is not a node, allowing for mobility. At (d=1, n=1, h=0) we use the 3-tuple of a Protocol (being a transport identifier), a Source Port and a Destination Port. The switching-identifier of edge R25 is the 3-tuple of 'TCP, Source port 80, Destination port 80' denoting the combination of 'Transmission Control Protocol' and well-known port 80 used for HTTP, as both source and destination. Alternatively, 'PROTOCOL=6' could have been used instead of 'TCP', denoting the TCP protocol.

Note that edges other than edges R1 through R5, R19 and R25 do not have a switching-identifier assigned.

The recursive-path of the topology-path named R25 contains the following information for each physical node in said recursive-path, being physical nodes PA, PB, PC, PD, PE, PF, PG and PH, as shown in FIG. 12H:
  an input port,
  an output port,
  a set of incoming edge-relationships,
  a set of outgoing edge-relationships.

Note that above input port, output port, a set of incoming edge-relationships, and a set of outgoing edge-relationships is the information contained in the topology-mappings named R1 through R5 and layer-mappings named R20 and R21.

The number of edges within a set of incoming and/or outgoing edge-relationships may be reduced by determining a relevant incoming and/or outgoing set of edge-relationships as described above (cf. PCT/EP2014/055640, page 197). The combination of above input port, output port, a set of incoming edge-relationships, a set of outgoing edge-relationships, and switching-identifiers of incoming set of edge-relationships and switching-identifiers of outgoing set of edge-relationships results in forwarding entries for physical nodes. The method described above may be used to calculate forwarding entries for a physical packet-switching node. The method described above may be used to calculate forwarding entries for a physical non-packet-switching node.

We present in alternative method to create forwarding entries, in which the amount of recursively calculated and stored nested edge-relationships is reduced.

PCT/EP2014/055640 (page 175) describes a second method for calculating a topology-mapping, comprising the following actions (in slightly modified wording):
  Calculating and storing a first topology-mapping from a first network at (d, n, h1) to a second network at (d, n, h1) as a concatenation of a first layer-mapping from said first network to a third network at (d, n−y, h2), a topology-path from said third network to a fourth network at (d, n−y, h2) and a second layer-mapping from said fourth network to said second network with y being larger than zero and smaller than or equal to n−n_min(d), n_min(d) being a lowest layer at particular depth d and n_min(d) being =>0, said topology-path being a concatenation of one or more second topology-mappings, optionally storing for each of said topology-mappings edge-relationships comprising a first edge-relationship (R22/R24) being a relationship between the first layer-mapping and said first topology-mapping, one or more second edge-relationships (R19/R24) each second edge-relationship being a relationship between one of said one or more second topology-mappings in said topology-path and said first topology-mapping or a second edge-relationship being a relationship between said topology-path and said first topology-mapping and one or more fourth edge-relationships each fourth edge-relationship being a relationship between one of said one or more second topology-mappings and said topology-path, and a third edge-relationship (R23/R24) being a relationship between the second layer-mapping and said first topology-mapping, Note that in the above description of said second method for calculating a topology-mapping a topology-path is used instead of a topology-level-path to aid the explanation. The described method can also be applied when using a topology-level-path in the second method for calculating a topology-mapping.

As will be understood by a person skilled in the art, typically different layers use different identifiers and forwarding or switching is performed based on the identifiers of said layer. Therefore, we perform the following actions, as shown in FIG. 12H:

a) After the calculation of a recursive-path of a requested-path (R25), removing from all sets of edge-relationships (R1/R16/R19/R24/R25; R2/R17/R19/R24/R25; R3/R17/R19/R24/R25; R4/R18/R19/R24/R25; R5/R18/R19/R24/R25) containing said second edge-relationship (R19/R24) said second edge-relationship (R19/R24) calculated using the second method for calculating topology-mappings, and any following edge-relationships (R24/R25), but retaining one or more edges (R25) when an instruction to perform an additional operation is to be created for one of said physical nodes (PE) per a defined operation call as identified by a combination of an operation name (action 7), at least one edge (R25), and a logical node (HE), b) After the calculation of a recursive-path of a requested-path (R25), removing from an incoming set of edge-relationships (R20/R22/R24/R25) of all incoming layer-mappings (R20) decreasing in layer of all physical nodes (PA) in said recursive-path, said first edge-relationship (R22/R24) calculated using the second method for calculating topology-mappings, and any following edge-relationships (R24/R25), but retaining one or more edges when an instruction to perform an additional operation is to be created for one of said physical nodes (PE) per a defined operation call as identified by a combination of an operation name, at least one edge, and a logical node, c) After the calculation of a recursive-path of a requested-path (R25), removing from an outgoing set of edge-relationships (R21/R23/R24/R25) of all outgoing layer-mappings (R21) increasing in layer of all physical nodes (PA) in said recursive-path, said third edge-relationship (R23/R24) calculated using the second method for calculating topology-mappings, and any following edge-relationships (R24/R25), but retaining one or more edges when an instruction to perform an additional operation is to be created for one of said physical nodes (PE) per a defined operation call as identified by a combination of an operation name, at least one edge, and a logical node, Note that in FIG. 12H that the edge R25 is retained in the incoming set of edge-relationships and in the outgoing set of edge-relationships of physical node PE as an instruction to perform an additional operation is to be created for one of said physical nodes (PE) per a defined operation call as identified by a combination of an operation name (action 7), at least one edge (R25), and a logical node (HE).

The combination of above input port, output port, a set of incoming edge-relationships, and a set of outgoing edge-relationships as shown in FIG. 12H and the switching-identifiers shown in FIG. 12G results in the forwarding entries for physical nodes PA, PB, PC, PD, PE, PF, PG and PH, as shown in columns two through six of in FIG. 12I. The first column of FIG. 12I shows an equipment.

Said forwarding entries comprise of an input port, an output port, the switching-identifiers of an incoming set of edge-relationships and the switching-identifiers of an outgoing set of edge-relationships, and an operation to perform on an edge as shown in the seventh column of FIG. 12I. The edge to perform said operation upon is shown between brackets. In FIG. 12I the switching-identifiers of an edge are shown between brackets after each edge. In FIG. 12I, 'Source' has been abbreviated by 'SRC', and 'Destination' has been abbreviated by 'DST'. Note that in the sixth packet forwarding system a packet is forwarded at the network layer (OSI layer 3) based on the switching-identifier of the topology-path named R19, being 'Source 1:2:3:4:11:11:11:10, Destination 1:2:3:5:11:11:11:13, FLOW-LABEL 100', and an operation named 'action 5' is performed on an incoming packet based on the switching-identifier of the topology-path named R19, being 'Source 1:2:3:4:11:11:11:10, Destination 1:2:3:5:11:11:11:13, FLOW-LABEL 100'. Note that in the ninth packet forwarding system a packet is forwarded at the network layer (OSI layer 3) based on the switching-identifier of the topology-path named R19, being 'Source 1:2:3:4:11:11:11:10, Destination 1:2:3:5:11:11:11:13, FLOW-LABEL 100', and an operation named 'action 7' is performed on an incoming packet based on the switching-identifier of the topology-path named R25, being 'Source 1:2:3:4:11:11:11:10, Destination 1:2:3:5:11:11:11:13, FLOW-LABEL 100'.

Note that in case said fourth operation call would not have been defined, physical node PE would perform MAC based on switching-identifiers of the edges R24 and R25 and would forward a packet based on a switching-identifiers of the edge R19 and not on a switching-identifier of edge R25.

Note that when additionally a requested topology-path R19 would have been created, physical node PE would have a forwarding instruction as shown in FIG. 12I and also a forwarding instruction comprising of switching-identifiers of the edges R24 and R25, performing MAC on a datalink layer, and of switching-identifier of the edge R19, performing packet forwarding on the network layer.

Said additional operations performed on a received packet may include monitoring a packet header, modifying said packet header, recording said packet header, buffering said packet header, monitoring a packet payload, modifying said packet payload, recording said packet payload, buffering said packet payload and buffering the packet and/or blocking the packet. The described method can be used for example, but not limited to, to implement functionality typically residing in so-called middle-boxes.

As described in PCT/EP2014/055640 (pages 126 and 245) when using a virtual resource, such as for example but not limited to a virtual machine or container, the above method provides for Network Functions Virtualization (NFV), in which a virtual node could perform optional operations such as but not limited to monitoring and/or recording and/or buffering and/or modifying of the incoming packet header and/or payload before forwarding the packet to one or more of it's output ports, or blocking an incoming packet. Note that virtual nodes, such as a Virtual Machine are represented as physical nodes in the method (cf. PCT/EP2014/055640 page 186), as described above. Note that in above description reference is made to 'forwarding entries' also in case of host node, used as a single term for instructions for physical equipment. As will be understood by a person skilled in the art, a host node is not forwarding, but only sending and receiving packets or signals.

Figures 13A, 13B, 13C, 13D:
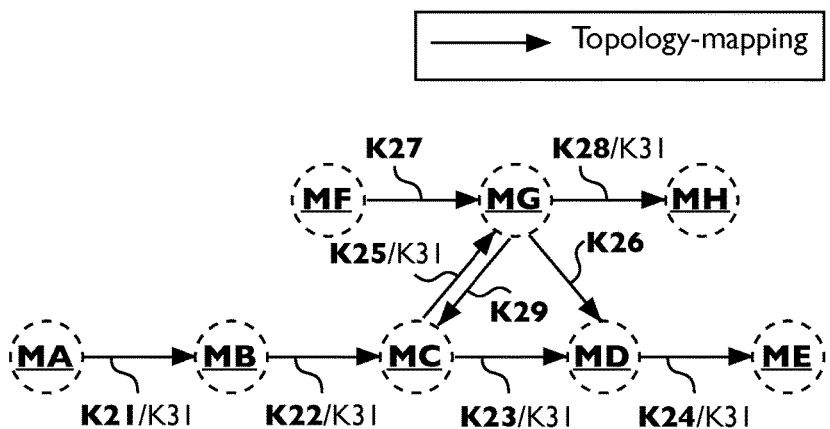
FIG. 13A is a diagram showing the notation used for a fourth edge with a fourth edge name, the fourth edge being of a fourth edge-type, and comprising of a first concatenation and a second concatenation in parallel, as denoted by the "&" sign.
FIG. 13B is a diagram showing logical nodes MA, MB, MC, MD, ME, MF, MG and MH, topology-mappings named K21 through K29 and a topology-path named K31.
FIG. 13C is a diagram showing topology-path named K31 per the notation of FIG. 6C.
FIG. 13D is a diagram showing topology-path named K31 per the notation of FIG. 6C.

As described above, a topology-path is a concatenation of topology-mappings (cf PCT/EP2014/055640 page 174). A first topology-path can comprise of a second topology-path, creating a nesting of the first topology-path and the second topology-path. PCT/EP2014/055640 FIG. 63D (described on pages 253 and 254) shows the notation used for a fourth edge with a fourth edge name, the fourth edge being of a fourth edge-type, and comprising of a first concatenation and a second concatenation in parallel. This notation is shown in FIG. 13A as well. The "&" sign denotes a start of a concatenation, said concatenation shown between brackets "( )", that is parallel to one or more other concatenations. The series of dots in FIG. 13A indicating an arbitrary number of concatenations equal to or higher than two. The usage of the "&" sign is not limited to the example disclosed in PCT/EP2014/055640 FIG. 63C but can be used in general. Therefore, a topology-path can comprise of two or more parallel concatenations, each of said parallel concatenations being a concatenation of zero or more topology-mappings at (d, n, h) and zero or more topology-paths at (d, n, h), said number of topology-mappings and said number of topology-paths being such that their sum is at least one. As an example, but not limited to, FIG. 13B shows a logical nodes MA, MB, MC, MD, ME, MF, MG and MH, topology-mappings named K21 through K29. A topology-path named K31 is mapped to topology-mappings K21 through K25 and K28 as indicated by K21/K31, K22/K31, K23/K31, K24/K31, K25/K31, K28/K31 in FIG. 13B.

FIG. 13C shows the topology-path named K31 per the notation of FIG. 6C. In FIG. 13C the "&" sign denotes a start of a concatenation, said concatenation shown between brackets "( )", that is parallel to one or more other concatenations as described above. Using "(A+B)/C" is equal to "A/C+B/C", in which A, B, C are edges (cf. PCT/EP2014/055640 page 214), the topology-path named K31 can be written in an equivalent shorter notation shown in FIG. 13D.

As described above we denote an operation by an operation name. Each operation name denoting one operation.

We define an operation call as a combination of:
an operation name denoting an operation,
at least one edge,
a node denoting a location at which said operation is to be performed, In a source node an additional operation may be performed before a transmitting operation. In a destination node an additional operation may be performed after a receiving operation.

Note that said at least one edge in a logical network may be a topology-mapping, a layer-mapping, a topology-path, a level-path or a topology-level-path.

Note that said at least one edge in a logical network may be an edge in an incoming set of edge-relationships, referred to as an incoming edge, an edge in an outgoing set of edge-relationships, referred to as an outgoing edge, or an edge in an incoming set of edge-relationships and in an outgoing set of edge-relationships. In the latter case said at least one edge is traversing a logical node and is referred to as a traversing edge.

Figures 13E, 13F:
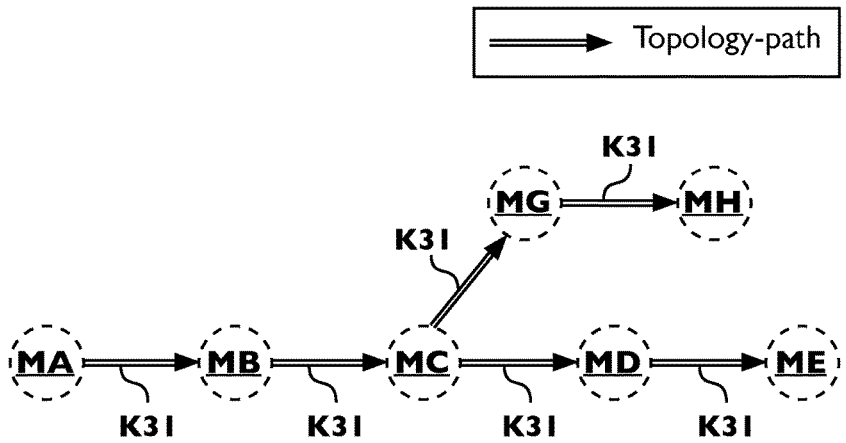
FIG. 13E is a diagram showing logical nodes MA, MB, MC, MD, ME, MG, MH, and a topology-path named K31.
FIG. 13F is a diagram showing operation calls comprising of an operation name denoting an operation, at least one edge, a node denoting a location at which said operation is to be performed.

FIG. 13F shows example operation calls comprising of an operation name denoting an operation, at least one edge, a node denoting a location at which said operation is to be performed. As shown in FIG. 13B, at node MA the outgoing set of edge-relationships contains the topology-path named K31. As shown in FIG. 13B, at nodes MB and MC the incoming set of edge-relationships and the outgoing set of edge-relationships contain the topology-path named K31. As shown in FIG. 13B, at node MD the incoming set of edge-relationships contains the topology-mapping named K23. As shown in FIG. 13B, at node ME the incoming set of edge-relationships contains the topology-path named K31. As shown in FIG. 13B, at node MG the outgoing set of edge-relationships contains the topology-mapping named K28. As shown in FIG. 13B, at node MH the incoming set of edge-relationships contains the topology-mapping named K28 and the topology-path named K31, per the edge-relationship K28/K31.

As described above, an operation call be specified in a logical network, being a combination of:
an operation name denoting an operation,
at least one edge in a logical network, denoting a packet or signal on which said operation should be performed,
a logical node in a logical network denoting a location at which said operation is to be performed.

FIG. 13F also shows whether said at least one edge is an incoming edge, an outgoing edge or a traversing edge. Note that this information is not part of said operation call, as this information is known based on the definition topology-mappings, layer-mappings and topology-paths.

Figure 15A:
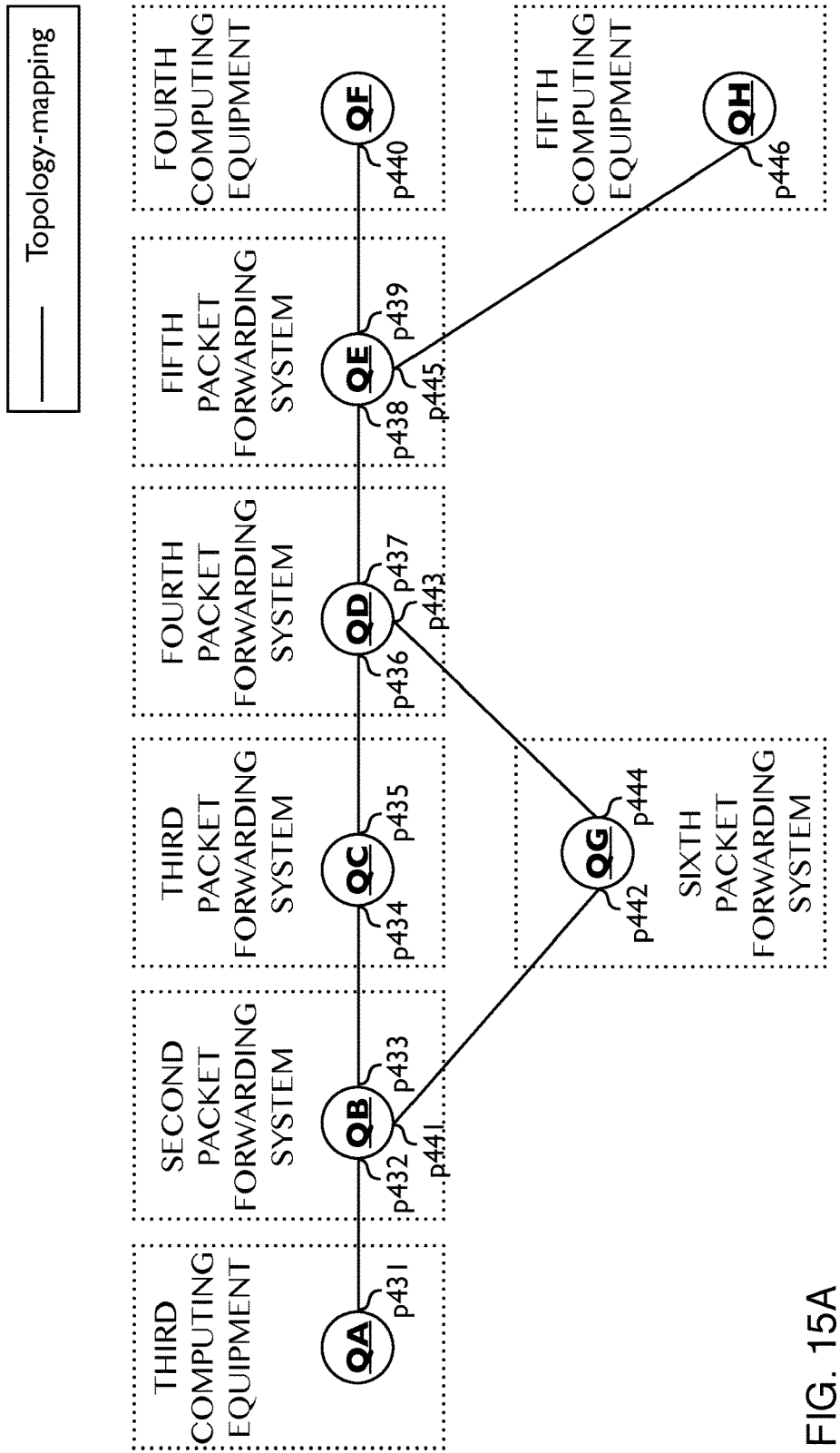
FIG. 15A is a diagram showing a physical node QA, representing a third computing equipment, a physical node QB, representing a second packet forwarding system, a physical node QC, representing a third packet forwarding system, a physical node QD, representing a fourth packet forwarding system, a physical node QE, representing a fifth packet forwarding system, a physical node QF, representing a fourth computing equipment, a physical node QG, representing a sixth packet forwarding system and a physical node QH, representing a fifth computing equipment interconnected by physical links.

The SDN Compiler method described in PCT/EP2014/055640 is now extended with the following actions:
i) storing one or more operation names, and storing one or more operation calls each identified by a combination of an operation name, at least one edge, and a logical node denoting a location at which said operation is to be performed,
ii) Creating an instruction to perform an additional operation, being one of said stored operations, on a packet or signal by one of said physical nodes IF an operation call as identified by a combination of an operation name, at least one edge, and said one of said logical nodes, has been defined AND a recursive-path contains a concatenation of one or more second depth-mappings increasing in depth from said one of said physical nodes to one of said logical nodes and/or a concatenation of one or more first depth-mappings decreasing in depth from said one of said logical nodes to said one of said physical nodes, AND said at least one edge is contained in an incoming set of edge-relationships of an incoming physical topology-mapping or physical layer-mapping and/or an outgoing set of edge-relationships of an outgoing physical topology-mapping or physical layer-mapping of said one of said physical nodes within said recursive-path, Optionally, we perform the following actions:
iii) storing one or more operation names of those physical nodes that can perform one or more operations, each operation name denoting one operation, iv) at action ii) above the additional condition: AND said additional operation name is stored with said one of said physical nodes, The above method is illustrated by an example, but not limited to, shown in FIGS. 15A through 15I. FIG. 15A shows physical node QA, representing a third computing equipment, a physical node QB, representing a second packet forwarding system, a physical node QC, representing a third packet forwarding system, a physical node QD, representing a fourth packet forwarding system, a physical node QE, representing a fifth packet forwarding system, a physical node QF, representing a fourth computing equipment, a physical node QG, representing a sixth packet forwarding system and a physical node QH, representing a fifth computing equipment interconnected by physical links.

Figure 15B:
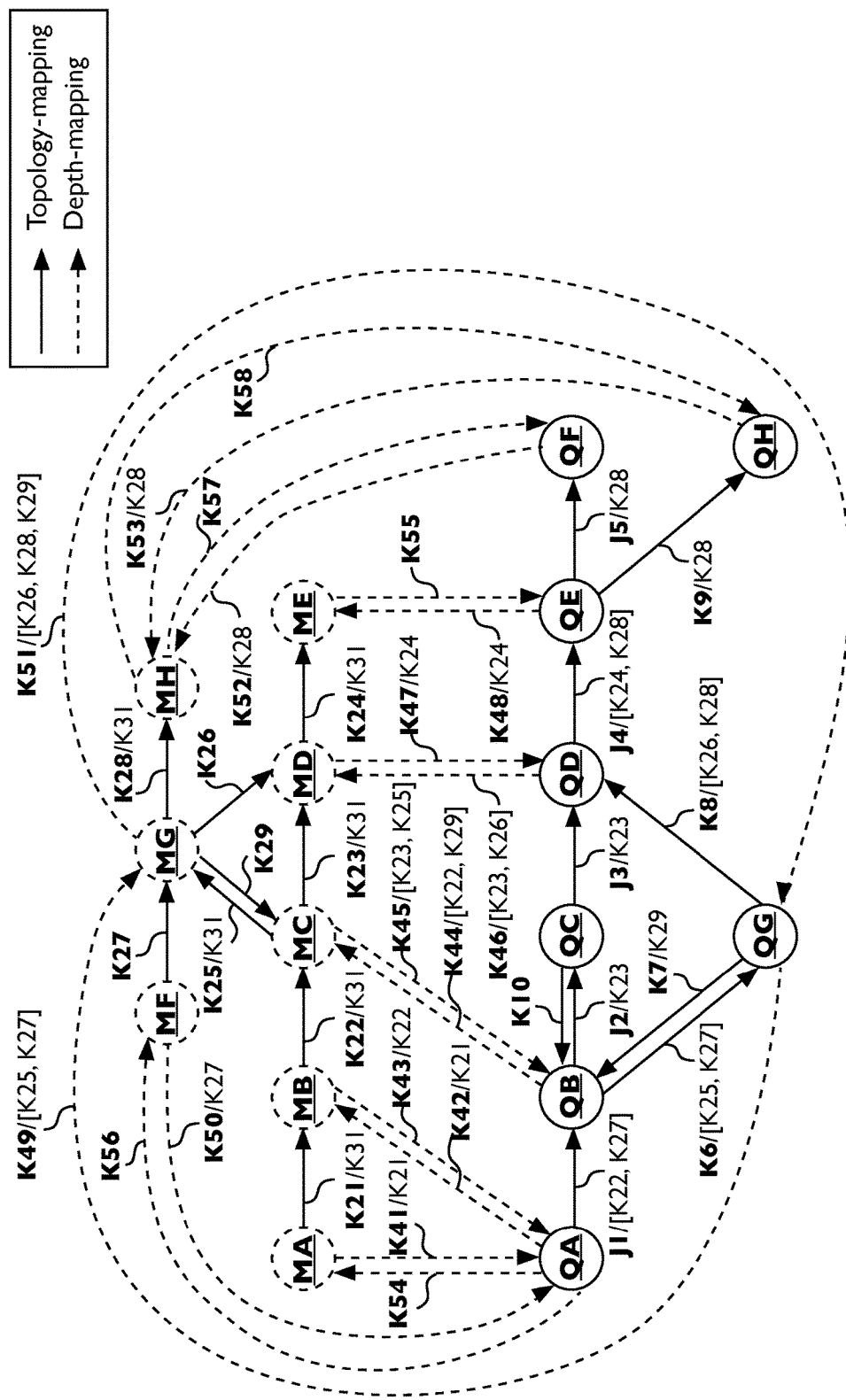
FIG. 15B is a diagram showing physical nodes QA, QB, QC, QD, QE, QF, QG, QH and logical nodes MA, MB, MC, MD, ME, MF, MG, MH, depth-mappings and topology-mappings.

FIG. 15B shows physical nodes QA, QB, QC, QD, QE, QF, QG, QH and logical nodes MA, MB, MC, MD, ME, MF, MG, MH, depth-mappings K41 through K58 and topology-mappings J1 through J5 and K6 through K10.

FIG. 15C shows physical topology-mappings named J1 through J5 and K6 through K10 per the notation of FIG. 6A. The topology-mappings named J1 through J5 and K6 through K10 represent physical links in a single direction.

FIG. 15D shows depth-mappings named K41 through K58 per the notation of FIG. 6A. FIG. 15E shows topology-mappings named K21 through K29 per the notation of FIG. 6C. The topology-mappings named K21 through K29 are calculated using the first method to calculate a topology-mapping. Note that the source node of the topology-mapping named K21 is logical node MA, the destination node of the topology-mapping named K21 is logical node MB, and that both logical node MA and logical node MB are mapped to physical node QA through depth-mappings.

In FIG. 15E the "&" sign denotes a start of concatenation, said concatenation shown between brackets "( )", that is parallel to one or more other concatenations (cf. PCT/EP2014/055640 page 253). Note that logical node MH is mapped to both physical node QF and QH. Therefore, the topology-mapping named K28 comprises of parallel concatenations as shown in FIG. 15E.

We calculate the recursive-path of the requested topology-path named K31, as described above. Using the relationships shown in FIG. 15E we recursively calculate said recursive-path and a set of edge-relationships comprising nested edge-relationships for each edge as shown in FIG. 15F.

FIG. 15G shows for physical nodes QA, QB, QC, QD, QE, QF, QG, QH and logical nodes MA, MB, MC, MD, ME, MG, MH in the recursive-path calculated from the requested topology-path named K31 an input port, an output port, incoming set of edge-relationships, outgoing set of edge-relationships, as per the recursive-path shown in FIG. 15F. Note that in FIG. 15G brackets ( ) and &-sign are shown as per the recursive-path shown in FIG. 15F to denote start and end of parallel concatenations.

FIG. 15G also shows for logical nodes MA, MB, MC, MD, ME, MG, MH an additional operation to perform, denoted by an operation name, as per the operation calls shown in FIG. 13F.

We apply the above described actions i) and ii):
i) storing one or more operation names, storing one or more operation calls each identified by a combination of an operation name, at least one edge, and a logical node denoting a location at which said operation is to be performed (['F1':K27:MF]; ['F2':K31:MB]; ['F3': K31:MC]; ['F4':K23:MD]; ['F5':K31:ME]; ['F6': K28:MG]; ['F7':K28/K31:MH]), ii) Creating an instruction to perform an additional operation, being one of said stored operations, on a packet or signal by one of said physical nodes (-; QA; QB; QD; QE; QG; QF, QH) IF an operation call as identified by a combination of an operation name (F1; F2; F3; F4; F5; F6; F7), at least one edge (K27; K31; K31; K23; K31; K28; K28/K31), and said one of said logical nodes (MA; MB; MC; MD; ME; MG; MH), has been defined AND a recursive-path (K31) contains a concatenation of one or more second depth-mappings (-; K42; K44; K46; K48; -; K52, K53) increasing in depth from said one of said physical nodes (-; QA; QB; QD; QE; -; QF, QH) to one of said logical nodes (MF; MB; MC; MD; ME; -; MH) and/or a concatenation of one or more first depth-mappings (-; K43; K45; -; -; K51; -) decreasing in depth from said one of said logical nodes (MF; MB; MC; -; -; MG; -) to said one of said physical nodes (-; QA; QB; -; -; QG; -), AND said at least one edge (K27; K31; K31; K23; K31; K28; K28/K31) is contained in an incoming set of edge-relationships of an incoming physical topology-mapping (-; -; J1; J3; J4; -; J5, K9) or physical layer-mapping and/or an outgoing set of edge-relationships of an outgoing physical topology-mapping (-; J1; J2, K6; -; -; K8; -) or physical layer-mapping of said one of said physical nodes (-; QA; QB; QD; QE; QG; QF, QH) within said recursive-path (K31), We consider physical node QA able to perform the additional operations named F1 and F2. We consider physical nodes QB, QD, QE, QF, QG, QH able to perform the additional operations named F3, F4, F5, F7, F6, F7 respectively.

We apply the above described optional actions iii) and iv):
iii) storing one or more operation names of those physical nodes (QA; QB; QD; QE; QF; QG; QH) that can perform one or more operations, each operation name (F1, F2; F3; F4; F5; F7; F6; F7) denoting one operation,
iv)—at action ii) above the additional condition: AND said additional operation name (F1; F2; F3; F4; F5; F6; F7) is stored with said one of said physical nodes (QA; QA; QB; QD; QE; QG; QF, QH).

As described above, the recursive-path of a requested topology-path contains the following information for each node at d=0, h=h_min being a physical node, as shown in FIG. 15H for the recursive-path of the requested topology-path named K31:

an input port, being a PoA between the physical or virtual node and a topology-mapping or a layer-mapping, with the exception of the first node in the recursive-path which does not have an input port as the packet or signal is created by the first node in the recursive-path an output port, being a PoA between the physical or virtual node and a topology-mapping or a layer-mapping, with the exception of the last node in the recursive-path which does not have an output port as the packet or signal is received by the last node in the recursive-path a set of incoming edge-relationships at the incoming topology-mapping or layer-mapping with the exception of the first node in the recursive-path which does not have an incoming topology-mapping or a layer-mapping a set of outgoing edge-relationships at the outgoing topology-mapping or layer-mapping with the exception of the last node in the recursive-path which does not have an outgoing topology-mapping or a layer-mapping FIG. 15H shows for physical nodes QA, QB, QC, QD, QE, QF, QG, QH in the recursive-path calculated from the requested topology-path named K31 an input port, an output port, incoming set of edge-relationships, outgoing set of edge-relationships. Per above described method, additional operations, denoted by an operation name F2, F3, F4, F5, F7, F6, F7 to be performed in physical nodes QA, QB, QD, QE, QF, QG, QH respectively, are shown in 15H as well.

The combination of above input port, output port, a set of incoming edge-relationships, a set of outgoing edge-relationships, switching-identifiers, and additional operations to perform result in forwarding entries for physical nodes, also referred to as forwarding instructions. The number of edges within a set of incoming and/or outgoing edge-relationships may be reduced by determining a relevant incoming and/or outgoing set of edge-relationships as described above. Forwarding entries for each physical node in the recursive-path comprise of an input port, an output port, the switching-identifiers of incoming set of edge-relationships, the switching-identifiers of outgoing set of edge-relationships and additional operations to perform. Above forwarding entries, are send to the physical nodes in the recursive-path, either directly or indirectly, as an example but not limited to, through an SDN Controller.

Note that when said at least one edge is an incoming edge or a traversing edge, action ii) is:
  Creating an instruction to perform an additional operation, being one of said stored operations, on a packet or signal by one of said physical nodes IF an operation call as identified by a combination of an operation name, at least one edge, said edge being an incoming edge or a traversing edge, and said one of said logical nodes, has been defined AND a recursive-path contains a concatenation of one or more second depth-mappings increasing in depth from said one of said physical nodes to one of said logical nodes AND said at least one edge is contained in an incoming set of edge-relationships of an incoming physical topology-mapping or physical layer-mapping of said one of said physical nodes within said recursive-path, As an alternative to action ii), the following action v) may be performed instead:
  v) Creating an instruction to perform an additional operation, being one of said stored operations, on a packet or signal by one of said physical nodes IF an operation call as identified by a combination of an operation name, at least one edge, and said one of said logical nodes, has been defined AND a recursive-path contains a second depth-mapping increasing in depth from said one of said physical nodes to one of said logical nodes and/or a first depth-mapping decreasing in depth from said one of said logical nodes to said one of said physical nodes, AND said at least one edge is contained in an incoming set of edge-relationships of said second depth-mapping and/or an outgoing set of edge-relationships of said first depth-mapping of said one of said logical nodes within said recursive-path, As an example, but not limited to, we apply the above described action v) to the example network shown in FIG. 15B:
  Creating an instruction to perform an additional operation, being one of said stored operations, on a packet or signal by one of said physical nodes (-; QA; QB; QD; QE; QG; QF, QH) IF an operation call as identified by a combination of an operation name (F1; F2; F3; F4; F5; F6; F7), at least one edge (K27; K31; K31; K23; K31; K28; K28/K31), and said one of said logical nodes (MF; MB; MC; MD; ME; MG; MH), has been defined AND a recursive-path (K31) contains a second depth-mapping (-; K42; K44; K46; K48; -; K52, K53) increasing in depth from said one of said physical nodes (-; QA; QB; QD; QE; -; QF, QH) to one of said logical nodes (MF; MB; MC; MD; ME; -; MH) and/or a first depth-mapping (-; K43; K45; -; -; K51; -) decreasing in depth from said one of said logical nodes (MF; MB; MC; -; -; MG; -) to said one of said physical nodes (-; QA; QB; -; -; QG; -), AND said at least one edge (K27; K31; K31; K23; K31; K28; K28/K31) is contained in an incoming set of edge-relationships of said second depth-mapping (-; K42; K44; K46; K48; -; K52, K53) and/or an outgoing set of edge-relationships of said first depth-mapping (-; K43; K45; -; -; K51; -) of said one of said logical nodes (MF; MB; MC; MD; ME; MG; MH) within said recursive-path (K31).

FIG. 15G shows for physical nodes QA, QB, QC, QD, QE, QF, QG, QH and logical nodes MA, MB, MC, MD, ME, MG, MH in the recursive-path calculated from the requested topology-path named K31 an input port, an output port, incoming set of edge-relationships, outgoing set of edge-relationships, and for logical nodes MF, MB, MC, MD, ME, MG, MH an additional operation to perform, denoted by an operation name. FIG. 15G illustrates above action v) applied to the example network shown in FIG. 15B. For example, the fourth row of FIG. 15G shows logical node MB, a second depth-mapping K42 increasing in depth from physical node QA to logical node MB, a first depth-mapping K43 decreasing in depth from logical node MB to physical node QA, and an operation name F2. Said at least one edge K31 is contained in an incoming set of edge-relationships K42/K21/K31 of said second depth-mapping K42 and in an outgoing set of edge-relationships K43/K22/K31 of said first depth-mapping K43 of said one of said logical nodes MB within said recursive-path K31.

Note that in physical node QB outgoing data named K23* is outputted from output port p433 and outgoing data named K25* is outputted from output port p441. Optionally, local state information may be used to determine which output port to use. For example, but not limited to, in case physical node QB is in a first state outgoing data named K23* may be outputted from output port p433. For example, but not limited to, in case physical node QB is in a second state outgoing data named K25* may be outputted from output port p441. For example, but not limited to, in case physical output port p433 is in a third state outgoing data named K23* may be outputted from output port p433. For example, but not limited to, in case physical output port p441 is in a fourth state outgoing data named K25* may be outputted from output port p441. The usage of local state information of a physical node, input port or output port may be used to perform protection switching. As will be understood by a person skilled in the art, a reduction in detection time of a failure and appropriate protection switching time may be realized by locally communicating physical link and/or physical node failures between physical nodes instead of relying on an SDN Compiler to calculate new forwarding entries. State of a physical node, input port or output port may be updated based on local communication. As an example but not limited to Bidirectional Forwarding Detection (BFD) may be used between two physical nodes to detect a one-way link failure.

Note that a topology-path is a directed graph itself. As an example but not limited to, the topology-path named K31 is a directed graph itself, as illustrated in FIG. 13E. FIG. 13E shows logical nodes MA, MB, MC, MD, ME, MG, MH, and the topology-path named K31. In comparison to FIG. 13B, in FIG. 13E the topology-mappings named K21 through K29 are not shown. Furthermore, a topology-path specifies the order in which topology-mappings are traversed, and consequently the order in which nodes are traversed. As an example but not limited to, the definition of the topology-path named K31, as shown in FIGS. 13C and 13D, specifies that topology-mapping K21 is traversed before topology-mapping K22, topology-mapping K23 is traversed before topology-mapping K22, and topology-mapping K25 is traversed before topology-mapping K22. Note that the topology-path named K31 results in multicasting from logical source node MA to logical destination nodes ME and MH.

A topology-path starting at one or more nodes, traversing one or more nodes, ending at one or more nodes, at which at least one operation call is defined results in one or more operation calls being performed sequentially or in parallel, and can be regarded a program comprising of one or more operation calls.

Said operation call and topology-path are defined by a user of an SDN Compiler, thereby providing programmability of a logical network to said user of an SDN Compiler. Said topology-path may be a requested topology-path. As an example, but not limited to, the requested topology-path named K31 can be regarded a program comprising of the operation calls shown in FIG. 13F.

Note that, as mentioned above, a first topology-path can comprise of a second topology-path, creating a nesting of the first topology-path and the second topology-path, and therefore creating a nesting of a first program represented by said first topology-path and a second program represented by said second topology-path.

An example of an additional operation is a transfer function. In a packet-switching network said transfer function transfers an incoming packet payload to an outgoing packet payload. A packet payload contains data. As said packet is in motion along a topology-path from a source node to a destination node, said data is in motion, and therefore said transfer function is performed on data in motion. In a non-packet-switching network said transfer function transfers an incoming signal to an outgoing signal. A signal contains data. As said signal is in motion along a topology-path from at least one source node to at least one destination node, said data is in motion, and therefore said transfer function is performed on data in motion. An example, but not limited to, of a transfer function is a process performed in software in computing equipment. Examples, but not limited to, of a transfer function are a process performed in software, a piece of computer code, a process performed in hardware, a physical process altering an incoming signal or digital signal processing.

As will be understood by a person skilled in the art, a network comprising of nodes in which a transfer function is performed on data in motion resembles a dataflow architecture. In a dataflow architecture the execution of an operation is solely based on the availability, or presence, of input arguments to an operation. In contrast, in a Von Neumann architecture the execution of an operation depends on a program counter. In a packet-switched network, said one or more input arguments to an operation are one or more packets. In a non-packet-switched network, said one or more input arguments to an instruction is a signal.

We consider the additional operations denoted by operation names F1 through F7, described above, to be transfer functions. FIG. 13G shows operation calls comprising of an operation name denoting an operation, at least one edge, a node denoting a location at which said operation is to be performed. FIG. 13G also shows relationship between operation name and data, input data and output data of said operation.

We use a node name to denote data-at-rest and refer to said data-at-rest by said node name followed by an asterisk (*). We consider data-at-rest any data to be stored at a particular location. An example, but not limited to, of data-at-rest is a file locally stored on a hard-drive. We consider data-at-in-motion to be data moving from a first location to a second location. As an example, but not limited to, of data-in-motion is a video stream. As an example, but not limited to, a node name may be a logical identifier of logical storage or logical content, as will be explained in more detail below. We use a topology-mapping or layer-mapping name to denote data-in-motion and refer to said data-in-motion by said topology-mapping name or said layer-mapping name followed by an asterisk (*). As an example but not limited to, as shown in the second row of FIG. 13G, we use a node name MF to denote data-at-rest and refer to said data-at-rest by said node name followed by an asterisk (*) MF*. As an example but not limited to, as shown in the second row of FIG. 13G, we use a topology-mapping K27 to denote data-in-motion and refer to said data-in-motion by said topology-mapping followed by an asterisk (*) K27*.

The fifth column of FIG. 13G labeled 'relationship operation name and data' describes the relationship between incoming data, outgoing data and an operation name using the notation:

Outgoing Data=Operation Name (Incoming Data)

As an example but not limited to, as shown in the second row of FIG. 13G, data-at-rest MF* is transferred to data-in-motion K27* using operation name F1 at logical node MF. As an example but not limited to, as shown in the third row of FIG. 13G, data-in-motion K21* is transferred to data-in-motion K22* using operation name F2 at logical node MB. As an example but not limited to, as shown in the fourth row of FIG. 13G, data-in-motion K22* is transferred to data-in-motion K23* and data-in-motion K25* using operation name F3 at logical node MC. As an example but not limited to, as shown in the fifth row of FIG. 13G, data-in-motion K23* is transferred to data-in-motion K24* using operation name F4 at logical node MD. As an example but not limited to, as shown in the sixth row of FIG. 13G, data-in-motion K24* is transferred to data-at-rest ME* at logical node ME. As an example but not limited to, as shown in the seventh row of FIG. 13G, data-in-motion K25* is transferred to data-in-motion K28* using operation name F6 at logical node MG. As an example but not limited to, as shown in the eighth row of FIG. 13G, data-in-motion K28* is transferred to data-at-rest MH* at logical node MH.

Note that the relationship between operation name, input data and output data is determined by a topology-path and one or more operation calls, as specified by a user of an SDN Compiler, and can therefore be generated. As an example, but not limited to, the topology-path named K31 shown in FIGS. 13C and 13D and the operation calls named F1 through F7 shown in FIG. 13F, determine the relationship between operation name and data shown in FIG. 13G. As an example, but not limited to, "K21/K31+K22/K31" in FIG. 13C states that the topology-path named K31 contains a concatenation of a topology-mapping named K21 and a topology-mapping named K22. The topology-mappings named K21 and K22 interconnect at logical node MB, per the definition of topology-mappings named K21 and K22, shown in FIG. 15E and the depth-mappings K42 and K43, shown in FIG. 15D. Therefore, the relationship between operation name and data is K22*=F2(K21*) at logical node MB, as shown in FIG. 13G. As an example, but not limited to, "K22/K31+(&(K23/K31+ . . . ) &(K25/K31+ . . . ))" in FIG. 13C states that the topology-path named K31 contains a concatenation of a topology-mapping named K22 and topology-mappings named K23 and K25 in parallel. The topology-mappings named K22, K23 and K25 interconnect at logical node MC, per the definition of topology-mappings named K22, K23 and K25, shown in FIG. 15E and the depth-mappings K44 and K45, shown in FIG. 15D. Therefore, the relationship between operation name and data is (K23*, K25*)=F3(K22*) at logical node MC, as shown in FIG. 13G. The relationship between operation name, input data and output data can be generated from a recursive-path of a requested topology-path and one or more specified operation calls.

Figures 14A, 14B, 14C, 14D:
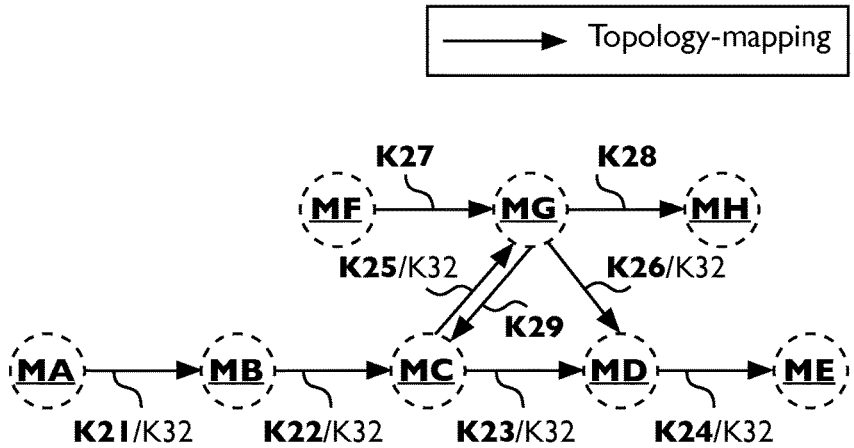
FIG. 14A is a diagram showing logical nodes MA, MB, MC, MD, ME, MF, MG and MH, topology-mappings named K21 through K29 and a topology-path named K32.
FIG. 14B is a diagram showing topology-path named K32 per the notation of FIG. 6C.
FIG. 14C is a diagram showing topology-path named K32 per the notation of FIG. 6C.
FIG. 14D is a diagram showing operation calls comprising of an operation name denoting an operation, at least one edge, a node denoting a location at which said operation is to be performed.

Note that multiple topology-paths can be defined by a user of an SDN Compiler in a logical network comprising of logical nodes and topology-mappings, and therefore multiple programs, each program being represented by a topology-path, can be defined in a logical network. FIG. 14A shows logical nodes MA, MB, MC, MD, ME, MF, MG and MH, topology-mappings named K21 through K29. We consider a topology-path named K32, being mapped to topology-mappings K21 through K26 as indicated by K21/K31, K22/K31, K23/K31, K24/K31, K25/K31, K26/K31 in FIG. 14A. FIG. 14B shows the topology-path named K32 per the notation of FIG. 6C. In FIG. 13C the "&" sign denotes a start of a concatenation, said concatenation shown between brackets "( )", that is parallel to one or more other concatenations as described above. Using "(A+B)/C" is equal to "A/C+B/C", in which A, B, C are edges (cf. PCT/EP2014/055640 page 214), the topology-path named K32 can be written in an equivalent shorter notation shown in FIG. 14C.

FIG. 14D shows example operation calls comprising of an operation name denoting an operation, at least one edge, a node denoting a location at which said operation is to be performed. In FIG. 14D all edges (K32) are considered traversing edges. FIG. 14D also shows the relationship between operation name and incoming and outgoing data. As an example but not limited to, as shown in the third row of FIG. 14D, data-in-motion K23* and data-in-motion K26* are transferred to data-in-motion K24* using operation name F9 at logical node MD. Note that the relationship between operation name and incoming and outgoing data for the additional operation named F9 is "K24*=F9(K23*, K26*), as shown in FIG. 14D, therefore the additional operation named F9 operates on incoming data K23* and K26*, which can be considered arguments to said additional operation. In general, an additional operation may have an arbitrary number of arguments, represented by incoming topology-mappings or layer-mappings. In general, an additional operation may have an arbitrary number of results, represented by outgoing topology-mappings or layer-mappings. As an example but not limited to the relationship between operation name and incoming and outgoing data for the additional operation named F8 is "(K23*, K25*)=F8(K22*), as shown in FIG. 14D, therefore the additional operation named F8 has two results: K23* and K25*.

Creating multiple logical topology-paths, each topology-path representing a program, allows for an efficient implementation of multiple programs. As an example, but not limited to, we consider logical node MA to be a logical identifier of storage, such as for example but not limited to, video content. Typically, there might be a requirement to perform multiple activities with said contents, for example: distributing said video content to end-users, distributing said video content to video distributors, distributing said video content to caches in a Content Distribution Network (CDN), making copies of said video content in various frame formats, subtitling said video content in one or multiple languages. Each of said multiple activities may be described by a topology-path. Using a single logical network, in this example shown in FIG. 13B comprising of logical nodes MA, MB, MC, MD, ME, MF, MG, MH, allows a user of an SDN Compiler to use the same logical name for said video content, in this example logical node MA. As will be understood by a person skilled in the art, alternatively, a separate logical network could be created for each program.

Note that an incoming set of edge-relationships can contain both data and control. As an example, but not limited to, the incoming set of edge-relationships of logical node MC is K44/K22/K31, as shown in FIG. 15G. The topology-mapping named K22 denotes data, being data-in-motion K22*. The topology-path named K31 is related to operation name F4, as per the operation calls shown in FIG. 13F, therefore the topology-path named K31 determines, or controls, the additional operation to be performed. As an example, but not limited to, the incoming set of edge-relationships of physical node QB is J1/K22/K31, as shown in FIG. 15H. Again, the topology-mapping named K22 denotes data, being data-in-motion K22*. The topology-path named K31 is related to operation name F4, as per the operation calls shown in FIG. 13F, therefore the topology-path named K31 determines, or controls, the additional operation to be performed.

PCT/EP2014/055640 (claim 1, action f) describes creating of forwarding table entries for physical nodes in said recursive-path from said recursive-path. The current leading protocol to instruct packet forwarding devices with the desired forwarding behavior is OpenFlow, but the present invention is not limited or bound to the OpenFlow protocol, but generic in nature and could work with future protocols that provide programmatic access to forwarding table(s) of packet forwarding devices. The forwarding table(s) contains the information against which information from the incoming packet and input port is matched, providing the desired output port(s) to forward the packet out to (cf. PCT/EP2014/055640 page 1).

Alternatively, code may be generated by an SDN Compiler for one or more physical nodes. Any traditional compiler may be used to compile said code. Said compiled code could be deployed at said each physical node. As an example, but not limited to, the information shown in FIG. 15H, as described above, is used to generate code for physical nodes QA, QB, QC, QD, QE, QF, QG and QH. We consider a programming language supporting message-passing and pattern-matching.

We use the notation "p ! {x, y}" to send a message, also referred to as a packet, comprising of a tuple{x, y}, x being an outgoing set of edge-relationships, and y being outgoing data out of output port p.

We use the notation "RECEIVE {q, v, _w}->f" to pattern-match against a tuple{q, v}, q being an input port, v being an incoming set of edge-relationships, _w being input data, and f being an operation name. The underscore symbol '_' is used as a wildcard symbol.

We use the y=f(w) to denote an additional operation with operation name f with input data w and output data y. Code may be generated for said additional operation, this is not shown in this example.

Using the input port (q), output port (p), incoming set of edge-relationships (v), outgoing set of edge-relationships (x), networking operation (transmit, receive, switch), additional operation (f), incoming data (_w), outgoing data (y) shown in FIG. 15H, results in the pseudo-code shown in FIG. 16. FIG. 16 shows for physical nodes QA, QB, QC, QD, QE, QF, QG, QH in the recursive-path calculated from the requested topology-path named K31 pseudo-code to be executed. The example code shown in FIG. 16 uses ports, represented by PoAs, to sent packets to and receive packets from. Alternatively, channels, represented by topology-mappings, may be used to sent packets to and receive packets from.

The advantage of the above described method of code generation is that physical nodes or virtual nodes are not constraint in the additional operations which they can perform, resulting in increased network programmability. As an example, but not limited to, particular code may be generated for a virtual machine or container, said virtual machine or container may be deployed at a particular physical node.

In the above example code is generated for sending messages, receiving messages and performing additional operations. Alternatively to increase the performance in an implementation, pattern-matching in a Ternary Content-Addressable Memory (TCAM) may be used for sending messages and receiving messages, while code is generated for performing additional operations. The instructions for sending messages and receiving messages could be exchanged between an SDN Compiler and a virtual or physical node using a standardized protocol, such as for example but not limited to OpenFlow, either directly or indirectly (using an SDN Controller).

As will be understood by a person skilled in the art, a programming language supporting pattern-matching may be used for generating said code. Note that the above pseudo-code shown in FIG. 16 uses names of edges. As will be understood by a person skilled in the art, a switching-identifier of said edges may be used instead.

Non-pre-published prior art EP14185828.2 describes a method to compile logical compute, storage and network against physical resources in an optimum way, thereby selecting physical resources based on requirements of logical compute, storage and network. Non-pre-published prior art EP14185828.2 (page 87, claim 16) describes that a requirement of a logical node may be an additional operation.

Non-pre-published prior art EP14185828.2 (page 45) describes how the SDN Compiler method described in PCT/EP2014/055640 is extended to determine depth-mappings, relating nodes at different depths, by an SDN Compiler based on requirements of logical nodes, logical-topology-mappings, and optionally logical layer-mappings, specified by a user of an SDN Compiler. Said extension allows a user of an SDN Compiler to specify logical nodes, requirements of logical nodes, logical topology-mappings and requirements of logical topology-mappings, and optionally logical layer-mappings and requirements of logical layer-mappings and have said SDN Compiler determine physical resources, comprising of physical nodes and physical links, against which said logical specification can be compiled, thereby determining the relationships between logical nodes and physical nodes as represented by depth-mappings, physical topology-paths, and optionally physical layer-mappings.

As an example, but not limited to, a user of an SDN Compiler could specify a first logical node denoting logical compute and a second logical node denoting logical compute and a topology-mapping from said first logical node to said second logical node, and nodes, topology-mappings and layer-mappings at one or more lower layers and have said SDN Compiler determine physical resources against which said logical specification can be compiled, thereby determining the relationships between logical nodes and physical nodes as represented by depth-mappings, physical topology-paths, and optionally physical layer-mappings.

To do so, we define "known physical nodes" and "unknown physical nodes". In the network model, logical nodes can be mapped to "known" and/or "unknown" physical nodes through depth-mappings. "Known physical nodes" are "physical nodes" which are existing or still to be setup (virtual) nodes in the network and of which the physical node names are stored in one or more databases which are directly or indirectly accessible to the compiler. Below, the label "known" will not always be used if the context does not require so. The term "unknown physical node" is used to define an imaginary physical node to which logical nodes can be mapped through depth-mappings and which are to be substituted by a physical node of the network of which the physical node name is stored in said database(s). Such unknown physical nodes can advantageously be used in a method of building the network model in case of cloud computing, as will be explained in more detail below.

Also, we define "known physical topology-paths" and "unknown physical topology-paths". "Known physical topology-paths" are "physical topology-paths" which are existing or still to be setup topology-paths in the network between two physical nodes and of which the physical topology-path names are stored in one or more databases which are directly or indirectly accessible to the compiler. Below, the label "known" will not always be used if the context does not require so. The term "unknown physical topology-path" is used to define an imaginary physical topology-path between either two "unknown physical nodes" or between one "unknown physical node" and a "known physical node". Such an "unknown physical topology-path" is to be substituted by a physical topology-path of the network of which the physical topology-path name is stored in said database(s). Such unknown physical topology-paths can advantageously be used in a method of building the network model, as will be explained in more detail below.

Also, we define "known physical layer-mapping" and "unknown physical layer-mapping". "Known physical layer-mappings" are "physical layer-mappings" which are existing or still to be setup layer-mappings in the network between two physical nodes and of which the physical layer-mapping names are stored in one or more databases which are directly or indirectly accessible to the compiler. Below, the label "known" will not always be used if the context does not require so. The term "unknown physical layer-mapping" is used to define an imaginary physical layer-mapping between either two "unknown physical nodes" or between one "unknown physical node" and a "known physical node". Such an "unknown physical layer-mapping" is not (yet) linked to a physical layer-mapping of which the physical layer-mapping name is stored in said database(s). Such unknown physical layer-mappings can advantageously be used in a method of building the network model, as will be explained in more detail below.

It is observed that, for the sake of efficiency, apart from the terms "physical node", "known physical node", and "unknown physical node" as defined above, the term "known/unknown physical node" is used. This latter term refers to a set comprising all known and unknown physical nodes and each member of this set may either be a known or an unknown physical node. "Known/unknown physical node names" are names of these "known/unknown physical nodes".

Similarly, for the sake of efficiency, apart from the terms "physical topology-path", "known physical topology-path", and "unknown physical topology-path" as defined above, the term "known/unknown physical topology-path" is used. This latter term refers to a set comprising all known and unknown physical topology-paths and each member of this set may either be a known or an unknown physical topology-path. "Known/unknown physical topology-path names" are names of these "known/unknown physical topology-paths".

Non-pre-published prior art EP14185828.2 (page 47) describes that the following actions are performed:

a) For each logical node not mapped to a known physical node through one or more depth-mappings creating at least one unknown physical node and storing an unknown physical-node name of said unknown physical node. This action is relating to action b) of claim 1) of non-pre-published prior art EP14185828.2.

b) For each logical node not mapped to a physical node through one or more depth-mappings creating a depth-mapping from said logical node not mapped to a known physical node to said unknown physical node, and creating a depth-mapping from said unknown physical node to said logical node not mapped to a known physical node, said depth-mappings being based on a directed graph representation, This action is relating to action c) of claim 1) of non-pre-published prior art EP14185828.2.

c) Creating and storing one or more logical topology-mappings, each logical topology-mapping being a directed graph representation from a first logical node to a second logical node, calculated as a concatenation of a first depth-mapping from the first logical node to a first known/unknown physical node, a known/unknown physical topology-path from the first known/unknown physical node, to a second known/unknown physical node, and a second depth-mapping from the second known/unknown physical node to the second logical node, said known physical topology-path being a concatenation of one or more physical topology-mappings, said unknown physical topology-path being created and stored. Note that said one or more logical topology-mappings are calculated using the first method to calculate a topology-mapping, This action is relating to action d) of claim 1) of non-pre-published prior art EP14185828.2.

d) Determining a suitable physical node in the overall network for each unknown physical node and determining a suitable physical topology-path in the overall network for each unknown physical topology-path by performing a search comprising matching each unknown physical topology-path with one of a set of suitable physical topology-paths, and matching each unknown physical node with one of a set of suitable physical nodes, and replacing and storing each unknown physical topology-path by said one of said set of suitable physical topology-paths, said one of said suitable physical topology-paths being a concatenation of one or more physical topology-mappings, and replacing each unknown physical node by said one of said set of suitable physical nodes in accordance with a result of said search. Here, the "physical nodes" and "physical topology-paths" respectively are entities available for use. They may already be in existence or still to be set up on demand: e.g., a node can be implemented by a virtual machine that is not yet in existence but can be requested by the SDN compiler (or other unit) to be set up when necessary. This action is relating to action e) of claim 1) of non-pre-published prior art EP14185828.2.

We apply above method to the logical network shown in FIG. 13B. It is our objective to determine depth-mappings, relating logical nodes MA, MB, MC, MD, ME, MF, MG, MH and appropriate physical nodes representing physical resources, by an SDN Compiler based on requirements of logical nodes, logical-topology-mappings, operation calls and optionally logical layer-mappings, specified by a user of an SDN Compiler.

Figure 17A:
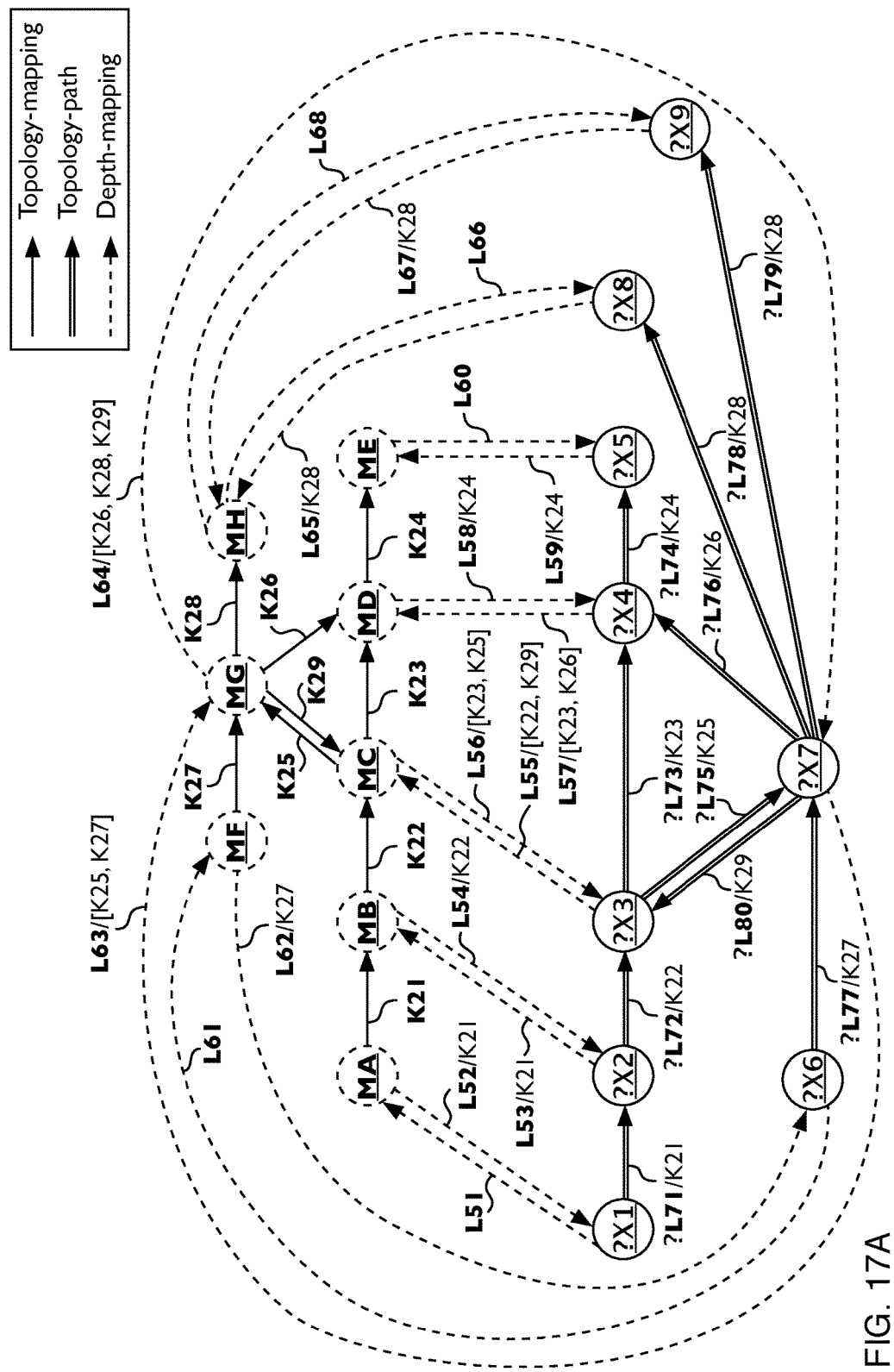
FIG. 17A is a diagram showing logical nodes MA, MB, MC, MD, ME, MF, MG, MH, at (d=1, n=0, h=0), unknown physical nodes ?X1, ?X2, ?X3, ?X4, ?X5, ?X6, ?X7, ?X8, ?X9, at (d=0, n=0, h=0), topology-mappings named K21 through K29, depth-mappings named L51 through L68, and unknown physical topology-paths named ?L71 through ?L80, represented as directed edges in a graph.

Actions a), b) and c) are illustrated by FIG. 17A. FIG. 17A shows logical nodes MA, MB, MC, MD, ME, MF, MG, MH, at (d=1, n=0, h=0), unknown physical nodes ?X1, ?X2, ?X3, ?X4, ?X5, ?X6, ?X7, ?X8, ?X9, at (d=0, n=0, h=0), topology-mappings named K21 through K29, depth-mappings named L51 through L68, and unknown physical topology-paths named ?L71 through ?L80, represented as directed edges in a graph. In FIG. 17A questions marks indicate unknown physical nodes and unknown physical topology-paths. Said logical nodes MA, MB, MC, MD, ME, MF, MG, MH were shown in FIG. 13B as well. We apply actions a), b) and c):

a) For each logical node (MA; MB; MC; MD; ME; MF; MG; MH) not mapped to a known physical node through one or more depth-mappings creating at least one unknown physical node (?X1; ?X2; ?X3; ?X4; ?X5; ?X6; ?X7; ?X8, ?X9) and storing an unknown physical-node name of said unknown physical node. Note that logical node MH is mapped to unknown physical nodes ?X8 and ?X9. As an example, but not limited to, a user of an SDN Compiler might have specified an availability requirement of logical node MH which can not be realized by a single physical node, but requires multiple physical nodes (?X8, ?X9). As an example, but not limited to, a user of an SDN Compiler might have specified a capacity requirement of logical node MH which can not be realized by a single physical node, but requires multiple physical nodes (?X8, ?X9).

b) For each logical node (MA; MB; MC; MD; ME; MF; MG; MH) not mapped to a physical node through one or more depth-mappings creating a depth-mapping (L52; L54; L56; L58; L60; L62; L64; L66, L68) from said logical node (MA; MB; MC; MD; ME; MF; MG; MH) not mapped to a known physical node to said unknown physical node (?X1; ?X2; ?X3; ?X4; ?X5; ?X6; ?X7; ?X8, ?X9), and creating a depth-mapping (L51; L53; L55; L57; L59; L61; L63; L65, L67) from said unknown physical node (?X1; ?X2; ?X3; ?X4; ?X5; ?X6; ?X7; ?X8, ?X9) to said logical node (MA; MB; MC; MD; ME; MF; MG; MH) not mapped to a known physical node, said depth-mappings being based on a directed graph representation. FIG. 17B shows depth-mappings named L51 through L68, per the notation of FIG. 6A.

c) Creating and storing one or more logical topology-mappings (K21; K22; K23; K24; K25; K26; K27; K28; K29), as shown in FIG. 17C per the notation of FIG. 6C, each logical topology-mapping (K21; K22; K23; K24; K25; K26; K27; K28; K29) being a directed graph representation from a first logical node (MA; MB; MC; MD; MC; MG; MF; MG; MG) to a second logical node (MB; MC; MD; ME; MG; MD; MG; MH;

MC), calculated as a concatenation of a first depth-mapping (L52; L54; L56; L58; L56; L64; L62; L64; L64) from the first logical node (MA; MB; MC; MD; MC; MG; MF; MG; MG) to a first known/unknown physical node (?X1; ?X2; ?X3; ?X4; ?X3; ?X7; ?X6; ?X7, ?X7), a known/unknown physical topology-path (?L71; ?L72; ?L73; ?L74; ?L75; ?L76; ?L77; ?L78, ?L79; ?L80) from the first known/unknown physical node (?X1; ?X2; ?X3; ?X4; ?X3; ?X7; ?X6; ?X7; ?X7), to a second known/unknown physical node (?X2; ?X3; ?X4; ?X5; ?X7; ?X4; ?X7; ?X8, ?X8; ?X3), and a second depth-mapping (L53; L55; L57; L59; L63; L57; L63; L65, L67; L55) from the second known/unknown physical node (?X2; ?X3; ?X4; ?X5; ?X7; ?X4; ?X7; ?X8, ?X8; ?X3) to the second logical node (MB; MC; MD; ME; MG; MD; MG; MH; MC), said known physical topology-path being a concatenation of one or more physical topology-mappings, said unknown physical topology-path (?L71; ?L72; ?L73; ?L74; ?L75; ?L76; ?L77; ?L78, ?L79; ?L80) being created and stored. Note that said one or more logical topology-mappings named K21 through K29 are calculated using the first method to calculate a topology-mapping, As shown in of FIGS. 17D and 17E we now determine the physical entities of the topology-mappings K21 through K29, which will be used in a search at action d). Step 1) of FIG. 17D shows the topology-mapping named K21 per FIG. 17C. In step 2) of FIG. 17D, the values of the depth-mappings named L52 and L53 in step 1) of FIG. 17D have been replaced by the definition of the depth-mappings named L52 and L53 shown in FIG. 17B. Note that the topology-mapping named K21 comprises logical nodes named MA and MB, depth-mappings named L52 and L53, zero physical nodes, two unknown physical nodes named ?X1 and ?X2, one unknown physical topology-path named ?L71, zero physical topology-mappings, and zero physical point-of-attachments. FIG. 17E shows the topology-mappings named K22 through K29 in rows two through nine using the same approach as described above for the topology-mapping named K21.

Per action d) above, we determine a suitable physical node for each unknown physical node and determine a suitable physical topology-path for each unknown physical topology-path by performing a search comprising matching each unknown physical topology-path with one of a set of suitable physical topology-paths, and matching each unknown physical node with one of a set of suitable physical nodes. As shown in FIGS. 17F and 17G, we use the relationship between unknown physical nodes and unknown physical topology-paths of the topology-mappings named K21, being "?X1-?L71[toppath]/K21->?X2" as a first search statement, we use the relationship between unknown physical nodes and unknown physical topology-paths of the topology-mappings named K21, being "?X1-?L71[toppath]/K21->?X2" as a first search statement. Similarly, we create a second, third, fourth, fifth, sixth, seventh, eighth and ninth search statement from the relationship between unknown physical nodes and unknown physical topology-paths of the topology-mappings named (K22; K23; K24; K25; K26; K27; K28; K29) respectively as shown in rows two through nine of FIG. 17F. We create a tenth search statement comprising said first through ninth search statements and logical ANDS, as shown in FIG. 17G. Said tenth search statement is used in said search.

Note that said tenth search statement comprises 'logical ANDS' of said first search statement through said ninth search statement as the objective of said search is to determine a physical node for each unknown physical node and a physical topology-path for each unknown physical topology-path, in accordance with the logical nodes and logical topology-mappings defined by the user of the SDN Compiler. Note that said search statement comprises of physical entities including nodes and topology-paths which comprise of topology-mappings being links in a single direction (including wireless links) and their relationships from multiple recursive paths, in this example unknown physical nodes (?X1; ?X2; ?X3; ?X4; ?X5; ?X6; ?X7; ?X8; ?X9) and unknown physical topology-paths named (?L71; ?L72; ?L73; ?L74; ?L75; ?L76; ?L77; ?L78; ?L79; ?L80). Said search is performed against a physical network layout comprising of physical nodes being interconnected by physical topology-mappings, said physical topology-mapping being based on a directed graph representation, as is described below.

PCT/EP2014/055640 (page 230) describes that the first method to calculate a topology-mapping, the second method to calculate a topology-mapping, the third method to calculate a topology-mapping, the fourth method to calculate a topology-mapping, the fifth method to calculate a topology-mapping, the first method to calculate a layer-mapping, the second method to calculate a layer-mapping, the method to calculate a topology-path, the method to calculate a level-path and the method to calculate a topology-level-path, used to create or recalculate a mapping or a topology-path, level-path or topology-level-path, can be implemented as a query in a graph database. Additional requirements as described above can be included in such query. As an example, but not limited to, said third search statement described above can be implemented as a query in a graph database.

Non-pre-published prior art EP14185828.2 (page 52) describes that in said search optionally requirements can be taken into account. Optionally, at action c) above requirements of said logical topology-mappings might be stored. Optionally, at action d) said requirements of each of said logical topology-mappings might be copied to said unknown physical topology-path used in the calculation of said logical topology-mapping, and said requirements of each of said unknown physical topology-paths might be matched with properties of a physical topology-path in said search, said properties of said physical topology-path being determined by properties of physical topology-mappings from which said physical topology-path is calculated.

FIG. 17H shows how requirements of a logical topology-mapping named K21 through K29 are related to requirements of an unknown physical topology-paths named ?L71 through ?L80, per the edge-relationships (?L71/K21; ?L72/K22; ?L73/K23; ?L74/K24; ?L75/K25; ?L76/K26; ?L77/K27; ?L78/K28; ?L79/K28; ?L80/K29), as shown in FIG. 17C. Optionally, at action b) above requirements of one or more logical nodes might be stored. Optionally, at action d) of claim 1) said requirements of each of said logical nodes might be copied to said unknown physical node mapped to said logical node through one or more depth-mappings, and said requirements of each of said unknown physical nodes might be matched with properties of said physical node in said search.

FIG. 17I shows how requirements of the logical nodes (MA; MB; MC; MD; ME; MF; MG; MH) are related to requirements of the unknown physical node named (?X1; ?X2; ?X3; ?X4; ?X5; ?X6; ?X7; ?X8, ?X9), per the depth-mappings named (L51, L52; L53, L54; L55, L56; L57, L58; L59, L60; L61, L62; L63, L64; L65, L66; L67, L68), as shown in FIG. 17B. FIG. 17I also shows how requirements of an operation name (F1; F2; F3, F8; F4, F9; F5; F6, F10; F7) at a logical node (MF; MB; MC; MD; ME; MG; MH), per FIGS. 13F and 14D becomes a requirement of the unknown physical node named (?X1; ?X2; ?X3; ?X4; ?X5; ?X7; ?X8, ?X9).

We now consider a physical network layout against which said search is performed, said physical network layout comprising nodes and links available for use. We consider the physical network comprising of physical nodes QA, QB, QC, QD, QE, QF, QG, QH and physical topology-mappings named J1 through K10 shown in FIGS. 15A and 15B and described above.

We perform a search comprising of above described tenth search statement, shown in FIG. 17G, against the physical network layout shown in FIG. 15B and include operation name requirements shown in FIG. 17I. As shown in FIG. 17I and described above at action d) the requirements of logical nodes (MA; MB; MC; MD; ME; MG; MH) are copied to the unknown physical node name (?X1; ?X2; ?X3; ?X4; ?X5; ?X7; ?X8, ?X9) respectively. The search statement including requirements is, written in pseudo-code:
MATCH (?X1-?L71[toppath]->?X2)
AND MATCH (?X2-?L72[toppath]->?X3)
AND MATCH (?X3-?L73 [toppath]->?X4)
AND MATCH (?X4-?L74[toppath]->?X5)
AND MATCH (?X3-?L75[toppath]->?X7)
AND MATCH (?X7-?L76[toppath]->?X4)
AND MATCH (?X6-?L77[toppath]->?X7)
AND MATCH (&(?X7-?L78[toppath]->?X8) &(?X7-?L79[toppath]->?X9))
AND MATCH (?X7-?L80[toppath]->?X3)
WHERE operation-name ?X1 equals "F1"
AND operation-name ?X2 equals "F2"
AND operation-name ?X3 equals "F3"
AND operation-name ?X3 equals "F8"
AND operation-name ?X4 equals "F2"
AND operation-name ?X4 equals "F9"
AND operation-name ?X5 equals "F5"
AND operation-name ?X7 equals "F6"
AND operation-name ?X7 equals "F10"
AND operation-name ?X8 equals "F7"
AND operation-name ?X9 equals "F7"
RETURN ?X1, ?X2, ?X3, ?X4, ?X5, ?X6, ?X7, ?X8, ?X9, ?L71, ?L72, ?L73, ?L74, ?L75, ?L76, ?L77, ?L78, ?L79, ?L80

As per optional action v) above one or more operation names are stored of physical nodes (QA; QB; QD; QE; QF; QG; QH) that can perform one or more operations, each operation name (F1, F2; F3; F4; F5; F7; F6; F7) denoting one operation. Above search statement will return a number of matches including the match shown in FIGS. 18A and 18B. FIG. 18A shows how unknown physical node (?X1; ?X2; ?X3; ?X4; ?X5; ?X6; ?X7; ?X8; ?X9) is matched against physical node (QA; QA; QB; QD; QE; QA; QG; QF; QH). FIG. 18B shows how the unknown physical topology-path named (?L71; ?L72; ?L73; ?L74; ?L75; ?L76; ?L77; ?L78; ?L79; ?L80) is matched against a physical topology-path (L71; L72; L73; L74; L75; L76; L77; L78; L79; L80), per the notation of FIG. 6C.

Note that in this example we do not consider any requirements for the logical topology-mapping named K21, therefore "/K21" has been omitted from the search statement (?X1-?L71[toppath]/K21->?X2), reducing the statement to (?X1-?L71[toppath]->?X2). Similarly, we do not consider any requirements for the logical topology-mappings named K22, K23, K24, K25, K26, K27, K28, K29 therefore "/K22", "/K23", "/K24", "/K25", "/K26", "/K27", "/K28", "/K29", has been omitted from the search statements shown in FIG. 17F.

Action d) for the above described example is:
Determining a suitable physical node (QA; QA; QB; QD; QE; QA; QG; QF; QH) in the overall network for each unknown physical node (?X1; ?X2; ?X3; ?X4; ?X5; ?X6; ?X7; ?X8; ?X9) and determining a suitable physical topology-path (L71; L72; L73; L74; L75; L76; L77; L78; L79; L80) in the overall network for each unknown physical topology-path (?L71; ?L72; ?L73; ?L74; ?L75; ?L76; ?L77; ?L78; ?L79; ?L80) by performing a search comprising matching each unknown physical topology-path (?L71; ?L72; ?L73; ?L74; ?L75; ?L76; ?L77; ?L78; ?L79; ?L80) with one of a set of suitable physical topology-paths (L71; L72; L73; L74; L75; L76; L77; L78; L79; L80), and matching each unknown physical node (?X1; ?X2; ?X3; ?X4; ?X5; ?X6; ?X7; ?X8; ?X9) with one of a set of suitable physical nodes (QA; QA; QB; QD; QE; QA; QG; QF; QH), and replacing and storing each unknown physical topology-path (?L71; ?L72; ?L73; ?L74; ?L75; ?L76; ?L77; ?L78; ?L79; ?L80) by said one of said set of suitable physical topology-paths (L71; L72; L73; L74; L75; L76; L77; L78; L79; L80), said one of said suitable physical topology-paths (L71; L72; L73; L74; L75; L76; L77; L78; L79; L80) being a concatenation of one or more physical topology-mappings (L71; L72; L73; L74; L75; L76; L77; (&L78 &L79); L80), and replacing each unknown physical node (?X1; ?X2; ?X3; ?X4; ?X5; ?X6; ?X7; ?X8; ?X9) by said one of said set of suitable physical nodes (QA; QA; QB; QD; QE; QA; QG; QF; QH) in accordance with a result of said search.

FIG. 18C shows the resulting depth-mappings named L51 through L68, per the notation of FIG. 6A. FIG. 18D shows the topology-mappings K21 through K29, per the notation of FIG. 6C. As an example, but not limited to, we create a requested topology-path named K31, as defined in FIGS. 13C and 13D. FIG. 18E shows the recursive-path of the topology-path named K31. Note that the recursive-path shown in FIG. 18E is identical to the recursive-path shown in FIG. 15F, except for names used for to denote depth-mappings, conform the difference between the depth-mappings defined in FIG. 15D and FIG. 18C, and the addition of the topology-paths named L71 through L75, L78, L79 in FIG. 18E. The above described method can be used to calculate forwarding instructions for the requested topology-path named K31.

In the example described above no depth-mappings were specified between a logical node and a physical node. As will be understood by a person skilled in the art, a user of an SDN Compiler might specify one or more depth-mappings between a logical node and a physical node, which would result in a search statement that might include said physical node used in the search at action d) above.

Note that in case code is generated by an SDN Compiler for one or more physical nodes, as described above and illustrated in FIG. 16, the above requirement of an operation name to be stored with an unknown physical node, as shown in FIG. 17I, changes to a requirement that compiled code can be executed at an unknown physical node. As an example, but not limited to, this changes the above search statement to, written in pseudo-code:
MATCH (?X1-?L71[toppath]->?X2)
AND MATCH (?X2-?L72[toppath]->?X3)
AND MATCH (?X3-?L73 [toppath]->?X4)

AND MATCH (?X4-?L74[toppath]->?X5)
AND MATCH (?X3-?L75[toppath]->?X7)
AND MATCH (?X7-?L76[toppath]->?X4)
AND MATCH (?X6-?L77[toppath]->?X7)
AND MATCH (&(?X7-?L78[toppath]->?X8) &(?X7-?L79 [toppath]->?X9))
AND MATCH (?X7-?L80[toppath]->?X3)
WHERE operation-name ?X1 equals "ability to execute compiled code"
AND operation-name ?X2 equals "ability to execute compiled code"
AND operation-name ?X3 equals "ability to execute compiled code"
AND operation-name ?X3 equals "ability to execute compiled code"
AND operation-name ?X4 equals "ability to execute compiled code"
AND operation-name ?X4 equals "ability to execute compiled code"
AND operation-name ?X5 equals "ability to execute compiled code"
AND operation-name ?X7 equals "ability to execute compiled code"
AND operation-name ?X7 equals "ability to execute compiled code"
AND operation-name ?X8 equals "ability to execute compiled code"
AND operation-name ?X9 equals "ability to execute compiled code"
RETURN ?X1, ?X2, ?X3, ?X4, ?X5, ?X6, ?X7, ?X8, ?X9, ?L71, ?L72, ?L73, ?L74, ?L75, ?L76, ?L77, ?L78, ?L79, ?L80

The method described above can now be used to determine optimal placement of compiled code, based on requirements specified by a user of an SDN Compiler and characteristics of physical resources.

In present IT (Information Technology) deployments there is a loose coupling between networking on one hand, and storage and compute on the other hand. As a result, networks have limited visibility of applications and applications have limited visibility of networks, resulting in sub-optimal performance op IT resources. Also, network operators have limited visibility of applications and their requirements and application developers have limited visibility of networking capabilities, resulting in sub-optimal software development, and application and network operations. PCT/EP2014/055640 describes a SDN Compiler method. A tighter coupling between networking, storage and compute is created by applying said SDN Compiler method to an overall network in which a logical node at a highest layer denotes logical storage or logical compute and in which a requested topology-level-path denotes a logical message-stream. Note that said highest layer is the layer comprising of logical nodes denoting logical storage or logical compute, not the 'application layer' (OSI layer 7).

Figure 19:
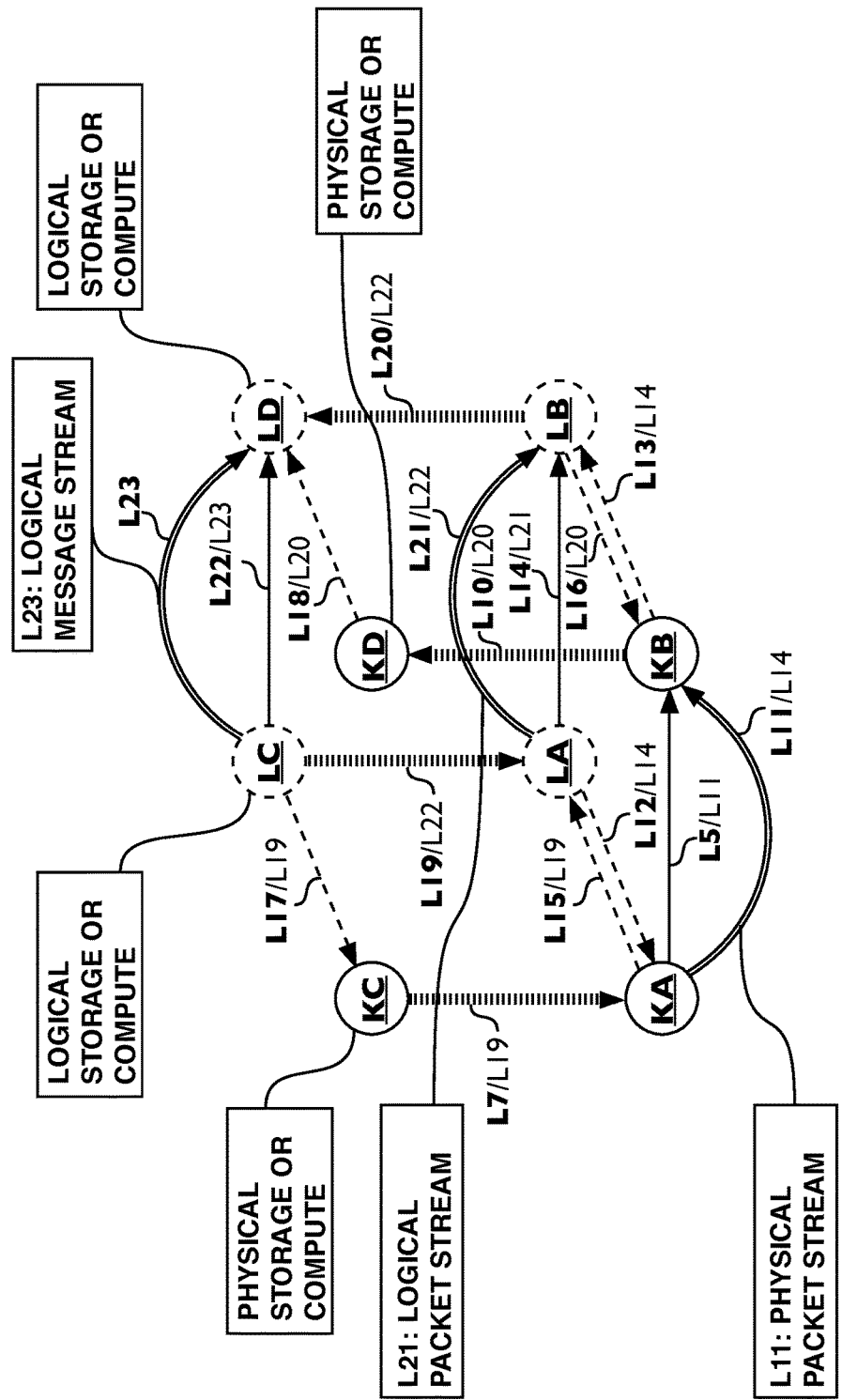
FIG. 19 is a diagram showing networks KA, KB, KC, KD, LA, LB, LC, LD and topology-mappings named L5, L14 and L22, depth-mappings named L12, L13, L15, L16, L17 and L18, layer-mappings named L7, L10, L19 and L20 and topology-paths named L11, L21 and L23, and edge-relationships.

The method described in PCT/EP2014/055640 is applied to an overall network in which a logical node at a highest layer denotes logical storage or logical compute and in which a requested-topology-level-path denotes a logical message-stream. This is illustrated in FIG. 19. FIG. 19 shows networks KA, KB, KC, KD, LA, LB, LC, LD and topology-mappings named L5, L14 and L22, depth-mappings named L12, L13, L15, L16, L17 and L18, layer-mappings named L7, L10, L19 and L20 and topology-paths named L11, L21 and L23, and edge-relationships. Note that FIG. 19 is identical to FIG. 5F, except for the commenting text. FIG. 19 shows a topology-path named L23 denoting a logical message stream. As will be understood by a person skilled in the art a logical message stream is created from a first logical abstraction of a first physical storage or compute resource, to a second logical abstraction of a second physical storage or compute resource. In the example of FIG. 19, but not limited to, said first logical abstraction of said first physical storage or compute resource is logical node LC, said second logical abstraction of said second physical storage or compute resource is logical node LD, said first physical storage or compute resource is physical node KC, and said second physical storage or compute resource is physical node KD. As will be understood by a person skilled in the art messages exchanged over said message-stream are created by a first logical node denoting storage or compute and are acted upon a by second logical node denoting storage or compute. Examples of acting upon a message by a logical node denoting storage or compute include, but are not limited to, storing (part of) said message, responding to said message, performing a function (computation) based on (part of) said message and storing the result of the computation locally, performing a function (computation) based on (part of) said message and sending the result of the computation to the sender, optionally modifying and forwarding (part of) said message, performing a function (computation) based on (part of) said message and forwarding the result of said computation to another logical node denoting storage or compute, not being the sender of the message. An example of, but not limited to, storing (part of) said message is a RESTful HTTP PUT method [REST=REpresentational State Transfer], [HTTP=HyperText Transfer Protocol]. An example of, but not limited to, responding to said message, is a HTTP-response, responding to an HTTP-request. An example of, but not limited to, performing a function (computation) based on (part of) said message and sending the result of said computation back to the sender is a SOAP RPC [SOAP=Simple Object Access Protocol], [RPC=REMOTE PROCEDURE CALL]. An example of, but not limited to, performing a function (computation) based on (part of) said message and forwarding the result of said computation to a logical node denoting storage or compute, said logical node not being the sender of said message is a distributed computation. In FIG. 19, the topology-path named L23, denoting a logical message-stream, is a requested topology-path resulting in forwarding instructions for physical networking, compute and storage resources per the SDN Compiler method described in PCT/EP2014/055640. FIG. 19 shows that the topology-path named L21 is a logical packet stream. The topology-path named L23, being a logical message stream, is multiplexed to the topology-path named L21 being a logical packet stream. A message-stream is typically carried in the payload of packets in a packet-stream. FIG. 19 shows that the topology-path named L11 is a physical packet stream using a physical link in the direction from physical node KA to physical node KB denoted by the topology-mapping named L5.

A more detailed example is presented in FIGS. 20A through 20H. It is noted that applying the method described in PCT/EP2014/055640 to an overall network in which a logical node at a highest layer denotes logical storage or logical compute and in which a requested-topology-level-path denotes a logical message-stream, can be applied to an arbitrary overall network, and is not limited to the examples presented. We consider a first physical equipment, a second physical equipment and a third physical equipment. FIG. 20A shows said first physical equipment, represented by physical node KE, said second physical equipment, represented by physical node KF and said third physical equipment, represented by physical node KG, connected by topology-mappings being physical links. FIG. 20A also shows Point-of-Attachment (PoA) p301 through p304.

FIG. 20B shows said physical node KE at (d=0, n=0, h=0), representing said first physical equipment, said physical node KF at (d=0, n=0, h=0), representing said second physical equipment, and said physical node KG at (d=0, n=0, h=0), representing said third physical equipment, logical nodes FE, FF and FG at (d=1, n=1, h=0), logical nodes FH and FJ at (d=1, n=2, h=0), and logical nodes FK and FL at (d=1, n=3, h=0). As an example, but not limited to, the first physical equipment KE is a Client, the third physical equipment KG is a Server and the second physical equipment KF is a packet-forwarding equipment, illustrating a typical Client-Server architecture. As will be understood by a person skilled in the art, in a typical deployment a more complex topology would be present than the linear chain network topology between the first physical equipment KE, the second physical equipment KF and the third physical equipment KG, typically comprising of many instead of one instances of packet-forwarding equipment. FIG. 20B also shows topology-mappings named Q1, Q3, Q19, Q20, Q24, Q28, depth-mappings named Q5 through Q14, Q16, Q17, layer-mappings named Q22, Q23, Q26, Q27 and Q51 through Q54, and topology-paths named Q21, Q25, Q29, represented as directed edges in a graph.

As will be understood by a person skilled in the art, it can be beneficial to represent a physical equipment by a single physical node, rather than representing a physical equipment by multiple physical nodes, as forwarding instructions are typically sent to a physical equipment and not to individual components of said physical equipment. When representing a physical equipment by multiple physical nodes, and a physical equipment requires forwarding instructions for said physical equipment in it's entirety, not it's components, multiple forwarding instructions will have to be combined by the SDN compiler, as described in PCT/EP2014/055640 (page 198), requiring an additional step in the calculation. Further, when representing a physical equipment by a single physical nodes the number of physical nodes stored, in for example but not limited to, a database is reduced. Representing a physical equipment by multiple physical nodes allows the user of the SDN Compiler control over subcomponents of a physical system and may reduce hardware complexity as instructions for individual components are created. Multiple physical components can be represented as a single physical node using the following approach. FIG. 5B shows physical nodes KA, KB, KC and KD. We consider physical nodes KA and KC to be physical components of a first physical equipment. As shown in FIG. 24A, we rename physical components KA and KC to KX. We consider physical nodes KB and KD to be physical components of a second physical equipment. We rename physical components KB and KD to KY. We now reduce the two physical nodes named KX in FIG. 24A to a single physical node named KX shown in FIG. 24B, thereby the layer-mapping in layer named L7 and the layer-mapping in layer named L8 have now become layer-mappings from physical node KX to physical node KX and may be omitted (cf. PCT/EP2014/055640 FIGS. 33C and 60B). We now reduce the two physical nodes named KY in FIG. 24A to a single physical node named KY shown in FIG. 24B, thereby the layer-mapping in layer named L9 and the layer-mapping in layer named L10 have now become layer-mappings from physical node KY to physical node KY and may be omitted.

We use this approach in FIG. 20B for physical node KE, representing a first physical equipment, and physical node KG, representing a second physical equipment. FIG. 20C shows topology-mappings named Q1 through Q4, depth-mappings named Q5 through Q18, and physical layer-mappings named Q51 through Q58 per the notation of FIG. 6A. Physical layer-mappings Q51 through Q54 are shown in FIG. 20B. Physical layer-mappings Q55 through Q58 are shown in FIG. 22A and will be described below. Note that the direction of the physical layer-mappings Q51 through Q58 is stored. Note that no Points-of-Attachments (PoA's) names have been stored for physical layer-mappings Q51 through Q58 as said physical layer-mappings Q51 through Q58 represent physical links internal in a first physical equipment. Points-of-Attachments (PoA's) names may be stored for physical layer-mappings from a first to a first node. FIG. 20D shows topology-mappings Q19, Q20, Q24, Q28, layer-mappings named Q22, Q23, Q26, Q27 and topology-paths named Q21, Q25, Q29, per the notation of FIG. 6C. The topology-mapping named Q1 is a physical link in the direction from node KE to node KF. The topology-mapping named Q3 is a physical link in the direction from node KF to node KG. The topology-mappings named Q19 and Q20 are calculated using the first method to calculate a topology-mapping, as shown in FIG. 20B and also shown in FIG. 20D using the notation of FIG. 6C. The topology-mappings named Q24 and Q28 are calculated using the second method to calculate a topology-mapping, as shown in FIGS. 20B and 20D. PCT/EP2014/055640 (page 178) describes that in the first method for calculating a layer-mapping, the third and fourth network can be the same network at (d–x, n2, h) or at (d–x, n2–y, h). The layer-mapping named Q22 is calculated as a concatenation of the depth-mapping named Q12, the layer-mapping named Q51 and the depth-mapping named Q5, using the first method to calculate a layer-mapping with the third and fourth network being the same node KE. Per notation of FIG. 6C, the layer-mapping named Q22 is 'laymap Q22=Q12/Q22+Q51/Q22+Q5/Q22', as shown in FIG. 20B and also shown in FIG. 20D using the notation of FIG. 6C. The layer-mapping named Q26 is calculated as a concatenation of the depth-mapping named Q16, the layer-mapping named Q52 and the depth-mapping named Q11, using the first method to calculate a layer-mapping with the third and fourth network being the same node KE. Per notation of FIG. 6C, the layer-mapping named Q26 is 'laymap Q26=Q16/Q26+Q52/Q26+Q11/Q26', as shown in FIGS. 20B and 20D. The layer-mapping named Q23 is calculated as a concatenation of the depth-mapping named Q10, the layer-mapping named Q53 and the depth-mapping named Q13, using the second method to calculate a layer-mapping with the third and fourth network being the same node KG. Per notation of FIG. 6C, the layer-mapping named Q23 is 'laymap Q23=Q10/Q23+Q53/Q23+Q13/Q23', as shown in FIGS. 20B and 20D. The layer-mapping named Q27 is calculated as a concatenation of the depth-mapping named Q14, the layer-mapping named Q54 and the depth-mapping named Q17, using the second method to calculate a layer-mapping with the third and fourth network being the same node KG. Per notation of FIG. 6C, the layer-mapping named Q27 is 'laymap Q27=Q14/Q27+Q54/Q27+Q17/Q27', as shown in FIGS. 20B and 20D. The topology-path named Q21 is calculated as a concatenation of the topology-mapping named Q19 and the topology-mapping named Q20, as shown in FIGS. 20B and 20D. The topology-path named Q25 is calculated as the topology-mapping named Q24, as shown in FIGS. 20B and 20D. The topology-path named Q29 is calculated as the topology-mapping named Q28, as shown in FIGS. 20B and 20D.

PCT/EP2014/055640 (page 197) describes that as only a subset of the set of switching-identifiers is used, not all nested edge-relationships have to be calculated. PCT/EP2014/055640 (page 175) describes a second method for calculating a topology-mapping, comprising the following actions (in slightly modified wording):

Calculating and storing a first topology-mapping from a first network at (d, n, h1) to a second network at (d, n, h1) as a concatenation of a first layer-mapping from said first network to a third network at (d, n−y, h2), a topology-path from said third network to a fourth network at (d, n−y, h2) and a second layer-mapping from said fourth network to said second network with y being larger than zero and smaller than or equal to n-n_min(d), n_min(d) being a lowest layer at particular depth d and n_min(d) being =>0, said topology-path being a concatenation of one or more second topology-mappings, optionally storing for each of said topology-mappings edge-relationships comprising a first edge-relationship being a relationship between the first layer-mapping and said first topology-mapping, one or more second edge-relationships each second edge-relationship being a relationship between one of said one or more second topology-mappings in said topology-path and said first topology-mapping or a second edge-relationship being a relationship between said topology-path and said first topology-mapping and one or more fourth edge-relationships each fourth edge-relationship being a relationship between one of said one or more second topology-mappings and said topology-path, and a third edge-relationship being a relationship between the second layer-mapping and said first topology-mapping, Note that in the above description of said second method for calculating a topology-mapping a topology-path is used instead of a topology-level-path to aid the explanation. The described method can also be applied when using a topology-level-path in the second method for calculating a topology-mapping.

We consider the requested a topology-path named Q29 the requested topology-path for which forwarding entries should be created. Using the method described above, we calculate the recursive-path of the topology-path Q29 through recursion and recursively calculate a set of edge-relationships for each edge comprising of nested edge-relationships, using the relationships shown in FIG. 20D.

In the method we calculate from said recursive-path forwarding entries for a requested topology-path Q29. A recursive-path contains the following information for each node at d=0, h=h_min being a physical node (cf. PCT/EP2014/055640 pages 192 and 193):

an input port, being a PoA between the physical or virtual node and a topology-mapping or a layer-mapping, with the exception of the first node in the recursive-path which does not have an input port as the packet or signal is created by the first node in the recursive-path an output port, being a PoA between the physical or virtual node and a topology-mapping or a layer-mapping, with the exception of the last node in the recursive-path which does not have an output port as the packet or signal is received by the last node in the recursive-path Additionally, when a set of edge-relationships has been calculated for each edge, the recursive-path also contains:

a set of incoming edge-relationships at the incoming topology-mapping or layer-mapping with the exception of the first node in the recursive-path which does not have an incoming topology-mapping or a layer-mapping a set of outgoing edge-relationships at the outgoing topology-mapping or layer-mapping with the exception of the last node in the recursive-path which does not have an outgoing topology-mapping or a layer-mapping In this example, but not limited to, the physical node KE, representing a first physical equipment (Client) and physical node KG, representing a third physical equipment (Server), have physical datalink layer (OSI layer 2) Media Access Control (MAC) functionality, network layer (OSI layer 3) packet sending and receiving functionality, transport layer (OSI layer 4) and application layer (OSI layer 7) functionality, and have physical storage and/or compute resources. In this example, the physical node KF, representing a second physical equipment (Client) having physical datalink layer (OSI layer 2) Media Access Control (MAC) functionality and network layer (OSI layer 3) packet forwarding functionality. In this example, but not limited to, at (d=0, n=0, h=0) we consider a physical datalink layer (OSI layer 2), at (d=1, n=1, h=0) a logical network layer (OSI layer 3), at (d=1, n=2, h=0) a logical transport layer (OSI layer 4) and a logical application layer (OSI layer 7), and at (d=1, n=3, h=0) logical storage and/or compute resources. As an example, but not limited to a logical storage and/or compute resource can be identified by a Uniform Resource Identifier (URI), a Uniform Resource Locator (URL). The layer-mappings named Q26 and Q27 might for example, but not limited to, denote a socket. The requested topology-path named Q29 from source node FK, denoting logical storage or compute, to destination node FL, denoting logical storage or compute, is representing a message-stream.

FIG. 20E shows, as an example but not limited to, switching-identifiers for the edges named Q1, Q3, Q21, Q25 and Q29. The switching-identifier of edge Q1 is 'Source p301, Destination p302', at (d=0, n=0, h=0), denoting physical PoA's at the datalink layer, performing Media Access Control (MAC). In FIG. 20E 'SRC' refers to 'Source' and 'DST' refers to 'Destination'. As will be understood by a person skilled in the art, in an implementation an Ethernet MAC address could be used as Point-of-Attachment (PoA), instead of the example PoAs p301 and p302 used in this example. The switching-identifier of edge Q3 is 'Source p303, Destination p304', at (d=0, n=0, h=0), denoting physical PoA's at the datalink layer, performing MAC.

At the network layer (OSI layer 3) we use the 3-tuple of the IPv6 Flow Label, IPv6 Source Address, and IPv6 Destination Address fields, providing IPv6 flow classification. PCT/EP2014/055640 (FIG. 52I, pages 201 and 202) describes assignment of IPv4 address to logical nodes and logical networks. In this example we assign an IPv6 address to logical nodes in the same manner. As an IP address denotes a subnet Point-of-Attachment and comprises of a subnet-part and a PoA-part, we assign a subnet-identifier to the topology-mapping named Q19 with as an example but not limited to value "1:2:3:4/64" and we assign a subnet-identifier to the topology-mapping named Q20 with as an example but not limited to value "1:2:3:5/64" as shown in FIG. 20F. We assign a PoA named "11:11:11:10" to the interface between the logical node FE and the topology-mapping named Q19, assign a PoA named "11:11:11:11" to the interface between the logical node FF and the topology-mapping named Q19, assign a PoA named "11:11:11:12" to the interface between the logical node FF and the topology-mapping named Q20, assign a PoA named "11:11:11:13" to the interface between the logical node FG and the topology-mapping named Q20, as illustrated in FIG. 20F, resulting in the following IPv6 addresses:

1:2:3:4:11:11:11:10, denoting the PoA named 11:11:11:10 of node FE with the topology-mapping named Q19,
1:2:3:4:11:11:11:11, denoting the PoA named 11:11:11:11 of node FF with the topology-mapping named Q19,
1:2:3:5:11:11:11:12, denoting the PoA named 11:11:11:12 of node FF with the topology-mapping named Q20,
1:2:3:5:11:11:11:13, denoting the PoA named 11:11:11:13 of node FG with the topology-mapping named Q20, The switching-identifier of edge Q17 is 'Source 1:2:3:4:11:11:11:10, Destination 1:2:3:5:11:11:11:13, FLOW-LABEL 100'. Note that in the representation of the Source and Destination IPv6 addresses leading zeroes have been omitted. Note that Source 1:2:3:4:11:11:11:10 is an IPv6 address of the interface of the topology-mapping named Q19 and node FE, being the source node of the topology-path named Q21. Note that Source 1:2:3:5:11:11:11:13 is an IPv6 address of the interface of the topology-mapping named Q20 and node FG, being the destination node of the topology-path named Q21. The value '100' is used for the IPv6 Flow Label. Alternatively, as described in PCT/EP2014/055640 (page 245), within an IPv6 address the Interface Identifier of an IPv6 address could be used to identify the logical node, while the remainder of the address, consisting of networks that are not nodes, could be denoted by subnetting of the IPv6 Global Routing Prefix and/or Subnet Identifier address. To allow for mobility a node could use as its IPv6 address an IPv6 Interface Identifier identifying the node and a special value denoting 'unspecified' as IPv6 Global Routing Prefix or Subnet Identifier. In other words, the address only specifies the node, not the network the node is residing in. Therefore, higher layer protocols such as, but not limited to, TCP as well as applications are not impacted in case of migration of the node to another network. Alternatively, as described in PCT/EP2014/055640 (page 250), an IPv6 address can be used to identify a node and an IPv6 address can be used to identify a network which is not a node, allowing for mobility.

At (d=1, n=2, h=0) we use the 3-tuple of a Protocol (being a transport identifier), a Source Port and a Destination Port. The switching-identifier of edge Q25 is the 3-tuple of 'TCP, Source port 80, Destination port 80' denoting the combination of 'Transmission Control Protocol' and well-known port 80 used for HTTP, as both source and destination. Alternatively, 'PROTOCOL=6' could have been used instead of 'TCP', denoting the TCP protocol. The switching-identifier of edge Q29 is 'HTTP Request 1', denoting a HTTP-request from logical node FK, being a user agent with logical name URI-1, being a Uniform Resource Identifier (URI), to logical node FL, being an origin server with logical name URI-2, as illustrated in FIG. 20G. Note that edges other than edge Q1, Q3, Q21, Q25 and Q29 do not have a switching-identifier assigned.

The number of edges within a set of incoming and/or outgoing edge-relationships may be reduced by determining a relevant incoming and/or outgoing set of edge-relationships as described above (cf PCT/EP2014/055640, page 197). The combination of above input port, output port, a set of incoming edge-relationships, and a set of outgoing edge-relationships and switching-identifiers, as contained by a recursive-path of the requested topology-path named Q29 results in the forwarding entries for physical nodes KE, KF and KG, shown in FIG. 20H. Said forwarding entries comprise of an input port, an output port, the switching-identifiers of incoming set of edge-relationships and the switching-identifiers of outgoing set of edge-relationships.

Forwarding entries for a physical packet-switching node are calculated by performing the method described above. Forwarding entries for a physical non-packet-switching node are calculated by performing the method described above.

In FIG. 20H the switching-identifiers of an edge are shown between brackets. In FIG. 20H, 'Source' has been abbreviated by 'SRC', and 'Destination' has been abbreviated by 'DST'. As will be understood by a person skilled in the art, the switching-identifiers named Q1, Q3, Q21 and Q25 determine a packet header, such as created in this example by physical equipment KE, as shown in FIG. 20H, while the switching-identifier named Q29 determines a packet payload, such as created in this example by physical equipment KE, as shown in FIG. 20H. Note that a requested topology-level-path could be a single message-stream, such as in the example of FIGS. 20A through 20H a single HTTP request 'HTTP Request 1'. More practical, a requested topology-level-path could be a set of message-streams, such as multiple HTTP requests. Note that the user of the SDN Compiler defining, or requesting, a requested topology-level-path representing a message-stream could be a person, such as for example, but not limited to, a Software Developer, IT architect, IT operator. Note that the user of the SDN Compiler defining, or requesting, a requested topology-level-path representing a message-stream could be a program, such as for example but not limited to a compiler or a cloud orchestration system. Note that in this example the switching-identifier of the topology-path named Q25 is the 3-tuple of 'TCP, Source port 80, Destination port 80'. As will be understood by a person skilled in the art, so-called 'well-known TCP port' 80 is used, denoting HTTP. Instead of using a well-known-port, a port could be used with a number outside the well-known-port range, as the instructions created by the SDN Compiler include the relationships between an identifier at the application layer (OSI layer 7), in this example 'Source port 80, Destination port 80' and the identifier of a message-stream, in this example 'HTTP Request 1'. Note that instead of the loose coupling between applications and the application layer (OSI layer 7) that is provided by a well-known-port, a tighter coupling between applications and the application layer is created using the above described approach. Also, it is current practice to use well-known TCP-port 80 (HTTP) for many applications, making it impossible to distinguish between these applications based on an application-layer identifier. In case multiple applications use the same IPv4 or IPv6 address and the same well-known port (e.g. well-known TCP-port 80), which is not uncommon, it is not possible to distinguish between said applications based on packet header information, resulting in usage of much more resource-consuming inspection of the payload of packets. Using a port number outside the well-known-port range allows for discrimination of applications using the same IPv4 or IPv6 address in an IP-based network. Note that in above description reference is made to 'forwarding entries' also in case of host node, used as a single term for instructions for physical equipment. As will be understood by a person skilled in the art, a host node is not forwarding, but only sending and receiving packets or signals.

Note that in case edges have been given a name which can be used for forwarding, switching-identifiers can be omitted and forwarding entries can be created directly from the name of said edges. In an implementation though, typically edges are stored using a different namespace than the namespace used for forwarding.

PCT/EP2014/055640 (page 222) describes that a requested topology-path, level-path or topology-level-path can be considered as a service for a user. An example, but not limited to, of said user being a person, an organization, or an application. Typically, the requirements of said service are stored in a contract, being a Service-Level-Agreement (SLA) between said user and the provider of said service. When a requested topology-level-path, which includes by definition a topology-path and includes by definition a level-path, is a message-stream, a SLA can be created between the application and the provider of said service, being the SDN Compiler.

PCT/EP2014/055640 (page 222) describes that the SDN Compiler method uses edge-relationships which are used to determine the impact of any changes in a set of networks and will recalculate edges to maintain the service represented by the requested topology-level-path. When a requested topology-level-path is a message-stream, a SLA can now be maintained by the SDN Compiler. As described in PCT/EP2014/055640 (page 153) typical requirements for the characteristics of a topology-path include, but are not limited to, capacity (throughput), delay, jitter, packet loss, availability and packet sequence preservation, being important characteristics for a message stream.

PCT/EP2014/055640 (page 221) describes that when creating a topology-mapping, layer-mapping, topology-path, level-path or topology-level-path per above described method, optionally one or more requirements are taken into account when creating said topology-mapping, layer-mapping, topology-path, level-path or topology-level-path. As will be understood by a person skilled in the art, by storing properties of networks and edges, by using this information in the creation of a topology-mapping, layer-mapping, topology-path, level-path or topology-level-path, by having the ability to calculate a recursive-path at any point in time, by having this information centrally stored, much more complex requirements can be created than in current networking implementations. When a requested topology-level-path is a message-stream, one or more requirements can be taken into account when creating said topology-level-path.

The above described actions are described by the following method:

Method of controlling an overall network by a compiler, based on a logical network model, the overall network comprising two or more physical nodes, the physical nodes being interconnected by physical links in accordance with a physical network layout, the logical network model comprising logical nodes, each logical node being indicated with a logical node name, each logical node name referring to at least one physical node in the network, a logical node at a highest layer denoting logical storage or logical compute, the method as performed by the compiler comprising the following actions:

a) Storing physical node names, each physical node name being an unique identifier of one physical node, storing physical topology-mappings, each physical topology-mapping being one physical link in one direction, said physical topology-mapping being based on a directed graph representation, and storing point-of-attachment names of said physical nodes, each of the point-of-attachment names of a physical node concerned being an unique identifier of a point-of-attachment between the certain physical node concerned and a physical link connecting the physical node concerned to another physical node, b) Storing logical node names for said logical nodes, each logical node name being an unique identifier of one logical node and storing depth-mappings, said depth-mappings at least defining how logical nodes are mapped to physical nodes, said depth-mapping being based on a directed graph representation, c) Creating and storing one or more first logical topology-mappings, each first logical topology-mapping being a directed graph representation from a first logical node to a second logical node, calculated as a concatenation of a first depth-mapping from the first logical node to a first physical node, a physical topology-path from the first physical node to a second physical node and a second depth-mapping from the second physical node to the second logical node, said physical topology-path being a concatenation of one or more physical topology-mappings, d) Creating and storing one or more first logical layer-mappings, each first logical layer-mapping being a directed graph representation from a third logical node to a fourth logical node, optionally calculated as a concatenation of a third depth-mapping from the third logical node to a third physical node, a first physical layer-mapping from said third physical node to a fourth physical node, and a fourth depth-mapping from the fourth physical node to the fourth logical node, e) Creating and storing one or more second logical topology-mappings, each second logical topology-mapping being a directed graph representation from a fifth logical node to a sixth logical node, calculated as a concatenation of a second logical layer-mapping from the fifth logical node to a seventh logical node, a logical topology-path from the seventh logical node to an eighth logical node and a third logical layer-mapping from the eighth logical node to the sixth logical node, said logical topology-path being a concatenation of one or more third logical topology-mappings, f) Creating and storing a requested-topology-path being a concatenation of one or more fourth logical topology-mappings, said fourth logical topology-mappings being a topology-mapping from a ninth logical node at a highest layer to a tenth logical node at a highest layer, said requested-topology-path denoting a logical message-stream, g) Calculating through recursion and storing a recursive-path for said requested-topology-path, comprising logical nodes as indicated by said logical node names, depth-mappings, physical nodes as indicated by said physical node names, physical topology-mappings, optional physical layer-mappings, physical point-of-attachments as indicated by physical point-of-attachment names, said recursive-path being based on a directed graph representation, h) Creating forwarding table entries for physical nodes in said recursive-path from said recursive-path, i) Sending said forwarding table entries, either directly or indirectly, to physical nodes in said recursive-path.

Optionally, the following actions may be performed:

at action c) storing for each of said first logical topology-mappings edge-relationships comprising a first edge-relationship being a relationship between the first depth-mapping and said first logical topology-mapping, one or more second edge-relationships each second edge-relationship being a relationship between one of said one or more physical topology-mappings in said physical topology-path and said first logical topology-mapping or a second edge-relationship being a relationship between said physical topology-path and said first logical topology-mapping and one or more fourth edge-relationships each fourth edge-relationship being a relationship between one of said one or more physical topology-mappings and said physical topology-path, and a third edge-relationship being a relationship between the second depth-mapping and said first logical topology-mapping, at action d) storing for each of said first logical layer-mappings edge-relationships comprising a fifth edge-relationship being a relationship between the third depth-mapping and said first logical layer-mapping, a sixth edge-relationship being a relationship between said first physical layer-mapping and said first logical layer-mapping, and a seventh edge-relationship being a relationship between the fourth depth-mapping and said first logical layer-mapping, at action e) storing for each of said second logical topology-mappings edge-relationships an eighth edge-relationship being a relationship between the second logical layer-mapping and said second logical topology-mapping, one or more ninth edge-relationships, each ninth edge-relationship being a relationship between said logical topology-path and said second logical topology-mapping and an tenth edge-relationship being a relationship between the third logical layer-mapping and said second logical topology-mapping, one or more eleventh edge-relationships each eleventh edge-relationship being a relationship between one of said one or more third logical topology-mappings in said logical topology-path and said logical topology-path.

at action f) storing one or more further edge-relationships, each further edge-relationship concerned being a relationship between one logical topology-mapping within the requested-topology-path and said requested-topology-path, Optionally, the following action may be performed:

at action e) calculating and storing nested edge-relationships,

As will be understood by person skilled in the art, the above method is beneficial in a Service Oriented Architecture (SOA). Examples of a SOA are SOAP-based Web Services. As an example, we consider a Web Services Simple Object Access Protocol (SOAP) request, as shown in FIG. 21A. FIG. 21A shows logical node FK, being a user agent with logical name URI-1, and logical node FL, being an origin server with logical name URI-2, topology-mapping named Q28, topology-path named Q29 denoting 'HTTP Request 1', and topology-path named Q42 denoting 'SOAP Request A'. Note that the topology-path named Q42 denoting 'SOAP Request A' is mapped to the topology-path named Q29 denoting 'HTTP Request 1' as in this example the SOAP request is made over HTTP. Per notation of FIG. 6C, the topology-path named Q42 is 'toppath Q42=Q29/Q42'. As known by a person skilled in the art as an alternative, the SOAP request could be made over TCP.

An example of a SOA are REST-based Web Services. As an example, we consider a Web Services REST request [REST=REpresentational State Transfer REST], as shown in FIG. 21B. FIG. 21B shows showing logical node FK, being a user agent with logical name URI-1, and logical node FL, being an origin server with logical name URI-2, topology-mapping named Q28, topology-path named Q29 denoting 'REST Request B'. Note that as REST uses HTTP, the topology-path named Q29 is the requested topology-path.

As an example, but not limited to, we now consider the response to 'HTTP request 1' from node FL to node FK.

FIG. 22A shows physical nodes KE, KF, KG and logical nodes FE, FF, FG, FH, FJ, FK and FL and shows topology-mappings named Q2, Q4, Q30, Q31, Q35, Q39, depth-mappings named Q5 through Q15, Q18, layer-mappings named Q33, Q34, Q37, Q38 and Q55 through Q58, and topology-paths named Q32, Q36, Q40, represented as directed edges in a graph.

FIG. 22B shows topology-mappings Q30, Q31, Q35, Q39, layer-mappings named Q33, Q34, Q37, Q38 and topology-paths named Q32, Q36, Q40, Q41, per the notation of FIG. 6C. The topology-mapping named Q2 is a physical link in the direction from node KF to node KE. The topology-mapping named Q4 is a physical link in the direction from node KG to node KF. The topology-mappings named Q30 and Q31 are calculated using the first method to calculate a topology-mapping, as shown in FIG. 22A and also shown in FIG. 22B using the notation of FIG. 6C. The topology-mappings named Q35 and Q39 are calculated using the second method to calculate a topology-mapping, as shown in FIGS. 22A and 22B. The layer-mappings named Q33 and Q37 are calculated using the first method to calculate a layer-mapping with the third and fourth network in said method being the same node KE, as described above. The layer-mappings named Q34 and Q38 are calculated using the second method to calculate a layer-mapping with the third and fourth network in said method being the same node KE, as described above. The response to 'HTTP request 1' from logical node FL, being an origin server, to logical node FK, being a user agent, is a requested topology-path named Q40, shown in FIG. 22A. The recursive-path of the requested topology-path named Q40 and the forwarding entries can be calculated as per description above for the requested topology-path named Q29 and is not further described.

FIG. 22C shows the HTTP interaction between user agent, being logical node FK and origin server, being logical node FL, comprising of 'HTTP request 1', being the requested topology-path named Q29, and 'HTTP response 1', being the requested topology-path named Q40. We can now represent an HTTP interaction comprising of a HTTP request and a HTTP response in the method by creating a requested topology-path being the HTTP interaction comprising of a topology-path being the HTTP request and a topology-path being the HTTP response. For the example, but not limited to, shown in FIG. 22C, we create a requested topology-path named Q41. Per notation of FIG. 6C, the topology-path named Q41 is 'toppath Q41=Q29/Q41+Q40/Q41'. Note that topolgoy-path Q41 is not shown in FIG. 22C to keep FIG. 22C relatively simple. The recursive-path of the requested topology-path named Q41 and the forwarding entries can be calculated as per description above for the requested topology-path named Q29 and is not further described.

The above described method allows for creating an interaction comprising of two or more topology-paths. As will be understood by a person skilled in the art such interaction is not limited to an interaction comprising of an HTTP request and an HTTP response, but any interaction between two or more logical nodes denoting logical storage and/or logical compute. Note that in a client-server architecture, the interaction is a point-to-point interaction from client to server and from server to client, resulting in a first requested topology-path comprising of a concatenation of a second topology-path and a third topology-path. Note that the described method allows for an interaction between an arbitrary number of logical nodes denoting logical storage and/or compute, said logical node being connected in an arbitrary topology through topology-mappings, and said interaction comprising of a concatenation of an arbitrary number of topology-paths. Note that alternatively, a topology-mapping from a first logical node to a second logical node might represent a request, for example, but not limited to the topology-mapping named Q28 shown in FIG. 22C. Note that alternatively, a topology-mapping from said second logical node to said first logical node might represent a response, for example, but not limited to the topology-mapping named Q39 shown in FIG. 22C. When using topology-mappings to denote a request and to denote a response, a requested topology-path denoting an interaction comprises of a concatenation of topology-mappings. Using above approach, a software architecture in a message-based distributed system can now be represented by a directed graph.

PCT/EP2014/055640 (page 177) describes that a topology-level-path used in the first method, second method, fourth method and fifth method to calculate a topology-mapping can be a topology-level-path, a topology-path or a level-path, as a topology-level-path can comprise of a single topology-path and a topology-level-path can comprise of a single level-path. PCT/EP2014/055640 (page 177, FIG. 50G) describes that when creating a topology-mapping the topology-level-path used in the calculation of the topology-mapping can either be a topology-level-path that is explicitly created or can be a concatenation of topology-mappings and level-mappings. In the example shown in FIG. 20B the topology-path named Q25 comprises of a single topology-mapping named Q24.

In order to improve the efficiency of the method, the creation of the topology-path named Q25 could be omitted, as shown in FIG. 23A. FIG. 23A shows a physical node KE at (d=0, n=0, h=0), representing a first physical equipment, a physical node KF at (d=0, n=0, h=0), representing a second physical equipment, and a physical node KG at (d=0, n=0, h=0), representing a third physical equipment, logical nodes FE, FF and FG at (d=1, n=1, h=0), logical nodes FH and FJ at (d=1, n=2, h=0), and logical nodes FK and FL at (d=1, n=3, h=0). FIG. 23A also shows topology-mappings named Q1, Q3, Q19, Q20, Q24, Q28, depth-mappings named Q5 through Q14, Q16, Q17, layer-mappings named Q22, Q23, Q26, Q27 and Q51 through Q54, and topology-paths named Q21, Q29, represented as directed edges in a graph. When omitting the topology-path named Q25, the topology-mapping named Q28 is calculated as 'topmap Q28=Q26/Q28+Q24/Q28+Q27/Q28'. Instead of assigning switching-identifier 'TCP, Source port 80, Destination port 80' to the topology-path named Q25, as shown in FIG. 20E, a switching-identifier 'TCP, Source port 80, Destination port 80' is assigned to the topology-mapping named Q24, yielding the same forwarding instructions for physical nodes KE, KF and KG, shown in FIG. 20H.

Alternatively, in case a topology-path comprises of a single topology-mapping, the first method to calculate a topology-mapping can be used to create a topology-path directly. In the example shown in FIGS. 20B and 20D the topology-path named Q25 comprises of a single topology-mapping named Q24. FIG. 23B shows a physical node KE at (d=0, n=0, h=0), representing a first physical equipment, a physical node KF at (d=0, n=0, h=0), representing a second physical equipment, and a physical node KG at (d=0, n=0, h=0), representing a third physical equipment, logical nodes FE, FF and FG at (d=1, n=1, h=0), logical nodes FH and FJ at (d=1, n=2, h=0), and logical nodes FK and FL at (d=1, n=3, h=0). FIG. 23B also shows topology-mappings named Q1, Q3, Q19, Q20, depth-mappings named Q5 through Q14, Q16, Q17, layer-mappings named Q22, Q23, Q26, Q27 and Q51 through Q54, and topology-paths named Q21, Q25, Q29, represented as directed edges in a graph.

As a first example, but not limited to, as shown in FIG. 23B, the topology-path named Q25 could be calculated as 'toppath Q25=Q22/Q25+Q21/Q25+Q23/Q25'. As a second example, but not limited to, as shown in FIG. 23B, the topology-path named Q29 could be calculated as 'toppath Q29=Q26/Q29+Q25/Q29+Q27/Q29'. PCT/EP2014/055640 (page 175 through 177) describes a first method to calculate a topology-mapping, a second method to calculate a topology-mapping, a third method to calculate a topology-mapping, a fourth method to calculate a topology-mapping, and a fifth method to calculate a topology-mapping. In case a topology-path comprises of a single topology-mapping, the first method to calculate a topology-mapping, the second method to calculate a topology-mapping, the third method to calculate a topology-mapping, the fourth method to calculate a topology-mapping, the fifth method to calculate a topology-mapping can be used to calculate a topology-path directly:

A first method for calculating a topology-path directly, comprising the following actions:
   Calculating and storing a topology-path from a first network at (d, n1, h) to a second network at (d, n1, h) as a concatenation of a depth-mapping from said first network to a third network at (d–x, n2, h), a topology-level-path from said third network to a fourth network at (d–x, n2, h) and a depth-mapping from said fourth network to said second network with x being larger than zero and smaller than or equal to d, where n1 may be equal to n2.

A second method for calculating a topology-path directly, comprising the following actions:
   Calculating and storing a topology-path from a first network at (d, n, h) to a second network at (d, n, h) as a concatenation of a layer-mapping from said first network to a third network at (d, n–y, h), a topology-level-path from said third network to a fourth network at (d, n–y, h) and a layer-mapping from said fourth network to said second network with y being larger than zero and smaller than or equal to n-n_min(d), n_min(d) being a lowest layer at particular depth d and n_min(d) being =>0.

The calculation of the topology-paths named Q25 and Q29 as explained above are examples of the second method for calculating a topology-path directly.

A third method for calculating a topology-path directly, comprising the following actions:
   Calculating and storing a topology-path from a first network at (d, n, h) to a second network at (d, n, h) as a concatenation of one or more level-mappings with decreasing level from the first network to a third network at (d, n, h–z), a topology-path from the third network to a fourth network at (d, n, h–z) and one or more level-mappings with increasing level from the fourth network to the second network, with z larger than zero and smaller than or equal to h-h_min, h_min being the lowest level at depth d and layer n.

A fourth method for calculating a topology-path directly, comprising the following actions:
   Calculating and storing a topology-path from a first network at (d, n, h) to a second network at (d, n, h) as a concatenation of a layer-mapping from said first network to a third network at (d, n+y, h), a topology-level-path from said third network to a fourth network at (d, n+y, h) and a layer-mapping from said fourth network to said second network with y larger than zero and smaller than or equal to n_max-n, n_max being the highest layer at particular depth d.

A fifth method for calculating a topology-path directly, comprising the following actions:

Calculating and storing a topology-path from a first network at (d, n1, h) to a second network at (d, n1, h) as a concatenation of a depth-mapping from said first network to a third network at (d+x, n2, h), a topology-level-path from said third network to a fourth network at (d+x, n2, h) and a depth-mapping from said fourth network to said second network with x larger than zero and smaller than or equal to d_max-d, d_max being the highest depth.

As will be understood by a person skilled in the art, the combination of above described methods to reduce the number of edges as shown in the examples of FIGS. 23A and 23B can also be applied.

As will be understood by a person skilled in the art, in the example shown in FIGS. 20A through 20H and described above, in case a well-known port is used, such as for example, but not limited to well-known TCP port 80 denoting HTTP, it is not necessary to create forwarding instructions for physical nodes denoting physical storage or physical compute, as said well-known port provides already a relationship between a logical identifier at the application layer and a logical identifier denoting logical storage or logical compute. Therefore, in the example shown in FIG. 20H, the switching-identifier of the topology-path named Q29 with value 'HTTP Request 1' could have been omitted, resulting in the forwarding entries for physical nodes KE and KG shown in FIG. 16F. Alternatively, in case no forwarding instructions need to be created for physical nodes denoting physical storage or physical compute, but logical nodes denoting logical storage or logical compute need to be created, for example but not limited to, to create a request from a first logical node denoting logical storage or logical compute to a second logical node denoting logical storage or logical compute, logical layer-mapping can be created directly instead of calculating logical layer-mappings using the first method to calculate a layer-mapping or using the second method to calculate a layer-mapping.

In the last decade, processors have evolved from single-core towards multi-core processors, which have become a common hardware design. Also, computation has become increasingly more distributed over multiple physical computing and storage resources connected by networks, such as for example but not limited to within datacenters and between datacenters. The current challenge/problem is to program these distributed networked physical and/or virtual resources, being distributed over a single processor, a single physical and/or virtual computing system (such as a server utilizing multiple processors), a single datacenter or over multiple datacenters. As will be understood by a person skilled in the art, said challenge/problem poses the following, none exhaustive list, requirements:

1) the ability to express concurrency. We define concurrency as independent logical processes within a program or algorithm.
2) the ability to compile from concurrency to parallel or distributed physical and/or virtual resources
3) the ability to provide networking guarantees between said distributed physical and/or virtual resources
4) the ability to optimize physical and/or virtual resources, said physical and/or virtual resources comprising of physical and/or virtual nodes and physical and/or virtual links
5) the ability to adapt to changes, said changes being changes in physical and/or virtual resources or user or program specifications.
6) the ability to provide resiliency
7) the ability to scale Recently, interest has grown in programming methodologies in which a program is expressed as logical processes exchanging data through message-passing. Typically, each logical process has a dedicated memory and data can only be shared between logical processes through message-passing, having the clear advantage that there is no shared mutable state between logical processes. As there is no shared mutable state between logical processes, the behavior of said logical processes is deterministic and each logical process may be compiled against multiple physical and/or virtual resources in parallel or distributed. Said message-passing from a first node to a second node may be performed over a logical channel from a first node to a second node.

Concurrency is expressed naturally in said programming methodology (point 1 above) and independent logical processes within a program or algorithm may be compiled against multiple parallel or distributed physical and/or virtual resources (point 2 above).

In case each logical process has at least one buffer, the operation of the overall system is asynchronous. In other words, processes are not synchronized and can operate independently.

The above programming model relies heavily on a physical and/or virtual network when compiled against multiple distributed physical and/or virtual resources. Currently, it is very hard, if not impossible, to provide guarantees from said physical and/or virtual network, as there is a loose coupling between networking on one hand, and storage and compute on the other hand. One of the main reasons for this loose coupling is the distributed control of networks. By changing from a distributed control of networks to a centralized control of networks, as per the SDN Compiler method disclosed in PCT/EP2014/055640, centralized control of storage, compute, networking becomes possible. The SDN Compiler method disclosed in PCT/EP2014/055640 (page 40) provides said networking guarantees, which may be stored in a Service-Level Agreement (SLA).

The above programming model lacks other networking constructs as well, such as for example but not limited to multiplexing and de-multiplexing, guaranteed order of delivery.

As described above, a topology-path starting at one or more nodes, traversing one or more nodes, ending at one or more nodes, at which at least one operation call is defined results in one or more operation calls being performed sequentially or in parallel, and can be regarded a program comprising of one or more operation calls.

Said operation call and topology-path are defined by a user of an SDN Compiler, thereby providing programmability of a logical network to said user of an SDN Compiler. Said topology-path may be a requested topology-path.

We use a logical network, as disclosed in PCT/EP2014/055640, to define logical processes exchanging data through message-passing over a channel. We represent a logical process by a logical node LR. We represent a logical channel by a logical topology-mapping. We represent a program by a logical topology-path, as described above. We represent a physical processes and physical processors by physical nodes. We represent an interconnection a first physical process to a second physical process by a topology-mapping. We represent an interconnection from said first physical processor to a second physical processor by a topology-mapping. A first physical node representing a physical process is related to a second physical node representing a physical processor through a layer-mapping. The layer n1 of said first physical node representing a physical process is larger than the layer n2 of said second physical node representing a physical processor. Logical processes and physical processes are related through depth-mappings. Note that alternatively a first physical node representing a physical process may be related to a second physical node representing a physical processor through a level-mapping.

As an example, but not limited to, FIG. 28A shows a first logical process represented by a logical node LR and second logical process represented by a logical node LS. We represent a logical channel from said first logical process to said second logical process by a logical topology-mapping named G4 from logical node LR to logical node LS. We represent a program by a logical topology-path, as described above. We represent a first physical process by physical node KR and represent a second physical process by physical node KS. We represent a first physical processor, on which said first physical process is deployed by a third physical node KP. We represent a second physical processor, on which said second physical process is deployed by a fourth physical node KQ. We represent an interconnection from said first physical process, represented by physical node KR, to said second physical process, represented by physical node KS, by a topology-mapping G7. We represent an interconnection from said first physical processor, represented by physical node KP, to said second physical processor, represented by physical node KQ, by a topology-mapping G1. Physical node KR, representing a first physical process, and physical node KP, representing a first physical processor are related through layer-mappings. Physical node KR is mapped to physical node KP through layer-mapping decreasing in layer named G8. Physical node KS, representing a second physical process, and physical node KQ, representing a second physical processor are related through layer-mappings. Physical node KQ is mapped to physical node KS through layer-mapping increasing in layer named G9. Logical processes and physical processes are related through depth-mappings. Logical node LR, representing a first logical process is mapped to physical node KR, representing a first physical process through a depth-mapping named G5 decreasing in depth. Physical node KS, representing a second physical process, is mapped to logical node LS, representing a second logical process through a depth-mapping named G6 increasing in depth. Topology-mapping G7 is defined as "topmap G7=G8/G7+G1/G7+G9/G7", per the notation of FIG. 6C. Topology-mapping G4 is defined as "topmap G4=G5/G4+G7/G4+G6/G4", per the notation of FIG. 6C.

Alternatively, physical processes might be omitted and logical processes may be mapped to physical processors through depth-mappings. As an example, but not limited to, FIG. 28B shows a first logical process represented by a logical node LR and second logical process represented by a logical node LS. We represent a logical channel from said first logical process to said second logical process by a logical topology-mapping named G4 from logical node LR to logical node LS. We represent a program by a logical topology-path, as described above. We represent a first physical processor by a third physical node KP. We represent a second physical processor by a fourth physical node KQ. We represent an interconnection from said first physical processor, represented by physical node KP, to said second physical processor, represented by physical node KQ, by a topology-mapping named G1. Logical processes and physical processors are related through depth-mappings. Logical node LR, representing a first logical process is mapped to physical node KP, representing a first physical processor through a depth-mapping named G2 decreasing in depth. Physical node KQ, representing a second physical process, is mapped to logical node LS, representing a second logical process through a depth-mapping named G3 increasing in depth. Topology-mapping G4 is defined as "topmap G4=G2/G4+G1/G4+G3/G4", per the notation of FIG. 6C.

Omitting physical processes as described above has the advantage of reducing the amount of information stored and complexity of calculations.

As described above, and described in non-pre-published prior art EP14185828.2 (page 45) the SDN Compiler method disclosed in PCT/EP2014/055640 may be extended to determine depth-mappings, relating nodes at different depths, by an SDN Compiler based on requirements of logical nodes, logical-topology-mappings, and optionally logical layer-mappings, specified by a user of an SDN Compiler. We apply this method to a logical network used to define logical processes exchanging data through message-passing as described above. Now, the placement of logical processes at physical processors is determined by an SDN Compiler.

As described above, concurrency is expressed naturally in the presented programming methodology comprising of a logical network, at least one logical topology-path and additional operations, and can be compiled against distributed or parallel physical resources using the SDN Compiler method.

Per the SDN Compiler method disclosed in PCT/EP2014/055640, an SDN Compiler supervises physical nodes. We apply this method to a logical network used to define logical processes exchanging data through message-passing as described above. Now, the supervision of physical processors and optionally physical processes is performed by an SDN Compiler. In case a physical processor fails the SDN Compiler method disclosed in PCT/EP2014/055640 is used to determine a new physical processor to perform the task. In case a physical process fails the SDN Compiler method disclosed in PCT/EP2014/055640 can be used to determine a new physical process to perform the task.

The above presented method provides a single compiler method and programming methodology for computing, storage and networking. The above presented method provides networking guarantees and networking functionality to storage and compute.

The above presented method provides enhanced networking functionality through additional operations. Said additional operations may be implemented in a functional programming language.

As will be understood by a person skilled in the art, the above presented additional operations might include complex programs or applications, such as for example but not limited to a database or middleware.

The above presented method provides the ability to optimize physical resources, said physical resources comprising of physical nodes and physical links. The above presented method provides the ability to adapt to changes, said changes being changes in physical resources or user or program specifications. The above presented method provides resiliency the ability to scale up or down.

As an example, we use a logical network, shown in FIG. 13B, to define logical processes MA, MB, MC, MD, ME, MF, MG, MH exchanging data through message-passing. We represent logical processes by logical nodes MA, MB, MC, MD, ME, MF, MG, MH. We represent channels over which data is exchanged between logical processes by the logical topology-mappings named K21 through K29. We represent a program by a logical topology-path named K31. We define operation calls F1, F2, F3, F4, F5, F6, F7 as shown in FIG. 14D. The topology-path named K31 determines the data-dependency between logical nodes MA, MB, MC, MD, ME, MF, MG, MH as shown in FIG. 13E.

We now apply the method presented above, and shown in FIGS. 15A through 15I to compile the logical network shown in FIG. 13B and the operation calls shown in FIG. 14D to physical nodes QA, QB, QC, QD, QE, QF, QG, QH. Note that physical nodes QA, QB, QC, QD, QE, QF, QG, QH are now considered physical processors. Note that physical processes are not modeled, as per FIG. 28B explained above, to keep the example relatively simple. Note that, here, even though compiling is performed against compute processors and the meaning of the physical nodes QA, QB, QC, QD, QE, QF, QG, QH is now different, no new drawings are presented.

As described above, and shown in FIG. 16, code may be generated by an SDN Compiler for one or more physical processes running on physical processors. Any traditional compiler may be used to compile said code. Said compiled code could be deployed at a physical node being a physical processor.

As described above and shown in FIGS. 17A through 17I and 18A through 18E code can be generated by an SDN Compiler. Said code can be executed by a traditional compiler and can be deployed at physical nodes being physical processors.

The above method can be applied to a multi-layer network, comprising of logical storage and logical compute at the highest layer.

We now consider a migration of an overall logical network. We define a migration of an overall logical network comprising of a set of logical nodes, said overall logical network being deployed against a first set of physical nodes, as compiling said overall logical network to a second set of physical nodes, and copying data stored in input and/or output buffers of said first set of physical nodes, to input and/or output buffers of said second set of physical nodes, thereby continuing the operation of said overall logical network.

The method is shown in the flowchart of FIG. 25, comprising of steps 1) through 7). The method is illustrated by the example shown in FIGS. 26A through 26D and 27A through 27G.

An example overall logical network is shown in FIG. 26A. Note that FIG. 26A is identical to FIG. 15B described above, except that in FIG. 26A buffer content B1 through B16 are shown. A migration may be requested by a user of an SDN Compiler to migrate an overall logical network. Said overall logical network comprising of a set of logical nodes. Alternatively, an SDN Compiler might start a migration itself, based on some predefined rules, for example but not limited to, in case of multiple simultaneous failures in a physical network.

Step 1

Determine forwarding instructions that have been created for said overall logical network and a first set of physical nodes (QA; QB; QC; QD; QE; QF; QG; QH) at which said forwarding instructions have been deployed.

Said forwarding instructions are shown in FIG. 15H. In this example requested topology-path named K31 is the only requested topology-path. In general the method can be applied to an overall logical network with one or more requested topology-paths, requested level-paths or requested topology-level-paths. Said forwarding instructions may have been stored by the SDN Compiler or may be calculated by the SDN Compiler.

Step 2

Send instructions to said first set of physical nodes (QA; QB; QC; QD; QE; QF; QG; QH) to:
 a) Stop packet forwarding activities at a first time t1
 b) Send buffer content matching said forwarding instructions at a second time t2>=t1 to SDN Compiler
 c) Remove said forwarding instructions At step 2a) said first set of physical nodes are instructed to stop packet forwarding. This action includes transmitting host nodes to stop sending packets. In order to synchronize this activity among physical nodes a time t1 is included in the instruction. For synchronous execution said physical nodes will have to be timed and synchronized.

At step 2b) said first set of physical nodes are instructed to send buffer content matching said forwarding instructions at time t2 to the SDN Compiler. This activity can be performed by a physical node by pattern-matching the content of one or more input buffers to said forwarding instructions. The content of output buffers may be forwarded out of an output port. Optionally, the content of output buffers may be sent to said SDN Compiler.

An optional time difference (t2−t1) is used to allow input buffers to receive any content from physical topology-mappings, physical layer-mappings and optionally output buffers of physical nodes. Said physical topology-mappings and physical layer-mappings represent physical links. As will be understood by a person skilled in the art a latency of a physical link known to said SDN Compiler may be used to calculate (t2−t1).

At step 2c) said first set of physical nodes are instructed to remove said forwarding instructions. Alternatively, step 2c) may be omitted. By not applying step 2c) an overall logical network is compiled to two sets of physical and/or virtual resources, as an example but not limited to for testing purposes.

Step 3

Receive and store buffer content from said first set of physical nodes (QA; QB; QC; QD; QE; QF; QG; QH).

FIG. 26B shows buffer content B1 through B16, as sent from physical nodes QA, QB, QC, QD, QE, QF, QG, QH to said SDN Compiler. Note that each buffer of a physical node is denoted by a Point-of-Attachment (PoA) and a buffer type, said buffer type being 'input buffer' or 'output buffer'. Alternatively, each buffer may be named. Note that the content of both input and output buffers is considered, as shown in the fourth column of FIG. 26B. As an example, but not limited to, physical node QB sends buffer content B2 which resided in an input buffer at PoA p432, sends buffer content B3 which resided in an output buffer at PoA p433, and sends buffer content B11 which resided in an input buffer at PoA p441. Note that said physical node may optionally send the PoA denoting the buffer and the buffer type from which said buffer content was sent.

Step 4

Map buffer content from said first set of physical nodes to buffers of said set of logical nodes and store said buffer content with said set of logical nodes.

We consider logical nodes to have an input buffer and optionally an output buffer. It is our objective to determine a buffer of a logical node for each buffer content received from a physical node. We use the recursive-path of a requested-path (K31, as shown in FIG. 26C), said requested-path being determined by a packet received from a physical node, to determine said buffer of a logical node. We use the PoA and buffer type denoting the buffer from which said buffer content was sent to determine the position in the recursive-path to store said buffer content. FIG. 26C shows the recursive-path of the topology-path named K31 including buffer content B1 through B16 using the PoA and buffer type denoting the buffer from which said buffer content was sent to determine the position in the recursive-path to store said buffer content. Said PoA and buffer type may be sent by said physical node. Alternatively, a buffer of a physical node may be named and a buffer name may be sent by said physical node. In case said PoA and buffer type are not sent by said physical node, said PoA may be determined from the packet header. We use a combination of a logical node name and a logical topology-mapping to denote a buffer of said logical node. Alternatively, point-of-attachments may be defined for logical nodes, and the combination of said point-of-attachment and buffer-type ('input buffer', 'output buffer') may be used to denote said buffer of said logical node. Alternatively, a buffer of a logical node may be named.

In FIG. 26C the buffer content B7 has been split in B7(1) and B7(2), B7(1) comprising of packets with the topology-mapping named K24 in the set of edge-relationships in the header of said packet, and B7(2) comprising of packets with the topology-mapping named K28 in the set of edge-relationships in the header of said packet. In FIG. 26C the buffer content B8 has been split in B8(1) and B8(2), B8(1) comprising of packets with the topology-mapping named K24 in the set of edge-relationships in the header of said packet, and B8(2) comprising of packets with the topology-mapping named K28 in the set of edge-relationships in the header of said packet.

We now apply the following method:

i) IF said buffer content (B1; B3; B7(1); B11; B13) belongs to an output buffer (p431; p433; p437; p441; p444) of a physical node (QA; QB; QD; QB; QG) and said physical node (QA; QB; QD; QB; QG) is mapped to a logical node (MB; MC; MD; MC; MG) through a depth-mapping decreasing in depth (K43; K45; K47; K45; K51) within said recursive-path, storing said buffer content (B1; B3; B7(1); B11; B13), storing said logical node (MB; MC; MD; MC; MG), storing a topology-mapping (K22; K23; K24; K25; K28) related to said depth-mapping decreasing in depth (K43; K45; K47; K45; K51) through an edge-relationship (K43/K22; K45/K23; K47/K24; K45/K25; K51/K28) and storing said buffer type.

ii) ELSE IF said buffer content (B2; B6; B8(1); B10; B12; B16) belongs to an input buffer (p432; p436; p438; p440; p442; p446) of a physical node (QB; QD; QE; QF; QG; QH) and said physical node (QB; QD; QE; QF; QG; QH) is mapped to a logical node (MC; MD; ME; MH; MG; MH) through a depth-mapping increasing in depth (K44; K46; K48; K52; K49; K53) within said recursive-path, storing said buffer content (B2; B6; B8(1); B10; B12; B16), storing said logical node (MC; MD; ME; MH; MG; MH), storing a topology-mapping (K22; K23; K24; K28; K25; K28) related to said depth-mapping increasing in depth (K44; K46; K48; K52; K49; K53) through an edge-relationship (K44/K22; K46/K23; K48/K24; K52/K28; K49/K25; K53/K28) and storing said buffer type.

iii) ELSE storing said buffer content (B4; B5; B7(2); B8(2); B9; B14; B15) that belongs to an input buffer (p434; p438; p443) OR output buffer (p435; p437; p439; p445) of a physical node (QC; QC; QD; QE; QE; QD; QE) with the next logical node (MD; MD; MH; MH; MH; MH; MH) relative to said physical node (QC; QC; QD; QE; QE; QD; QE) within said recursive-path and determine a depth-mapping increasing in depth (K46; K46; K52; K52; K52; K52; K53) connected to said next logical node (MD; MD; MH; MH; MH; MH; MH), storing said logical node (MD; MD; MH; MH; MH; MH; MH), storing a topology-mapping (K23; K23; K28; K28; K28; K28; K28) related to said depth-mapping increasing in depth (K46; K46; K52; K52; K52; K52; K53) through an edge-relationship (K46/K23; K46/K23; K52/K28; K52/K28; K52/K28; K52/K28; K53/K28) and storing said buffer type as 'input buffer'.

FIG. 26D shows the resulting buffer content B1 through B16, a logical node, a topology-mapping and a buffer type.

Note that at action iii) above, buffer content of physical nodes that are not mapped to logical nodes is stored at an input buffer of the next logical node in the recursive-path.

Note that no PoAs have been defined for the Point-of-Attachment between logical nodes and logical topology-mappings. Therefore, a topology-mapping (K22; K23; K24; K25; K28; K22; K23; K24; K28; K25; K28; K23; K23; K28; K28; K28; K28; K28) is stored at actions i), ii) and iii) above. The combination of said logical node (MB; MC; MD; MC; MG; MC; MD; ME; MH; MG; MH; MD; MD; MH; MH; MH; MH; MH) and said topology-mapping (K22; K23; K24; K25; K28; K22; K23; K24; K28; K25; K28; K23; K23; K28; K28; K28; K28; K28) determines a buffer of said logical node. Alternatively, logical PoA's might be defined and stored.

Step 5

Compile said overall logical network against a second set of physical nodes by applying SDN Compiler method.

The SDN Compiler method disclosed in PCT/EP2014/055640 is now applied, resulting in a second set of physical nodes against which the overall logical network is compiled. The above method is illustrated by an example, but not limited to, shown in FIGS. 27A through 27G. FIG. 27A shows a physical node RA, representing a sixth computing equipment, a physical node RB, representing a seventh packet forwarding system, a physical node RC, representing a eighth packet forwarding system, a physical node RD, representing a ninth packet forwarding system, a physical node RE, representing a seventh computing equipment, a physical node RF, representing a tenth packet forwarding system, a physical node RG, representing a eleventh packet forwarding system and a physical node RH, representing a eighth computing equipment interconnected by physical links.

FIG. 27B shows physical nodes RA, RB, RC, RD, RE, RF, RG, RH and logical nodes MA, MB, MC, MD, ME, MF, MG, MH, depth-mappings and topology-mappings. FIG. 27C shows physical topology-mappings named S1 through S10 per the notation of FIG. 6A. FIG. 27D shows depth-mappings named S21 through S32 per the notation of FIG. 6A. FIG. 27E shows topology-mappings named K21 through K29 per the notation of FIG. 6C. The topology-mappings named K21 through K29 are calculated using the first method to calculate a topology-mapping. We calculate the recursive-path of the requested topology-path named K31, as described above. Using the relationships shown in FIG. 27E we recursively calculate said recursive-path and a set of edge-relationships comprising nested edge-relationships for each edge as shown in FIG. 27F. FIG. 27F also shows buffer content B1 through B16 as per FIG. 26D and described above.

Step 6

Determine buffer content for each physical node within said second set of physical nodes from buffer content stored with said set of logical nodes.

We use the recursive-path of a requested-path (K31, as shown in FIG. 27F), said requested-path being determined by each packet stored with a logical node, to determine said buffer of a physical node within said second set of physical nodes. We use a combination of a logical node and a logical topology-mapping denoting a logical buffer, as shown in FIG. 26D, denoting a buffer from which said buffer content was sent to determine the position in the recursive-path to store said buffer content. FIG. 27F shows the recursive-path of the topology-path named K31 including buffer content B1 through B16 using a combination of a logical node and a logical topology-mapping denoting a logical buffer for which said buffer content is stored to determine the position in the recursive-path to store said buffer content.

We now apply the following method:

iv) IF said buffer content (B1; B3; B7(1); B11; B13) belongs to an output buffer of a logical node (MB; MC; MD; MC; MG) and said logical node (MB; MC; MD; MC; MG) is mapped to a physical node (RB; RC; RD; RC; RG) through a depth-mapping decreasing in depth (S23; S25; S27; S25; S31) within said recursive-path, storing said buffer content (B1; B3; B7(1); B11; B13), storing said physical node (RB; RC; RD; RC; RG), storing a PoA (p503; p505; p507; p509; p515) denoting a point-of-attachment between said physical node (RB; RC; RD; RC; RG) and a topology-mapping (S2; S3; S4; S5; S10), said topology-mapping following said depth-mapping decreasing in depth (S23; S25; S27; S25; S31) in said recursive-path and storing said buffer type.

v) ELSE IF said buffer content (B2; B4; B5; B6; B7(2); B8(1); B8(2); B9; B10; B12; B14; B15; B16) belongs to an input buffer of a logical node (MC; MD; MD; MD; MH; ME; MH; MH; MH; MG; MH; MH; MH) and said logical node (MC; MD; MD; MD; MH; ME; MH; MH; MH; MG; MH; MH; MH) is mapped to a physical node (RC; RD; RD; RD; RH; RE; RH; RH; RH; RG; RH; RH; RH) through a depth-mapping increasing in depth (S24; S26; S26; S26; S32; S28; S32; S32; S32; S30; S32; S32; S32) within said recursive-path, storing said buffer content (B2; B4; B5; B6; B7(2); B8(1); B8(2); B9; B10; B12; B14; B15; B16), storing said physical node (RC; RD; RD; RD; RH; RE; RH; RH; RH; RG; RH; RH; RH), storing a PoA (p504; p506; p506; p506; p516; p508; p516; p516; p516; p514; p516; p516; p516) denoting a point-of-attachment of said physical node (RC; RD; RD; RD; RH; RE; RH; RH; RH; RG; RH; RH; RH) and a topology-mapping (S2; S3; S3; S3; S10; S4; S10; S10; S10; S8; S10; S10; S10), said topology-mapping preceding said depth-mapping increasing in depth S24; S26; S26; S26; S32; S28; S32; S32; S32; S30; S32; S32; S32) in said recursive-path and storing said buffer type.

FIG. 27G shows the resulting buffer content B1 through B16, a physical node, a Point-of-Attachment (PoA) and a buffer type.

Step 7

Send said buffer content (B1; B2; B3; B4; B5; B6; B7(1); B7(2); B8(1); B8(2); B9; B10; B11; B12; B13; B14; B15; B16), PoA (p503; p504; p505; p506; p506; p506; p507; p516; p508; p516; p516; p516; p509; p514; p515; p516; p516; p516), and buffer type to each physical node (RB; RC; RC; RD; RD; RD; RD; RH; RE; RH; RH; RH; RC; RG; RG; RH; RH; RH) within said second set of physical nodes and an instruction to start forwarding said buffer content (B1; B2; B3; B4; B5; B6; B7(1); B7(2); B8(1); B8(2); B9; B10; B11; B12; B13; B14; B15; B16) at third time t3>t2.

In order to synchronize this activity among physical nodes a time t3 is included in the instruction. For synchronous execution said physical nodes will have to be timed and synchronized.

Above actions result in the following method of migrating an overall logical network by a compiler comprising the following actions:

1) Determining forwarding instructions that have been created for said overall logical network and a first set of physical nodes at which said forwarding instructions have been deployed,
2) Sending instructions to said first set of physical nodes to:
    a) Stop packet forwarding activities at a first time t1,
    b) Send buffer content matching said forwarding instructions at a second time t2>=t1 to said compiler,
    c) Remove said forwarding instructions,
3) Receiving and storing buffer content from said first set of physical nodes,
4) Mapping buffer content from said first set of physical nodes to buffers of said set of logical nodes and storing said buffer content with said set of logical nodes,
5) Compiling said overall logical network against a second set of physical nodes by applying a compiler method,
6) Determining buffer content for each physical node within said second set of physical nodes from buffer content stored with said set of logical nodes.
7) Sending said buffer content, points-of-attachment and buffer type to each physical node within said second set of physical nodes and an instruction to each physical node to start forwarding said buffer content at a third time t3>t2.

As will be understood by a person skilled in the art, above method may be used to duplicate a network by omitting step 2a and step 2c.

As described above, a logical network may be used to define logical processes exchanging data through message-passing and a logical topology-path may represent a program. Using the above described method, a program expressed as a logical topology-path within a logical network can be migrated during operation of said program from a first set of physical nodes to a second set of physical nodes. As will be understood by a person skilled in the art, in said migration a physical node within said first set of physical nodes should not maintain any state. As an example, but not limited to, said migration during operation of said program might be performed in case of maintenance on said first set of physical nodes.

It is observed that the content of the present application, including its claims, can be combined with the teachings of EP14185828.2 which is not pre-published but filed on 22 Sep. 2014.

It is observed that the content of the present application, including its claims, can be combined with the teachings of EP15158114.7 which is not pre-published but filed on 6 Mar. 2015.

In the above specification, reference has been made to many different kinds of units, like controller, compiler, node, virtual machine, NIC, etc. (cf. PCT/EP2014/055640 page 89). As will be apparent to persons skilled in the art, the functionality of such units is performed by at least one of hardware and software running on a processing unit. Such hardware may be any known type of hardware (now and in the future) arranged to perform the claimed functions. FIG. 10 shows a schematic diagram of a computer arrangement that can perform such functions. FIG. 10 shows a kind of "complete" picture: it will be evident that some components (like a printer) may not be used for many of the units specified in the present document.

The arrangement shown in FIG. 10 comprises a processor 1 for carrying out arithmetic operations.

The processor 1 is connected to a plurality of memory components, including a hard disk 5, Read Only Memory (ROM) 7, Electrically Erasable Programmable Read Only Memory (EEPROM) 9, and Random Access Memory (RAM) 11. Not all of these memory types need necessarily be provided. Moreover, these memory components need not be located physically close to the processor 1 but may be located remote from the processor 1.

The processor 1 is also connected to units for inputting instructions, data etc. by a user, like a keyboard 13, and a mouse 15. Other input units, such as a touch screen, a track ball and/or a voice converter, known to persons skilled in the art may be provided too.

A reading unit 17 connected to the processor 1 is provided. The reading unit 17 is arranged to read data from and possibly write data on a data carrier like a floppy disk 19 or a CDROM 21. Other data carriers may be tapes, DVD, Blu Ray disks, Compact Flash (CF), Secure Digital (SD), Micro SD, Mini SD, Extreme Digital (xD), and memory sticks, etc. as is known to persons skilled in the art. The data carrier may be provided with a computer program product comprising instructions and data arranged to be read by the processor 1 and, after being read, allowing the processor 1 to perform a method in accordance with the invention. Such a computer program product may then be loaded in one of the memory components 5, 7, 9, 11. However, such computer program product may, alternatively, be downloaded via the telecommunication network 27.

The processor 1 may be connected to a printer 23 for printing output data on paper, as well as to a display 3, for instance, a monitor or LCD (Liquid Crystal Display) screen, a plasma display panel, an Organic Light Emitting Diode (OLED), an Active Matrix OLED (AMOLED) or any other type of display known to persons skilled in the art.

The processor 1 may be connected to a communication network 27, for instance, the Public Switched Telephone Network (PSTN), a Local Area Network (LAN), a Wide Area Network (WAN), the Internet, etc. by means of an I/O unit 25. The processor 1 may be arranged to communicate with other communication arrangements through the network 27.

The processor 1 may be implemented as stand alone system, or as a plurality of parallel operating processors each arranged to carry out subtasks of a larger computer program, or as one or more main processors with several sub-processors. Parts of the functionality of the invention may even be carried out by remote processors communicating with processor 1 through the network 27.

It is to be understood that the invention is limited by the annexed claims and its technical equivalents only. In this document and in its claims, the verb "to comprise" and its conjugations are used in their non-limiting sense to mean that items following the word are included, without excluding items not specifically mentioned. In addition, reference to an element by the indefinite article "a" or "an" does not exclude the possibility that more than one of the element is present, unless the context clearly requires that there be one and only one of the elements. The indefinite article "a" or "an" thus usually means "at least one".

The invention claimed is:

1. A method of controlling an overall network by a compiler, based on a logical network model, the overall network comprising two or more physical nodes, the physical nodes being interconnected by physical links in accordance with a physical network layout, the logical network model comprising logical nodes, each logical node being indicated with a logical node name, each logical node name referring to at least one physical node in the overall network, the method as performed by the compiler comprising the following actions:
  a) Storing physical node names, each physical node name being an unique identifier of one physical node, storing physical topology-mappings, each physical topology-mapping being one physical link in one direction, said physical topology-mapping being based on a directed graph representation, and storing point-of-attachment names of said physical nodes, each of the point-of-attachment names of a physical node concerned being an unique identifier of a point-of-attachment between the physical node concerned and a physical link connecting the physical node concerned to another physical node,
  b) Storing logical node names for said logical nodes, each logical node name being an unique identifier of one logical node and storing depth-mappings, said depth-mappings at least defining how logical nodes are mapped to physical nodes, said depth-mapping being based on a directed graph representation, storing one or more operation names, each operation name denoting one operation, storing one or more operation calls each identified by a combination of an operation name, at least one edge, and a logical node denoting a location at which said operation is to be performed,
  c) Creating and storing one or more logical topology-mappings, each logical topology-mapping being a directed graph representation from a first logical node to a second logical node, calculated as a concatenation of a first depth-mapping from the first logical node to a first physical node, zero or more physical topology-paths from the first physical node to a second physical node and a second depth-mapping from the second physical node to the second logical node, said a physical topology-path being a concatenation of one or more physical topology-mappings,
  d) Creating and storing a requested-topology-path being a concatenation of one or more logical topology-mappings,
  e) Calculating through recursion and storing a recursive-path for said requested-topology-path, comprising logical nodes as indicated by said logical node names, depth-mappings, physical nodes as indicated by said physical node names, physical topology-mappings, physical point-of-attachments as indicated by physical point-of-attachment names, said recursive-path being based on a directed graph representation,
  f) Creating an instruction to perform an additional operation, being one of said stored operations, on a packet or signal by one of said physical nodes,
  g) Creating at least one of forwarding table entries and forwarding instructions for physical nodes in said recursive-path from said recursive-path, including an instruction to perform one or more operations on said packet or signal in one or more physical nodes, said operation being denoted by said operation name,
  h) Sending at least one of said forwarding table entries and forwarding instructions, either directly or indirectly, to physical nodes in said recursive-path.

2. The method according to claim 1, wherein said overall network comprises a plurality of networks, said plurality of networks comprising a first set of networks comprising one or more networks and said logical network model comprising a second set of networks comprising one or more networks, said first set of networks being grouped in one or more layers (n) and said second set of networks being grouped in one or more layers n and at one or more depths d from said first set of networks, wherein each one of those networks of said first set which are at a same layer n are related to one another by a topology-mapping, each one of those networks of said first set which are at a higher layer than a minimum layer n=n_min, n_min(d) being a lowest layer at particular depth d and n_min(d) being =>0, are related to zero or more networks of said first set of networks at a preceding layer n−y with 0<y<=n−n_min(d), by a layer-mapping, each one of those networks of said second set of networks which are at a first depth d=1 from said first set of networks are related to one or more of said networks of said first set of networks by a first depth-mapping, each one of those networks of said second set of networks which are at a higher layer than minimum layer n=n_min are related to zero or more networks of said second set of networks at a preceding layer n−y with 0<y<=n-n_min, n_min being the lowest layer at particular depth d by a layer-mapping, and each one of those networks of said second set of networks which are at a second or higher depth d>=2 from said first set of networks are related to one or more networks of said second set of networks at a preceding depth d−x with x larger than zero and smaller than or equal to d by a depth-mapping and/or are related to one or more networks of said first set of networks by a depth-mapping, where each network of said first set of networks comprises one or more physical nodes and each network of said second set of networks comprises logical nodes.

3. The method according to claim 2, wherein at least one network of said first set of networks is arranged as a first nested configuration of one or more networks at one or more levels h relating to one another by first level-mappings, networks of said first set of networks at a lowest level h=h_min being either a physical node or a virtual node, and networks at higher levels than lowest level h=h_min possibly being either a physical node or a virtual node, where h_min=<h=<h_max, h_max being a maximum level.

4. The method according to claim 2, wherein at least one network of said second set of networks is arranged as a second nested configuration of one or more networks at one or more levels h relating to one another by second level-mappings, networks of said second set of networks at a lowest level h=h_min being a logical node, and networks at higher levels than lowest level h=h_min possibly being a logical node, where h_min=<h=<h_max, h_max being a maximum level.

5. The method according to claim 4, comprising the following actions:
Calculating and storing a level-path being a concatenation of level-mappings.

6. The method according to claim 2, comprising the following actions:
Calculating and storing a topology-mapping from a first network at a first depth d, a first layer n1 and a first level h1 to a second network at said first depth d, said first layer n1 and said first level h1 as a concatenation of a depth-mapping from said first network to a third network at a second depth d−x, a second layer n2 and a second level h2, a topology-level-path from said third network to a fourth network at said second depth d−x, said second layer n2 and said second level h2 and a depth-mapping from said fourth network to said second network with x being larger than zero and smaller than or equal to d, and wherein said first layer n1 may be equal to said second layer n2.

7. The method according to claim 2, comprising the following actions:
Calculating and storing a topology-mapping from a first network at a depth d, a first layer n and a first level h1 to a second network at said depth d, said first layer n and said first level h1 as a concatenation of a layer-mapping from said first network to a third network at said depth d, a second layer n−y and a second level h2, a topology-level-path from said third network to a fourth network at said depth d, said second layer n−y and said second level h2 and a layer-mapping from said fourth network to said second network with y being larger than zero and smaller than or equal to n−n_min (d).

8. The method according to claim 2, comprising the following actions:
Calculating and storing a layer-mapping from a first network at a first depth d+x, a first layer n1 and a first level h1 to a second network at said first depth d+x, a second layer n1−y and a second level h2 as a concatenation of a depth-mapping from said first network to a third network at a second depth d=0, a third layer n2 and a third level h3, zero or more known/unknown physical layer-mappings from said third network to a fourth network at said second depth d=0, a fourth layer n2−y and a fourth level h4 and a depth-mapping from said fourth network to said second network with x larger than zero, with y larger than zero and smaller than or equal to n1−n1_min and smaller than or equal to n2−n2_min, n1_min being the lowest layer at said first depth d+x, n2_min being the lowest layer at said second depth d=0.

9. The method according to claim 2, comprising the following actions:
Calculating and storing a layer-mapping from a first network at a first depth d+x, a first layer n1 and a first level h1 to a second network at said first depth d+x, a second layer n1+y and a second level h2 as a concatenation of a depth-mapping from said first network to a third network at a second depth d=0, a third layer n2 and a third level h3, zero or more known/unknown physical layer-mappings from said third network to a fourth network at said second depth d=0, a fourth layer n2+y and a fourth level h4 and a depth-mapping from said fourth network to said second network with x larger than zero, with y larger than zero and smaller than or equal to n1_max−n1 and smaller than or equal to n2_max−n2, n1_max being the highest layer at said first depth d+x, n2_max being the highest layer at said second depth d=0.

10. The method according to claim 1, comprising the following actions:
at action g) of claim 1) Creating an instruction to perform an additional operation, being one of said stored operations, on a packet or signal by one of said physical nodes IF an operation call as identified by a combination of an operation name, at least one edge, and said one of said logical nodes, has been defined AND said recursive-path contains a concatenation of one or more second depth-mappings increasing in depth from said one of said physical nodes to one of said logical nodes and/or a concatenation of one or more first depth-mappings decreasing in depth from said one of said logical nodes to said one of said physical nodes, AND said at least one edge is contained in an incoming set of edge-relationships of an incoming physical topology-mapping and/or an outgoing set of edge-relationships of an outgoing physical topology-mapping of said one of said physical nodes within said recursive-path.

11. The method according to claim 1, comprising the following actions:
- at action g) of claim 1) Creating an instruction to perform an additional operation, being one of said stored operations, on a packet or signal by one of said physical nodes IF an operation call as identified by a combination of an operation name, at least one edge, said edge being an incoming edge or a traversing edge, and said one of said logical nodes, has been defined AND said recursive-path contains a concatenation of one or more second depth-mappings increasing in depth from said one of said physical nodes to one of said logical nodes AND said at least one edge is contained in an incoming set of edge-relationships of an incoming physical topology-mapping of said one of said physical nodes within said recursive-path.

12. The method according to claim 1, comprising the following actions:
- at action g) of claim 1) Creating an instruction to perform an additional operation, being one of said stored operations, on a packet or signal by one of said physical nodes IF an operation call as identified by a combination of an operation name, at least one edge, and said one of said logical nodes, has been defined AND said recursive-path contains a second depth-mapping increasing in depth from said one of said physical nodes to one of said logical nodes and/or a first depth-mapping decreasing in depth from said one of said logical nodes to said one of said physical nodes, AND said at least one edge is contained in an incoming set of edge-relationships of said second depth-mapping and/or an outgoing set of edge-relationships of said first depth-mapping of said one of said logical nodes within said recursive-path.

13. The method according to claim 10, comprising the following actions:
- at action a) of claim 1 storing one or more operation names of those physical nodes that can perform one or more operations, each operation name denoting one operation,
- at claim 10 apply an additional condition: AND said additional operation name is stored with said one of said physical nodes.

14. The method according to claim 1, comprising the following action:
- generating code for an additional operation, being one of said stored operations, said additional operation being identified by said operation name, on at least one of a packet and a signal by one of said physical nodes.

15. The method according to claim 1, comprising the following action:
- generating code for networking operations, being transmitting, receiving, switching, multiplexing or de-multiplexing operations on a packet or signal by one of said physical nodes.

16. The method according to claim 1, wherein a physical node is mapped to more than one logical node through a depth-mapping resulting in multicasting.

17. The method according to claim 1, wherein a first topology-mapping between a first physical node and a second physical node is removed and a second topology-mapping between said second physical node and a third physical node is created resulting in mobility of said second physical node.

18. The method according to claim 2, wherein a logical node at a highest layer denotes logical storage or logical compute, and a requested-topology-path denotes a logical message-stream.

19. The method according to claim 1, including an action of migrating the overall logical network by said compiler comprising the following actions:
1) Determining forwarding instructions that have been created for said overall logical network and a first set of physical nodes at which said forwarding instructions have been deployed,
2) Sending instructions to said first set of physical nodes to:
   a) Stop packet forwarding activities at a first time t1,
   b) Send buffer content matching said forwarding instructions at a second time t2>=t1 to said compiler,
   c) Remove said forwarding instructions,
3) Receiving and storing buffer content from said first set of physical nodes,
4) Mapping buffer content from said first set of physical nodes to buffers of said set of logical nodes and storing said buffer content with said set of logical nodes,
5) Compiling said overall logical network against a second set of physical nodes by applying a compiler method,
6) Determining buffer content for each physical node within said second set of physical nodes from buffer content stored with said set of logical nodes,
7) Sending said buffer content, points-of-attachment and buffer type to each physical node within said second set of physical nodes and an instruction to each physical node to start forwarding said buffer content at a third time t3>t2.

20. The method according to claim 1, comprising:
Calculating forwarding entries for a physical packet-switching node, referred to as node in below method, within the recursive-path of a requested-path by performing the below method comprising the following actions:
i. if the recursive-path does not contain an incoming topology-mapping or an incoming layer-mapping for said physical packet-switching node, and said physical packet-switching node is mapped to a source network of the recursive-path through one or more depth-mappings, creating for each outgoing topology-mapping and each outgoing layer-mapping of said physical packet-switching node in said recursive-path a forwarding entry instructing said physical packet-switching node to create a packet with a packet overhead containing switching-identifiers of an outgoing set of edge-relationships of said outgoing topology-mapping or said outgoing layer-mapping, and to send said packet out of an output port, said output port being a point-of-attachment between said physical packet-switching node and said outgoing topology-mapping or said outgoing layer-mapping,
ii. else if the recursive-path does not contain an outgoing topology-mapping or an outgoing layer-mapping for said physical packet-switching node, and said physical packet-switching node is mapped to a destination network of the recursive-path through one or more depth-mappings, creating for each incoming topology-mapping and each incoming layer-mapping of said physical packet-switching node in said recursive-path a forwarding entry instructing said physical packet-switching node to receive at an input port a packet in accordance with switching-identifiers of the incoming set of edge-relationships of said incoming topology-mapping or said incoming layer-mapping, said input port being a point-of-attachment of between said physical packet-switching node and said incoming topology-mapping or said incoming layer-mapping, iii. else if the recursive-path does contain one incoming topology-mapping or one incoming layer-mapping for said physical packet-switching node and the recursive-path does contain one or more outgoing topology-mappings or outgoing layer-mappings for said physical packet-switching node, creating for each outgoing topology-mapping and each outgoing layer-mapping of said physical packet-switching node in said recursive-path a forwarding entry instructing said physical packet-switching node to receive an incoming packet at an input port, said input port being a point-of-attachment between said physical packet-switching node and said incoming topology-mapping or said incoming layer-mapping specified by the recursive-path, said packet in accordance with switching-identifiers of an incoming set of edge-relationships of said incoming topology-mapping or said incoming layer-mapping and to modify said packet in accordance with switching-identifiers of an outgoing set of edge-relationships of said outgoing topology-mapping or said outgoing layer-mapping, and forward said packet out of an output port, said output port being a point-of-attachment between said physical packet-switching node and said outgoing topology-mapping or said outgoing layer-mapping.

21. The method according to claim 1 comprising:

Calculating forwarding entries for a physical non-packet-switching node within the recursive-path of a requested-path by performing the below method comprising the following actions:

i. if the recursive-path does not contain an incoming topology-mapping or an incoming layer-mapping for said physical non-packet-switching node, and said physical non-packet-switching node is mapped to a source network of the recursive-path through one or more depth-mappings, creating for each outgoing topology-mapping and each outgoing layer-mapping of said physical non-packet-switching node in said recursive-path an instruction instructing said physical non-packet-switching node to create a signal in accordance with a switching-identifiers of an outgoing set of edge-relationships of said outgoing topology-mapping or said outgoing layer-mapping, and to send said signal out of an output port, said output port being a point-of-attachment between said physical non-packet-switching node and said outgoing topology-mapping or said outgoing layer-mapping, ii. else if the recursive-path does not contain an outgoing topology-mapping or an outgoing layer-mapping for said physical non-packet-switching node, and said physical non-packet-switching node is mapped to a destination network of the recursive-path through one or more depth-mappings, creating for each incoming topology-mapping and each incoming layer-mapping of said physical non-packet-switching node in said recursive-path an instruction instructing said physical non-packet-switching node to receive at an input port a signal in accordance with switching-identifiers of an incoming set of edge-relationships of said incoming topology-mapping or said incoming layer-mapping, said input port being a point-of-attachment of between said physical non-packet-switching node and said incoming topology-mapping or said incoming layer-mapping, iii. else if the recursive-path does contain one incoming topology-mapping or one incoming layer-mapping for said physical non-packet-switching node and the recursive-path does contain one or more outgoing topology-mappings or outgoing layer-mappings for said physical non-packet-switching node, creating for each outgoing topology-mapping and each outgoing layer-mapping of said physical non-packet-switching node in said recursive-path an instruction instructing said physical non-packet-switching node to receive an incoming signal at an input port in accordance with switching-identifiers of an incoming set of edge-relationships of said incoming topology-mapping or said incoming layer-mapping, said input port being a point-of-attachment between said physical non-packet-switching node and said incoming topology-mapping or said incoming layer-mapping specified by the recursive-path, and to modify said signal in accordance with switching-identifiers of an outgoing set of edge-relationships of said outgoing topology-mapping or said outgoing layer-mapping, and forward said signal out of an output port, said output port being a point-of-attachment between said physical non-packet-switching node and said outgoing topology-mapping or said outgoing layer-mapping.

22. The method according to claim 1, wherein networks, mappings and topology-level-paths are stored in a graph database, said networks are stored as a named vertex in said graph database, said mappings are stored as a named and directed edge in said graph database, said topology-level-paths are stored as a named and directed edge in said graph database, properties of said networks are stored as vertex attributes in said graph database, properties of said mappings are stored as edge attributes in said graph database, properties of said topology-level-paths are stored as edge attributes in said graph database, types of mapping are stored as an edge type in said graph database, and types of topology-level-paths are stored as an edge type in said graph database, and wherein the creation and recalculation of mappings and topology-level-paths is implemented by querying a graph database.

23. The method according to claim 1 in which one or more networks at depth d>0 represent user requirements, in which one or more topology-mappings and/or layer-mappings and/or level-mappings represent user requirements, in which zero or more policies represent user requirements, in which the namespace of the one or more networks at depth d>0 is not used in a forwarding decision by a physical or virtual node.

24. A compiler for controlling an overall network, the compiler comprising a processor and a memory storing a non-transitory computer readable medium, arranged to perform the method of claim 1.

25. A non-transitory computer-readable medium comprising instructions and data, arranged to be loaded by the compiler according to claim 24.

26. The method according to claim 1, comprising the following actions:

at action c) storing for each of said logical topology-mappings, edge-relationships comprising:

i. a first edge-relationship being a relationship between the first depth-mapping and said logical topology-mapping, ii. one or more second edge-relationships, each second edge-relationship being a relationship between one of said one or more physical topology-mappings in said physical topology-path and said logical topology-mapping or a second edge-relationship being a relationship between said physical topology-path and said logical topology-mapping and one or more fourth edge-relationships each fourth edge-relationship being a relationship between one of said one or more physical topology-mappings and said physical topology-path, iii. a third edge-relationship being a relationship between the second depth-mapping and said logical topology-mapping, at action d) storing one or more further edge-relationships, each further edge-relationship concerned being a relationship between one logical topology-mapping within the requested-topology-path and said requested-topology-path.

27. The method according to claim 26, comprising the following actions:
at action e) of claim 1 calculating and storing nested edge-relationships.

28. The method according to claim 1, wherein at action b) of claim 1 the operation name denoting an operation and a logical node name being a unique identifier of a logical node are identical and stored once.

29. A network comprising the compiler according to claim 24.

* * * * *